United States Patent [19]
Torihara et al.

[11] Patent Number: 5,693,958
[45] Date of Patent: Dec. 2, 1997

[54] LIGHT-WRITING-TYPE LIQUID CRYSTAL ELEMENT HAVING A PHOTOCONDUCTOR BETWEEN CARRIER BLOCKING LAYERS

[75] Inventors: Hiroshi Torihara, Yamabe-gun; Akitsugu Hatano, Nara; Shinpei Higashida, Tenri, all of Japan

[73] Assignee: Sharp Kabushiki Kaisha, Osaka, Japan

[21] Appl. No.: 588,257

[22] Filed: Jan. 18, 1996

[30] Foreign Application Priority Data

Jan. 25, 1995 [JP] Japan .................................. 7-010155
Jan. 18, 1996 [JP] Japan .................................. 8-006363

[51] Int. Cl.$^6$ .......................... H01L 29/04; H01L 31/036
[52] U.S. Cl. ................... 257/59; 257/72; 349/25; 349/26; 349/27
[58] Field of Search .................... 359/71, 72, 74, 359/294; 257/59, 72; 349/25–27

[56] References Cited

U.S. PATENT DOCUMENTS 4,314,014  2/1982  Yamamoto et al. ........................ 430/57

FOREIGN PATENT DOCUMENTS 43681       4/1981   Japan .
58-034435A  2/1983   Japan .
4-261520A   9/1992   Japan .
104522      11/1995  Japan .

Primary Examiner—Tom Thomas
Assistant Examiner—Fetsum Abraham
Attorney, Agent, or Firm—Nixon & Vanderhye, P.C.

[57] ABSTRACT

A light-writing-type liquid crystal element which is provided with carrier-blocking layers that are installed on the transparent electrode side and on the light-shielding layer side of a photoconductive layer and that prevents carriers from entering the photoconductive layer. By adjusting the width of a depletion layer that is formed by the carrier-blocking layers and other factors, the energy-band structure of the photoconductive layer is kept asymmetric so that when a voltage is applied onto the photoconductive layer, the area on the writing-light incident-side of the photoconductive layer receives a higher voltage than that of the area on the liquid-crystal-layer side. Consequently, the photosensitivity of the photoconductive layer is improved, and the resolution as well as the contrast of the element can be improved.

39 Claims, 79 Drawing Sheets

LIGHT-WRITING-TYPE LIQUID CRYSTAL ELEMENT HAVING A PHOTOCONDUCTOR BETWEEN CARRIER BLOCKING LAYERS

FIELD OF THE INVENTION

The present invention relates to a light-writing-type liquid crystal element, and more particularly concerns a light-writing-type liquid crystal element that is used for projection-type liquid crystal displays.

BACKGROUND OF THE INVENTION

For example, the basic structure of a conventional light-writing-type liquid crystal element is disclosed in Japanese Laid-Open Patent Publication No. 43681/1981 (Tokukaishou 56-43681). As illustrated in FIG. 78, the light-writing-type liquid crystal element has a pair of glass substrates 101a and 101b that are disposed face to face through insulating spacer seals 107, and a liquid crystal layer 108 that is sandwiched in between them and that is made of nematic liquid crystal that is twisted to 45° using the hybrid electric-field-effect mode.

On the glass substrate 101a, transparent electrode 102a made of an ITO (Indium Tin Oxide) film, a photoconductive layer 103 made of CdS (cadmium sulfide), a light-shielding layer 104 made of CdTe (cadmium telluride), a multi-layered dielectric mirror layer 105, and an inactive insulating film 106a made of $SiO_2$ (silicon dioxide) are stacked in this order. Further, on the other glass substrate 101b, are stacked a transparent electrode 102b made of an ITO film and an inactive insulating film 106b made of $SiO_2$ in this order. Here, the above-mentioned inactive insulating films 106a and 106b are alignment films that align liquid crystal molecules inside the liquid crystal layer 108 in a predetermined direction, and that are supposed to have neither chemical interaction nor electrical interaction with the liquid crystal material. Moreover, an ac power source 109, which is used for driving the light-writing-type liquid crystal elements, is connected between the transparent electrodes 102a and 102b.

In general, the light-writing-type liquid crystal elements having the above-mentioned arrangement are used as light valves (LV) 112 for projection systems that are, for example, shown in FIG. 79.

Referring to FIGS. 78 and 79, an explanation will be given of the operating principle of the projection system. First, light, which is illuminated by a CRT 113 functioning as an image-forming means, is formed into a writing light beam 110 through a lens 114 so that an image is formed on the light-writing side of the light valve 112.

In this case, on the light-writing side of the light-writing-type liquid crystal element, when the writing light 110 representative of a predetermined image is incident on the photoconductive layer 103, the impedance of the photoconductive layer 103 is reduced at the light-incident area (bright state). Therefore, most of the voltage that has been applied by the ac power source 109 is applied to the liquid crystal layer 108 so that the liquid crystal at this area in the liquid crystal layer 108 is subjected to the electro-optic effect and is allowed to polarize. In contrast, at the area which has not been subjected to the incident light (dark state), the impedance of the photoconductive layer 103 does not change, and only provides an insufficient voltage that serves to induce the electro-optic effect in the liquid crystal of the liquid crystal layer 108. Thus, it is possible to polarize the liquid crystal of the liquid crystal layer 108 spatially by utilizing the electro-optic effect that is partially exerted in the liquid crystal by changes in the impedance of the photoconductive layer 103 that occur depending on the presence and absence of light illumination.

Furthermore, on the reading side of the light-writing-up liquid crystal element, when reading light 111a, which is illuminated by a reading light source 115, passes through a polarizing beam splitter 116, the reading light 111a is polarized, and only reading light 111b having s-state polarization component is reflected by the polarizing beam splitter 116, and allowed to be incident on the reading side of the light valve 112. This reading light 111b of the s-state polarization component is not modulated by the liquid crystal layer 108 even when it is incident on the area that has not been subjected to the electro-optic effect of the liquid crystal layer 108, and remains to maintain s-state polarization. Therefore, the reading light 111b reflected by the multi-layered dielectric mirror layer 105, and again allowed to be incident on the polarizing beam splitter 116. Since the reading light 111b, which has been again incident on the polarizing beam splitter 116, has the s-state polarization component, it is reflected by the polarizing beam splitter 116, returned to the reading light source 115, and allowed to display black points on the screen 117. When incident on the area that has been subjected to the electro-optic effect of the liquid crystal layer 108, the reading light 111b passes through the polarizing beam splitter 116 so that a pattern that is identical to the image pattern of the writing light 110 is projected onto the screen 117.

However, CdS, which is used in the photoconductive layer 103 of the light-writing-type liquid crystal element, has a low light response speed in the range of several milli seconds to several tens of mils seconds. Here, the light response speed refers to a speed at which a current, which has been exerted by carriers caused by the incident of light, flows. Therefore, a problem has arisen in which this arrangement is not suitable for apparatuses, such as televisions, that require high-speed switching of images. Moreover, another problem of CdS is that since CdS has a great conductivity in dark, carriers have great diffusions in the lateral direction so that it is difficult to obtain high resolution.

Moreover, in the light-writing-type liquid crystal element having the above-mentioned arrangement, the photoconductive layer 103, the light-shielding layer 104 and the multi-layered dielectric mirror layer 105 are made of different materials. Therefore, the respective layers require different manufacturing methods. Further, unconformities tend to occur in the respective grating constants of the photoconductive layer 103, the light-shielding layer 104 and the multi-layered dielectric mirror layer 105; this results in a problem of adherence property among the respective layers, that is, a problem of separations between the layers that are caused by differences in coefficients of thermal expansion. Consequently, this causes a problem of low reliability in the light-writing-type liquid crystal element. Furthermore, in the case of using CdS, its sulphur component tends to shorten the service life of a vacuum apparatus.

Thus, it has been proposed that an amorphous silicon hydride film, which has a faster light response speed in the order of several tens micro seconds and which is superior in reproducibility of the element, should be adopted as the material of the photoconductive layer. Amorphous silicon hydride has a maximum sensitivity in the wavelength range of visible rays as does CdS, and its dark conductivity is not more than $10^{-9}$ $\Omega^{-1}$ $cm^{-1}$, which is smaller than that of CdS; therefore, the contrast of the light-writing-type liquid crystal element can be improved to a great degree, the resolution can be enhanced, and the reproducibility can also be improved.

As described above when amorphous silicon hydride is applied to the photoconductive layer, the performances of the light-writing-type liquid crystal element can be greatly improved. However, it has been considered to be difficult to put it into practical use since amorphous silicon hydride does not have sufficient photosensitivity. The photosensitivity is defined as a ratio (Z dark/Z photo) between the impedance during dark time (Z dark) and the impedance during photo time (Z photo), and the greater the ratio, the better the photosensitivity.

Here, in a photoconductive layer using amorphous silicon hydride whose conductivity-type is intrinsic (i type), when comparisons are made between the cases in which positive bias and negative bias are applied to the ITO film, both dark current and photo current show an asymmetric pattern in their voltage versus current density characteristic, as shown in FIG. 80.

FIG. 80 shows that when comparisons are made between the absolute values of current density in dark current during both bias times, the absolute value of negative bias time is greater than that of positive bias time. It is believed that this is due to the fact that electron injection (carrier injection) is exerted from the ITO film during negative bias time. In contrast, when comparisons are made between the absolute values of current density in photo current during both bias times, the absolute value of negative bias time is smaller than that of positive bias time. It is considered that this is because positive holes tend to accumulate in the vicinity of the interface of the ITO film, and because the re-coupling between the optically excited electrons and the positive holes is more likely to occur in negative bias time than in positive bias time so that carriers in the amorphous silicon hydride decrease in number.

Therefore, in a photoconductive layer using amorphous silicon hydride whose conductivity-type is intrinsic, the impedance during dark time becomes smaller than the impedance that is calculated by using the original conductivity. In contrast, the impedance during photo time becomes greater than the impedance that is calculated by using the original conductivity. As a result, the impedance ratio between dark and photo times becomes smaller. This causes an insufficient photosensitivity in the photoconductive layer, and has resulted in a problem in which good images cannot be provided.

Thus, the following patent publications have disclosed element structures wherein various efforts have been made to improve the photosensitivity in photoconductive layers using amorphous silicon hydride.

For example, Japanese Laid-Open Patent Publication No. 34435/1983 (Tokukaishou 58-34435) discloses various element structures in order to improve the photosensitivity in photoconductive layers. In other words, as illustrated in FIG. 81(a), this Patent Publication discloses an element structure wherein a transparent electrode film 121, a metal thin-film 122, an amorphous silicon hydride film (i type) 123b, an amorphous silicon hydride film (n type) 123c, and a light-shielding layer 124 are successively stacked. Further, as illustrated in FIG. 81(b), this Patent Publication discloses another element structure wherein a transparent electrode film 121, an amorphous silicon hydride film (p type) 123a, an amorphous silicon hydride film (i type) 123b, an amorphous silicon hydride film (n type) 123c, and a light-shielding layer 124 are successively stacked. Moreover, as illustrated in FIG. 81(c), this Patent Publication discloses still another element structure wherein a transparent electrode film 121, a transparent insulating layer 125, an amorphous silicon hydride film (i type) 123b, an amorphous silicon hydride film (n type) 123c, and a light-shielding layer 124 are successively stacked.

Therefore, the element structure of FIG. 81(a) forms a Schottky barrier by Joining the metal thin-film 122 to the amorphous silicon hydride film (i type) 123b; the element structure of FIG. 81(b) provides amorphous silicon hydride layers with the pin structure; and the element structure of FIG. 81(c) provides stacked layers of the transparent insulating layer (I) 125 and the amorphous silicon hydride layers (in type), which forms the Iin structure.

FIG. 75 shows the relationship between the dark current density and the photo current density during both bias times with respect to these three elements. In all these element structures, that is, the Schottky barrier structure, the pin structure and the Iin structure, the carrier injection from the transparent electrode can be commonly prevented. Therefore, when a reversed-bias voltage is applied, that is, when a minus voltage is applied to the transparent electrode, the density of dark current becomes very small. This results in a great impedance during dark time upon application of the reversed-bias voltage. Further, since the above-mentioned element structure forms a diode in its broader sense, the symmetric property of absolute values of photocurrent is suitable, but upon illumination of light, an internal potential is generated in the photoconductive layer so that the zero point of the photocurrent is shifted in the positive-bias direction by the order of several hundreds mV to 1 V.

In contrast, when a positive bias voltage is applied to the transparent electrode, the impedance during photo time becomes smaller as shown in FIG. 75, compared with the case of simply using an amorphous silicon hydride layer of the i type. Further, the impedance during dark time is maintained in a high-resistance state at the time of negative bias, but it is brought to a low-resistance state at the time of positive bias, compared with the case of simply using an amorphous silicon hydride layer of the i type. Consequently, the impedance during dark time becomes smaller than that of an amorphous silicon hydride layer of the i type. However, since the reduction of the impedance during photo time is influential to the point that the ratio of impedance between photo and dark times is greater in the case of using the above-mentioned element structure, that is, the diode structures in its broader sense, than in the case of simply using an amorphous silicon hydride layer of the i type. Thus, light-writing-type liquid crystal elements using these element structures have improved photosensitivity and contrast compared with those of conventional structures.

Moreover, Japanese Laid-Open Patent Publication No. 261520/1992 (Tokukaihei 4-261520) discloses another "liquid crystal display element". As illustrated in FIG. 76, this liquid crystal display element has a structure wherein a liquid crystal layer 134 is sandwiched between a glass substrate 131a, on which a transparent conductive film 132a and an alignment film 133a are stacked, and a glass substrate 131b, on which a transparent conductive film 132b, an inorganic insulating film 136b, an amorphous silicon hydride film 137, an inorganic insulating film 136a, a reading-light reflection film 135 functioning as a light-shielding layer and an alignment film 133b are stacked.

The above-mentioned photoconductive layer, which has a construction wherein the amorphous silicon hydride film 137 is sandwiched by the inorganic insulating film 136b and the inorganic insulating film 136a, prevents carrier injection from the transparent conductive film 131b to the amorphous silicon hydride film 137, as well as preventing carrier injection from the reading-light reflection film 135 to the amorphous silicon hydride film 137. With this structure, it is possible to increase the impedance upon both bias times during dark time, and consequently to improve the photosensitivity.

Meanwhile, in the photoconductive layer that is disclosed in Japanese Laid-Open Patent Publication No. 34435/1983 (Tokukaishou 58-34435) and that is a diode in its broader sense of element structure, the liquid crystal layer is always subjected to dc component due to the rectifying property of the diode and generation of internal potential. This results in a problem of deterioration in the liquid crystal layer and subsequent degradation in display characteristics.

In contrast, with the photoconductive layer having the element structure disclosed in Japanese Laid-Open Patent Publication No. 261520/1992 (Tokukaihei 4-261520), since the layer has a symmetric energy structure, it is possible to reduce the internal potential that is generated upon illumination of writing light; thus, the degradation of the liquid crystal layer 134 can be prevented.

However, in the above-mentioned photoconductive layer which has a construction wherein the amorphous silicon hydride film 137 is sandwiched by the inorganic insulating film 136b and the inorganic insulating film 136a, since the impedance as a whole is comparatively great, less photocurrent is allowed to flow when a positive bias voltage is applied to the transparent electrode 132b on the photoconductive layer side, compared with a case using a rectifying element. Therefore, the above-mentioned element structure has resulted in a problem in which the impedance during photo time can not be made as small as the rectifying element. Consequently, since the ratio (z dark/Z photo) between the impedance during dark time (Z dark) and the impedance during photo time (Z photo) becomes smaller, it is not possible to obtain good photosensitivity.

In order to solve this problem, Japanese Laid-Open Patent Publication No. 223814/1991 (Tokukaihei 3-223814) (Japanese Examined Patent Publication No. 104522/1995 (Tokukouhei 7-104522)) discloses a photoconductive layer which can prevent the lowering of the charge-mobility rate at the joint interfaces by using an arrangement wherein the compositions of semiconductors are successively changed in the vicinity of the Joint interfaces of the semiconductors.

However, in the photoconductive layer of the above-mentioned Patent Publication, the compositions of semiconductors are successively changed in the vicinity of the joint interfaces of the semiconductors in order to prevent the lowering of the charge-mobility rate, and the successive changes in the compositions are not necessarily made by taking into consideration the refractive index of light. Therefore, light reflection occur on the joint interfaces between the portions having the composition changes and the transparent electrode, and this results in a reduction in the amount of light that is to be incident on the photoconductive layer, and a subsequent lowering in the photosensitivity of the photoconductive layer.

SUMMARY OF THE INVENTION

It is therefore an objective of the present invention to provide a light-writing-type liquid crystal element which has high photosensitivity, high contrast and high resolution.

In order to achieve the above-mentioned objective, the light-writing-type liquid crystal element of the present invention is provided with:

(a) a pair of first and second transparent electrode substrates that are placed face to face with each other;

(b) a liquid crystal layer that is formed between the first and second transparent electrode substrates;

(c) a photoconductive layer that is formed inside the first transparent electrode substrate;

(d) a first carrier-blocking layer that is formed on the writing-light incident-side of the photoconductive layer and that prevents or suppress carrier injection and outflow into and from the photoconductive layer; and (e) a second carrier-blocking layer that is formed on the liquid-crystal-layer side of the photoconductive layer and that prevents or suppress carrier injection and outflow into and from the photoconductive layer. In this arrangement, the first and second carrier blocking layers are installed so that the energy-band structure of the photoconductive layer is kept asymmetric so that when a voltage is applied onto the photoconductive layer, the area on the writing-light incident-side of the photoconductive layer receives a higher voltage than that of the area on the liquid-crystal-layer side.

With this arrangement, during dark time, it is possible to prevent carrier injection from the transparent electrode as well as from the liquid-crystal-layer side upon application of a voltage because of the first and second carrier-blocking layers that are formed on the writing-light incident-side and the liquid-crystal-layer side. This makes the photoconductive layer become high resistance and the dark current to Become difficult to flow, resulting in high impedance in the photoconductive layer. Moreover, during photo time, the area on the writing-light incident-side of the photoconductive layer is allowed to receive a higher voltage upon application of the voltage and the electric field is effectively applied to the effective area of carrier generation. This makes the photoconductive layer become low in resistance and also makes the photo current easy to flow, resulting in low impedance in the photoconductive layer.

Here, this photoconductive layer has no rectifying property. In other words, since there is a voltage loss —not to an extent that would lower the photosensitivity—that is caused by the second carrier-blocking layer on the liquid crystal layer side (even though internal potential is generated in the photoconductive layer on the light-incident side), the internal electric potential is not as great as that of the pin-type element. Thus, since the dc component that is imposed on the liquid crystal layer due to the internal electric potential can be suppressed, it is possible to lengthen the service life of the liquid crystal layer, and consequently to lengthen the service life of the light-writing-type liquid crystal element.

In the above-mentioned element structure, since the ratio (Z dark/Z photo) between the impedance during dark time (Z dark) and the impedance during photo time (Z photo) becomes greater, it is possible to improve the photosensitivity of the photoconductive layer, compared with the conventional cases in which the impedance during dark time is increased, and consequently to improve the resolution. Further, the greater impedance ratio (Z dark/Z photo) of the photoconductive layer increases the voltage that is to be applied to the liquid crystal layer during photo time, thereby resulting in improved contrast.

Therefore, since the photosensitivity, resolution and contrast of the photoconductive layer can be improved, it becomes possible to provide a light-writing-type liquid crystal element that has high photosensitivity, high resolution and high contrast, and that also has a long service life.

In order to keep the energy-band structure of the photoconductive layer in an asymmetric state as described earlier, a depletion layer or a maximum depletion layer, which is formed by the first and second carrier-blocking layers, is desirably allowed to satisfy the following inequality during the driving time: $W_{Ii} > W_{BIi}$, where $W_{Ii}$ represents the width of a depletion layer or a maximum depletion layer that is formed in the area on the writing-light incident side and $W_{BIi}$ represents the width of a depletion layer or a maximum depletion layer that is formed in the area on the liquid-crystal-layer side.

Moreover, it is possible to eliminate the transport of carriers by constituting the first carrier-blocking layer of an insulating material, except for that caused by the tunnel effect on electrons. This arrangement makes it possible to virtually block the carrier injection from the transparent electrode completely. Here, since the insulating material (insulating layer) can reduce the gap between refractive indexes of the transparent electrode and the photoconductive layer on their interface, the interface reflection of the writing light is reduced, and the writing light is thus directed to the photoconductive layer effectively. Furthermore, it is also possible to improve the adhering strength of films in the photoconductive layer as a whole.

Moreover, the first carrier-blocking layer is also preferably constituted of a semiconductor of i-type or p-type with a wide gap which has a greater energy gap than the photoconductive layer or a semiconductor of p-type which has the same energy gap as the photoconductive layer.

This arrangement makes it possible to prevent carrier injection from the transparent electrode without using the insulating layer. Further, since the first carrier-blocking layer can be continuously formed in the forming device of the photoconductive layer, the manufacturing process can be simplified.

In particular, in the case of the heterojunction using semiconductors (i-type or p-type) with a wide gap, it is possible to make the film thinner, compared with the case where semiconductors of p-type having the same energy gap are used thus, it becomes possible to eliminate any extra voltage loss. Consequently, photocurrent is allowed to flow effectively. Furthermore, since carriers, which are generated by incident light, do not contact the transparent electrode directly, it is possible to eliminate reduction in photocurrent due to generation of the surface state caused by contact with the transparent electrode.

Moreover, it is also desirable to design the first carrier-blocking layer so that it has a chirp structure wherein the energy gap is narrowed toward the liquid crystal layer side. This arrangement makes it possible to eliminate portions having holes that are accumulated therein as a result of the interface contacting the transparent electrode or the insulating layer. Consequently, this makes it possible to suppress electrons generated in the photoconductive layer from re-coupling to holes, and to allow photocurrent to flow effectively. Therefore, since the photosensitivity of the photoconductive layer is improved, the photosensitivity and contrast of the light-writing-type liquid crystal element can be improved. Further, when the chirp structure is adopted, the refractive index can also be changed toward the photoconductive layer. This makes it possible to suppress reflection of the writing light, thereby allowing effective use of the writing light and improvement of the photosensitivity.

Furthermore, when the donor density of the area on the writing-light incident-side of the photoconductive layer is represented by $N_{DI}$ and the donor density of the area on the liquid crystal side is represented by $N_{DLC}$, it is desirable to satisfy the following inequality: $ND_{DI} < N_{DLC}$. With this arrangement, the width of a depletion layer or the width of a maximum depletion layer, which is formed in the area on the transparent electrode side of the photoconductive layer, becomes greater than the width of a depletion layer or the width of a maximum depletion layer that is formed in the area on the liquid crystal layer side of the photoconductive layer. Therefore, the area on the writing-light incident-side of the photoconductive layer becomes more highly resistive than the area on the liquid crystal layer side, and is subjected to a higher applied voltage. For this reason, the photoconductive layer is subjected to more photocurrent flows, and the photosensitivity of the photoconductive layer is thus improved.

For a fuller understanding of the nature and advantages of the invention, reference should be made to the ensuing detailed description taken in conjunction with the accompanying drawings.

BRIEF DESCRIPTION OF THE DRAWINGS

FIG. 53(a) is a band diagram of a light-writing-type liquid crystal element having an element structure of I/I/intermediate-p/i type.

FIG. 53(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 53(a).

FIG. 53(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 53(a).

FIG. 54(a) is a band diagram of a light-writing-type liquid crystal element having an element structure of I/wide-i/i/intermediate-p/i type.

FIG. 54(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 54(a).

FIG. 54(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 54(a).

FIG. 55(a) is a band diagram of a light-writing-type liquid crystal element having an element structure of I/p/i/intermediate-p/i type.

FIG. 55(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 55(a).

FIG. 55(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 55(a).

FIG. 56(a) is a band diagram of a light-writing-type liquid crystal element having an element structure of I/wide-p/i/intermediate-p/i type.

FIG. 56(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 56(a).

FIG. 56(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 56(a).

Figure 57A:
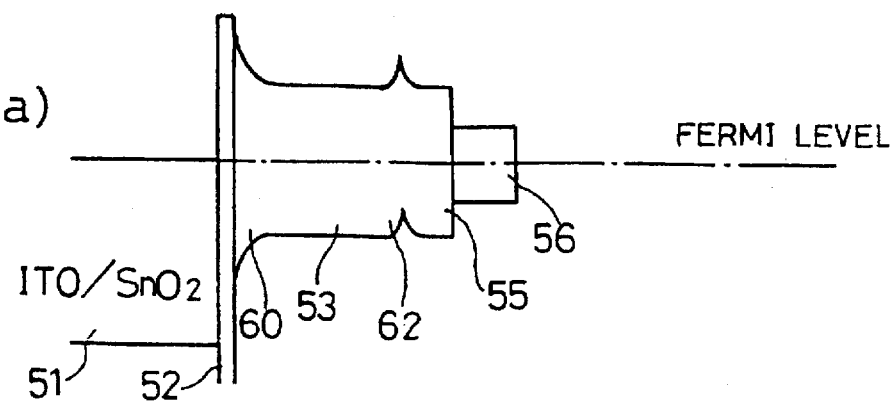

FIG. 57(a) is a band diagram of a light-writing-type liquid crystal element having an element structure of I/Chirp-i/i/intermediate-p/i type.

Figure 57B:
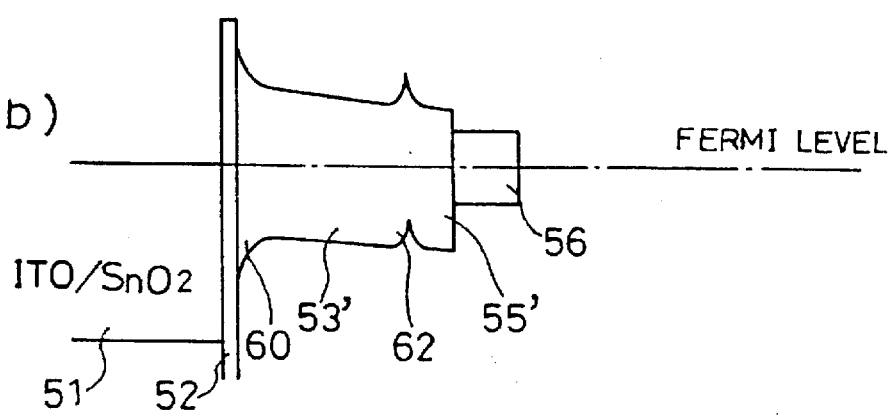

FIG. 57(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 57(a).

Figure 57C:
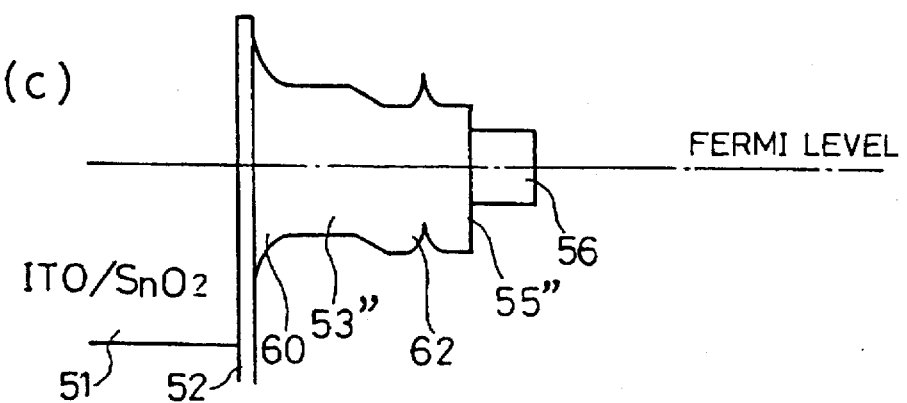

FIG. 57(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 57(a).

Figure 58A:
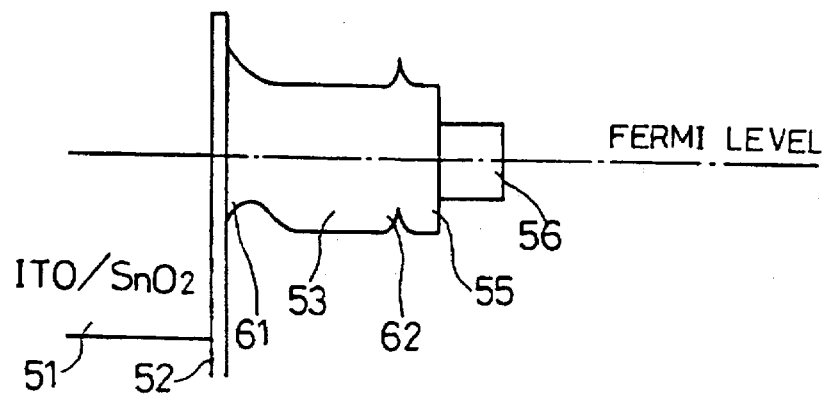

FIG. 58(a) is a band diagram of a light-writing-type liquid crystal element having an element structure of I/Chirp-p/i/intermediate-p/i type.

Figure 58B:
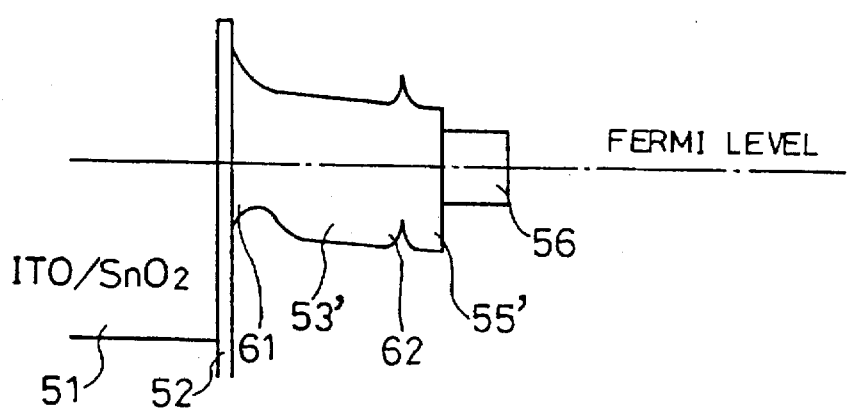

FIG. 58(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 58(a).

Figure 58C:
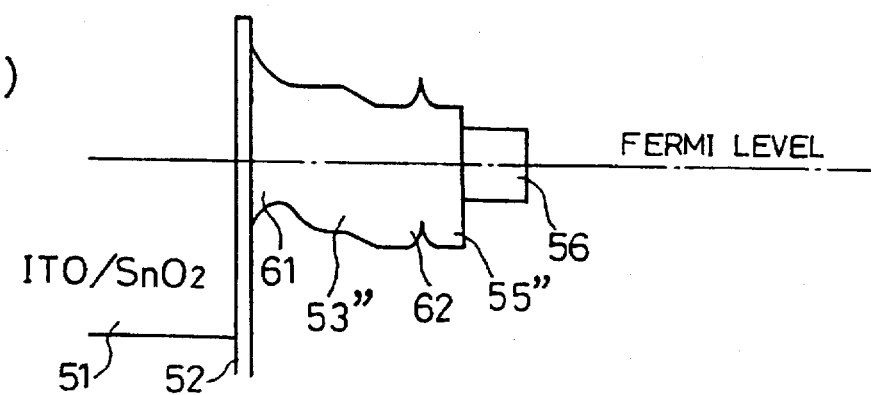

FIG. 58(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 58(a).

Figure 59A:
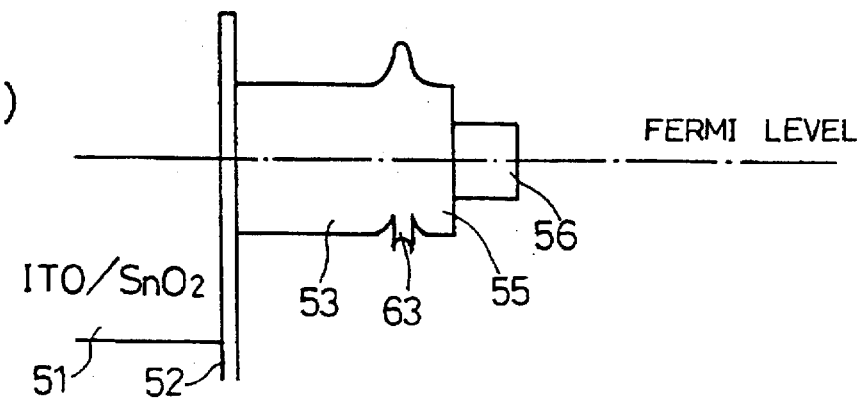

FIG. 59(a) is a band diagram of a light-writing-type liquid crystal element having an element structure of I/i/wide (intermediate)-p/i type.

Figure 59B:
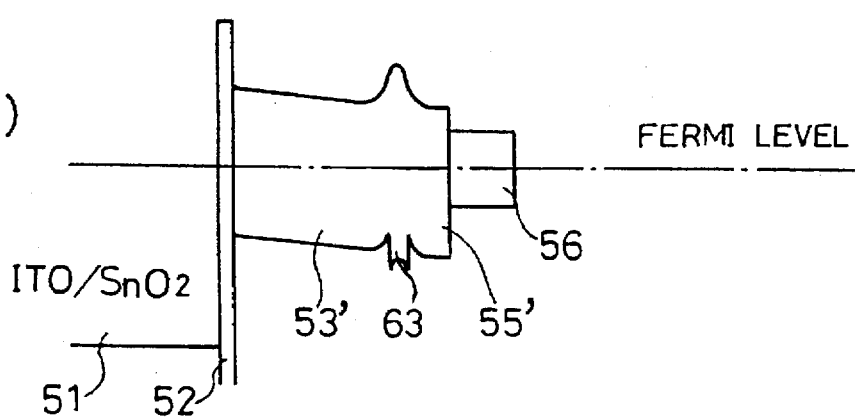

FIG. 59(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 59(a).

Figure 59C:
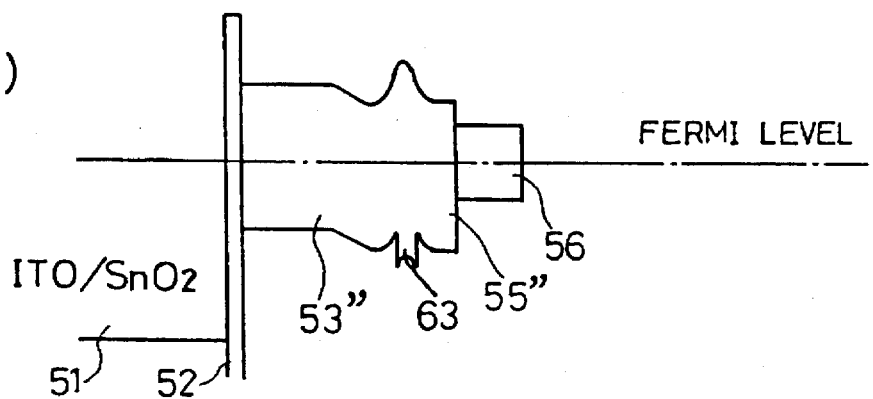

FIG. 59(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 59(a).

Figure 60A:
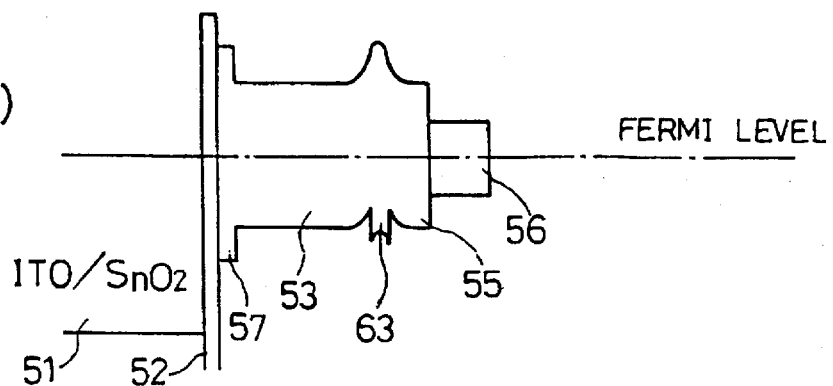

FIG. 60(a) is a band diagram of a light-writing-type liquid crystal element having an element structure of I/wide-i/i/wide (intermediate )-p/i type.

Figure 60B:
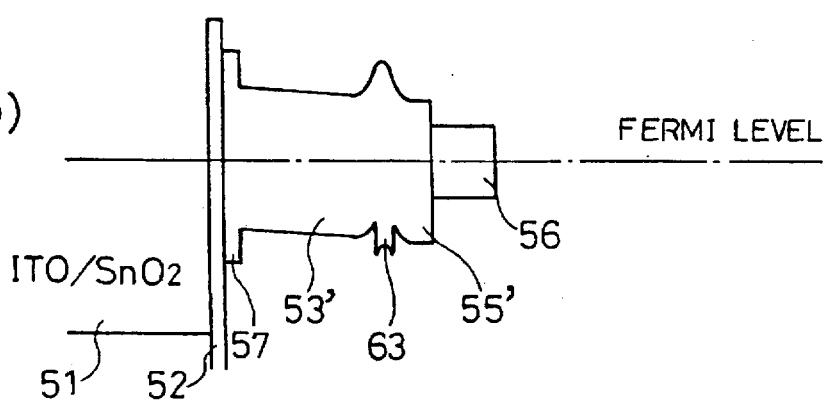

FIG. 60(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 60(a).

Figure 60C:
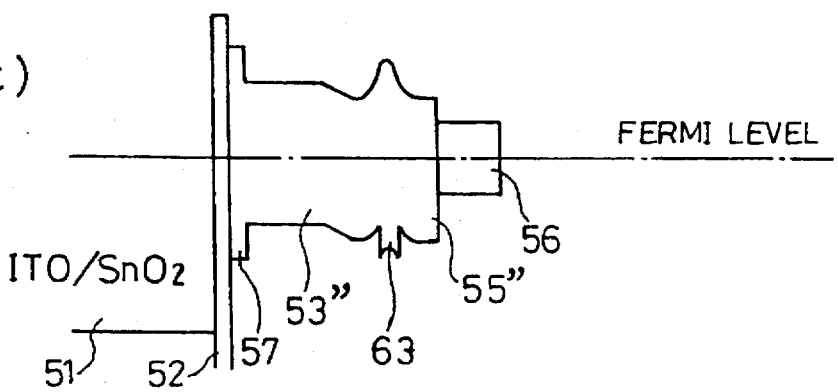

FIG. 60(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 60(a).

Figure 61A:
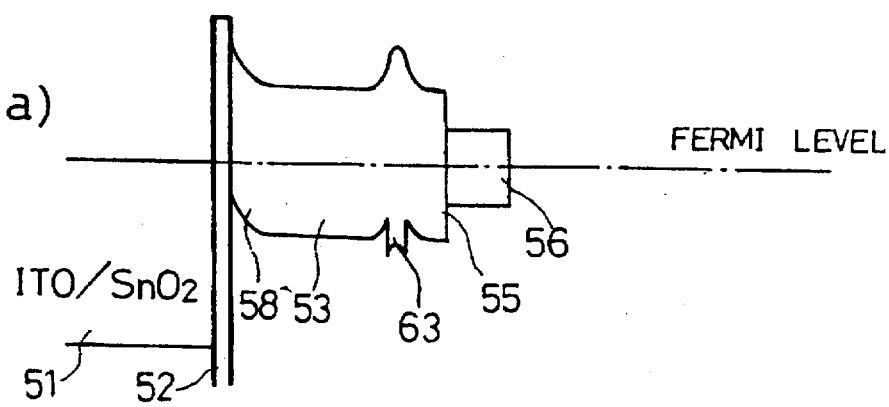

FIG. 61(a) is a band diagram of a light-writing-type liquid crystal element having an element structure of I/p/i/wide (intermediate)-p/i type.

Figure 61B:
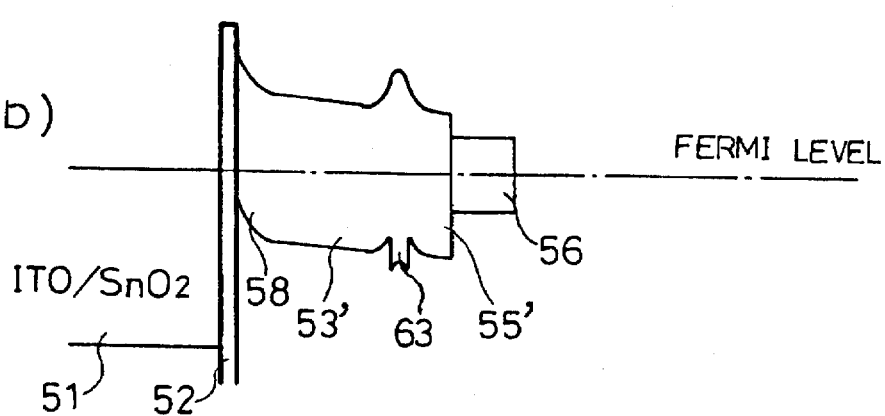

FIG. 61(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 61(a).

Figure 61C:
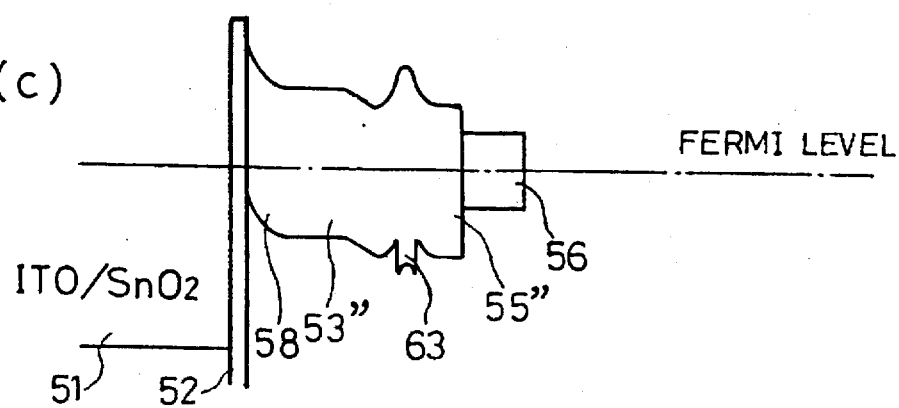

FIG. 61(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 61(a).

Figure 62A:
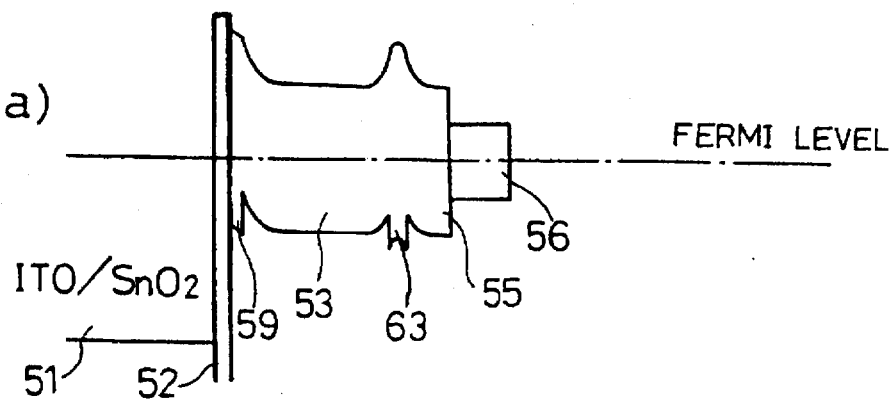

FIG. 62(a) is a band diagram of a light-writing-type liquid crystal element having an element structure I/wide-p/i/wide (intermediate)-p/i type.

Figure 62B:
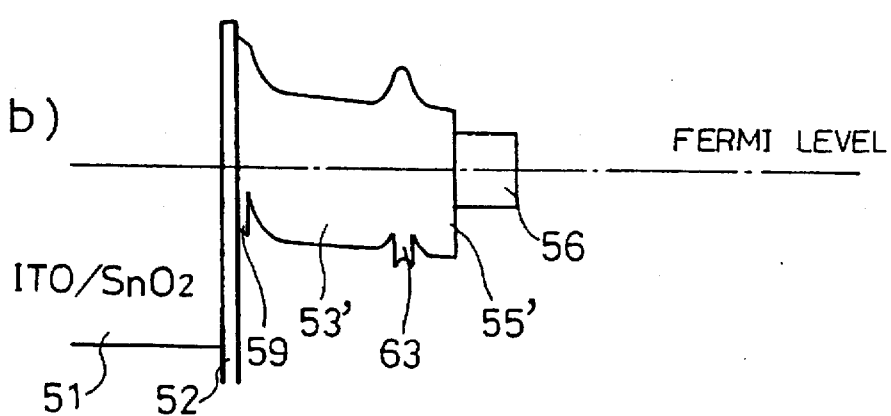

FIG. 62(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 62(a).

Figure 62C:
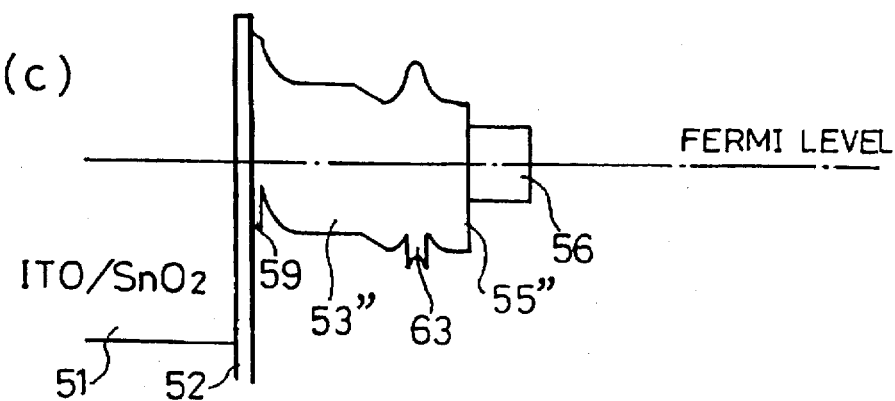

FIG. 62(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 62(a).

Figure 63A:
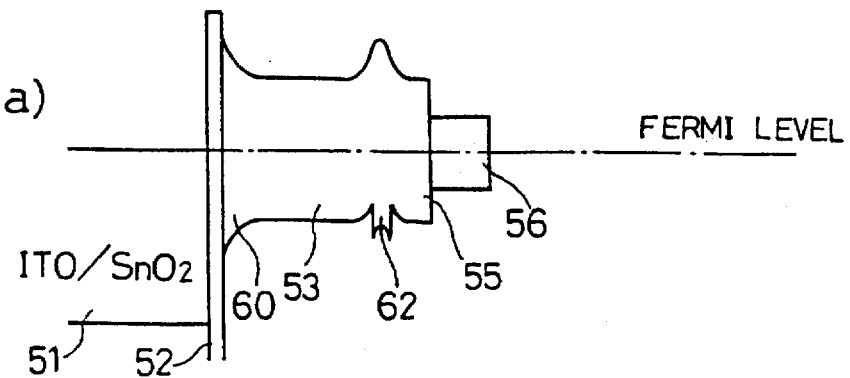

FIG. 63(a) is a band diagram of a light-writing-type liquid crystal element having an element structure of I/Chirp-i/i/wide (intermediate)-p/i type.

Figure 63B:
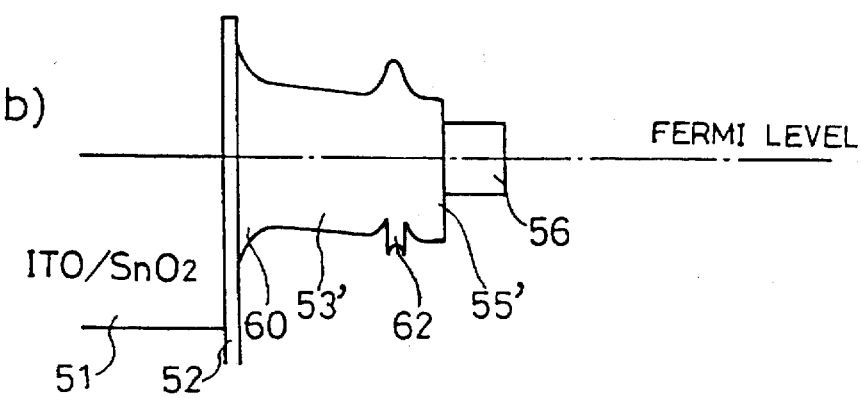

FIG. 63(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 63(a).

Figure 63C:
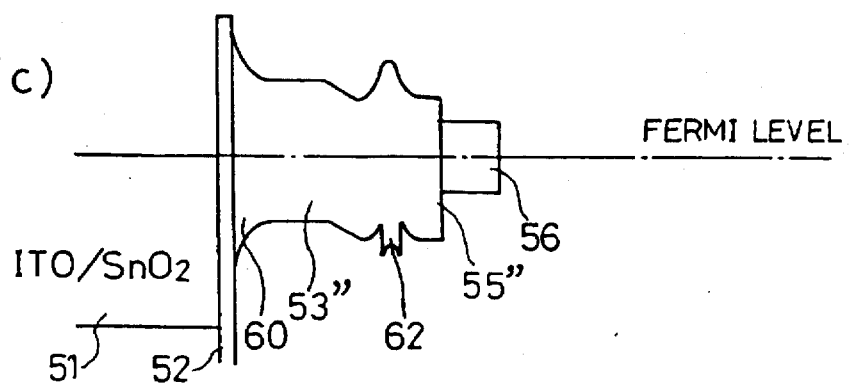

FIG. 63(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 63(a).

Figure 64A:
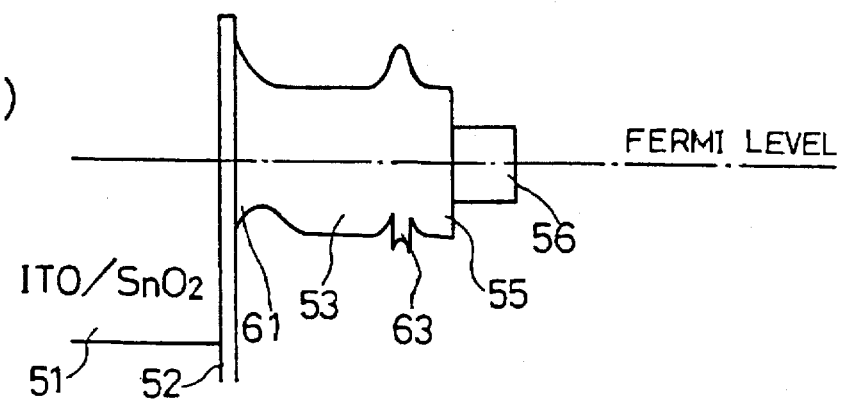

FIG. 64(a) is a band diagram of a light-writing-type liquid crystal element having an element structure of I/Chirp-p/i/wide (intermediate)-p/i type.

Figure 64B:
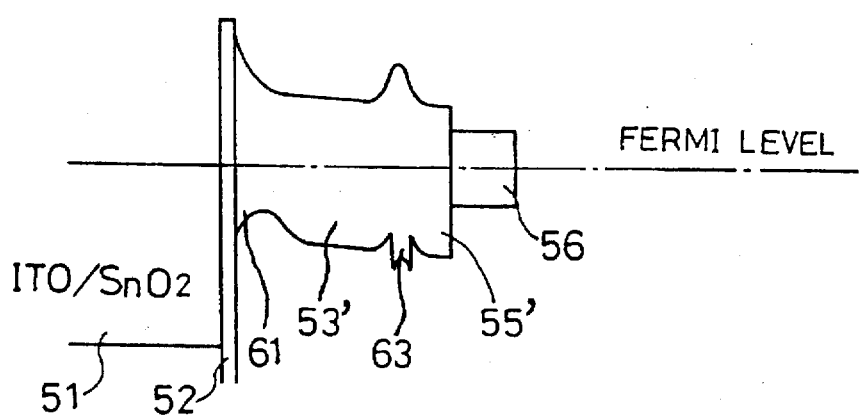

FIG. 64(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 64(a).

Figure 64C:
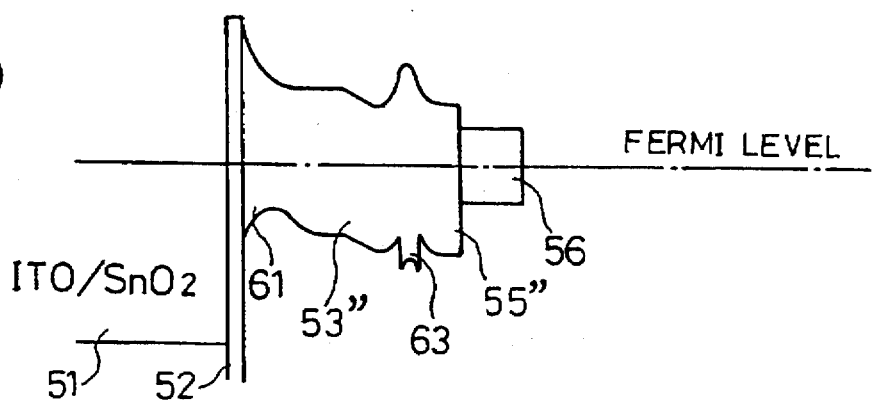

FIG. 64(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 64(a).

Figure 65A:
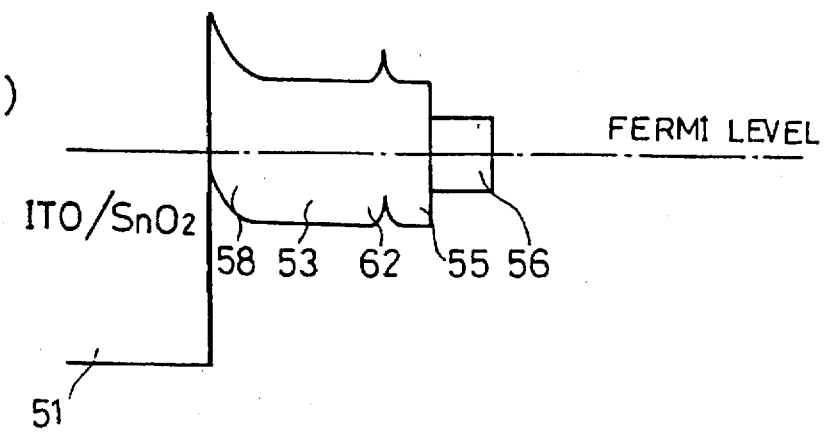

FIG. 65(a) is a band diagram of a light-writing-type liquid crystal element having an element structure of I/p/i/intermediate-p/i type.

Figure 65B:
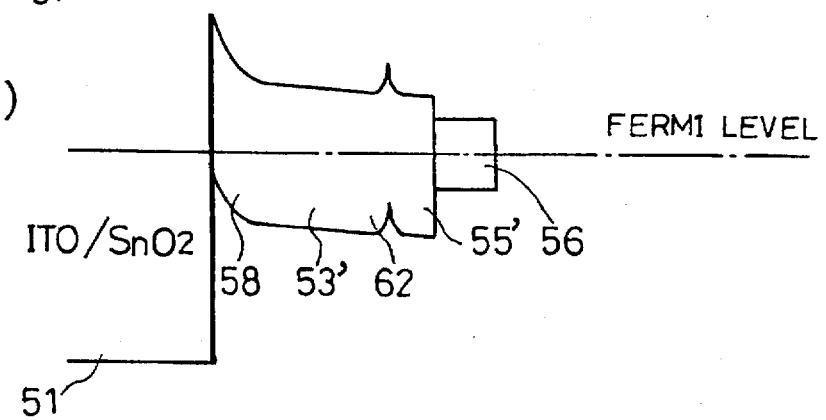

FIG. 65(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 65(a).

Figure 65C:
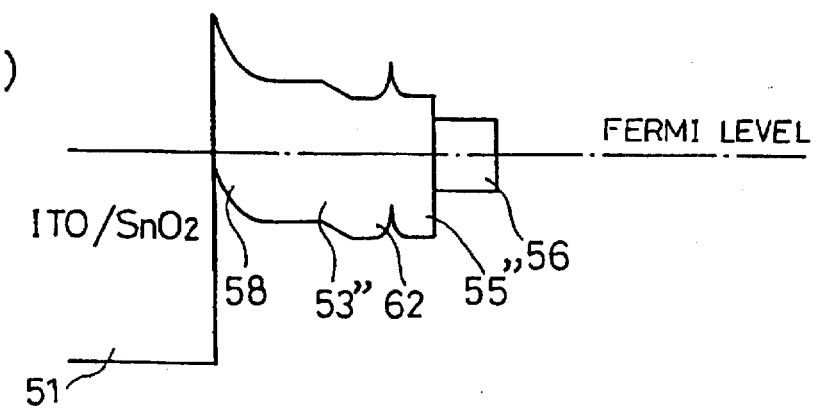

FIG. 65(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 65(a).

Figure 66A:
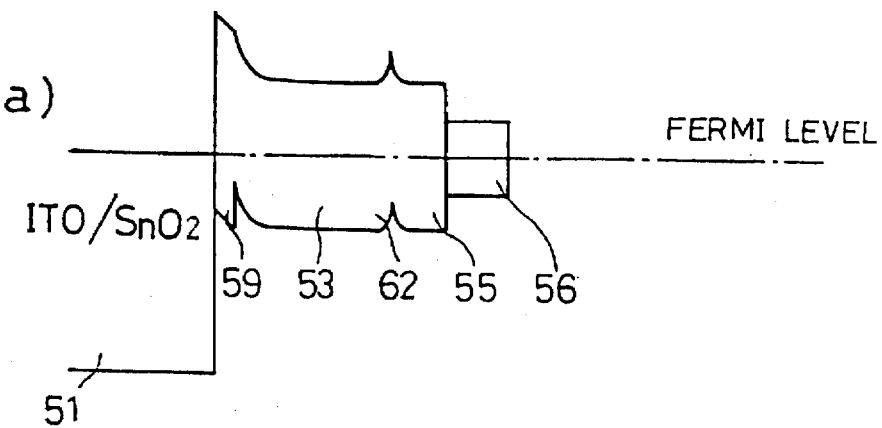

FIG. 66(a) is a band diagram of a light-writing-type liquid crystal element having an element structure of I/wide-p/i/intermediate-p/i type.

Figure 66B:
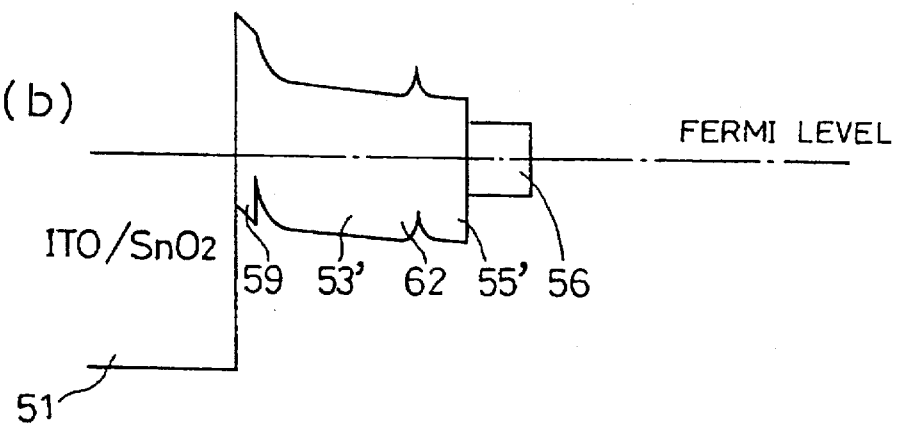

FIG. 66(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 66(a).

Figure 66C:
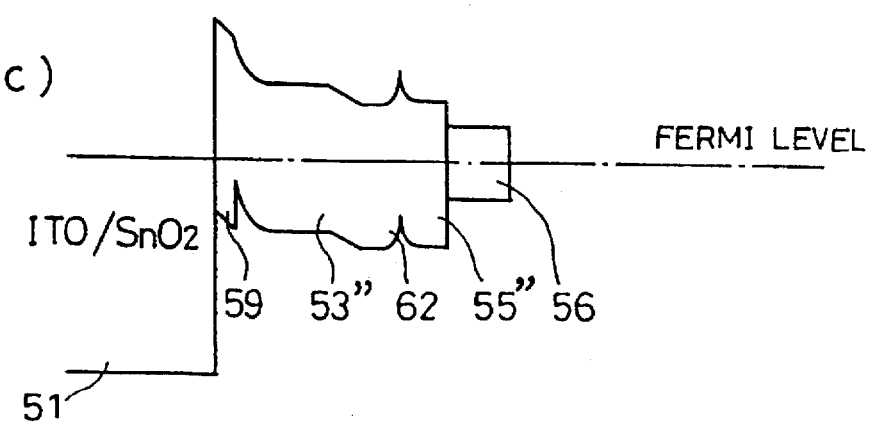

FIG. 66(c) is a band diagram of an element structure which uses a photoconductive layer in which the density is increased step by step toward the light-shielding layer side from the transparent electrode side (while the acceptor density decreases), instead of the photoconductive layer of the light-writing-type liquid crystal element of FIG. 66(a).

Figure 67A:
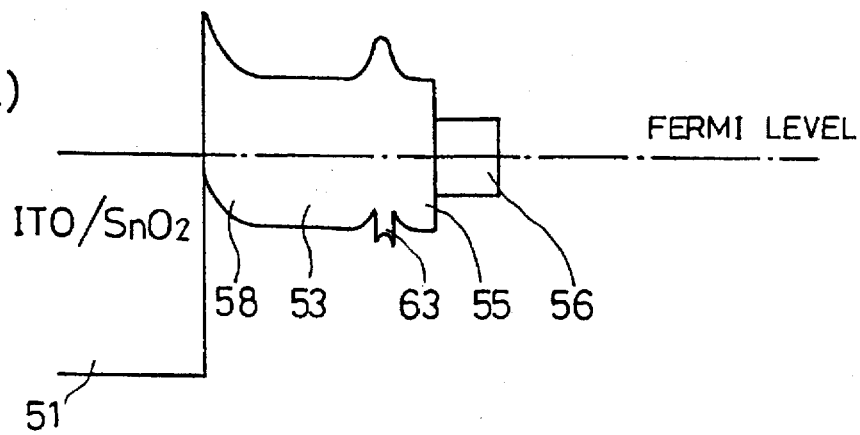

FIG. 67(a) is a band diagram of a light-writing-type liquid crystal element having an element structure of I/p/i/wide (intermediate)-p/i type.

Figure 67B:
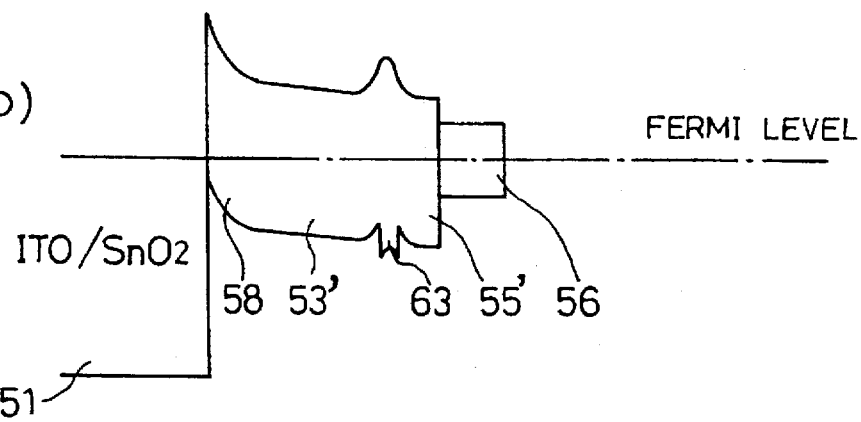

FIG. 67(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 67(a).

Figure 67C:
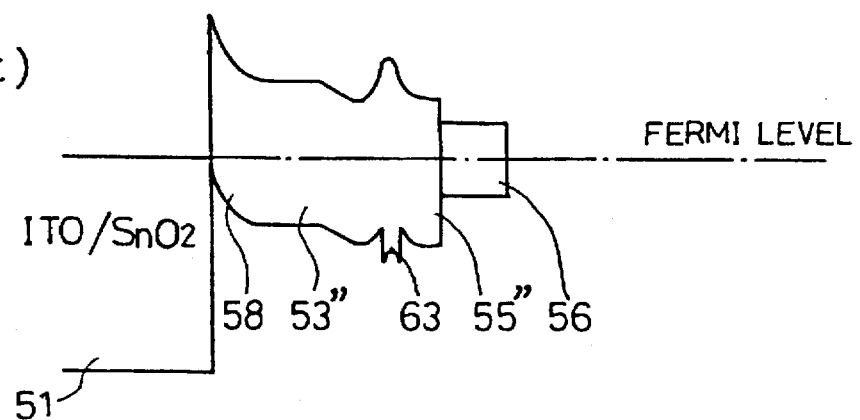

FIG. 67(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 67(a).

Figure 68A:
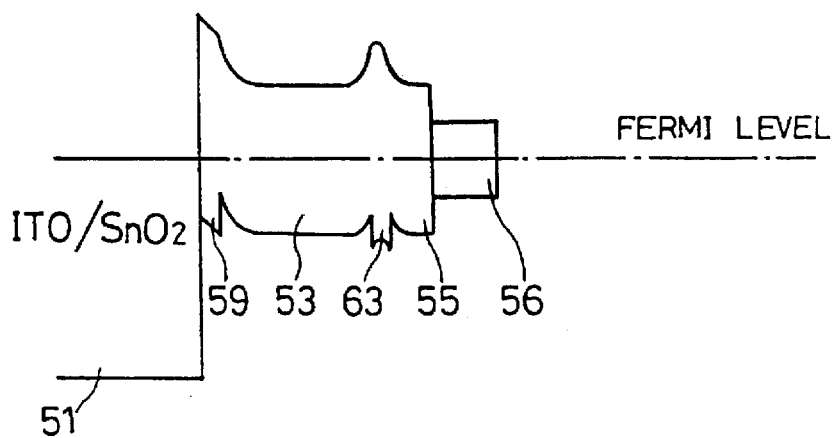

FIG. 68(a) is a band diagram of a light-writing-type liquid crystal element having an element structure of I/wide-p/i/wide (intermediate)-p/i type.

Figure 68B:
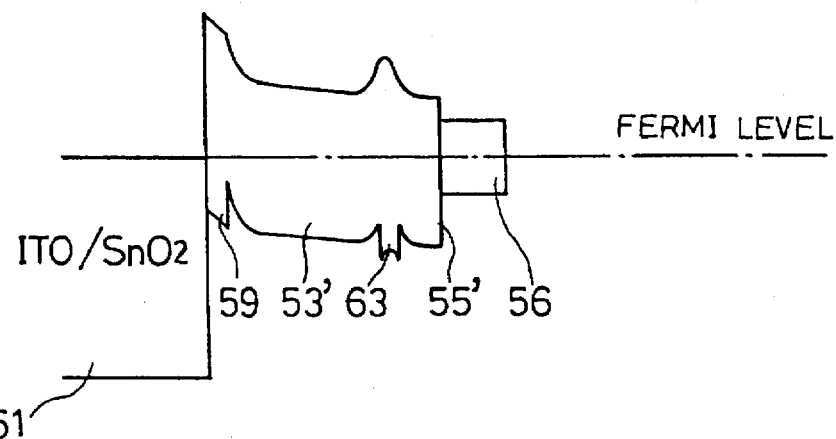

FIG. 68(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 68(a).

Figure 68C:
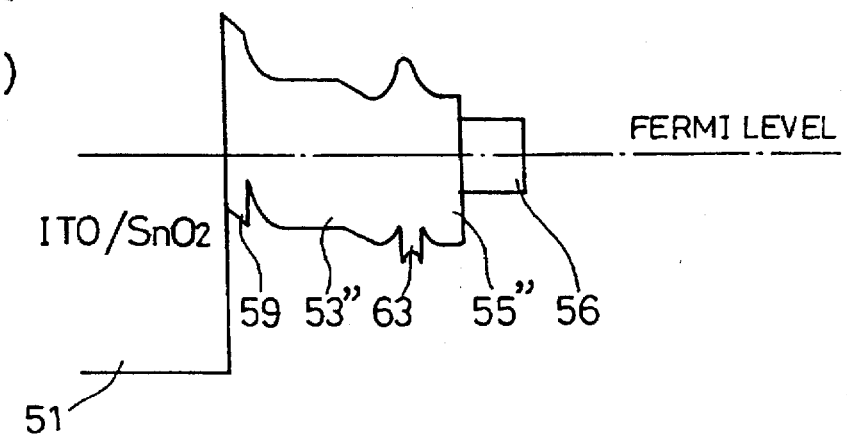

FIG. 68(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 68(a).

Figure 40A:
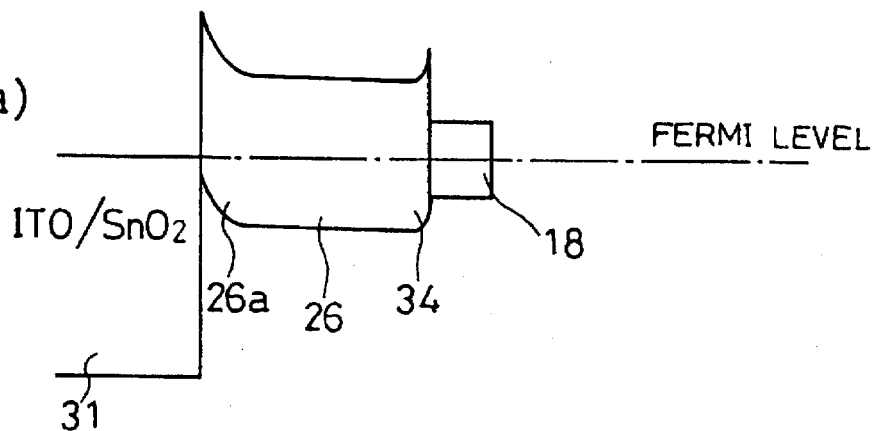
FIG. 40(a) is a band diagram of a light-writing-type liquid crystal element having an element structure of p/i/p type.
Figure 42A:
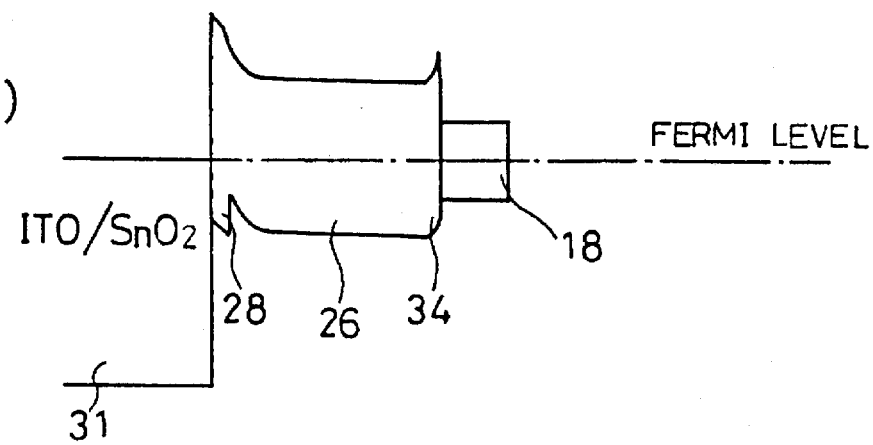
FIG. 42(a) is a band diagram of a light-writing-type liquid crystal element having an element structure of wide-p/i/p type.
Figure 69:
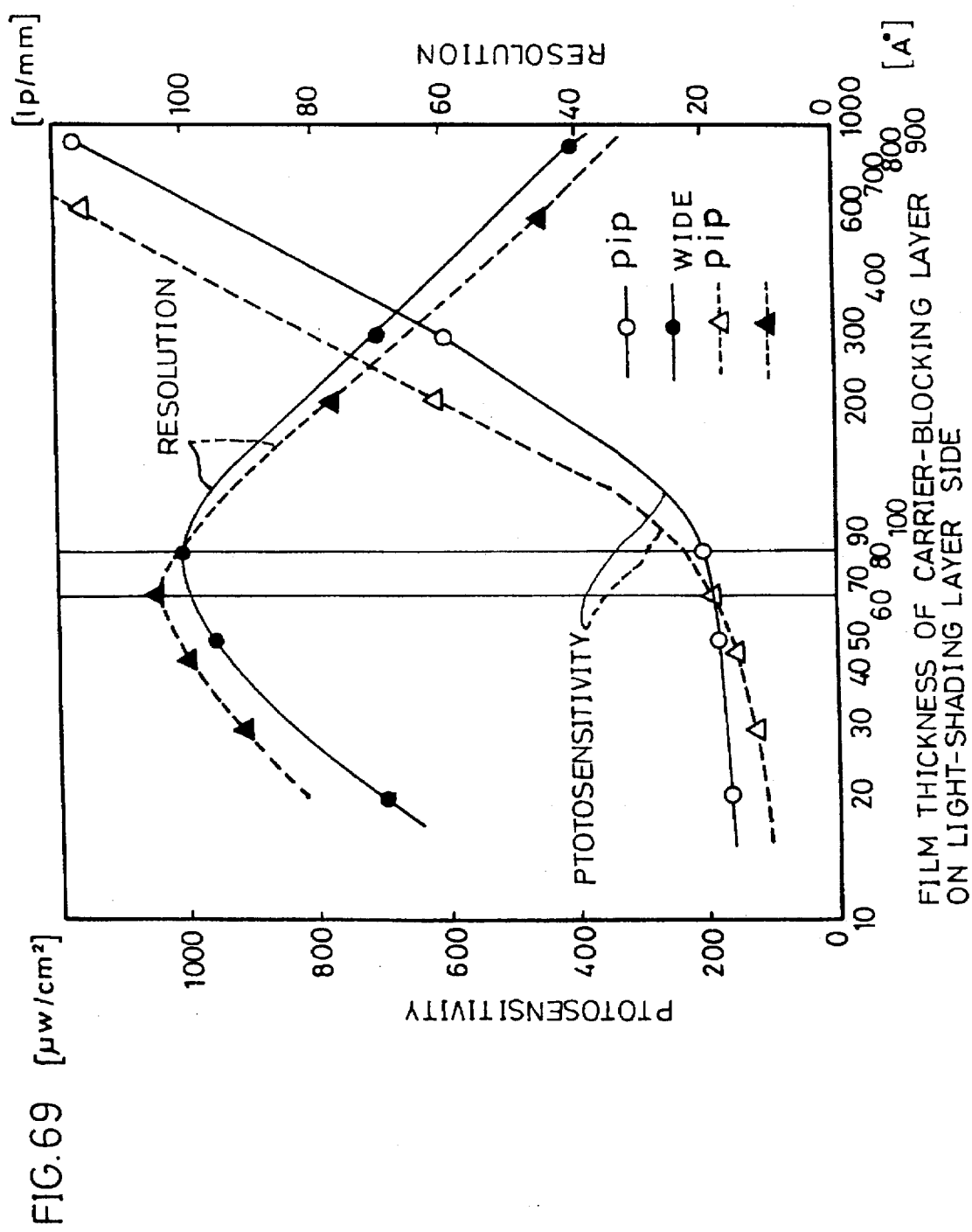

FIG. 69 is a graph that shows the relationship between the film thickness of a carrier-blocking layer on the light-shielding-layer side and the photosensitivity (the light-intensity of writing light required) in the photoconductive layers that are respectively provided in the light-writing-type liquid crystal elements of FIG. 40(a) and FIG. 42(a).

Figure 70:
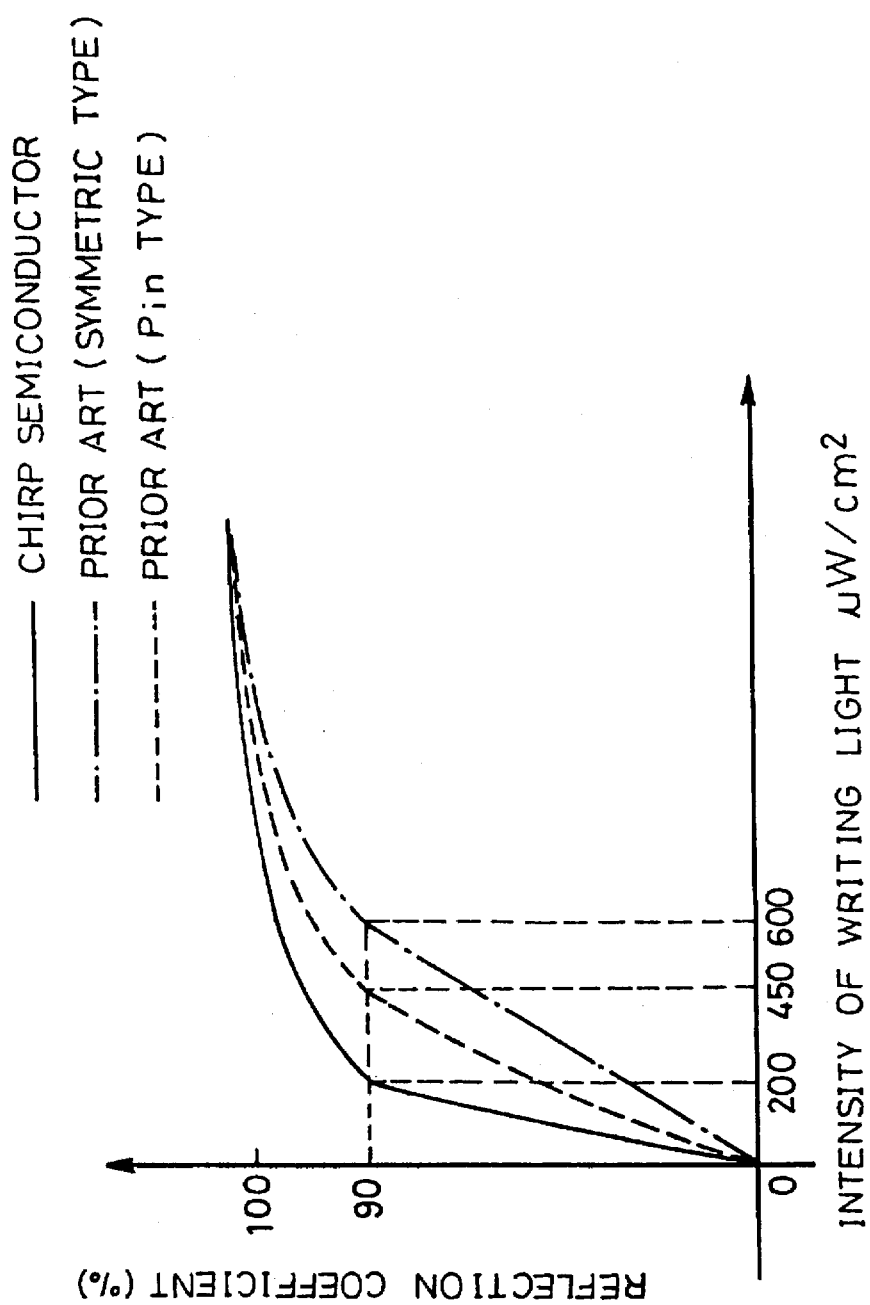

FIG. 70 is a graph which shows the relationship between the writing-light intensity and the reflectivity of the photoconductive layer using a chirp semiconductor of the light-writing-type liquid crystal element of the present invention.

Figure 4:
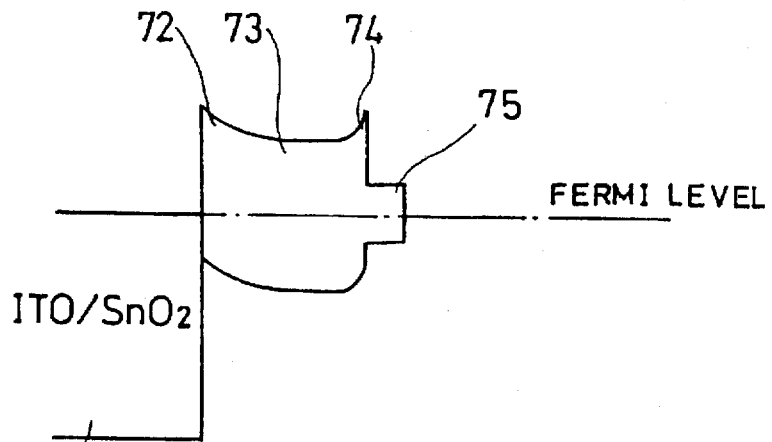
FIG. 4(a) is a band diagram during a thermal equilibrium state of a light-writing-type liquid crystal element which is provided with carrier-blocking layers on both sides of a photoconductive layer.
FIG. 4(b) shows a band diagram when a positive bias is applied to the transparent electrode on the photoconductive layer side of the write-writing-type liquid crystal element of FIG. 4(a).
FIG. 4(c) shows a band diagram when a negative bias is applied to the transparent electrode on the photoconductive layer side of the write-writing-type liquid crystal element of FIG. 4(a).
Figure 4:
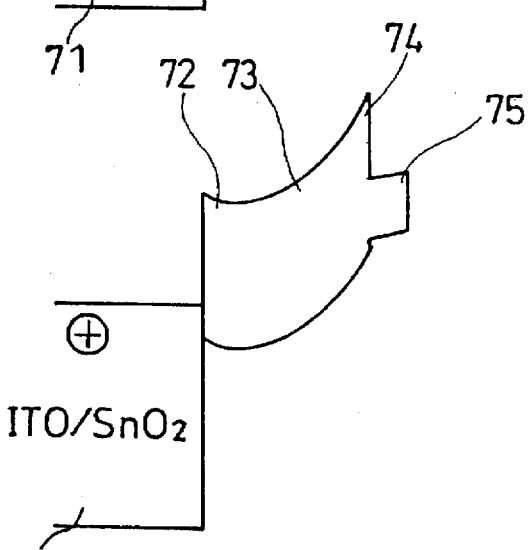
Figure 4:
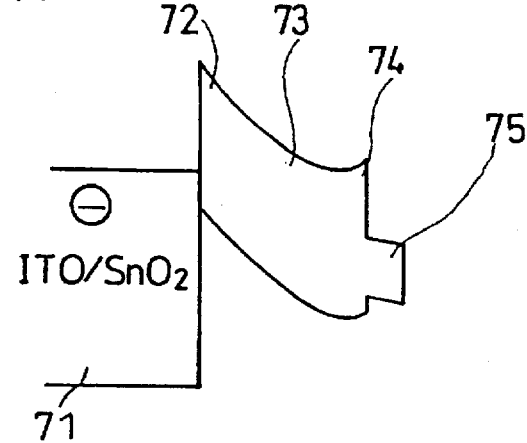
Figure 71:
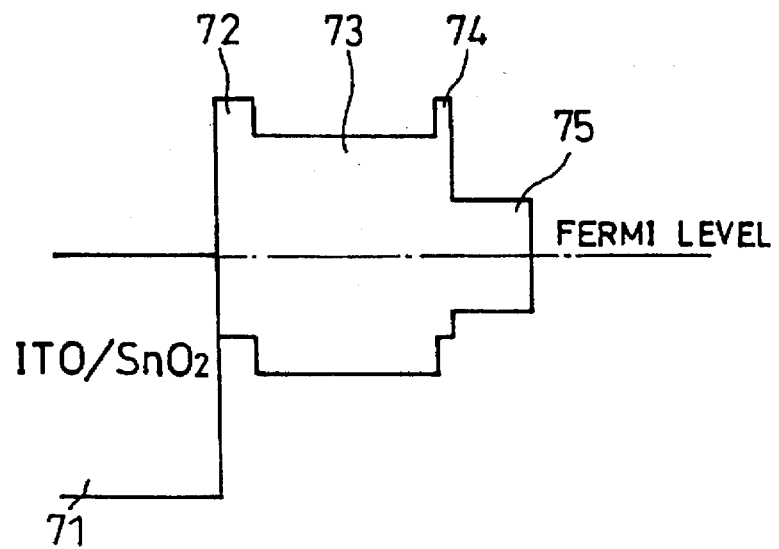

FIG. 71 is a band diagram during a film-forming process of the element shown in FIG. 4(a).

Figure 5A:
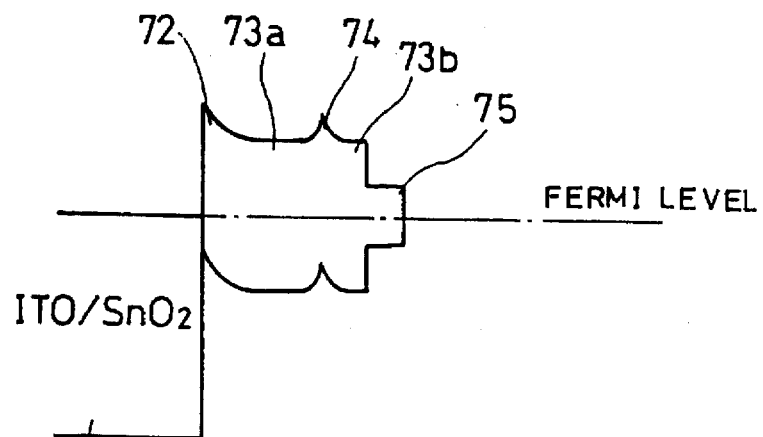
FIG. 5(a) is a band diagram during a thermal equilibrium state of a light-writing-type liquid crystal element which is provided with a carrier-blocking layer which is formed on the light-shielding layer side of a photoconductive layer.
Figure 72:
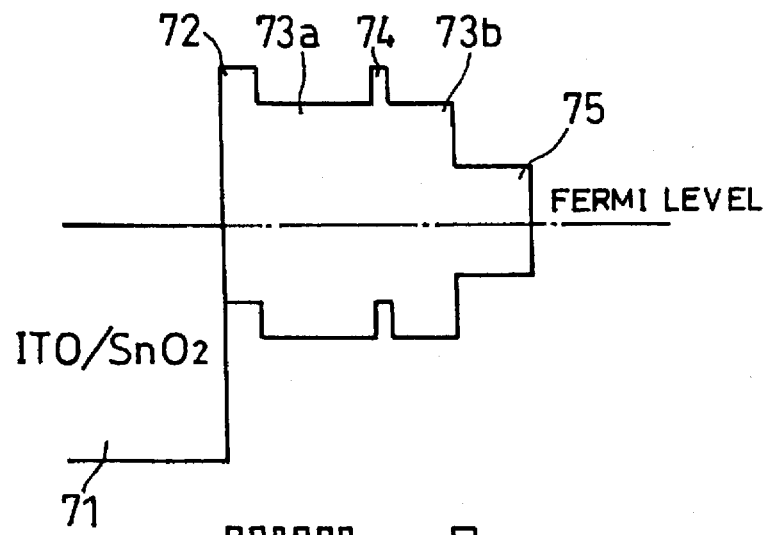

FIG. 72 is a band diagram during a film-forming process of the element shown in FIG. 5(a).

Figure 73:
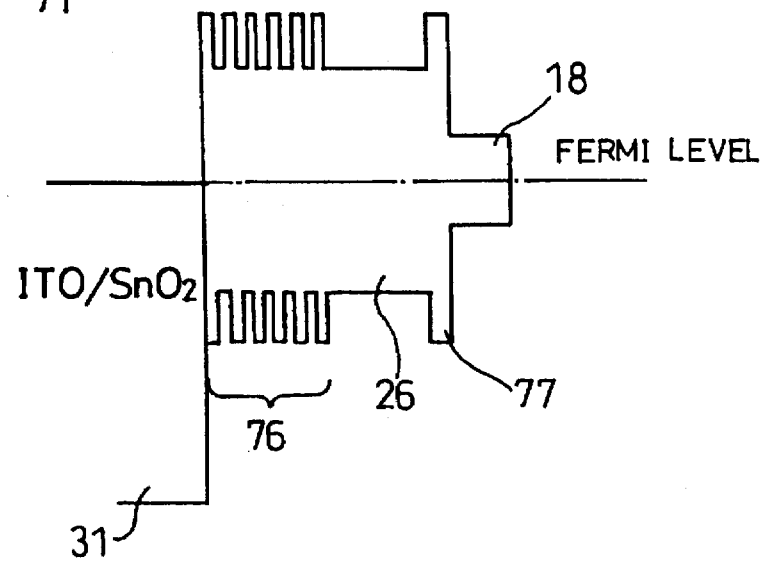

FIG. 73 is a band diagram of a light-writing-type liquid crystal element having a carrier-blocking layer of a superlattice structure.

Figure 74:
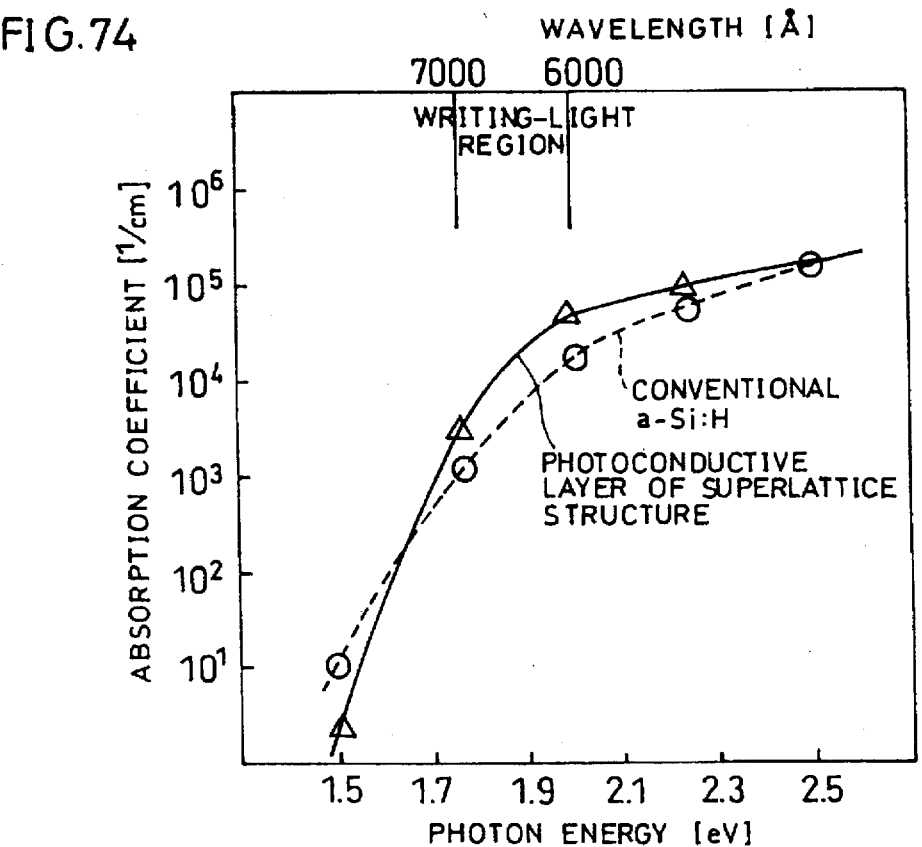

FIG. 74 shows graphs in which the relationship between the photon energy and the light-absorption coefficient is shown with respect to each of the element of FIG. 73 and a conventional element.

Figure 75:
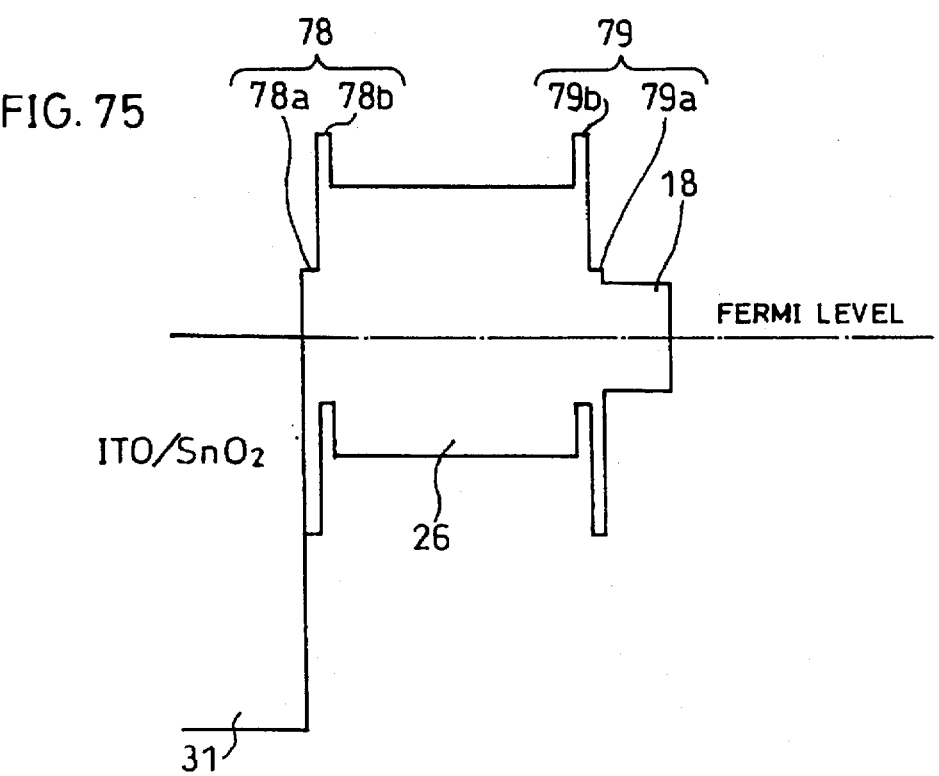

FIG. 75 is a band diagram during a film-forming process of a light-writing-type liquid crystal element that has a carrier-blocking layer having a stacked structure of a p-type semiconductor and an n-type semiconductor.

Figure 76:
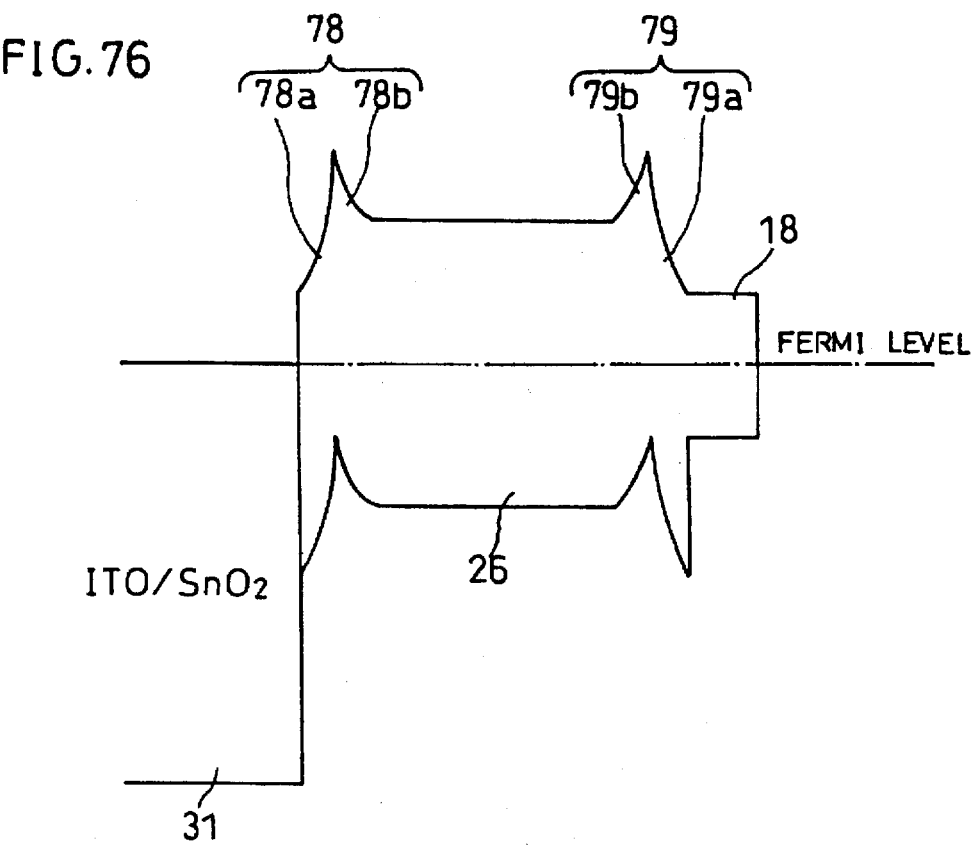

FIG. 76 is a band diagram showing a thermal equilibrium state of the element of FIG. 75.

Figure 77:
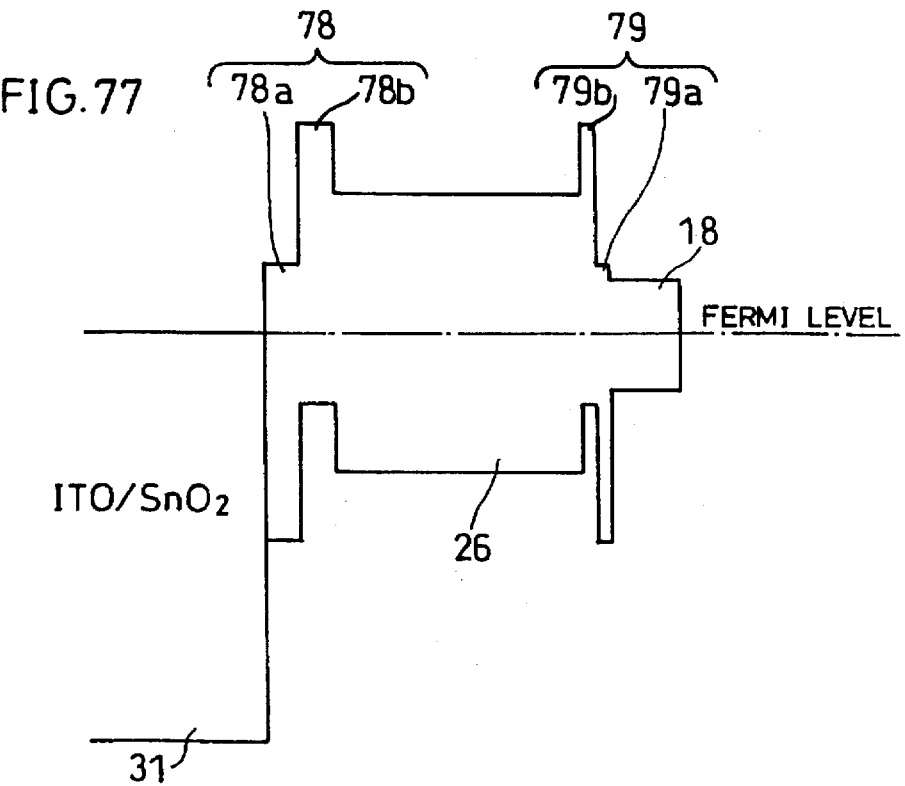

FIG. 77 is a band diagram concerning a modified example of the element of FIG. 75.

Figure 78:
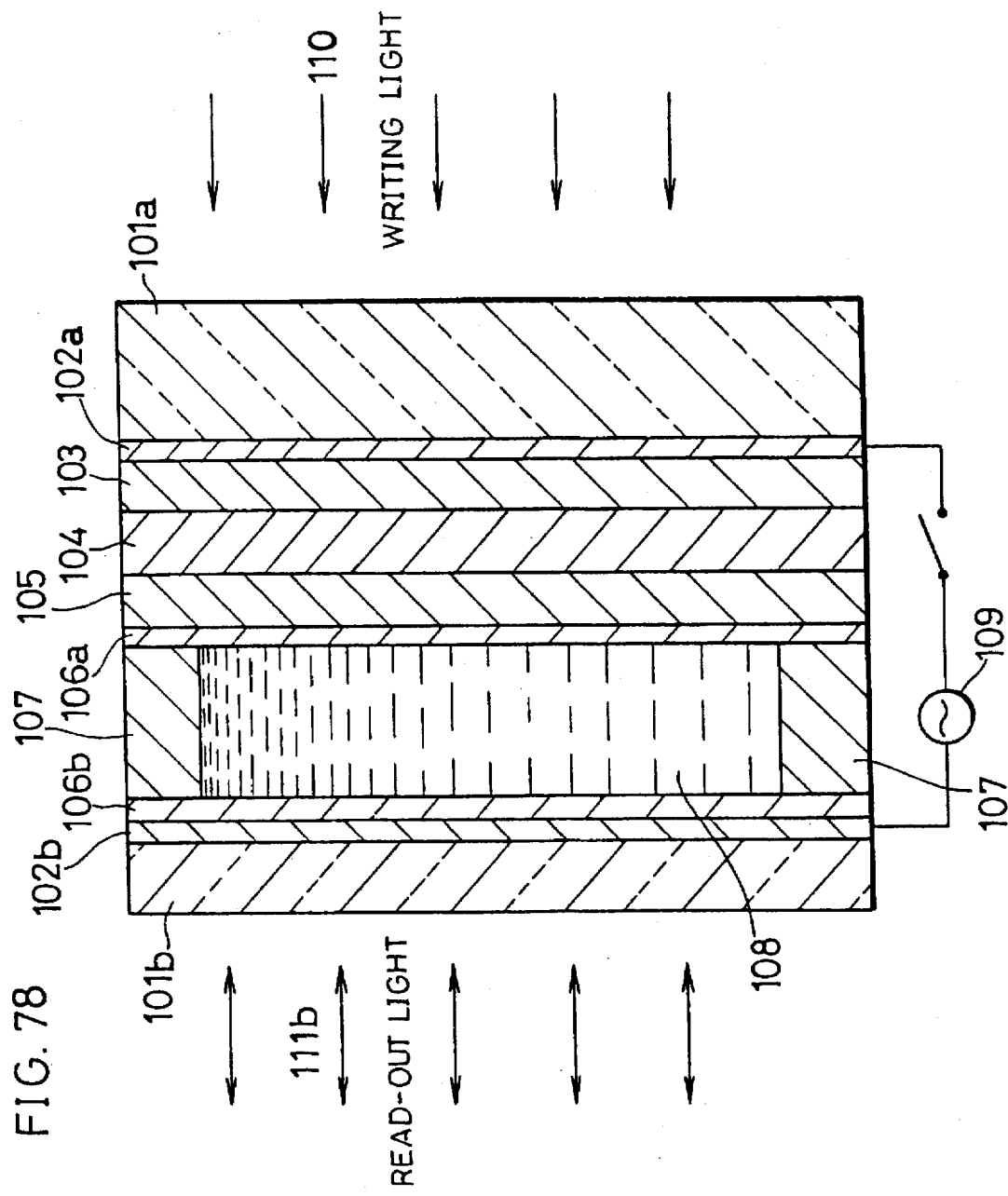

FIG. 78 is a schematic view showing a construction of a conventional light-writing-type liquid crystal element.

Figure 79:
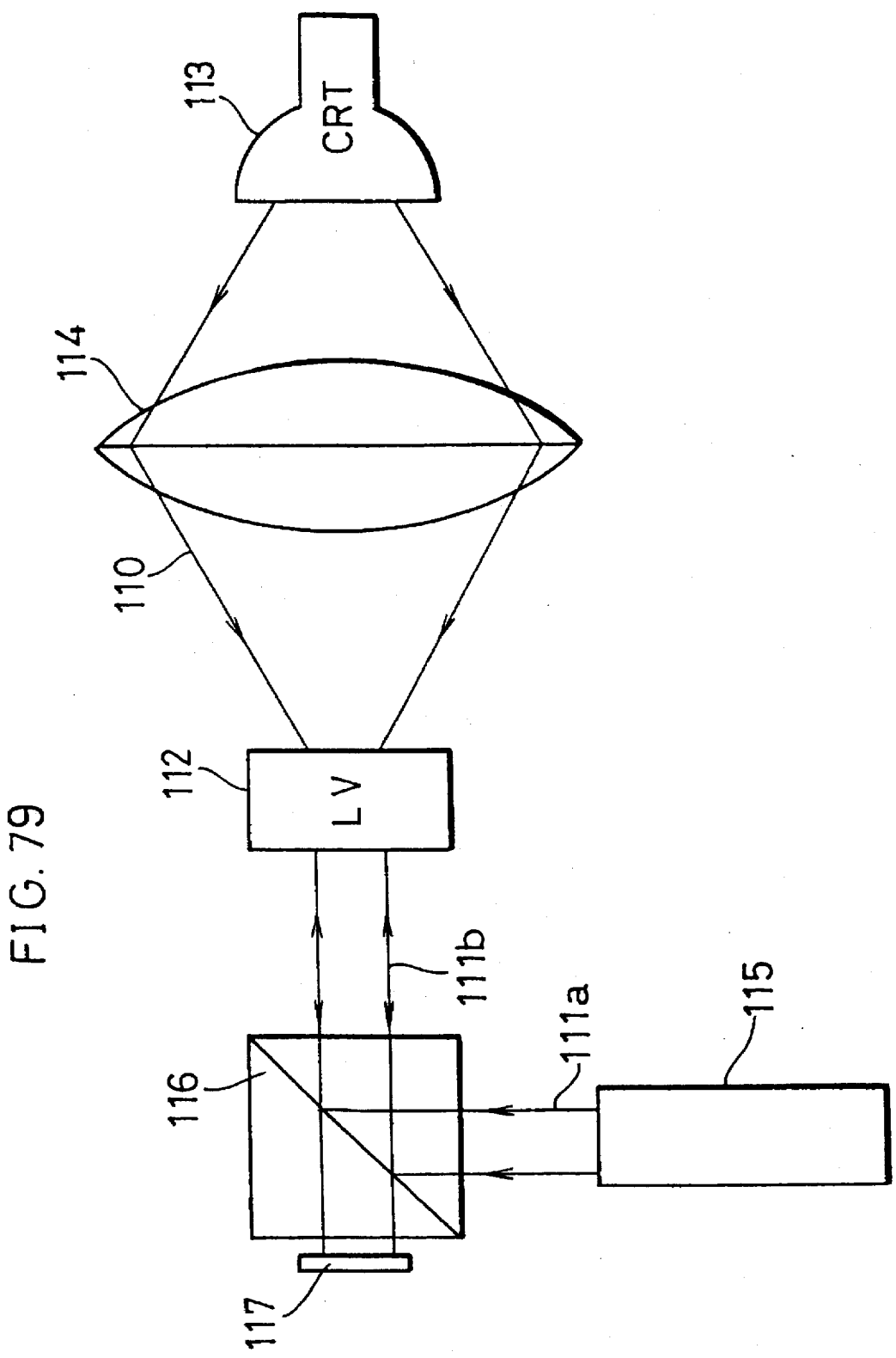

FIG. 79 is a schematic view showing a construction of a projection-type liquid crystal display using the light-writing-type liquid crystal element shown in FIG. 71.

Figure 80:
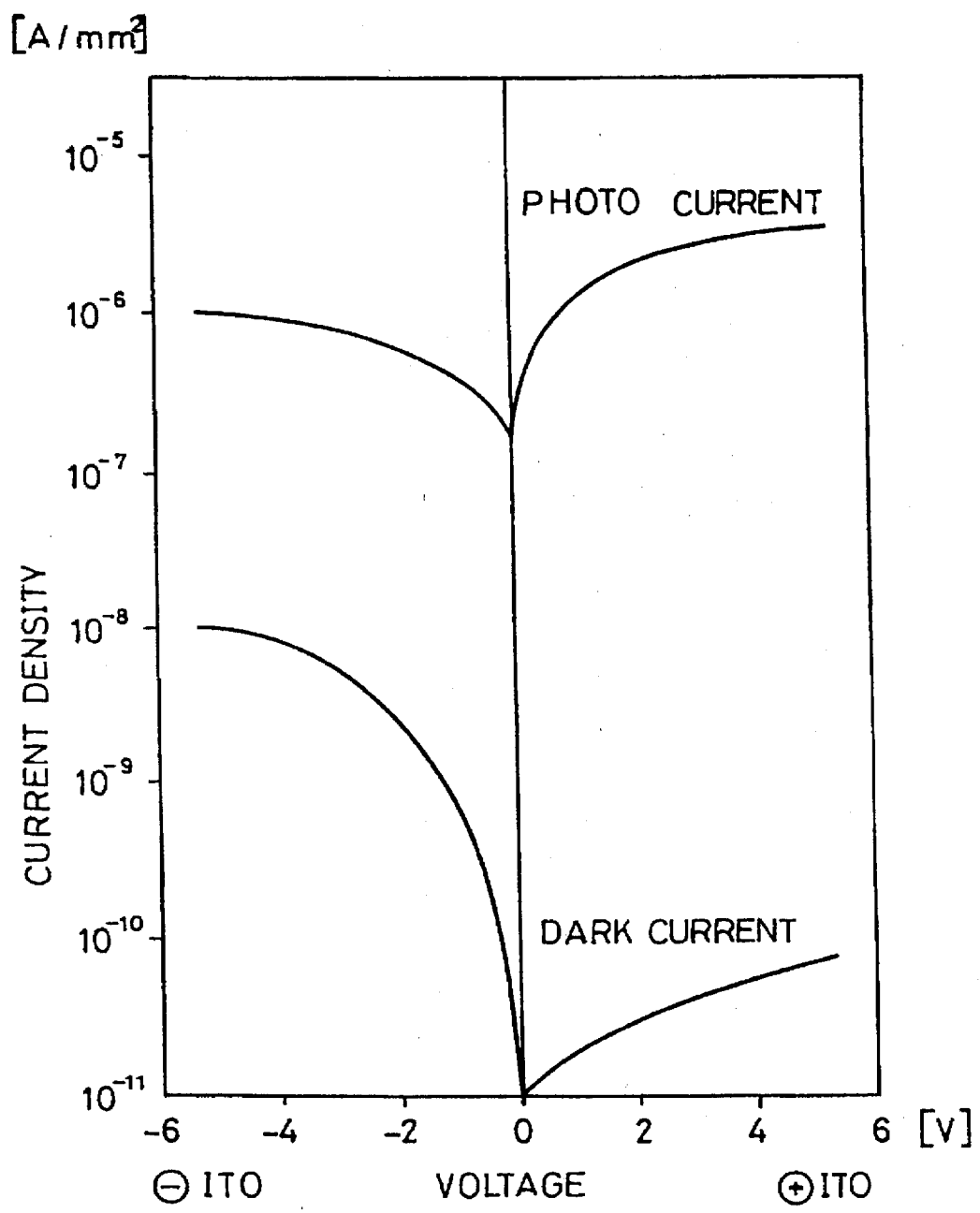

FIG. 80 is a graph which shows the relationship between the applied voltage and the current density of a photoconductive layer wherein a conventional i-type semiconductor is used.

Figure 81A:
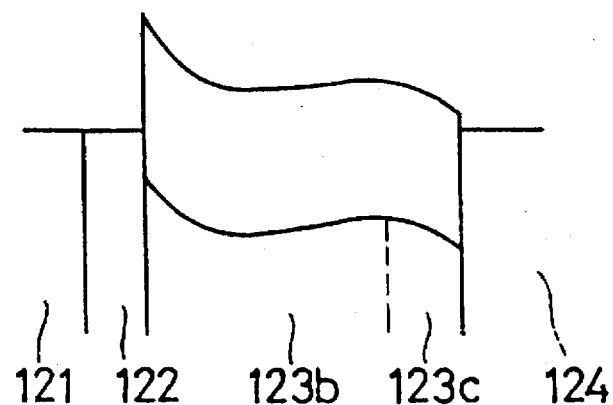

FIG. 81(a) is an energy-band diagram of a conventional light-writing-type liquid crystal element.

Figure 81B:
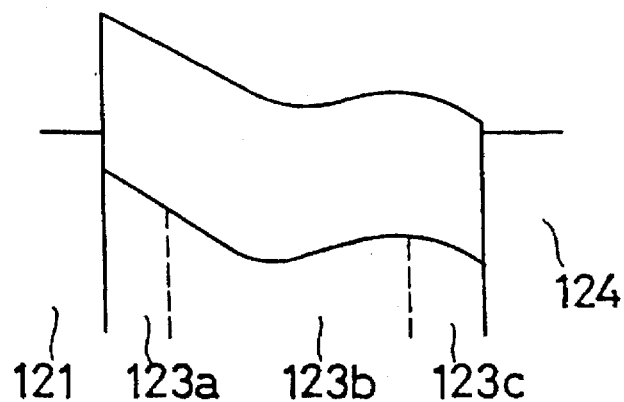

FIG. 81(b) is an energy-band diagram of another conventional light-writing-type liquid crystal element.

Figure 81C:
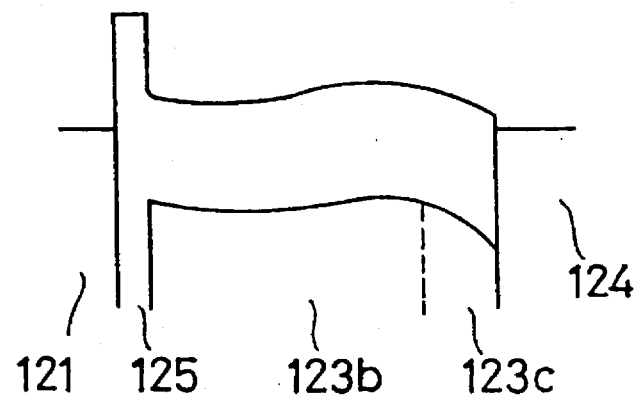

FIG. 81(c) is an energy-band diagram of still another conventional light-writing-type liquid crystal element.

Figure 82:
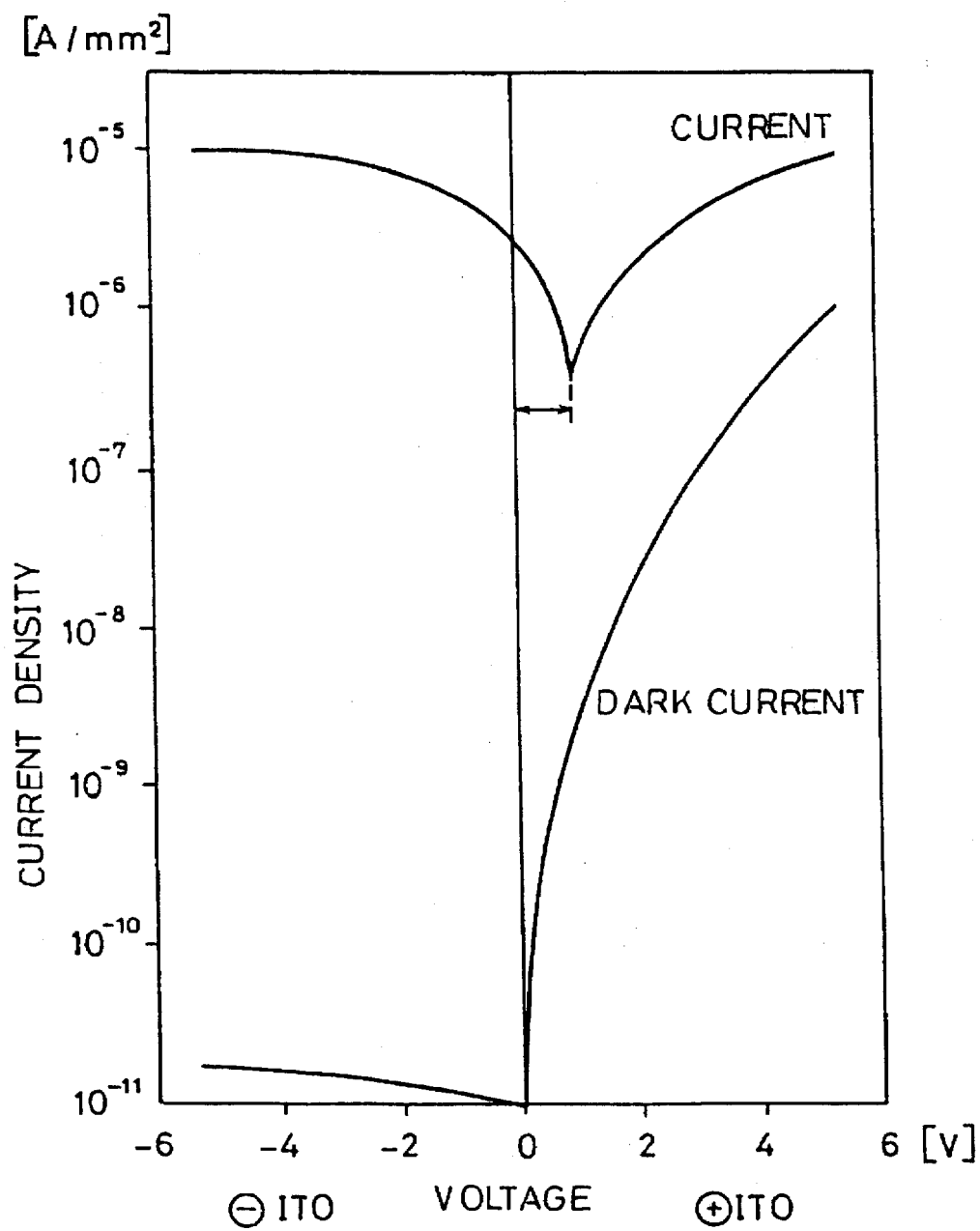

FIG. 82 is a graph which shows the relationship between the applied voltage and the current density of a photoconductive layer that is provided in the above-mentioned light-writing-type liquid crystal element.

Figure 83:
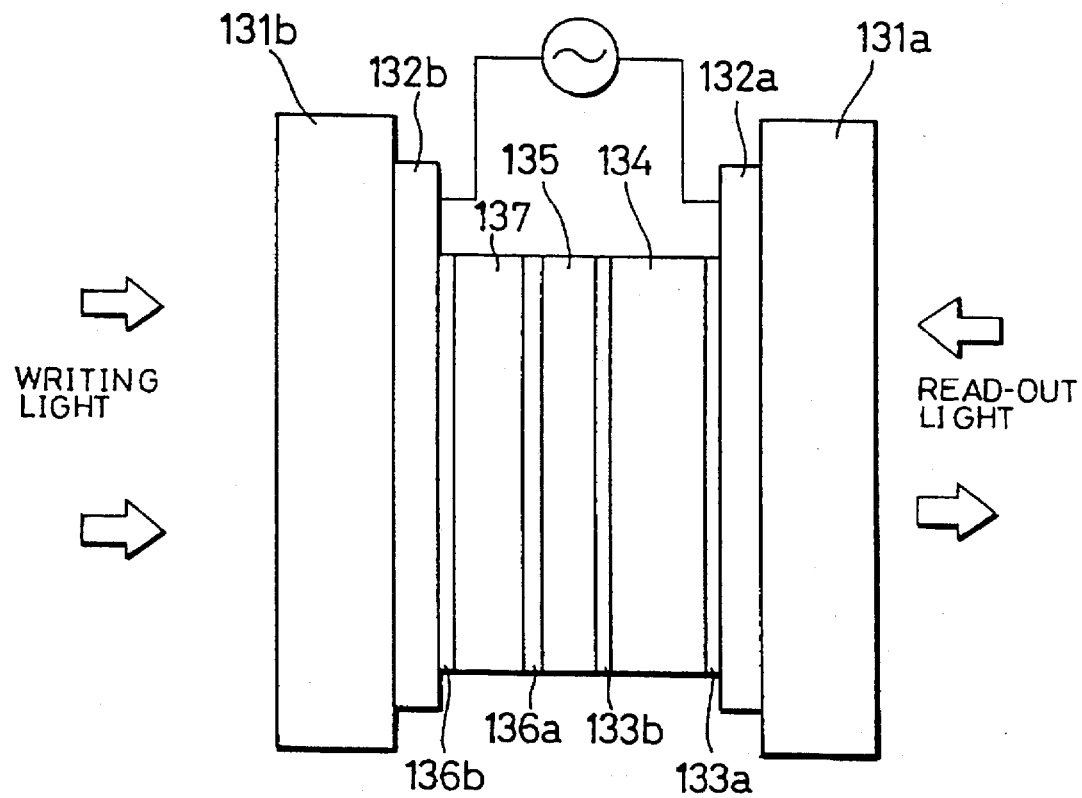

FIG. 83 is a schematic view showing a construction of another conventional light-writing-type liquid crystal element.

DESCRIPTION OF THE EMBODIMENTS

[EMBODIMENT 1]

Referring to FIGS. 1 through 16 as well as FIGS. 71 and 72, the following description will discuss one embodiment of the present invention. Here, prior to an explanation of the present embodiment, a general explanation is given of designs and other subjects of carrier-blocking layers (carrier-invasion-blocking layers) that are used in light-writing-type liquid crystal elements having a structure wherein a photoconductive layer and a liquid crystal layer are sandwiched between transparent electrodes.

Conventionally, CdS has been used as a material for photoconductive layers. However, in this patent application, an amorphous silicon hydride film (a-Si:H film) is adopted in place of CdS because of its light response speed faster than that of CdS and other features.

In general, in light-writing-type liquid crystal elements, the greater the photosensitivity, the higher the contrast, thereby providing high-quality display images. The photosensitivity is defined as a ratio (Z dark/Z photo) between the impedance during dark time (Z dark) and the impedance during photo time (Z photo), and it is found that the greater the ratio, the better the photosensitivity.

However, the use of an amorphous silicon hydride film as a photoconductive layer raises problems such as degradation in contrast due to insufficient photosensitivity. As described earlier, this is because, in a photoconductive layer using an amorphous silicon hydride film whose conductivity-type is intrinsic, when comparisons are made between the cases in which positive bias voltage and negative bias voltage are applied to the transparent electrode, both dark current and photo current show an asymmetric pattern in their voltage versus current density characteristic.

Therefore, in the photoconductive layer using an amorphous silicon hydride film, the impedance during dark time becomes smaller than the impedance that is calculated by using the original conductivity while the impedance during photo tame becomes greater than the impedance that is calculated by using the original conductivity. As a result, the ratio of the impedances during photo time and dark time becomes smaller. Thus, since the ratio of the impedances during dark time and photo time in the photoconductive layer becomes smaller, the photosensitivity becomes insufficient, resulting in low-quality images.

Here, in order to increase the ratio of the impedances during dark time and photo time, it is necessary to prevent carrier injection from the transparent electrode side and also to prevent carrier injection from the light-shielding layer that is formed between the photoconductive layer and the liquid crystal layer. Thus, it is possible to maintain a symmetric property in the voltage versus current characteristic upon both bias times during photo time as well as dark time.

First, in order to prevent carrier injection from the transparent electrode side, an insulating material is interpolated between the transparent electrode and the photoconductive layer, or a semiconductor, which is of hetero-series that has an energy gap wider than that of the photoconductive layer and which is of n-type or i-type with high resistance, may be interpolated therebetween. Alternatively, a semiconductor, which is of homo- or wide-hetero-series and which is of p-type wherein the value of resistance does not matter so much, may be interpolated therebetween.

On the other hand, in order to prevent carrier injection from the light-shielding layer, an insulating material is interpolated between the light-shielding layer and the photoconductive layer, or a semiconductor, which is of hetero-series that has an energy gap wider than that of the photoconductive layer and which is of n-type, i-type or p-type having not so low resistance, may be interpolated therebetween. Further, in the case of using the same material as the photoconductive layer, it is possible to prevent carrier injection from the light-shielding layer by interpolating a p-type semiconductor wherein the value of resistance does not matter so much.

Here, in order to prevent carrier injection from the transparent electrode side as well as preventing carrier injection from the light-shielding layer, particular blocking films are respectively used. In general, the absolute values of carrier injections from the transparent electrode side and from the light-shielding layer side are different from each other, and the carrier injection from the light-shielding layer side is greater. For this reason, in order to prevent carrier injection from the light-shielding side, it is necessary to make the blocking film on the light-shielding layer side stronger, that is, to prevent the carrier injection therefrom more completely, in the case where the energy band structures of the blocking film and the photoconductive layer show a symmetric pattern.

However, in the above-mentioned method, since the carrier injections from both sides, that is, from the transparent electrode side and the light-shielding layer side, are blocked, the impedance during dark time becomes greater. This feature is preferable as far as light-writing-type liquid crystal elements are concerned; however, since the photocurrent is reduced (remarkably reduced particularly upon positive bias time) compared with that made of a diode element in a broader sense, the impedance during photo time becomes greater. For this reason, the above-mentioned method merely provides an impedance ratio of during dark time and photo time that is the same as or slightly smaller than that made of a diode element in a broader sense.

Therefore, it is necessary not only to merely prevent the carrier injections from both sides, but also to generate a photocurrent during photo time that is as much as that of a diode element in a broader sense.

In order to achieve such a photoconductive layer having an optimal photocurrent characteristic, any of the following arrangements (a) through (d) can be adopted so that the highly-resistive area on the transparent electrode side becomes wider than the highly-resistive area on the light-shielding side, and so that a higher voltage is applied to the high-resistance area on the transparent electrode side than to the area on the light-shielding layer side.

(a) A p-layer, which is reinforced more than a diode element in a broader sense (that is, has an increased dope amount of impurities, an increased film thickness, and other features), is prepared, and this is joined to an i-type photoconductive layer so as to make a depletion layer (a very high-resistance area), which is formed on the transparent electrode side.

(b) In the case of forming an insulating layer on the transparent electrode side, the film thickness of the insulating layer is made to be thicker than that of the conventional layer, and this is joined to the photoconductive layer so as to form a very high-resistance area.

(c) In the case of using a material of hetero-series on the transparent electrode side that has a wider energy gap than the photoconductive layer, a highly-resistive n-type layer or i-type layer (which has a film thickness thicker than that of the conventional layer) is prepared, and this is joined to the photoconductive layer so as to form a very high-resistance area.

(d) in the case of using a p-layer as a material of hereto-series on the transparent electrode side that has a wider energy gap than the photoconductive layer, the p-layer is reinforced more than the conventional layer, and this is joined to a photoconductive layer of i-type so as to form a depletion layer.

With the above-mentioned arrangements, voltage that is to be applied to the photoconductive layer can be biased, that is, a higher voltage is applied to the highly-resistive area formed on the transparent electrode side than to the area on the light-shielding layer side. Thus, it is possible to obtain characteristics during photo time that are very close to those of a diode in a broader sense, and consequently to reduce the impedance during photo time. In addition, since it is possible to prevent carrier injection during dark time, the impedance during dark time becomes greater than that of the conventional element. Therefore, the impedance ratio of during dark time and photo time becomes greater than those of other conventional elements, thereby making it possible to provide an optimal photoconductive layer.

Moreover, another method for obtaining an optimal photoconductive layer is explained as follows:

First, a carrier-blocking layer is formed on the transparent electrode side by using the above-mentioned insulating layer, or using a semiconductor, which is of hetero-series that has an energy gap wider than that of the photoconductive layer (which is an n-type or i-type layer with high resistance, or a p-type layer wherein the value of resistance does not matter so much), or using a p-type layer having not so low resistance in the case of a material having the same energy gap as the photoconductive layer.

On the light-shielding layer side, is formed inside the photoconductive layer, the carrier-blocking layer which is the same as that interpolated between the photoconductive layer and the light-shielding layer (for example, an insulating layer; an n-type or i-type layer with high resistance, or a p-type layer wherein the value of resistance does not matter so much in the case of using a material of hetero-series that has an energy gap wider than that of the photoconductive layer; or a p-type layer wherein the value of resistance does not matter so much in the case of a material having the same energy gap as the photoconductive layer).

This makes it possible to achieve an optimal photoconductive layer. In the above-mentioned arrangement, the carrier injection on the photoconductive layer side can be blocked by the carrier-blocking layer that is provided on the transparent electrode side and the carrier injection from the light-shielding layer side can be blocked by the carrier-blocking layer that is provided inside the photoconductive layer; thus, highly-resistive states can be obtained during both bias times. Therefore, dark current is hardly allowed to flow in this element. Moreover, when writing light is incident on the photoconductive layer from the transparent electrode side, the closer to the transparent electrode the position in question is, more photocarriers are generated, because the light is absorbed by the photoconductive layer in an exponential functional manner. Therefore, no problem arises as far as the photocarrier generation is concerned even if the carrier-blocking layer is provided in an area closer to the light-shielding layer inside the photoconductive layer where not so many photocarriers are generated.

Consequently, even if the carrier-blocking layer is provided close to the light-shielding layer inside the photoconductive layer, photocurrent is allowed to flow well during both bias times in the same manner as the case where the carrier-blocking layer is interpolated between the light-shielding layer and the photoconductive layer.

Furthermore, in the above-mentioned elements, the magnitude of internal potential, which is caused by light illumination, is extremely reduced compared with the conventional element so that dc component (DC bias) hardly remains in the liquid crystal layer during photo time. Thus, it becomes possible to achieve a light-writing-type liquid crystal element with high reliability.

Figure 16:
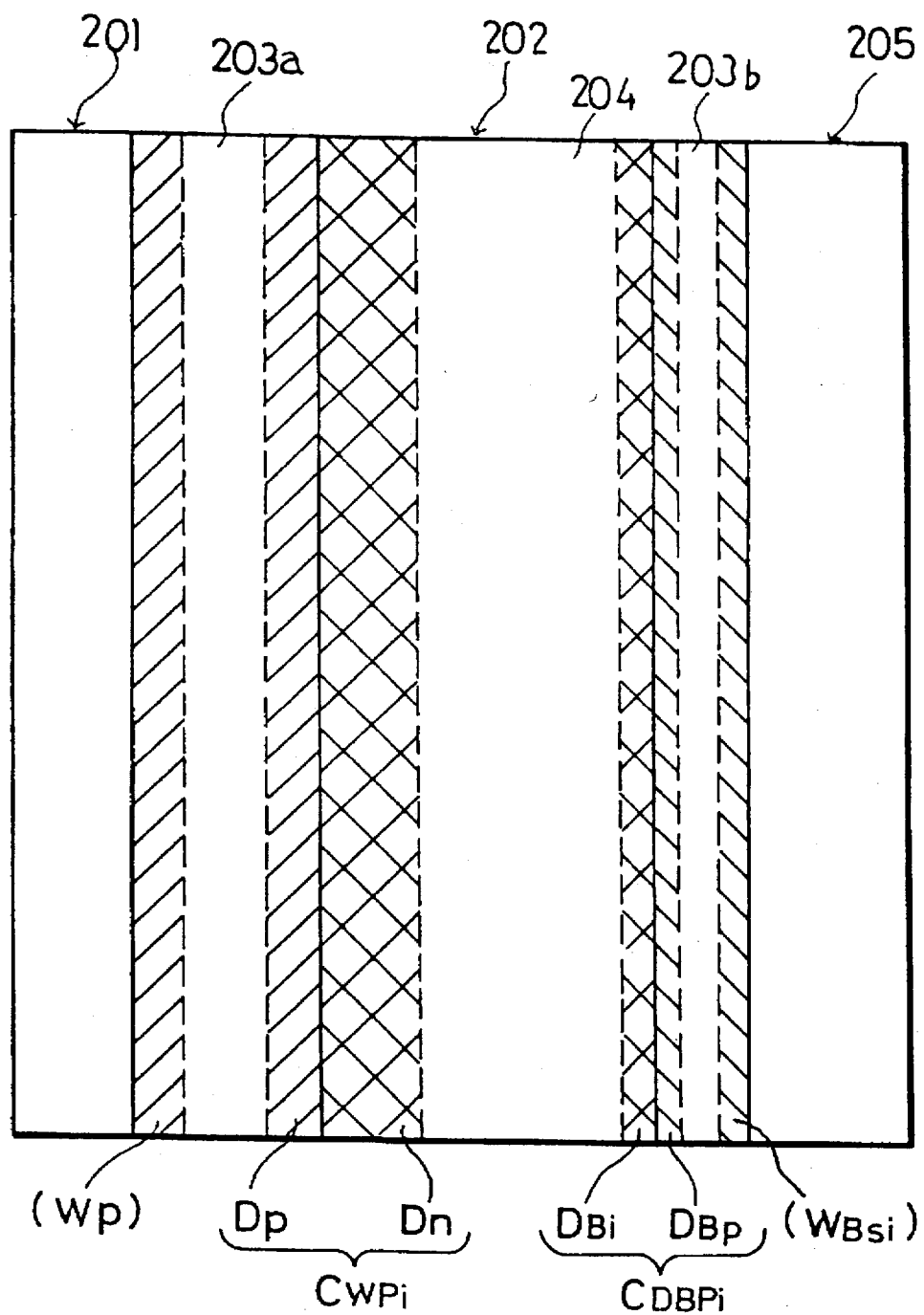
FIG. 16 is an explanatory drawing that shows a design of a carrier-blocking layer which is formed in the light-writing-type liquid crystal element of the present invention.

Referring to FIG. 16, the following description will discuss the design of the carrier-blocking layer which is made to achieve an optimal photoconductive layer. Here, in the following description, transparent electrode 201 is a stacked layer constituted of an ITO film and an $SnO_2$ film; photoconductive layer 202 is a stacked layer wherein a p-type a-Si:H film 203a, an i-type a-Si:H film 204 and a p-type a-Si:H film 203b are stacked in this order from the transparent electrode 201 side; and light-shielding layer 205 is an a-SiGe:H film. Further, with respect to externally applied voltages, an explanation is first given of dc voltage, and then is given of ac voltage.

First, an explanation is given of a case where the same material as that of the photoconductive layer 202 is used as a material for the carrier-blocking layer. In this case, depletion layers, which are provided on the transparent electrode 201 side as well as on the light-shielding layer 205 side inside the photoconductive layer 202, are used as the blocking layers.

In the above-mentioned photoconductive layer 202, the depletion layer on the a-Si:H film 203a side, which is formed by a junction between the transparent electrode 201 and the p-type a-Si:H film 203a, needs to have a minimum film thickness as its depletion-layer width that is given by the following equation (1) so that it functions as the carrier-blocking layer on the transparent electrode 201 side:

$$W_P = \sqrt{(2\epsilon_{SnO_2}\epsilon_{Si}N_D(V_{bi}-V)/qN_A(\epsilon_{SnO_2}N_D+\epsilon_{Si}N_A))} \qquad (1)$$

Here, $\epsilon_{SnO_2}$ represents the dielectric constant of the transparent electrode 201, $\epsilon_{Si}$ represents the dielectric constant of the a-Si:H film, $N_D$ represents the donor density inside the transparent electrode 201, $N_A$ represents the acceptor density inside the p-type a-Si:N film 203a, $V_{bi}$ represents the diffusion potential that is exerted by the junction between the transparent electrode 201 and the p-type a-Si:H film 203a, V represents an externally applied voltage, and q represents a unit charge. Further, $V_{bi}$ is given by the following equation (2).

$$V_{bi} = (k_B T/q)\ln(N_A N_D/n_i^2) \qquad (2)$$

Here, $k_B$ represents Boltzmann's constant, T is the absolute temperature, and $n_i$ represents the intrinsic carrier density. This shows that Wp, which is given by equation (1), is dependent on the externally applied voltage V. In particular, the depletion-layer width decreases when the $SnO_2$ side is negatively biased. Thus, when the depletion-layer width decreases, carrier injection from the transparent electrode 201 to the photoconductive layer 202 tends to occur. In order to prevent this phenomenon, the depletion-layer width at the time when negatively biased is added to the transparent electrode 201 side, thereby making it possible to suppress the carrier injection. The depletion-layer width that is added to the transparent electrode 201 side is obtained by the above-mentioned equation (1).

Here, terms related to material parameters except the diffusion potential and the externally applied voltage are summarized into one, that is, $\alpha$, which is given by the following equation (3).

$$\alpha = 2\epsilon_{SnO2}\epsilon_{Si}N_D/qN_A(\epsilon_{SnO2}N_D + \epsilon_{Si}N_A) \quad (3)$$

Further, the depletion-layer width without the externally applied voltage is denoted by $Wp_{v-0}$ and the depletion-layer width with the externally applied voltage is denoted by $Wp_{v-Vapp}$. Then, the difference between them, $\Delta Wp$, is given by the following equation (4), which is derived from the above-mentioned equation (3).

$$\Delta Wp = Wp_{v-0} - Wp_{v-Vapp}$$

$$= \sqrt{\alpha V_{bi}} - \alpha(V_{bi} - V_{app}) \quad (4)$$

Therefore, the thickness of the p-type a-Si:H film 203a, which is required for blocking the carrier injection from the transparent electrode 201 side, is given by adding Wp and $\Delta Wp$.

Moreover, another objective of the p-type a-Si:H film 203a on the transparent electrode 201 side is to form a depletion layer by making a junction with the i-type a-Si:H film 204 (which is, in fact, slightly close to n-type), that is, by making a p-i junction, and to apply a voltage to this depletion layer. Here, with respect to the junction formed between the p-type a-Si:H film 203a (p-layer) and the i-type a-Si:H film 204 (i-layer), the following description will discuss the depletion-layer width on the p-layer side as well as the depletion-layer width on the i-layer side. The depletion-layer width, Dp, on the p-layer side, made by the p-i junction, is given by the following theoretical equation (5).

$$Dp = \sqrt{(2\epsilon_{Si}N_D(V_{bi} - V)/qN_A(N_A + N_D))} \quad (5)$$

Here, $N_D$ represents the donor density inside the i-type a-Si:H film 204, $V_{bi}$ represents the diffusion potential that is exerted by the junction between the p-type a-Si:H film 203a and the i-type a-Si:H film 204. As explained by the above-mentioned equation (5), the depletion-layer width Dp on the p-layer side is dependent on the externally applied voltage. However, different from the case of the junction between the transparent electrode 201 and the p-type a-Si:H film 203a, Dp increases when the transparent electrode 201 side is negatively biased; therefore, it is not necessary to intentionally increase the film thickness of the p-type a-Si:H film 203a.

On the other hand, the depletion-layer width, Dn, formed on the i-type a-Si:H film 204 side, is given by the following equation (6).

$$Dn = \sqrt{(2\epsilon_{Si}N_A(V_{bi} - V)/qN_D(N_A + N_D))} \quad (6)$$

Next, an explanation will be given of the depletion layer that is formed on the light-shielding layer 205 side of the photoconductive layer 202.

First, an explanation will be given of the film thickness of the p-type a-Si:H film 203b that is interpolated between the i-type a-Si:H film 204 and the light-shielding layer 205 (a-SiGe:H film) so as to prevent carrier injection from the light-shielding layer 205. The depletion-layer width, $W_{BSi}$, which is formed on the p-type a-Si:H film 203b side through the junction between the a-SiGe:H film and the p-type a-Si:H film 203b, is given by the following theoretical equation (7).

$$W_{BSi} = \sqrt{(2\epsilon_{Si}\epsilon_{SiGe}N_D(V_{bi} - V)/qN_A(\epsilon_{SiGe}N_D + \epsilon_{Si}N_A))} \quad (7)$$

Here, $\epsilon_{SiGe}$ represents the dielectric constant of the a-SiGe:H film, and $N_D$ represents the donor density inside the a-SiGe:H film. Thus, the depletion-layer width, $W_{BSi}$, which is calculated by the above-mentioned equation (7), shows a minimum film thickness that is required for preventing carrier injection from the light-shielding layer 205 side.

Further, since a depletion layer is created in the vicinity of the junction between the p-type a-Si:H film 203b and the i-type a-Si:H film 204, it is necessary to take this depletion layer width into consideration as well. Here, the depletion-layer width, $D_{Bp}$, of the p-type a-Si:H film 203b, which is formed by the junction between the p-type a-Si:H film 203b and the i-type a-Si:H film 204, is given by the following theoretical equation (8).

$$D_{Bp} = \sqrt{(2\epsilon_{Si}N_D(V_{bi} - V)/qN_A(N_A + N_D))} \quad (8)$$

Further, the depletion-layer width, $D_{Bi}$, which is formed in the i-type a-Si:H film 204, is given by the following theoretical equation (9).

$$D_{Bi} = \sqrt{(2\epsilon_{Si}N_A(V_{bi} - V)/qN_D(N_A + N_D))} \quad (9)$$

As described above, the film thickness of the carrier-blocking layer that is to be formed on the light-shielding layer 205 side of the photoconductive layer 202 is obtained by adding the depletion-layer widths $D_{Bp}$ and $D_{Bi}$, which are obtained by the above-mentioned equations (8) and (9), to the depletion-layer width $W_{BSi}$ which is obtained by the above-mentioned equation (7).

In general, in the light-writing-type liquid crystal element, voltages, which are applied to the photoconductive layer 202, are imposed on the areas of the depletion layers when the element is actually driven. Further, carriers that are generated in the photoconductive layer 202 upon illumination of writing light reduce in an exponential functional manner from the transparent electrode 201 side toward the light-shielding 205 side. Therefore, in order to obtain a photocurrent efficiently, it is necessary to make the voltage to be applied to the transparent electrode 201 side greater than that to be applied to the light-shielding layer 205 side. In order to make the voltage to be applied to the transparent electrode 201 side of the photoconductive layer 202 greater as described above, the depletion-layer width, formed on the transparent electrode 201 side of the photoconductive layer 202, needs to be greater than the depletion-layer width that is formed on the light-shielding layer 205 side of the photoconductive layer 202. The following methods are used to make the depletion-layer width on the transparent electrode 201 side greater than that on the light-shielding layer 205 side:

① To make greater the acceptor density in the p-type a-Si:H film 203a on the transparent electrode 201 side so that the diffusion potential, which is exerted by the p-i junction, is made greater. Here, in order to make smaller the acceptor density in the p-type a-Si:H film 203a on the transparent electrode 201 side, it is necessary to make the p-type a-Si:H film 203a thicker.

② To make smaller the donor density in the i-type a-Si:H film 204 on the transparent electrode 201 side so that the depletion-layer width, which is formed by the p-i junction, is made greater.

③ To make the film thickness of the p-type a-Si:H film 203a on the transparent electrode 201 side greater than the theoretical value of the depletion-layer width in the case when no voltage is externally applied to the transparent electrode 201. Thus, it becomes possible to take it into consideration the depletion-layer width that decreases particularly when a reversed-bias voltage is applied to the p-i junction.

With these methods ① through ③ described above, the p-type a-Si:H film 203a provided on the transparent electrode 201 side, which prevents carrier injection from the transparent electrode 201 side, also allows voltage to be applied in a focused manner to areas on the transparent electrode 201 side of the photoconductive layer 202 when its depletion layer is made greater on the transparent electrode 201 side.

Moreover, this objective, that is, to apply voltage to the areas on the transparent electrode 201 side of the photoconductive layer 202 in a focussed manner, is also achieved by making as small am possible the depletion-layer width formed by the junction between the p-type a-Si:H film 203b, which is provided on the light-shielding layer 205 side of the photoconductive layer 202, and the light-shielding layer 205 and the depletion-layer width formed by the junction between the p-type a-Si:H film 203b and the i-type a-Si:H film 204 so as to prevent extra voltage loss. The following methods are used to suppress the extra voltage loss:

①' To make the acceptor density in the p-type a-Si:H film 203b on the light-shielding layer 205 side smaller than the acceptor density in the p-type a-Si:H film 203a on the transparent electrode 201 side so that the diffusion potential, which is exerted by the p-i junction, is made smaller than the diffusion potential which is exerted by the p-i junction on the transparent electrode 201 side.

②' To arrange the film thickness of the p-type a-Si:H film 203b on the light-shielding layer 205 side so that it is provided by adding the depletion-layer width of the p-type a-Si:H film 203b, which is formed by the junction with the light-shielding layer 205, to the depletion-layer width the p-type a-Si:H film 203b which is formed by the junction. Here, the respective depletion-layers are supposed to have theoretical values in the case when no voltage is externally applied.

③' To make the donor density in the i-type a-Si:H film 204 on the light-shielding layer 205 side greater than the donor density on the transparent electrode 201 side so that the depletion-layer width, which is formed by the p-i junction, is made smaller than the depletion-layer width which is formed by the p-i junction on the transparent electrode 201 side.

With these methods ①' through ③' described above, the carrier-blocking layer, provided on the light-shielding layer 205 side, not only prevents carrier injection from the light-shielding layer 205, but also suppresses extra voltage loss by making as small as possible the depletion-layer width which functions as a carrier-blocking layer on the light-shielding layer 205 side. This makes it possible to apply voltage to areas on the transparent electrode 201 side of the photoconductive layer 202 in a focussed manner.

Although the above-mentioned theories are based on concepts concerning dc voltage, they can be applied to ac voltage with the same effects. This is because a depletion layer generally has an electrostatic capacity, and in the case of electrostatic capacities that are merely connected in series with one another, the smaller the electrostatic capacity, the greater the application of voltage. The electrostatic capacity C of a depletion layer is given by the following basic theoretical equation (10):

$$C = \epsilon_s S/W \quad (10)$$

Here, S represents the cross-sectional area of the depletion layer, and W represents the width of the depletion layer. Further, the impedance Z of a capacitor is given by the following basic theoretical equation (11) in terms of ac.

$$Z = 1/\omega C \quad (11)$$

Here, $\Omega$ is an angular frequency, which is given by $2\pi f$. f represents an ac driving frequency. Substitution of equation (10) into equation (11) yields the following equation (12).

$$Z = W/\Omega \epsilon_s S \quad (12)$$

According to equation (12), it is found that the depletion-layer width is proportional to the impedance. This is the reason why the depletion-layer width, formed by the p-i junction on the transparent electrode 201 side, is made greater than the deletion-layer width formed on the light-shielding layer 205 side.

The following description will discuss the electrostatic capacity of depletion layer more specifically. The electrostatic capacity $C_{WPi}$ of the depletion layer, which is provided by the p-i junction on the transparent electrode 201 side of the photoconductive layer 202, and the electrostatic capacity $C_{DBpi}$ of the depletion layer, which is provided by the p-i junction on the light-shielding layer 205 side, are given by the following theoretical equations (13) and (14):

$$C_{WPi} = \sqrt{(q\epsilon_s N_A N_D/2(N_A+N_D)(V_{bi}-V)} \quad (13)$$

$$C_{DBpi} = \sqrt{(q\epsilon_s N_A N_D/2(N_A+N_D)(V_{bi}-V)} \quad (14)$$

Here, although $N_D$ represents a donor density in the i-type a-Si:H film 204, $N_D$ in equation (13) and $N_D$ in equation (14) are different from each other in their absolute values. In other words, the donor density in the i-type a-Si:H film 204 is different in its value depending on the transparent electrode 201 side and the light-shielding layer 205 side: The relationship, $N_D$ in equation (13)<$N_D$ in equation (14), is always satisfied. Moreover, the acceptor density $N_A$ in the p-type a-Si:H films 203a and 203b can be freely selected to a certain degree in relation to $N_D$ and the depletion-layer width. Furthermore, with respect to the relationship in size between $C_{WPi}$ and $C_{DBpi}$, it is necessary to always satisfy $C_{WPi} < C_{DBpi}$.

Here, in the case of taking into consideration the electrostatic capacity in the vicinity of the photoconductive layer 202, strictly speaking, it is necessary to consider the electrostatic capacity of the depletion layer (Wp), which is formed by the junction between the transparent electrode 201 and the p-type a-Si:H film 203a, as well as the electrostatic capacity of the depletion layer ($W_{BSi}$), which is formed by the junction between the light-shielding layer 205 and the p-type a-Si:H film 203b. However, the widths of these depletion layers are extremely small compared with the aforementioned depletion layer formed by the p-i junction on the transparent electrode 201 side of the photoconductive layer 202 and depletion layer formed by the p-i junction on the light-shielding layer 205 side. Therefore, these widths are negligible since voltages, which are distributed, are also very small.

Next, the following description will discuss the width of a depletion layer that is formed in the case of using a p-type wide-gap semiconductor on the transparent electrode 201 side in place of the p-type a-Si:H film 203a, and the electrostatic capacity of this depletion layer.

The width of the p-type wide-gap semiconductor on the transparent electrode 201 side is determined by the width of a depletion layer that is formed by the function between this wide-gap semiconductor and the i-type a-Si:H film 204, and the film thickness that is at least the same as the depletion-layer width formed in the wide-gap semiconductor is required.

For example, an explanation will be given of a case wherein an a-SiC:H film is used as the wide-gap semiconductor. The depletion-layer width WpsiC, which is used in the wide-gap semiconductor when this a-SiC:H film is formed, is given by the following theoretical equation (15):

$$W_{PsiC} = \sqrt{(2\epsilon_{si}\epsilon_{siC}N_D(V_{bi}-V)/qN_A(\epsilon_{si}N_D+\epsilon_{siC}N_A))} \quad (15)$$

The depletion-layer width $Wi_{Si}$, which is formed in the i-type a-Si:H film 204, is given by the following theoretical equation (16)

$$W_{iSi} = \sqrt{(2\epsilon_{si}\epsilon_{siC}N_A(V_{bi}-V)/qN_D(\epsilon_{si}N_D+\epsilon_{siC}N_A))} \quad (16)$$

Therefore, the area on the transparent 201 side of the photoconductive layer 202 that is subjected to the applied voltage corresponds to an area of the depletion-layer width that is obtained by the above-mentioned equations (15) and (16). The electrostatic capacity of this depletion-layer width Cwpi is given by the following equation (17):

$$C_{wpi} = \sqrt{(q\epsilon_{si}\epsilon_{siC}N_A N_D/2(\epsilon_{si}N_D+\epsilon_{siC}N_A)(V_{bi}-V))} \quad (17)$$

As described above, in the case where the wide-gap semiconductor is used as a carrier-blocking layer on the light-shielding layer 201 side in place of the p-type a-Si:H film 203a, the design of the film thickness of the wide-gap semiconductor can be carried out by the depletion-layer width and the electrostatic capacity that are obtained by the above-mentioned equations (15), (16) and (17). Further, when the film thickness of this wide-gap semiconductor is designed, it is necessary to make the electrostatic capacity Cwpi on the transparent electrode 201 side smaller than the electrostatic capacity on the light-shielding layer 205 side, in order to apply a higher voltage to the transparent electrode 201 side of the photoconductive layer 202, in the same manner as described earlier.

Next, the following description will discuss a case where insulating films (not shown), which function as the carrier-blocking layers, are provided on the transparent electrode 201 side as well as on the light-shielding layer 205 side of the photoconductive layer 202.

In general, it is considered that, in an optimal insulating film, there is no carrier transportation except for that caused by the tunnel effect on electrons. Accordingly, the depletion-layer width ($W_{ISi}$) and the electrostatic capacity ($C_{ISi}$), which are formed by the junctions between the insulating films and the semiconductors, are given by the following equations (18) and (19):

$$W_{ISi} = \sqrt{(2\epsilon_{si}\phi_S/qN_D)} \quad (18)$$

$$C_{ISi} = \epsilon_I/t_I + (\epsilon_I/\epsilon_{si})(2\epsilon_{si}\phi_S/qN_D)^{1/2} \quad (19)$$

Here, $\epsilon_I$ represents the dielectric constant of the insulating film, and $t_I$ represents the film thickness of the insulating film. Further, $\phi_S$ represents the surface potential, which is given by the following equation (20):

$$\phi_S = 2k_B T ln(N_D/n_i) \quad (20)$$

In this case also, in order to apply a higher voltage onto the transparent electrode 201 side than that onto the light-shielding layer 205 side of the photoconductive layer 202, it is necessary to make the depletion-layer width on the transparent electrode 201 side greater than the depletion-layer width on the light-shielding layer 205 side of the photoconductive layer 202. Therefore, the following methods are used:

①" To make the donor density of the a-Si:H film 203a that is joined to the insulating film on the transparent electrode 201 side smaller than the donor density of the a-Si:H film 203b that is joined to the insulating film on the light-shielding layer 205 side.

②" To make the thickness of the insulating film on the transparent electrode 201 side greater than the thickness of the insulating film on the light-shielding layer 205 side.

③" To make the dielectric constant of the insulating film that is installed on the transparent electrode 201 side smaller than the dielectric constant of the insulating film that is installed on the light-shielding layer 205 side.

With the above-mentioned methods ①" through ③", it is possible to increase the depletion-layer width on the transparent electrode 201 side and also to reduce the electrostatic capacity of the transparent electrode 201 side, thereby making it possible to prevent extra voltage loss on the light-shielding layer 205 side. Thus, a higher voltage can be applied to the transparent electrode 201 side of the photoconductive layer 202 than to the light-shielding layer 205 side.

As described above, when insulating films are installed on both sides of the photoconductive layer 202 as carrier-blocking layers, a higher voltage can be applied to the transparent electrode 201 side of the photoconductive layer 202 by making the depletion-layer width that is formed on the transparent electrode 201 side of the photoconductive layer 202 greater than the depletion-layer width that is formed on the light-shielding layer 205 side, or by making the electrostatic capacity of the depletion layer that is formed on the transparent electrode 201 side of the photoconductive layer 202 smaller than the electrostatic capacity of the depletion layer that is formed out he light-shielding layer 205 side. This effect can be obtained even in the case where a wide-gap semiconductor or a semiconductor made of the same material having a different conduction type is installed on the light-shielding layer 205 side as a carrier-blocking layer, or even in the case where a wide-gap semiconductor or a stacked layer of an insulating film and a wide-gap semiconductor is installed on the transparent 201 side as a carrier-blocking layer.

Therefore, the photoconductive layer 202 that is designed as described above exhibits characteristics during photo time that are very close to those of a diode in a broader sense, and consequently has a reduced impedance during photo time. In addition, since it is possible to prevent carrier injection from the transparent electrode 201 and from the light-shielding layer 205, the impedance during dark time becomes greater than that of any other conventional element. As a result, the impedance ratio of during dark time and photo time becomes greater than any conventional element, thereby making it possible to provide an optimal photoconductive layer 202. Thus, it is possible to improve performances of a lightwriting-type liquid crystal element by adopting this photoconductive layer 202.

Moreover, in any one of the photoconductive layers 202 designed as described above, the magnitude of internal potential, which is caused by light illumination, is extremely reduced compared with the conventional element so that high dc component (dc bias) is hardly imposed on the liquid crystal layer during photo time. Thus, it becomes possible to achieve a light-writing-type liquid crystal element with high reliability by using this photoconductive layer 202.

The following two types of structures are proposed as light-writing-type liquid crystal elements, each of which has a photoconductive layer that satisfies the above-mentioned designing requirements: one structure wherein carrier-blocking layers are installed on both sides of a photoconductive layer, and the other structure wherein the carrier-blocking layer on the transparent electrode side is installed on one end portion of the photoconductive layer while the carrier-blocking layer on the light-shielding layer side is installed inside the photoconductive layer. Energy band diagrams in the light-writing-type liquid crystal elements of the two types are shown in FIGS. 4(a) through 4(c) and FIGS. 5(a) through 5(c) as well as in FIGS. 71 and 72.

Figure 5B:
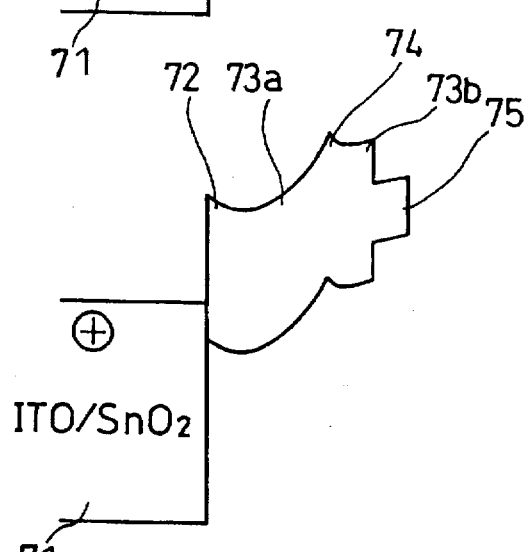
FIG. 5(b) shows a band diagram when a positive bias is applied to the transparent electrode on the photoconductive layer side of the write-writing-type liquid crystal element of FIG. 5(a).
Figure 5C:
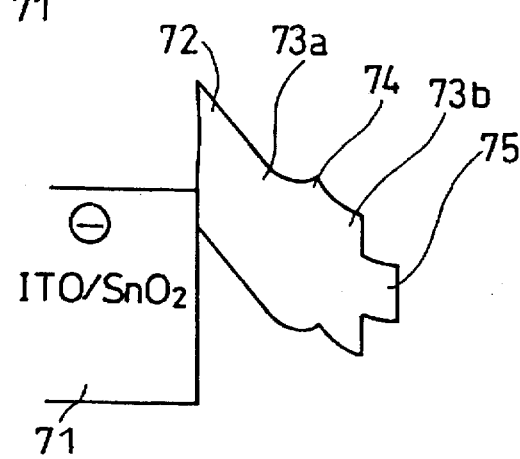
FIG. 5(c) shows a band diagram when a negative bias is applied to the transparent electrode on the photoconductive layer side of the write-writing-type liquid crystal element of FIG. 5(a).

FIGS. 4(a) through 4(c) show energy-band diagrams of an element structure wherein carrier-blocking layers 72 and 74 are installed on both sides of a photoconductive layer 73. Further, FIG. 71 is an energy-band diagram during a film-forming process, and when a thermal equilibrium state has been reached, the energy-band diagram changes to the one shown in FIG. 4(a). FIGS. 5(a) through 5(c) show energy-band diagrams of an element structure wherein one of the carrier-blocking layer 74 is installed between photoconductive layers 73a and 73b. Here, FIG. 72 is an energy-band diagram during a film-forming process, and when a thermal equilibrium state has been reached, the energy-band diagram changes to the one shown in FIG. 5(a).

In the element structure shown by FIGS. 4(a), 4(b) and 4(c), which respectively show a thermal equilibrium state, a positively-biased state and a negatively-biased state thereof, it is found that carrier injection from the transparent electrode 71, as well as from the light-shielding layer 75, is blocked by the carrier-blocking layers 72 and 74 during both positive and negative bias times in the case of dark time. Thus, a portion of the photoconductive layer 73, which is under dark state, becomes highly-resistive and is maintained in a high-impedance state wherein dark currents are hardly allowed to flow. In the case of photo time, on the other hand, since a depletion layer, which is wider than that formed on the light-shielding layer 75 side, is formed on the transparent electrode 71 side of the photoconductive layer 73, a higher voltage is applied to the transparent electrode 71 side of the photoconductive layer 73. This makes it possible to obtain photocurrents more effectively and also to reduce the magnitude of internal electric potential. Therefore, in a portion of the photoconductive layer 73 which is under photo state, the impedance becomes smaller than that derived from the conventional element structures. Moreover, in the element structure shown by FIGS. 5(a) through 5(c) also, the same effects can be obtained.

As described above, in the element structure of the present invention, it is possible to increase the impedance ratio between dark and photo times more than that obtained from the conventionally developed element structures (including diode elements in a broader sense), and also to improve the photosensitivity to a great extent. As a result, by incorporating the element of the present invention to a light-writing-type liquid crystal element, it is possible to improve the photosensitivity of the light-writing-type liquid crystal element by the use of the improved photosensitivity of the photoconductive layer.

Further, since the impedance ratio between dark and photo times of the photoconductive layer becomes greater, the voltage that is applied on the liquid crystal layer during photo time becomes greater so that the contrast increases, compared with that of the conventional elements. Moreover, since the generation of internal electric potential is reduced compared with the conventional elements, it is possible to suppress the dc component that is imposed on the liquid crystal layer, and consequently to lengthen the service life of the light-writing-type liquid crystal element.

Furthermore, with the extraordinary improvements in performances of the photoconductive layer, the photosensitivity of the photoconductive layer can be improved. This allows the light-writing-type liquid crystal element to be driven by low driving voltages, the driving voltage of the light-writing-type liquid crystal element can be lowered, and consequently low power consumption is achieved in the driving voltage of the light-writing-type liquid crystal element. In addition, since the photoconductive layer is not an element having a rectifying property which is highly temperature-dependent, offsets in performances are very small with respect to temperatures, and the temperature-dependence is consequently very small.

In the present embodiment 1, an explanation will be given of a light-writing-type liquid crystal element having an element structure wherein insulating films are used on both sides of a photoconductive layer as carrier-blocking layers, and with respect to the other element structures, explanations will be given in embodiment 2 and thereafter.

Figure 3:
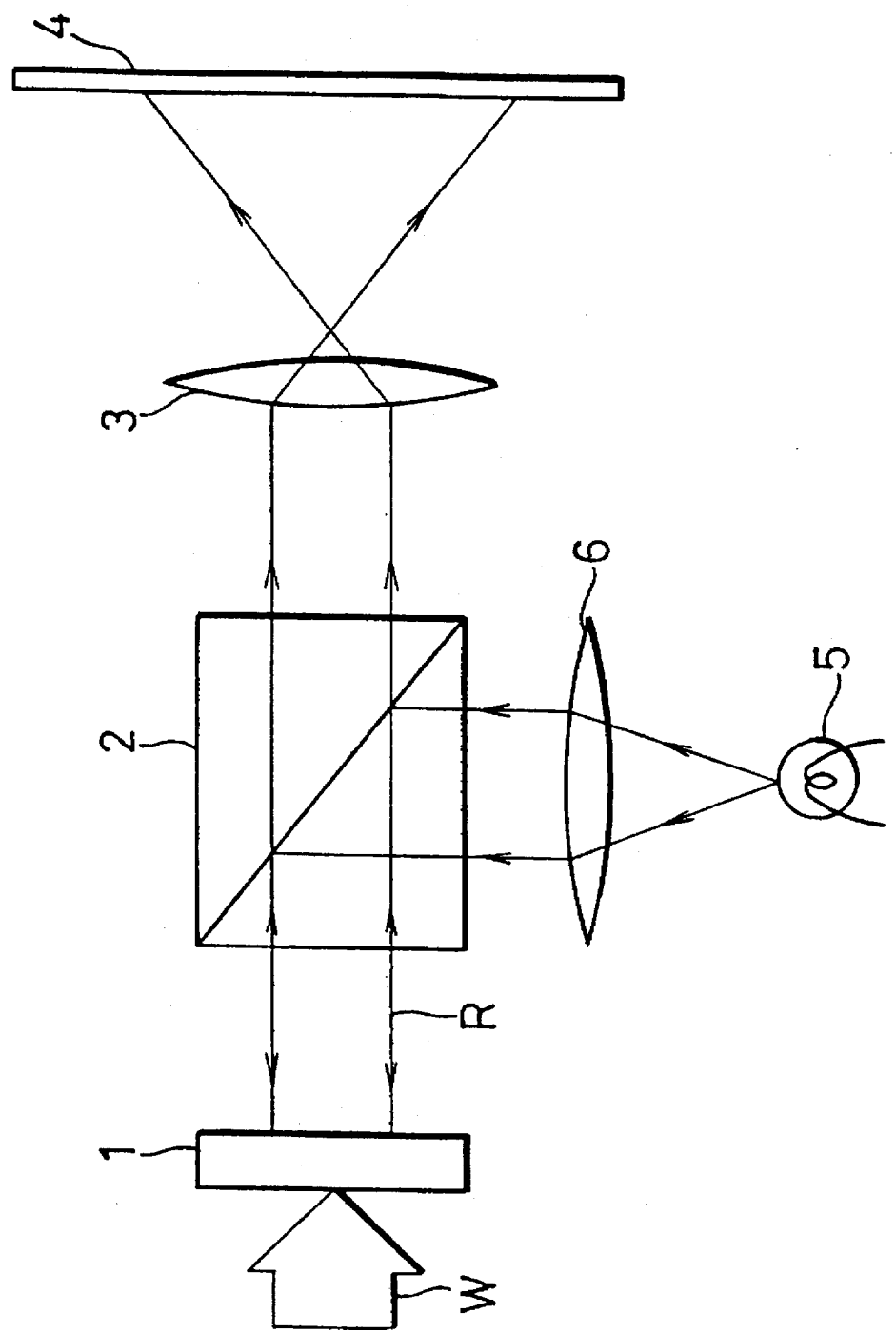
FIG. 3 is a schematic view showing a construction of a liquid crystal display of the projection type wherein the light-writing-type liquid crystal element is installed.

As illustrated in FIG. 3, a projection-type liquid crystal display of the present embodiment is provided with a liquid-crystal light valve (light-writing-type liquid crystal element) 1. This liquid crystal light valve 1 is constituted of a photoconductive layer whose impedance changes upon receipt of incident light, a light-reflection layer which reflects light (read-out light R) that is incident thereon from the front-surface side, and a liquid crystal layer. The function of the liquid crystal light valve 1 is that, upon receipt of writing light W from the rear-surface side, the area in question changes its oriented state in the liquid-crystal-layer portion, that is, its optical characteristics, due to a change in the impedance of the photoconductive layer. In other words, when the writing light W, which has been released from an image-forming device such as a CRT, is incident thereon, the liquid crystal light valve 1 is subjected to modulation in its liquid crystal in accordance with a writing image. Additionally, a detailed description of the photoconductive layer of the liquid crystal light valve 1 will be given later.

Further, the liquid crystal light valve 1 is driven in the hybrid field effect mode (hereinafter, referred to simply as the HFE mode), which is one of the display modes. For this reason, a polarizing beam splitter 2 is placed in front of the liquid crystal light valve 1. Thus, the read-out light R, which has been released from a read-out light source 5 and converged by a lens 6, is directly polarized by the polarizing beam splitter 2 and allowed to be incident on the liquid crystal light valve 1.

A lens 3 is disposed at a position opposing to the liquid crystal light valve 1 with the polarizing beam splitter 2 sandwiched in between, and a screen 4 is also disposed in front of the lens 3.

Therefore, in the projection-type liquid crystal display having the above-mentioned arrangement, the writing light W, released from the image-forming device such as a CRT, is incident on the rear-surface side of the liquid crystal light valve 1 so that an image is formed on the liquid crystal light valve 1. On the other hand, the light, which has been illuminated from the read-out light source 5 and converged by the lens 6, is directly polarized by the polarizing beam splitter 2, and allowed to be incident on the front-surface side of the liquid crystal light valve 1 as the read-out light R. The incident read-out light R is again reflected by the light-reflection layer inside the liquid crystal light valve 1 toward the front-surface side. At this time, in the liquid crystal layer of the liquid crystal light valve 1, the oriented state of the liquid crystal is changed at a liquid-crystal-layer portion corresponding to pixels that have been subjected to the writing light W. Therefore, the read-out light R, which has been incident on this pixel portion, has its polarizing direction changed from the direction at the incident time after it has been reflected by the light-reflection layer, and is allowed to pass through the polarizing beam splitter 2. The transmitted light is enlarged by the lens 3, and projected onto the screen 4.

In other words, in the projection-type liquid crystal display, since the liquid crystal light valve 1 is driven in the HFE mode, the liquid crystal layer is maintained in an oriented state wherein its nematic liquid crystal having the positive dielectric anisotropy is twisted to 45°. When a voltage is applied to the liquid crystal layer, the liquid crystal molecules respond to the electric field and tilt in the normal direction with respect to the substrate. Thus, the incident light has its polarizing direction rotated due to reflection and the double-refraction effect derived from the tilt and twist of the liquid crystal molecules. The light, which has been subjected to this rotation, is allowed to pass through the polarizing beam splitter 2, thereby bringing the screen 4 into the photo state. When no voltage is applied, the light, which has been incident on the liquid crystal layer, can not pass through the polarizing beam splitter 2 since its polarizing direction at the time of incident of the light is maintained even after the reflection due to rotatory polarization of the liquid crystal. Therefore, no image is projected onto the screen 4 so that it is brought into the dark state. As described above, images, formed on the liquid crystal light valve 1, are projected onto the screen 4 in an enlarged manner through the lens 3.

The following description will discuss the structure of the above-mentioned liquid crystal light valve 1.

Figure 2:
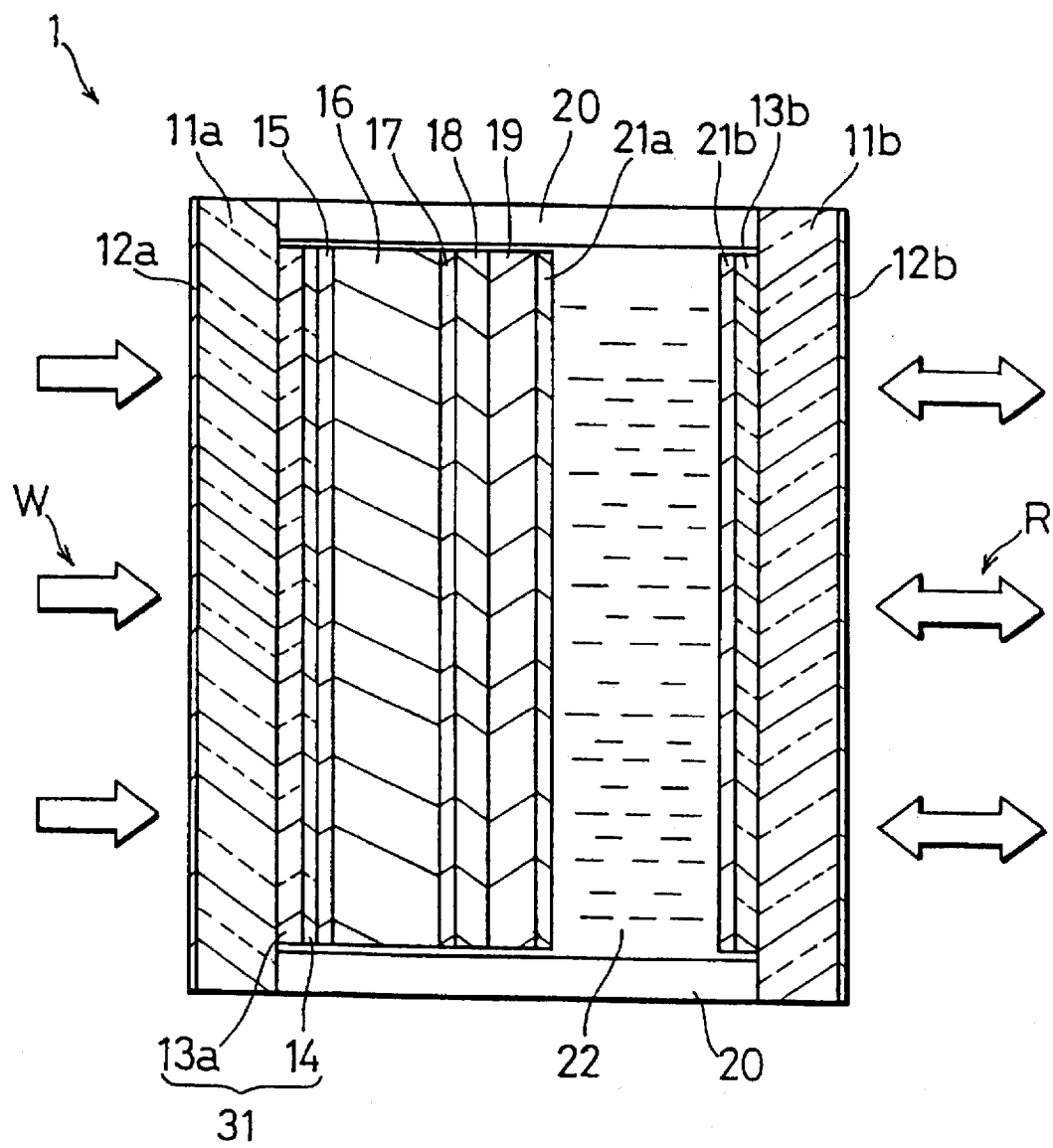
FIG. 2 is a schematic cross-sectional view of the above-mentioned light-writing-type liquid crystal element.

As illustrated in FIG. 2, the liquid crystal light valve 1 has a structure wherein glass substrates 11a and 1b, which function as insulating transparent substrates, are placed face to face with each other through spacer seals 20, which are made of an insulating resin or other materials, and a liquid crystal layer 22 is sandwiched in between.

An anti-reflection film 12a, which prevents reflection of light, is formed on the light (writing light W)-incident-surface side of the glass substrate 11a. Moreover, on the side opposite to the side bearing the anti-reflection film 12a of the glass substrate 11a, a transparent electrode 31, constituted of an ITO film 13a and an SnO₂ film 14, a carrier-blocking layer 15, a photoconductive layer 16, a carrier-blocking layer 17, a light-shielding layer 18, a multi-layer dielectric mirror layer 19 and an alignment film 21a are successively stacked in this order.

Similarly, an anti-reflection film 12b, which prevents reflection of light, is formed on the light (read-out light R)-incident-surface side of the glass substrate 11b. Further, on the side opposite to the side bearing the anti-reflection film 12b of the glass substrate 11b, an ITO film 13b and an alignment film 21b are successively stacked.

The transparent electrode 31 of the glass substrate 11a and the ITO film 13b of the glass substrate 11b are connected to power sources, not shown, so that the liquid crystal light valve 1 can be driven.

In other words, in the liquid crystal light valve 1, when writing light W is incident thereon from the glass substrate 11a side with voltages being applied to the transparent electrode 31 and the ITC film 13b from the power sources, carriers are generated inside the photoconductive layer 16 in accordance with the intensity of the incident writing light W. An electric field is exerted in the liquid crystal layer 22 due to these carriers, and the oriented state of the liquid crystal of the liquid crystal layer 22 is changed at its portion in which the carriers have been generated, that is, the writing light W is subjected to modulation. In this state, when read-out light R is incident thereon from the glass substrate 11b side, the read-out light R is polarized at the portion inside the liquid crystal layer 22 to which the electric field has been applied. Thus, the polarized read-out light R is reflected from the multi-layer dielectric mirror layer 19, and is again released from the glass substrate 11b.

The following description will discuss a manufacturing method of the above-mentioned liquid crystal light valve 1.

First, on a glass substrate 11a that is made of, for example, polished glass 7059 manufactured by Corning Inc., Ltd. and that serves as the insulating transparent substrate, an ITO film 13a of 1000 Å, made of $In_2(Sn)O_3$, and a $SnO_2$ film 14 of 300 Å are stacked by using the sputtering method so as to form a transparent electrode 31. On this is deposited a carrier-blocking layer 15 of 850 Å that is made of $TiO_2$ and that serves as an inorganic insulating film by using the electron beam (EB) vapor deposition method.

Next, a photoconductive layer 16 with a thickness of 10 μm, which is an amorphous silicon hydride layer, is accumulated by using the plasma CVD method (chemical vapor phase growth method). More specifically, the photoconductive layer 16 is formed as follows: $SiH_4$ gas is directed into a reaction furnace, and decomposed using glow discharge by applying high frequency electric power (13.56 MHz) so as to accumulate a-Si:H film. The a-Si:H film, thus obtained, exhibits a superior photoconductivity and shows electrical measurements of $\sigma_{dark}$ (dark conductivity)=$2.0 \times 10^{-12} \Omega^{-1}$ $cm^{-1}$ and $\sigma_{photo}$ (photo conductivity, under illumination of 250 μW/cm²)=$2.4 \times 10^{-7} \Omega^{-1}$ $cm^{-1}$.

Next, on this a-Si:H film, a carrier-blocking layer 17, which functions as an inorganic insulating film made of $TiO_2$, was vapor-deposited by using the EB deposition method with a thickness of 300 Å under the same conditions as the vapor deposition of the carrier-blocking layer 15.

Then a light-shielding layer (a-SiGe:H film) 18 of 500 Å was accumulated by using the plasma CVD method. In other words, the light-shielding layer 18 was formed as follows:

$SiH_4$ gas and $GeH_4$ gas were directed into a reaction furnace, and decomposed using glow discharge so as to accumulate a-SiGe:H film. The a-SiGe:H film, thus obtained, exhibits a superior light-shielding property. That is, the a-SiGe:H film provides α (absorbency index)=$1.9 \times 10^5 cm^{-1}$ with respect to a light wavelength of 650 nm.

Next, on the light-shielding layer 18, was formed a multilayer dielectric mirror layer 19 which is made by alternately stacking films having a low refractive index and films having a high refractive index under an optical condition of $\lambda/4=(nd)$. Here, $SiO_2$ (silicon dioxide) film provided as the films having a low refractive index and $TiO_2$ (titanium dioxide) films provided as the films having a high refractive index were alternately stacked by using the EB vapor deposition method to form 12 layers. The thickness of the $SiO_2$ film and the thickness of the $TiO_2$ film are determined by the central wavelength of read-out light R. For example, when the central wavelength of the read-out light R is 550 nm (light having a wavelength within the green region), the thickness of the $SiO_2$ film is set to 940 Å and the thickness of the $TiO_2$ film is set to 590 Å.

Then an alignment film 21a, made of a polyimide film, is formed on the multi-layer dielectric mirror layer 19 with a thickness of 700 Å by the printing method. The alignment film 21a, thus formed, is subjected to an alignment treatment through a rubbing process.

Meanwhile, on a glass substrate 11b that serves as the other insulating transparent substrate, an ITO film 13b of 1000 Å, made of $In_2(Sn)O_3$, is deposited by sputtering as the transparent electrode 31. On this is formed an alignment film 21b with a thickness of 780 Å in the same manner as the alignment film 21a, and the alignment film 21b is also subjected to an alignment treatment through a rubbing process. Here, the glass substrate 11b is also made of polished glass 7059 manufactured by Corning Inc. in the same manner as the glass substrate 11a.

Additionally, the rubbing directions of the alignment film 21a and the alignment film 21b are set to anti-parallel directions, with one direction having rotated 45° to the other direction.

On the substrate of the writing side that is arranged as described above, that is, on the glass substrate 11a side, spacer is sprayed so that the glass substrate 11a and the glass substrate 11b are bonded to each other with spacer seals 20 sandwiched in between. Liquid crystal, which has a positive refractive-index anisotropy, is vacuum-injected into a region with a sell thickness of 3 μm that is obtained by bonding the substrates, and a liquid crystal light valve 1, which functions as a light-writing-type liquid crystal element, is thus obtained.

Figure 1:
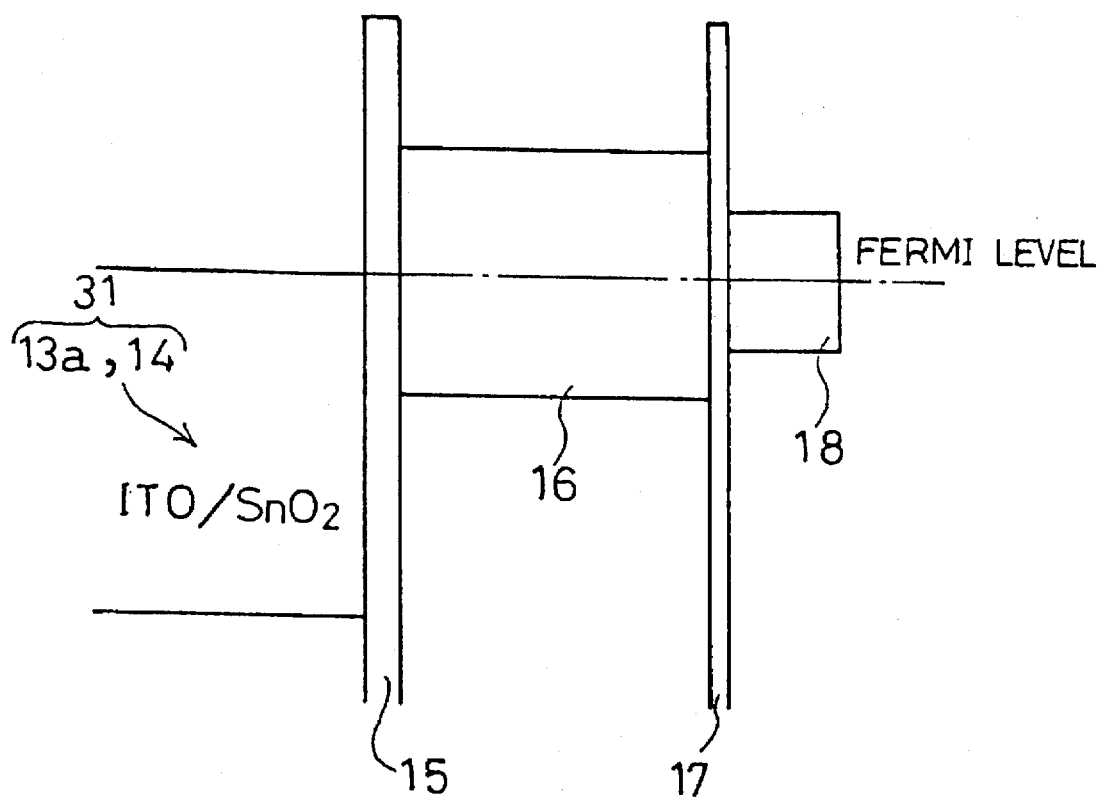
FIG. 1 is an energy-band diagram of a light-writing-type liquid crystal element of one embodiment of the present invention.

As shown in FIG. 1, in the energy-band diagram in the vicinity of the photoconductive layer 16 of the light-writing-type liquid crystal element 1 that was manufactured as described above, the carrier-blocking layer 15 and the carrier-blocking layer 17, which are installed on both sides of the photoconductive layer 16, have high energy levels at the lower ends of their conduction bands. Here, as described above, the thickness of the carrier-blocking layer 15 is 850 Å and the thickness of the carrier-blocking layer 17 is 300 Å. This is because the carrier-blocking layer 17 on the light-shielding layer 18 side is set to a film thickness that is only required for blocking carrier injection from the light-shielding layer 18, while the carrier-blocking layer 15 on the transparent electrode 31 side is set to a film thickness that is required not only for blocking carrier injection from the transparent electrode 31, but also for providing a highly-resistive area on the transparent electrode 31 side of the photoconductive layer 16.

Referring to FIGS. 6 through 9, the following description will discuss the impedances during photo and dark times of the stacked layers of the photoconductive layer and light-shielding layer 18 on the light-writing side of the light-writing-type liquid crystal element that was manufactured as described above and the reflection characteristics of read-out light when the light-writing-type liquid crystal element is used as a projector.

Figure 6:
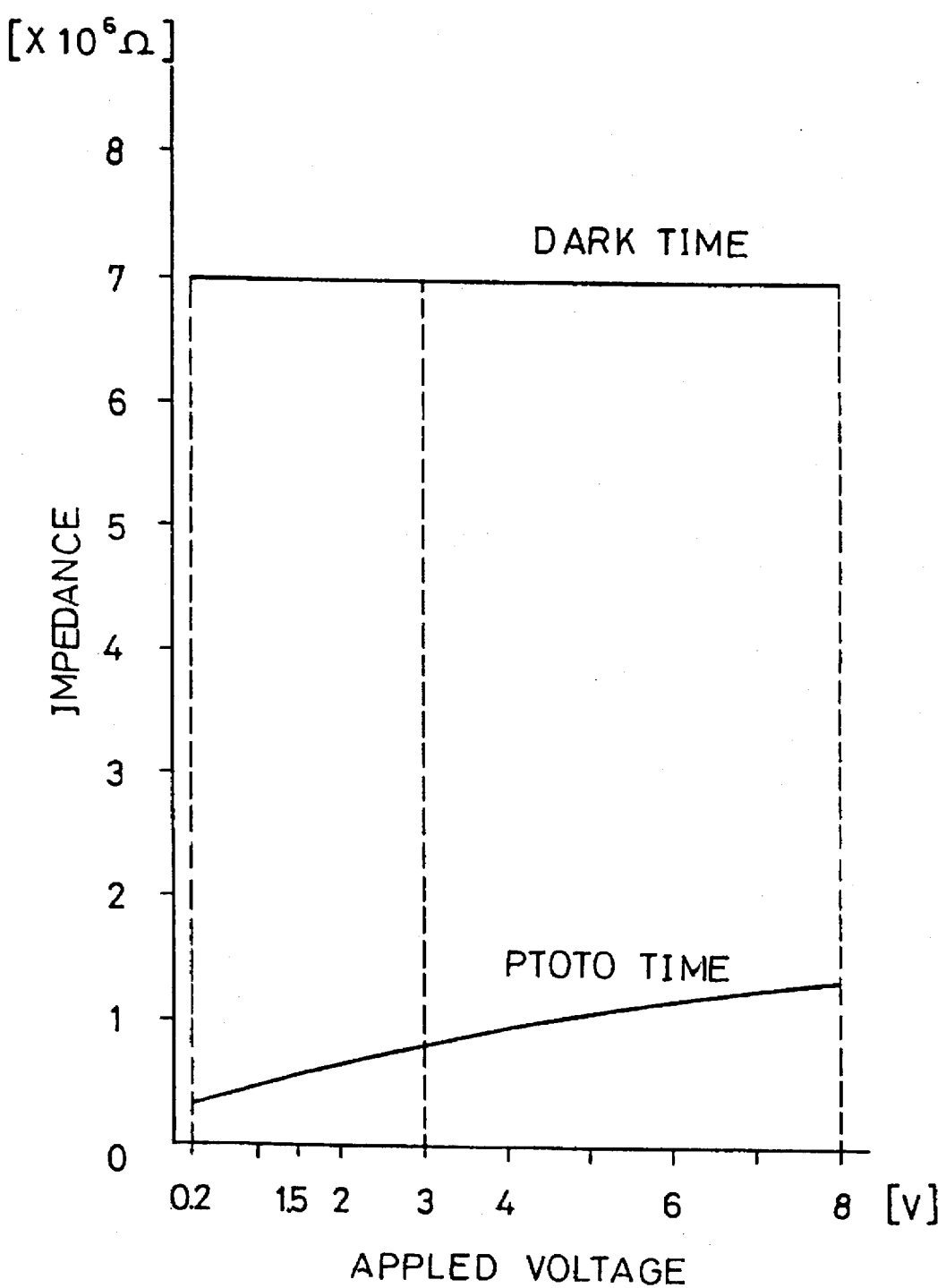
FIG. 6 is a graph which shows the relationship between the applied voltage (AC 500 Hz) and the impedance of the photoconductive layer that is provided in the light-writing-type liquid crystal element shown in FIG. 1.

First, FIG. 6 shows the relationship between the ac voltage and the impedances during photo and dark times of the light-writing-type liquid crystal element. Here, the ac voltage of driving frequency of 560 Hz is applied to the light-writing-type liquid crystal element with a varied range from 0.2 to 0.8 V.

FIG. 6 shows that the impedance during dark time has a constant value $7 \times 10^6 \Omega$ independent of the applied voltage, and that the impedance during photo time increases with the increase of the applied voltage. Actually, the voltage, which is to be applied to this stacked film that serves as the light-writing-type liquid crystal element, is approximately 3.0 V during dark time, and approximately 1.5 V during photo time. Therefore, $Z_{photo}$ (writing-light intensity: 250 μW/cm²)=$8 \times 10^5 \Omega$ and $Z_{dark}=7 \times 10^6 \Omega$ are obtained; this provides an impedance ratio during photo and dark times of 8.75, which is greater than impedance ratios of conventional arrangements (see comparative examples shown in Table 2 which will be given later).

Figure 7:
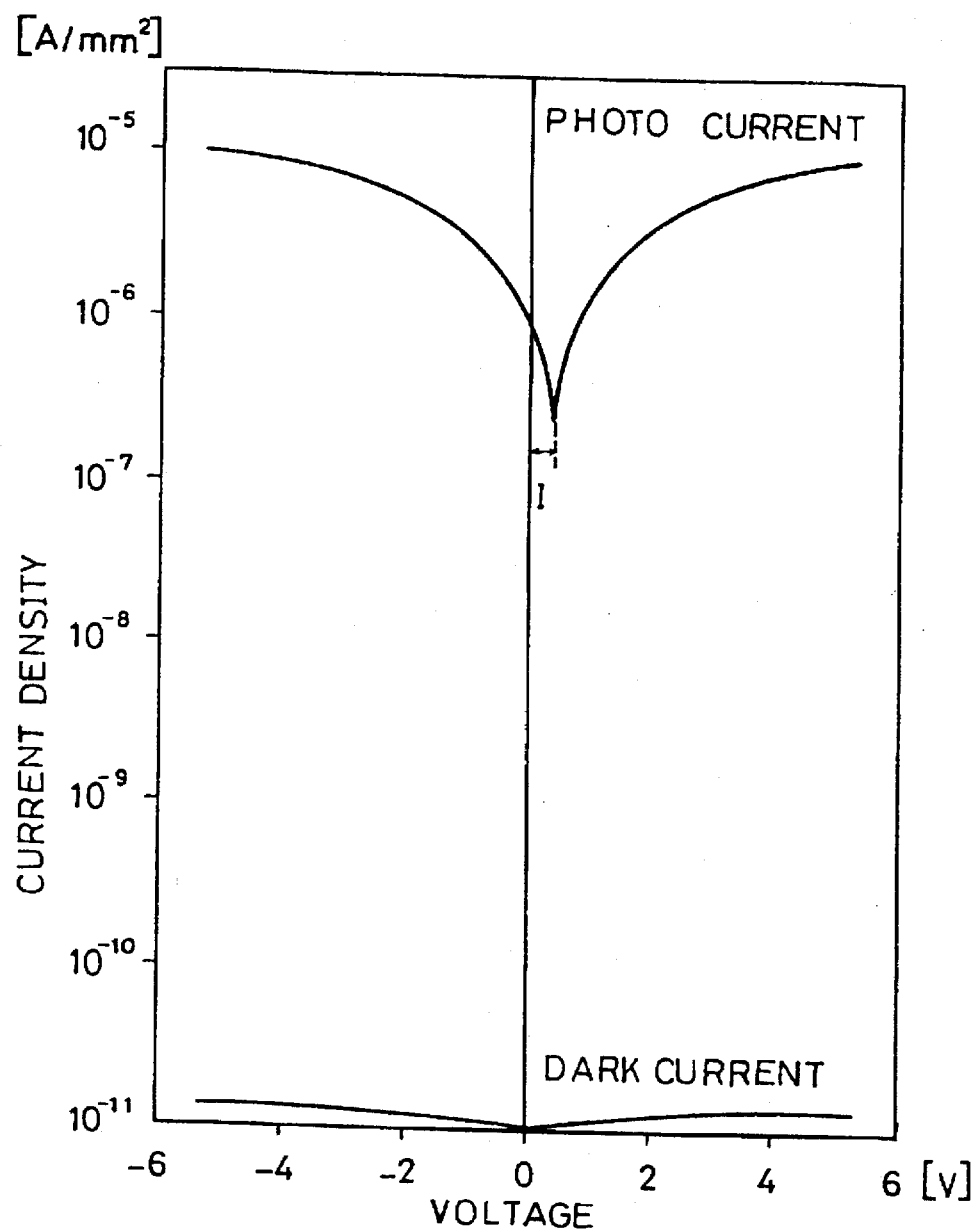
FIG. 7 is a graph which shows the relationship between the applied voltage and the current density of the photoconductive layer that is provided in the light-writing-type liquid crystal element.
Figure 8:
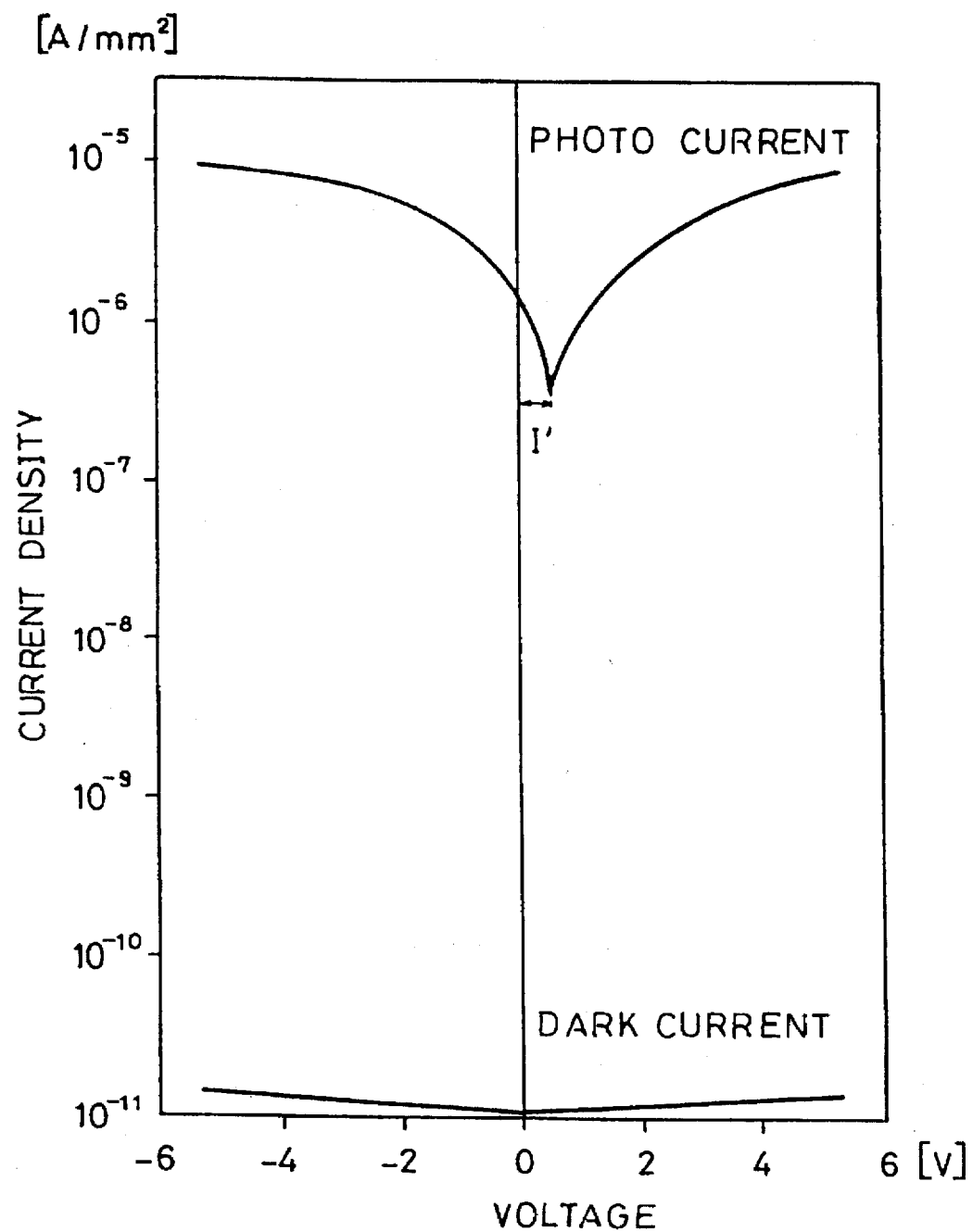
FIG. 8 is a graph which shows the relationship between the applied voltage and the current density of a structure made by stacking the photoconductive layer and the light-shielding layer that is provided in the light-writing-type liquid crystal element.
Figure 9:
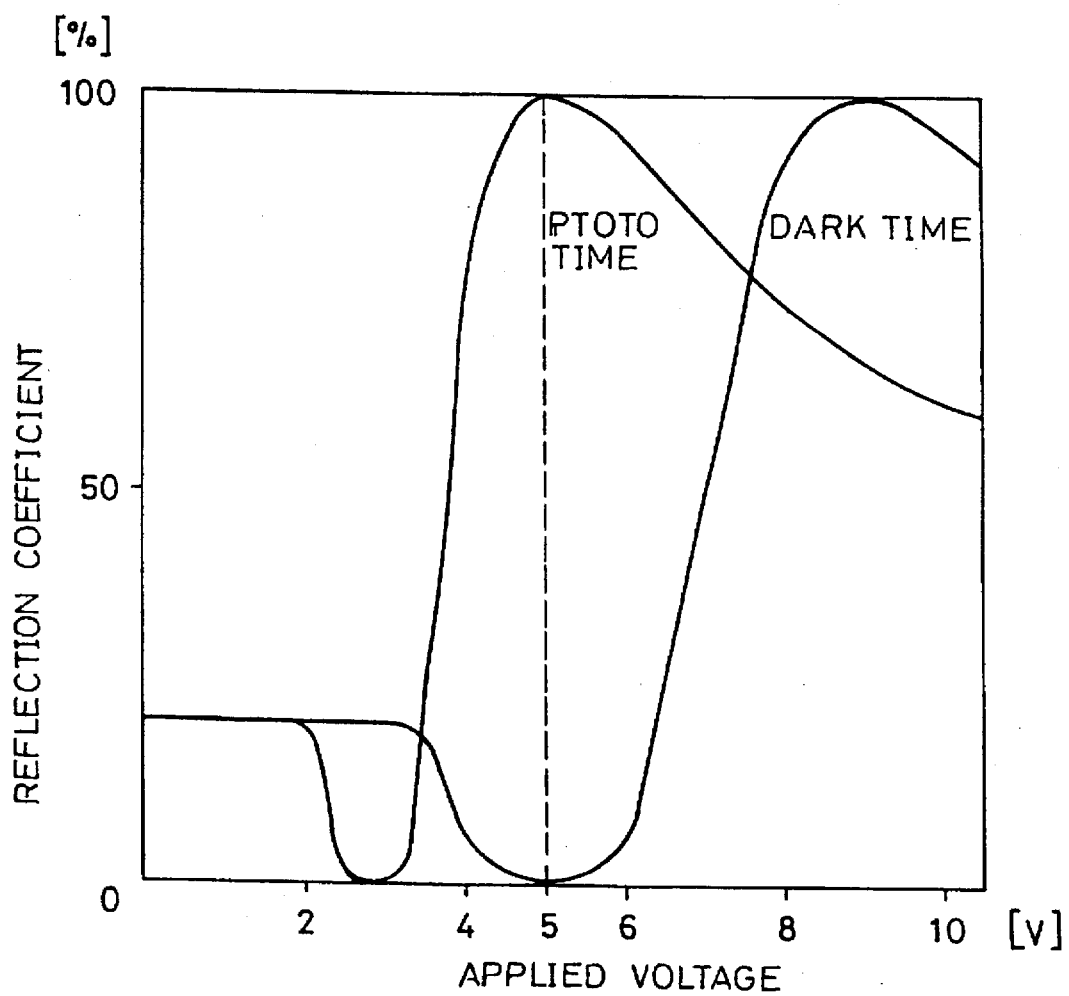
FIG. 9 is a graph which shows the relationship between the applied voltage and the reflectivity of the liquid crystal element with respect to reading light when a driving voltage is applied to the light-writing-type liquid-crystal element.

Moreover, FIGS. 7 and 8 show the results of measurements that were made on the current density at both bias times during photo and dark times of the light-writing-type liquid crystal element. FIG. 7 shows the current density related only to the photoconductive layer 16, and FIG. 8 shows the current density related to a stacked-layer state of the photoconductive layer 16 and the light-shielding layer 18.

FIGS. 7 and 8 indicate that, in both cases of having only the photoconductive layer 16 and having the stacked-layer of the photoconductive layer 16 and the light-shielding layer 18, high resistances are marked at both bias times during dark time, and also indicate that the graphs provide symmetrical patterns.

Moreover, during photo time, the impedances become smaller, and the generations of the internal electric potentials I and I' also become as small as 0.4 V. Thus, since the dc component that is imposed on the liquid crystal layer 22 due to the internal electric potentials can be suppressed, it is possible to lengthen the service life of the liquid crystal layer 22, and consequently to lengthen the service life of the light-writing-type liquid crystal element.

Moreover, as indicated by the relationship between the applied voltage and the reflectivity of the read-out light, that is, the reflection characteristics, the reflectivity decreases to a minimum (bottom) during dark time upon application of a voltage of 5 V with a rectangular wave, while the reflectivity during photo time (writing-light intensity: 250 μW/cm²) marks a maximum (peak). Since the photosensitivity of the photoconductive layer is improved to a great degree, it is possible to obtain a reflectivity characteristic wherein the bottom during dark time and the peak during photo time coincide with each other upon application of a certain voltage, and thereby to improve the contrast. In fact, the light-writing-type liquid crystal element having the above-mentioned arrangement has achieved a contrast of 200.

Furthermore, since the impedance of the photoconductive layer during dark time is greater than those of conventional arrangements and since the impedance during photo time is smaller than those of conventional arrangements, the generated carriers are suppressed in their diffusion in lateral directions, and consequently the resolution is improved. In the resolution measurements, a resolution of 1001 p/mm has been obtained.

Additionally, in the present embodiment, a stacked layer of $In_2(Sn)O_3$ and $SnO_2$:Sb is used as the transparent electrode 31 on the photoconductive layer side. However, the present invention is not intended to be limited to this structure, and other structures may be adopted wherein ZnO:Al, ZnO:B, CdO:Al, CdO:B, and other materials are stacked by using the DC sputtering method to form the film. In this case, the EB method may be used for forming the film. Moreover, these films may provided as mono-layer films or multi-layer films.

Furthermore, in this embodiment, TiO2 of 870 Å is accumulated in order to form an insulating film on the transparent electrode 31 side. However, the present invention is not intended to be limited to this material and this film thickness; for example, $CeO_2$ or other materials may be adopted, and the film thickness may be set to a value within the range of 34 nm to 136 nm.

Here, it has been found that reflection of writing light can be suppressed by using a certain material as the insulating film (wherein consideration is particularly given to its refractive index) in combination with its film thickness and that the writing light is consequently directed to the photoconductive layer effectively. Therefore, in the light-writing-type liquid crystal element having the element structure of the present embodiment, the insulating film is properly arranged so that the writing light is effectively utilized as described above.

Table 1 gives specific examples of structures, materials, film thicknesses and other aspects of the insulating films which can satisfy proper impedance characteristics of the photoconductive layer and also utilize the writing light effectively.

Figure 10:
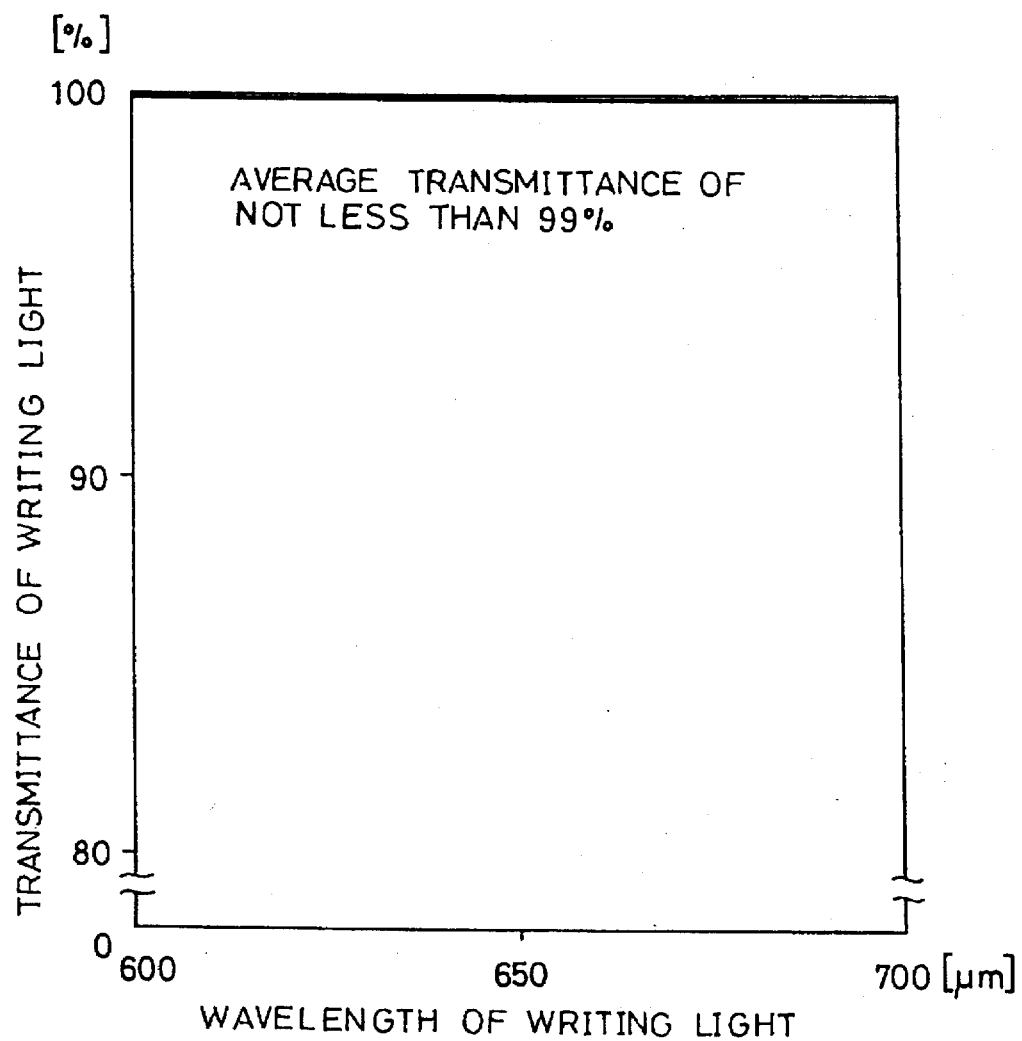
FIG. 10 is a graph which shows the relationship between the writing wavelength and the transmittance of writing light in the photoconductive layer that is provided in the light-writing-type liquid crystal element.
Figure 11:
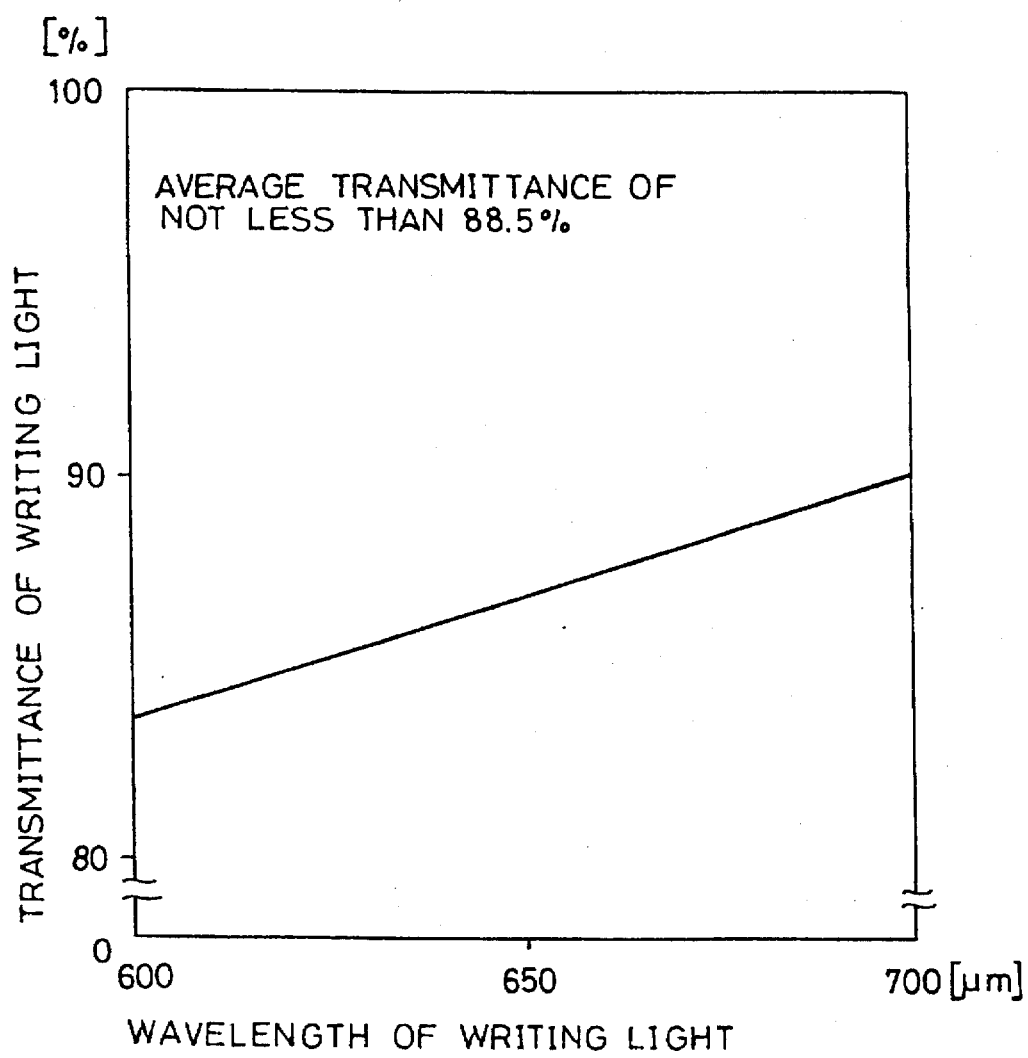
FIG. 11, which is used for comparing with the light-writing-type liquid crystal element of FIG. 1, is a graph which shows the relationship between the writing wavelength and the transmittance of writing light in a photoconductive layer (comparative example) of pin-type.

FIG. 11 shows the transmittance of writing light through the photoconductive layer in the above-mentioned comparative example. Here, the film thickness of the transparent electrode 31 was set to 1300 Å, using the same condition as the aforementioned embodiment. As indicated by FIG. 11, in the photoconductive layer of the comparative example using the pin element, the average transmittance of writing light having wavelengths of 600 nm–700 nm is 88.5%; this shows a loss of not less than 10% of the writing light. In contrast, FIG. 10 shows the transmittance of writing light through the photoconductive layer in the case where the insulating film, shown in Table 1, is used. As indicated by FIG. 10, in the photoconductive layer using the insulating film shown in Table 1, the loss of writing light having wavelengths of 600 m–700 nm is reduced to not more than 1%; this shows that the writing light is effectively directed to the photoconductive layer.

Figure 12:
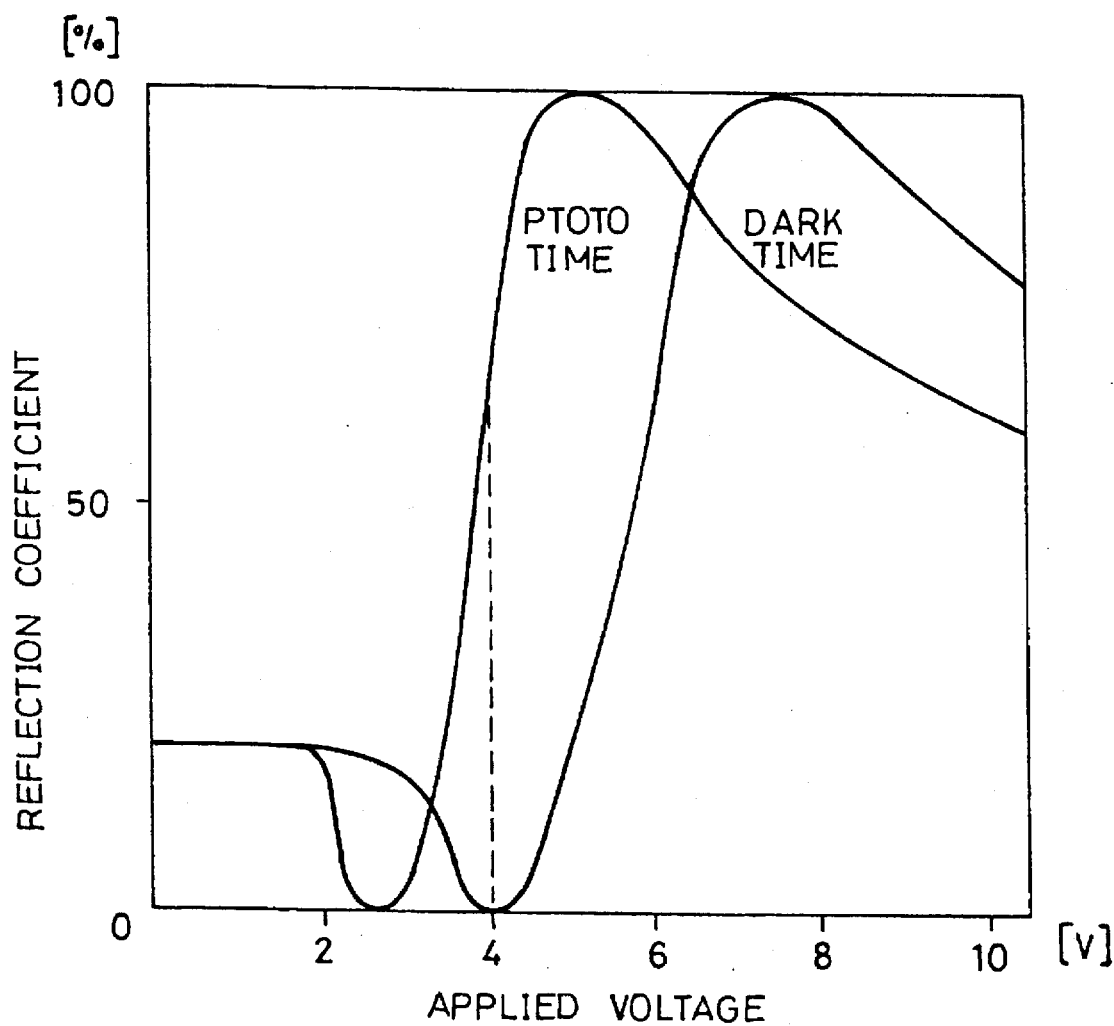
FIG. 12, which is used for comparing with the light-writing-type liquid crystal element of FIG. 1, is a graph which shows the relationship between the applied voltage and the reflectivity of a photoconductive layer (comparative example) of pin-type that is made of a-Si:H.
Figure 13:
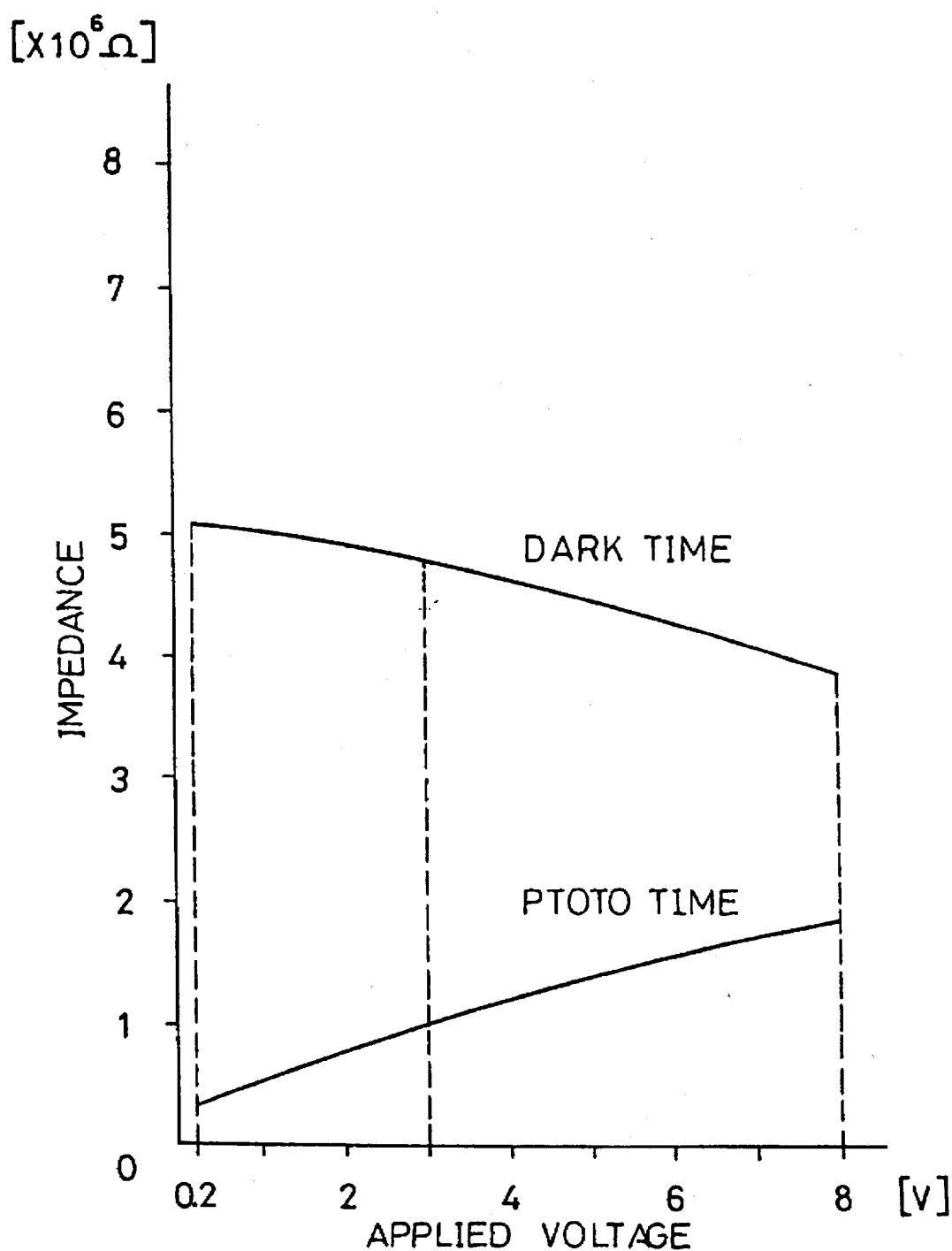
FIG. 13 is a graph which shows the relationship between the applied voltage and the impedance of the photoconductive layer (comparative example) of FIG. 12.

Referring to FIGS. 12 and 13, the following description, which gives a comparative example of the light-writing-type liquid crystal element of the present embodiment, will discuss the reflectivity characteristics of a light-writing-type liquid crystal element that uses a pin-type element made of

TABLE 1

| ITO/$SiO_2$/<br>Material/a-Si:H | Optimal Film<br>Thickness (Å) | | | Allowable Range (Å) | | |
|---|---|---|---|---|---|---|
| * /$TiO_2$/ | 870 | | | | | 340–1360, 1740–2810 |
| * /$CeO_2$/ | 910 | | | | | 390–1390, 1780–2820 |
| * /ZnS/ | 830 | | | | | 330–1330, 1690–2750 |
| * /a-SiN:H/ | 540 | | | | | 50–3000 |
| ** /$TiO_2$/$CeO_2$/ | $TiO_2$ | .. | 420 | $TiO_2$ | .. | 50–1020, 1230–2500 |
| | $CeO_2$ | .. | 450 | $CeO_2$ | .. | 50–950, 1290–2370 |
| ** /NaF/$TiO_2$/ | NaF | .. | 2000 | NaF | .. | 90–270, 1230–2770 |
| | $TiO_2$ | ... | 550 | $TiO_2$ | .. | 80–960, 1490–2380 |
| ** /$TiO_2$/$SiO_2$/ | $TiO_2$ | ... | 770 | $TiO_2$ | .. | 300–1230 |
| | $SiO_2$ | ... | 70 | $SiO_2$ | .. | 50–300 |
| ** /$SiO_2$/$TiO_2$/ | $SiO_2$ | ... | 1620 | $SiO_2$ | .. | 550–3400 |
| | $TiO_2$ | ... | 530 | $TiO_2$ | .. | 85–980 |
| ** /$TiO_2$/$Bi_2O_3$/ | $TiO_2$ | ... | 790 | $TiO_2$ | .. | 300–1300 |
| | $Bi_2O_3$ | .. | 50 | $Bi_2O_3$ | .. | 50–370, 1470–2050 |
| ** /$Bi_2O_3$/$TiO_2$/ | $Bi_2O_3$ | .. | 660 | $Bi_2O_3$ | .. | 50–2630 |
| | $TiO_2$ | ... | 570 | $TiO_2$ | ... | 50–1100, 1360–2550 |
| ** /$SiO_2$/$Ta_2O_5$/ | $SiO_2$ | ... | 270 | $SiO_2$ | ... | 50–2500 |
| | $Ta_2O_5$ | .. | 950 | $Ta_2O_5$ | .. | 620–1280 |
| ** /$Ta_2O_5$/$SiO_2$/ | $Ta_2O_5$ | .. | 950 | $Ta_2O_5$ | .. | 450–1430 |
| | $SiO_2$ | .. | 80 | $SiO_2$ | ... | 50–270 |
| **** /$SiO_2$/$TiO_2$/$SiO_2$/ | $SiO_2$ | .. | 2100 | $SiO_2$ | ... | 1110–3220 |
| $TiO_2$/ | $TiO_2$ | ... | 270 | $TiO_2$ | ... | 50–3000 |
| | $SiO_2$ | .. | 2050 | $SiO_2$ | ... | 960–3150 |
| | $TiO_2$ | .. | 530 | $TiO_2$ | ... | 80–940 |

* represents one layer.
** represents two layers.
**** represents four layers.

Here, in order to provide an comparative example of the present invention, a research was conducted as to how percentage of writing light is allowed to pass through the photoconductive layer in the case when the insulating film, shown in Table 1, is not used and a pin-type element is used as the photoconductive layer. In this case, however, 4% of the writing light, which corresponds to an amount of light reflected from the glass substrate, is excluded from the measurement. Reduction of the reflection of writing light from the glass substrate has been achieved by vapor-depositing a material whose refractive index is located between that of air (refractive index 1) and that of glass (refractive index 1.52) on the surface of the glass substrate on the writing light side under a condition of λ/4. Reduction of the reflection of read-out light has been also achieved by utilizing the above-mentioned optical conditions for suppressing the reflection on the writing light side.

a-Si:H as a photoconductive layer and the impedance of the photoconductive layer.

The above-mentioned pin-type element, which is made of a-Si:H, is provided with: an i-layer that has a film thickness of 10 μm, which is the same as the above-mentioned embodiment; a p-layer having a film thickness of 2001 Å; and an n-layer that is accumulated with a thickness of 1000 Å. The other conditions related to its production are set to the same as those shown in the embodiment of the present invention.

Referring to FIG. 13, comparisons between the impedances during photo and dark times of this photoconductive layer and those of the element of the present invention are made, and it is found that in the pin-type element, the impedance during dark time is smaller than the impedance (FIG. 6) of the element of the present invention. Moreover, in the pin-type element, an applied-voltage dependence (a phenomenon wherein the impedance decreases in inverse proportion to the applied voltage) can be observed. The impedance during photo time is, on the other hand, kept in the same level as the element of the present invention.

Next, referring to FIG. 12, comparisons, which were made with the photoconductive layer (FIG. 9) of the element structure of the present invention, yield the following results:

① The margin in voltage-variation width in the bottom of the reflectivity during dark time is small.

② The peak of the reflectivity during photo time is not set to the same voltage value as the bottom of the reflectivity during dark time.

For this reason, in the light-writing-type liquid crystal element using the pin-type element, the light intensity of writing light required is as low as 450 μW/cm², which shows a low photosensitivity, the contrast is as low as 150, and an internal potential (0.7 V) is generated.

Figure 14:
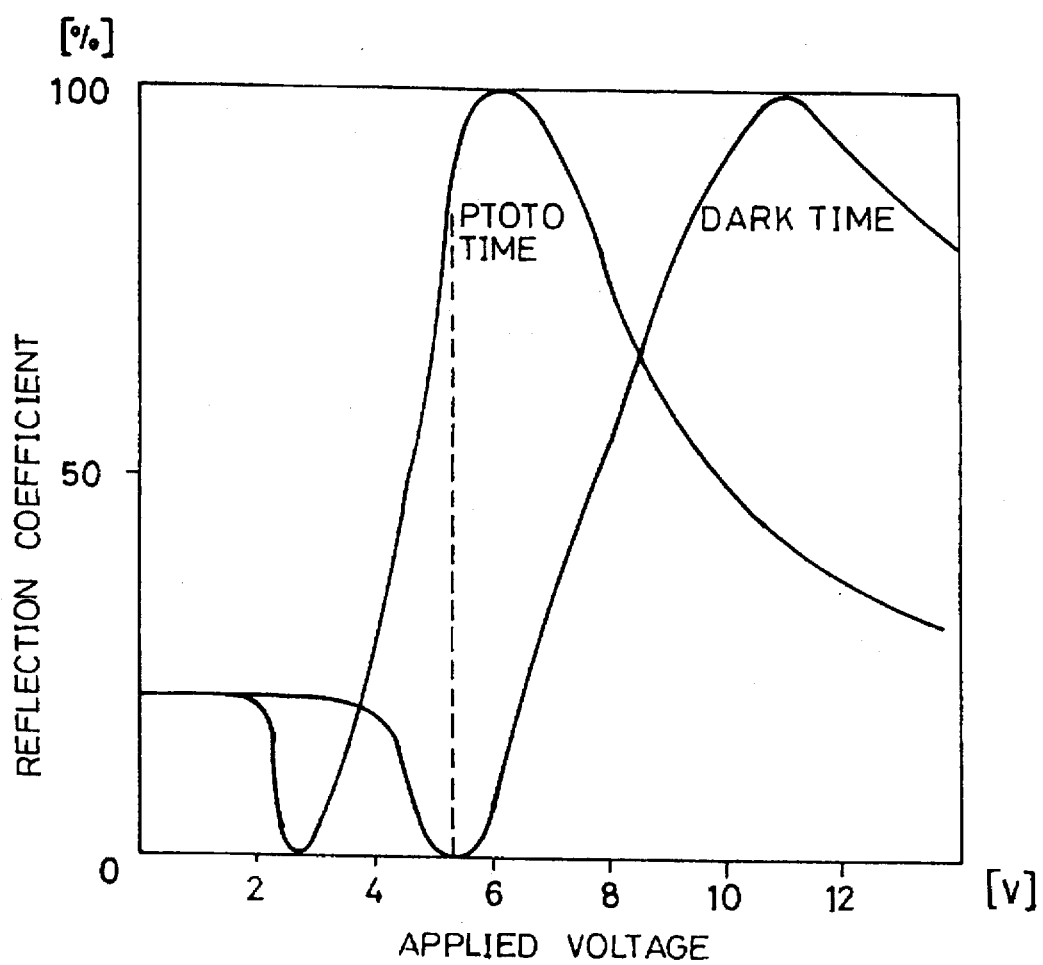
FIG. 14, which is used for comparing with the light-writing-type liquid crystal element of FIG. 1, is a graph which shows the relationship between the applied voltage and the reflectivity of the photoconductive layer (comparative example) whose energy structure shows a symmetric pattern.
Figure 15:
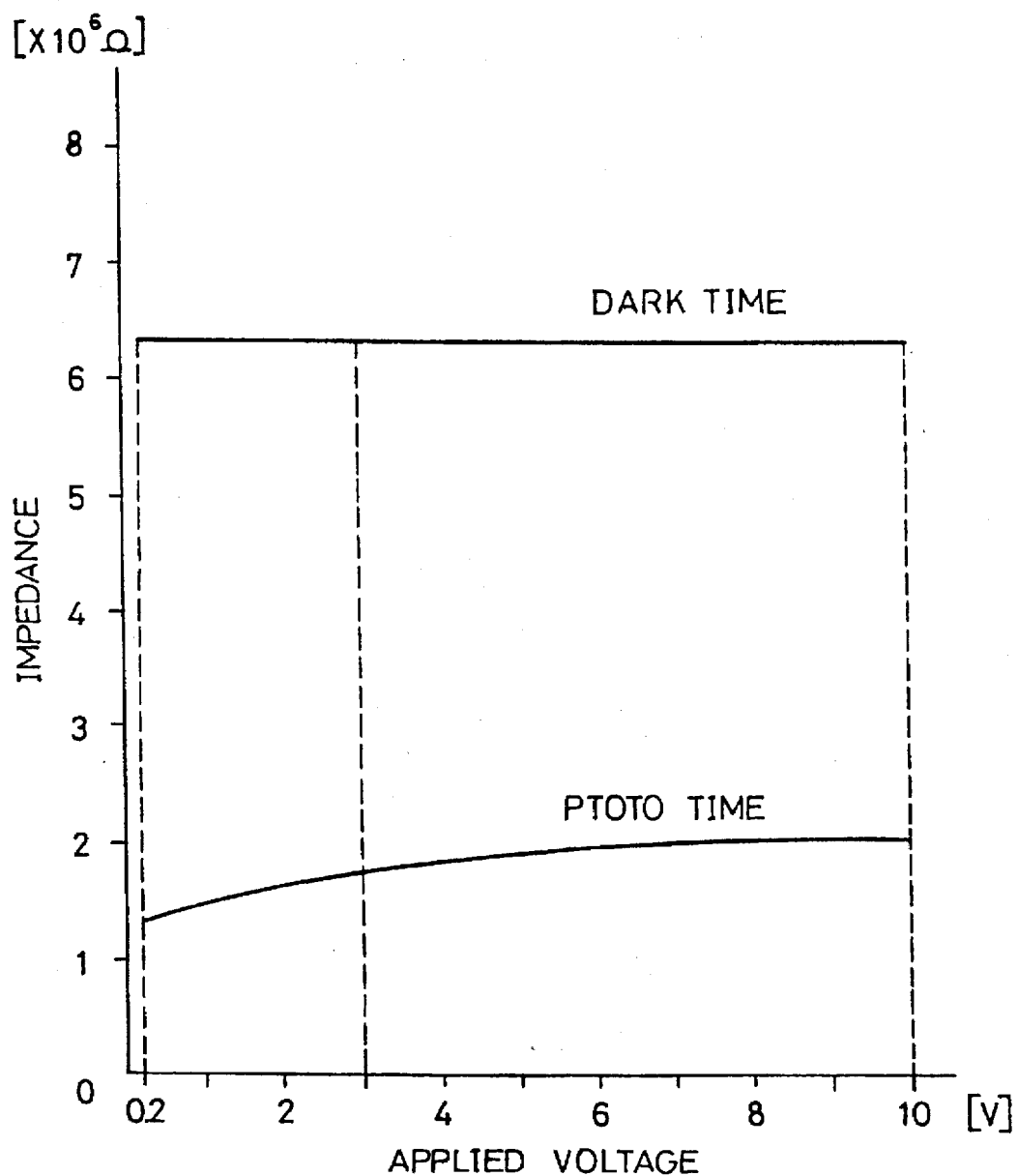
FIG. 15 is a graph which shows the relationship between the applied voltage and the impedance of the photoconductive layer (comparative example) of FIG. 14.

Furthermore, referring to FIGS. 14 and 15, the following description, which gives another comparative example of the light-writing-type liquid crystal element of the present embodiment, will discuss the reflectivity characteristics of a light-writing-type liquid crystal element wherein a carrier-blocking layer whose energy structure of the energy-band diagram shows a symmetric pattern is used in a photoconductive layer and the impedance of the photoconductive layer.

The above-mentioned carrier-blocking layer, which is an inorganic insulating film made of silicon dioxide, has a film thickness of 300 Å. The photoconductive layer has an i-layer that is an a-Si:H film and that has a film thickness of 10 μm. The other conditions related to its production are set to the same as those shown in embodiment 1.

First, with respect to impedances during photo and dark times of this photoconductive layer, the graph of impedances, shown in FIG. 15, indicates that, compared with the photoconductive layer of the present invention, although the impedance during dark time does not show an applied-voltage dependence, such as shown in the pin-type element, the impedance during dark time fails to provide such an impedance as marked by the photoconductive layer (FIG. 6) of the present invention or the pin-type element. The graph also indicates that the impedance during photo time is not as low as that of the photoconductive invention or present invention or the pin-type element.

Next, the graph of reflectivity, shown in FIG. 14, indicates that the peak of the reflectivity during photo time is not set to the same voltage value as the bottom of the reflectivity during dark time. For this reason, in the light-writing-type liquid crystal element using the symmetric-type element, the light intensity of writing light required is as low as 600 μW/cm², which shows a low photosensitivity, and the contrast is also as low as 150.

These results are summarized and shown in Table 2.

TABLE 2

|  | Comparative Examples |  | Present Invention |
|---|---|---|---|
|  | Pin-type Element Structure | Symmetric-type Element Structure | Element Structure of Embodiment 1 |
| * | $Z_{dark}$ | $<$ | $Z_{dark}$ |
|  |  | $Z_{dark} >$ |  |

TABLE 2-continued

|  | Comparative Examples |  | Present Invention |
|---|---|---|---|
|  | Pin-type Element Structure | Symmetric-type Element Structure | Element Structure of Embodiment 1 |
|  | $Z_{photo}$ | $Z_{photo} >$ | $Z_{photo}$ |
|  | $Z_{dark}/Z_{photo}$ (6.8) | $Z_{dark}/Z_{photo}$ (7.0) | $Z_{dark}/Z_{photo}$ (8.75) |
| ** | Light Intensity of Writing Light (~450) | Light Intensity of Writing Light (~600) | Light Intensity of Writing Light (~250) |
|  | Contrast (~150) | Contrast (~150) | Contrast (~200) |
|  | Resolution (~40) | Resolution (~80) | Resolution (not less than 100 1 p/mm) |
|  | Tem. Dependence (L) | Tem. Dependence (S) | Tem. Dependence (S) |
|  | Service Life (S) | Service Life (L) | Service Life (L) |
|  | Amount of Incident Writing Light (88.5%) | Amount of Incident Writing Light (90.0%) | Amount of Incident Writing Light (not less than 99%) |

In the above Table 2, * represents comparisons among photoconductive layers, and ** represents comparisons of performances among light-writing-type liquid crystal elements.

As described above, Table 2 shows that when the impedance ratio during photo and dark times of the photosensitive layer having the element structure of the present invention is compared with that of the photoconductive layer having the element structures of the comparative examples, it is found that the impedance ratio of the photosensitive layer having the element structure of the present invention is greater. Thus, by incorporating the photoconductive layer of the present invention to a light-writing-type liquid crystal element, it is possible to improve the photosensitivity to a great degree, and consequently to improve the contrast and resolution. Further, since the photoconductive layer having the element structure of the present invention is designed so that no carrier injection occurs, no rectifying property is caused, which is different from the photoconductive layer having the pin-type element structure of the comparative example. Therefore, it is possible to remarkably improve the temperature dependence and service life.

Additionally, in the present embodiment, the i-type a-Si:H film is used as the photoconductive layer. However, the present invention is not intended to be limited to this structure: for example, an a-Si:H film which is formed by introducing a small amount of $B_2H_6$ thereto during its P-CVD forming process or an a-Si:F:H film may be adopted. Further, an a-Si:H film and an a-Si:F:H film, to which a small Mount of B is added, may be adopted.

Moreover, when an a-Si:F:H film is used as the photoconductive layer, the following film-forming processes using the P-CVD method are proposed: $SiH_4$ and $SiF_4$ are introduced so as to form the film; $SiH_4$, $SiF_4$ and $H_2$ are introduced to form the film; or $SiF_4$ and $H_2$ are introduced to form the film. It has been discovered that the a-Si:F:H film is slightly greater than the a-Si:H film shown in the present embodiment in its absorption coefficient with respect to writing-light wavelengths of 600–700 nm. If the absorption coefficient becomes greater, the generated carriers in the highly-resistive area increase more than those shown in the embodiment with respect to writing light that is incident on the photoconductive film. This results in an increase in the number of carriers that receive energy gain caused by the electric field, thereby causing an increase in the photoconductivity. Further, the a-Si:F:H film is more effective in suppressing photodegradation (Staebler Wronski Effect: a phenomenon wherein both photo and dark conductivities drop upon illumination of light) than the a-Si:H film. Moreover, since the a-Si:F:H film has another effect wherein the photoconductive characteristics do not deteriorate even when the film-forming speed is increased, it is possible to provide a high-speed film-forming process even in the case of thick photoconductive layers (general μm–20 μm).

Moreover, in the case when a slight amount of acceptor, such as B, is added to the a-Si:F:H film, the same effect can be expected in the case when a slight amount of B or other materials is added to the a-Si:H film.

Therefore, light-writing-type liquid crystal elements, which are provided with a photoconductive layer using the a-Si:F:H film or the a-Si:F:H film with a slight amount of B or other materials added thereto, have improved photosensitivity, contrast and resolution, as well as having longer service life with high quality.

Furthermore, since the photoconductive layer has a film thickness that is as thin as 10 μm, the a-Si:H film with a slight amount of B added thereto, the a-Si:H:F film, or the a-Si:H:F film with a slight amount of B added thereto may be used as a layer that absorbs most of writing light as a light-absorbing layer (carrier-generation layer), that is, the photoconductive layer on the insulating layer on the transparent electrode 31 side, and the a-Si:H film, shown in the embodiment, may be used as a carrier-transportation layer. Any of these combinations may be adopted.

Moreover, the material of the light-shielding layer 18 is not intended to be limited to a-SiGe:H, and for example, an organic material or a thermet may be used.

In general, it is necessary to use a light-shielding material with high impedance in order to achieve high resolution. However, when a light-shielding material with high impedance is used, it becomes difficult to apply voltages to the photoconductive layer. For this reason, in conventional arrangements, a material with low impedance has been used as the light-shielding layer, even if it lowers the resolution, so that voltages can be easily applied to the photoconductive layer so as to improve the photosensitivity. However, the element structure of the photoconductive layer of the present embodiment, which has an improved photosensitivity, makes it possible to use a material with high impedance as the light-shielding layer 18, that is, a material with higher impedance than those of conventional arrangements. With this regard, it also becomes possible to achieve high resolution.

Moreover, the multilayer dielectric mirror layer 19 of the present invention is designed so as to deal with read-out light located in the green region within visible light. However, the present invention is not intended to be limited to this arrangement, and for example, it may be set to deal with read-out light located in the blue region or the red region by applying the same condition of λ/4, and the layers are accumulated in accordance with the optical film thickness. In the multilayer dielectric mirror layer 19, $SiO_2$ films are used as films having a low refractive-index material, and $TiO_2$ films are used as films having a high refractive-index material. However, the present invention is not intended to be limited to these arrangements. With respect to low refractive-index materials, for example, $BaF_2$, NaF, $MgF_2$, $AlF_3$, $CaF_3$, $SrF_2$, LiF, $Na_3AlF_6$, and $Na_5Al_3F_{14}$ may be adopted. With respect to high refractive-index materials, for example, $LaF_3$, $Y_2O_3$, $WO_3$, $Sc_2O_3$, $PbF_2$, $NdF_3$, $Sm_2O_3$, $Pr_6O_{11}$, $MoO_3$, $La_2O_3$, $Eu_2O_3$, $Bi_2O_3$, ZnS, ZnO, $NdO_3$, $CeF_3$, $Al_2O_3$, MgO, $HfO_2$, $Si_3N_4$, $ZrO_2$, $Sb_2O_3$, $Ta_2O_5$, and $CeO_2$ may be adopted.

Furthermore, the multilayer dielectric mirror layer 19, which have manufactured by using these materials, have problems, such as reduction in impedance, reduction in reflectivity and variations in reflected wavelengths due to moisture absorption; therefore, it is necessary to carry out the accumulating processes by using film-forming conditions for increasing the filling rate, and to use the ion assist deposition method (IAD) by which the filling rate of the films can be increased by illuminating an ion beam and a neutralization-use electron beam at the same time during the EB deposition process.

As described above, in the present embodiment, the display mode of the liquid crystal layer 22 is set to the HFE mode; however, the present invention is not intended to be limited to this mode. For example, the following modes may be adopted: the ECB (Electric-field Control-type Bi-refraction) mode having a perpendicular orientation, the PDLC (Polymer Dispersion-type Liquid Crystal) mode, the FLC (Ferro-Dielectric Liquid Crystal) mode, the FC (phase-change-type liquid crystal) mode, the DS (Dynamic Scattering) mode and the GH (Guest Host) mode.

Furthermore, in the present embodiment, the rectangular wave of 500 Hz was used for driving the light-lighting-type liquid crystal element. However, any wave may be used as long as it has an ac frequency in the range of 120 Hz to 30 kHz. Here, the driving waveform is not limited to the rectangular shape, any ac driving waveform may be used as long as it is defined, for example, by a periodic function.

As illustrated in FIG. 1, the feature of the above-mentioned Embodiment 1 is that carrier injections from the transparent electrode 31 and the light-shielding layer 18 to the photoconductive layer are prevented by using the structure where carrier-blocking layers 15 and 17 are provided on both sides of the photoconductive layer 16. For this reason, the photoconductive layer 16 is constituted of an i-type a-Si:H film, and the donor density in this i-type a-Si:H film is set to be virtually uniform.

However, when the donor density in the i-type a-Si:H film is set so that it is greater on the light-shielding layer 18 side than on the transparent electrode 31 side, the depletion-layer width that is formed by a junction between the photoconductive layer and the insulating layer formed on the transparent electrode 31 side of the photoconductive layer becomes greater than the maximum depletion-layer width that is formed by a junction between the photoconductive layer and the insulating layer formed on the light-shielding layer 18 side. Therefore, the electrostatic capacity on the transparent electrode 31 side becomes smaller than the electrostatic capacity on the light-shielding layer 18 side, thereby making it possible to apply a higher voltage to the transparent electrode 31 side of the photoconductive layer. The following embodiment 2 will discuss element structures which have the effect as described above.

[EMBODIMENT 2]

Referring to FIGS. 17(a) through 19, the following description will discuss another embodiment of the present invention. Here, for convenience of explanation, those members that have the same functions and that are described in the above-mentioned Embodiment 1 are indicated by the same reference numerals and the description thereof is omitted. This is said in the other embodiments that follow this embodiment.

Figure 17A:
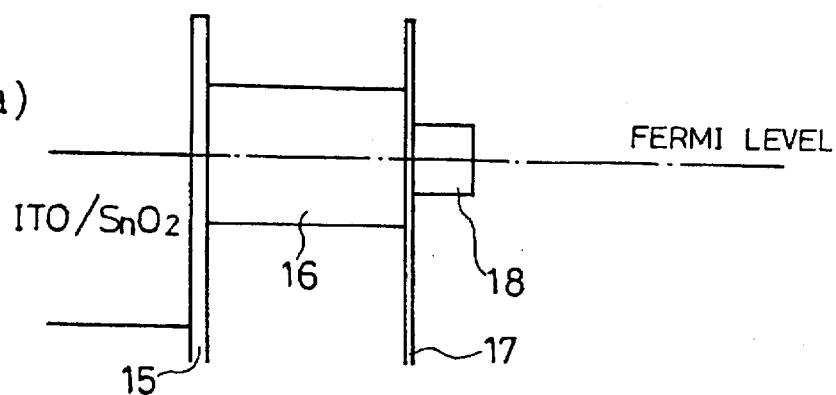
FIG. 17(a) is a band diagram of a light-writing-type liquid crystal element that has carrier-blocking layers made of an insulating material on both sides of the photoconductive layer.
Figure 17B:
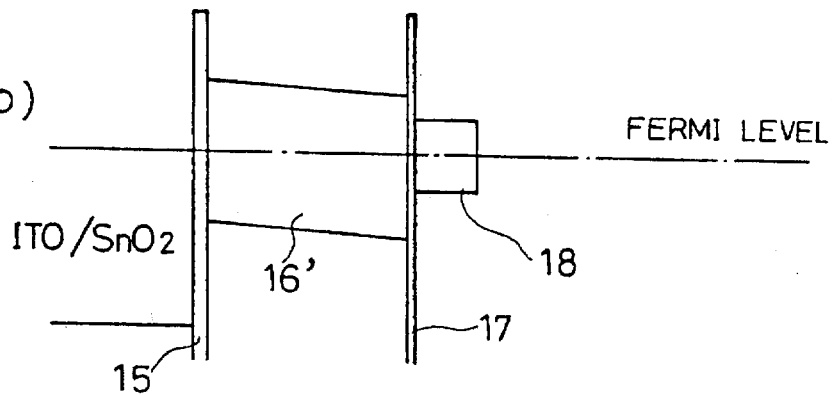
FIG. 17(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 17(a).
Figure 17C:
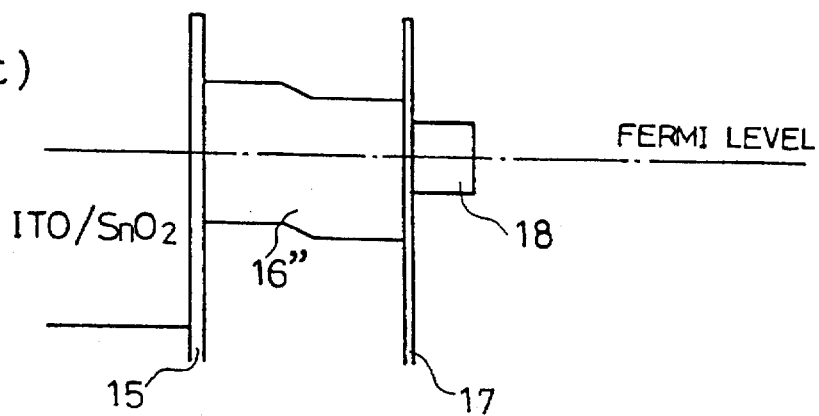
FIG. 17(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 17(a).

In light-writing-type liquid crystal elements of the present embodiment, the donor density in the i-type a-Si:H film is set so that it is greater on the light-shielding layer 18 side than on the transparent electrode 31 side, and the energy band diagrams of the photoconductive layers 16 are shown in FIGS. 17(b) and 17(c). Here, FIG. 17(a) shows the energy band diagram of the photoconductive layer 16 in the above-mentioned embodiment 1.

The energy band diagram of FIG. 17(b) is derived from an element structure which is provided with a photoconductive layer 16' in which the donor density is continuously increased from the light-shielding layer 31 side toward the light-shielding layer 18 side, and the energy band diagram of FIG. 17(c) is derived from an element structure which is provided with a photoconductive layer 16" in which the donor density is increased step by step from the light-shielding layer 31 side toward the light-shielding layer 18 side.

First, an explanation is given of manufacturing methods for the photoconductive layer that has the element structure of FIG. 17(b). In order to continuously increase the donor density of the photoconductive layer 16 from the transparent electrode 31 side toward the light-shielding layer 18 side, at least the following three methods for manufacturing the photoconductive layer 16 are proposed:

① To increase the amount of donor addition successively from the transparent electrode 31 side toward the light-shielding layer 18 side.

② To add acceptor for compensation-use from the transparent electrode 31 side toward the light-shielding layer 18 side, and then add the donor. In this case, the amount of acceptor addition is reduced to a predetermined position in the photoconductive layer, and then the amount of donor addition is increased toward the light-shielding layer 18 side.

③ To reduce the amount of addition of the acceptor for compensation-use from the transparent electrode 31 side toward the light-shielding layer 18 side. In this case, the photoconductive layer that forms a junction with the insulating layer on the transparent electrode 31 side is provided as a very highly resistive layer whose conduction type is n-type.

First, an explanation will be given of a manufacturing method for an a-Si:H film in accordance with the above-mentioned method ①. The a-Si:H film was formed by the plasma CVD method (chemical vapor phase growth method), and accumulated with a thickness of 10 μm. In this case, $PH_3$ gas (diluted to 1% by $H_2$ gas) was supplied so as to add donor, while $SiH_4$ gas of 1000 sccm was being continuously introduced into the reaction furnace. At this time, at the start time of film-formation on the carrier-blocking layer 15 on the transparent electrode 31 side, the amount of $PH_3$ gas supply was changed to zero, and after the start of film-formation, the amount of the gas supply was increased with the film-formation of a-Si:H. Finally, at the time when the film was joined to the carrier-blocking layer 17 of the light-shielding layer 18, the amount of $PH_3$ gas supply was set to 10 sccm.

The donor density in the a-Si:H film thus obtained was approximately $10^{16}$ $cm^{-3}$ at an area that was joined to the carrier-blocking layer 15 on the transparent electrode 31 side, and was approximately $10^{18}$ $cm^{-3}$ at an area that was joined to the carrier-blocking layer 17 of the light-shielding layer 18.

Next, an explanation will be given of a manufacturing method for an a-Si:H film in accordance with the above-mentioned method ②. $B_2H_6$ gas was added in order to add acceptor for compensation-use, while $SiH_4$ gas of 1000 sccm was being continuously introduced into the reaction furnace, and then $PH_3$ gas was added in order to add donor. In this case, at the start time of film-formation on the carrier-blocking layer 15 on the transparent electrode 31 side, the amount of acceptor supply was set to 10 sccm, and decreased with the film-forming time. The amount of acceptor supply was set to zero in the middle of the photoconductive layer 16, and from this point, the supply of $PH_3$ gas (diluted to 1% by $H_2$) was started, and gradually increased. Finally, at the time when the film was joined to the carrier-blocking layer 17 on the light-shielding layer 18 side, the amount of $PH_3$ gas supply was set to 10 sccm.

The donor density in the a-Si:H film thus obtained was approximately $10^{15}$ $cm^{-3}$ at the area that was joined to the carrier-blocking layer 15 on the transparent electrode 31 side, and was approximately $10^{16}$ $cm^{-3}$ at the area that was joined to the carrier-blocking layer 17 of the light-shielding layer 18.

Moreover, an explanation will be given of a manufacturing method for an a-Si:H film in accordance with the above-mentioned method ③. $B_2H_6$ gas was added in order to add acceptor for compensation-use, while $SiH_4$ gas of 1000 sccm was being continuously introduced into the reaction furnace. In this case, at the start time of film-formation on the carrier-blocking layer 15 on the transparent electrode 31 side, the amount of acceptor supply was set to 10 sccm, and decreased with the film-forming time. Finally, at the time when the film was joined to the carrier-blocking layer 17 on the light-shielding layer 18 side, the amount of $B_2H_6$ gas supply was set to zero.

The donor density in the a-Si:H film thus obtained was approximately $10^{15}$ $cm^{-3}$ at the area that was joined to the carrier-blocking layer 15 on the transparent electrode 31 side, and was approximately $10^{16}$ $cm^{-3}$ at the area that was joined to the carrier-blocking layer 17 of the light-shielding layer 18.

In any one of the a-Si:H films of the photoconductive layer 16' that were formed by the above-mentioned three methods, the donor density is greater on the light-shielding layer 18 side than on the transparent electrode 31 side. Thus, with respect to the widths of maximum depletion layers that are formed by the junctions with the carrier-blocking layers 15 and 17 constituted of insulating films, the width of maximum depletion layer on the transparent electrode 31 side is made greater. As a result, a higher voltage can be applied to the transparent electrode 31 side of the photoconductive layer.

Next, an explanation is given of a manufacturing method for the photoconductive layer that has the element structure of FIG. 17(c).

The photoconductive layer 16" having this element structure is designed so that the donor density in the a-Si:H film is increased step by step from the transparent electrode 31 side toward the light-shielding layer 18 side. More specifically, in an area in the a-Si:H film that is greater than the width of the maximum depletion layer formed by the junction with the insulating film on the transparent electrode 31 side, a film-formation is carried out with a constant donor density; in an area that is close to the light-shielding layer 18, the donor density is gradually increased in a region having a film thickness that is not overlapped with the maximum depletion layer on the light-shielding layer 18 side; and in the area of the maximum depletion layer on the light-shielding layer 18 side, the donor density is kept constant. In other words, in the present embodiment, the donor density of the a-Si:H film is designed so as to be changed by one step.

The following description will discuss a manufacturing method of the photoconductive layer 16" whose donor density is increased step by step as described above. Here, the film thickness of the a-Si:H film is supposed to be 10 μm.

First, an a-Si:H film was formed with a thickness of 7 μm, whale $SiH_4$ gas of 1000 sccm was being continuously introduced into the reaction furnace. Then, while the a-Si:H film grew from 7 µm to 9 µm, that is, 2 µm, $PH_3$ gas (diluted to 1% by $H_2$ gas) was supplied so as to add donor, and the amount of the supply was gradually increased to 10 sccm. Thereafter, the donor density was set to $10^{18}$ cm$^{-3}$ when the film thickness had reached to 9 µm, and the film formation was carried out within 1 µm up to a film thickness of 10 µm, while keeping the amount of donor addition as it was.

Further, when it is desired to make the donor density on the transparent electrode 31 side smaller, the addition of acceptor for compensation-use can be carried out as described earlier. Moreover, in the present embodiment, the donor density in the a-Si:H film was changed by one step. However, the same effect can be obtained by using changes in multi-steps, such as, two steps or three steps.

As described above, the donor density ($N_{DI}$) on the transparent electrode 31 side of the i-type a-Si:H film is made smaller than the donor density ($N_{DL}$) on the light-shielding layer 18 side in such a manner that the width of a depletion layer or the width of a maximum depletion layer, which is formed on the transparent electrode 31 side, becomes greater than the width of a depletion layer or the width of a maxim depletion layer that is formed on the light-shielding layer 18 side.

Figure 18:
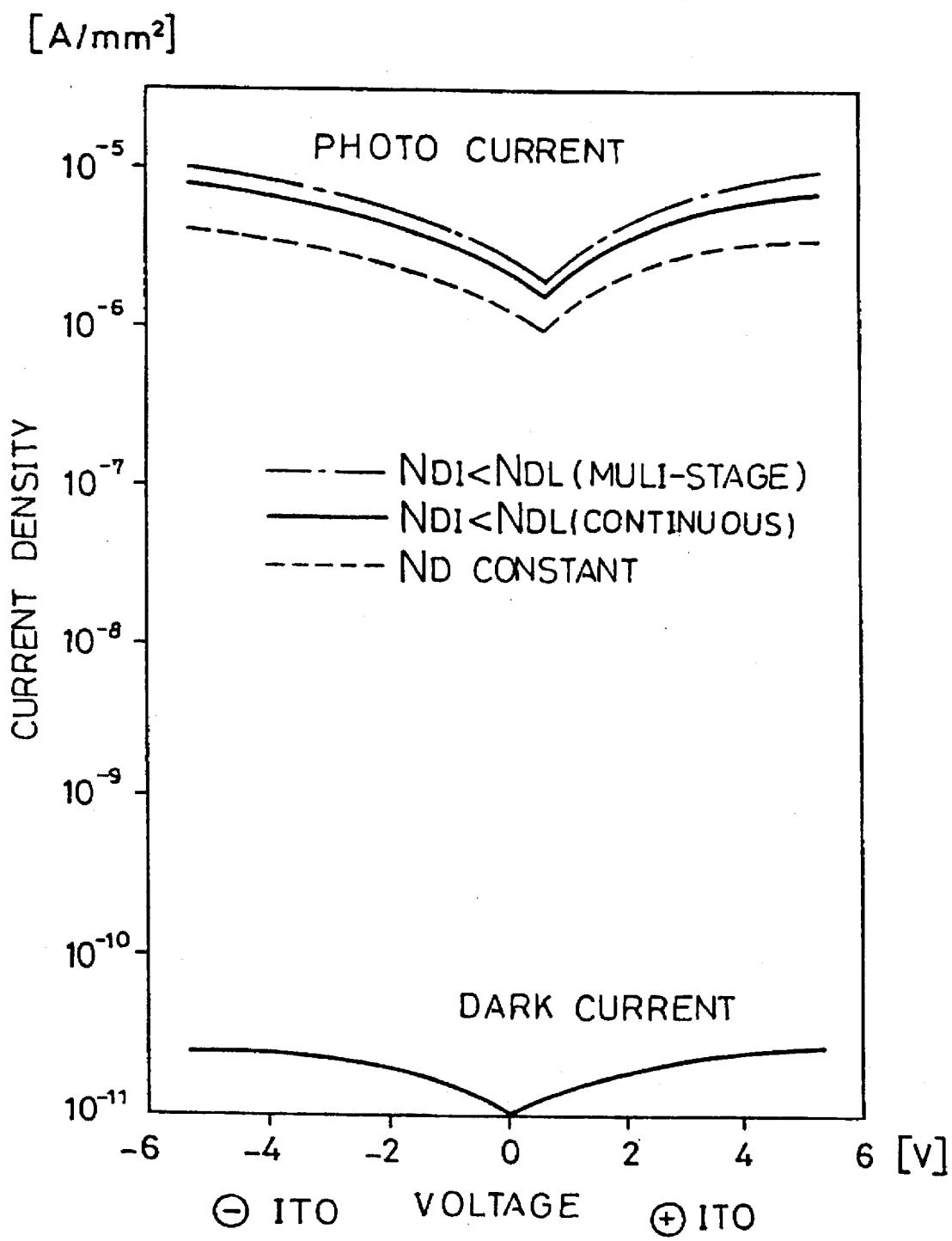
FIG. 18 is a graph which shows the relationship between the applied voltage and the current density of the photoconductive layers that are provided in the light-writing-type liquid crystal element of FIGS. 17(a) through 17(c).

Therefore, since higher voltage is applied onto the transparent electrode 31 side of the photoconductive layer than onto the light-shielding layer 18 side, more photocurrent is allowed to flow, as shown in FIG. 18, compared with the case of a constant donor density ($N_D$) in the a-Si:H film. Here, dark currents are kept the same independent of the gap of donor densities.

Figure 19:
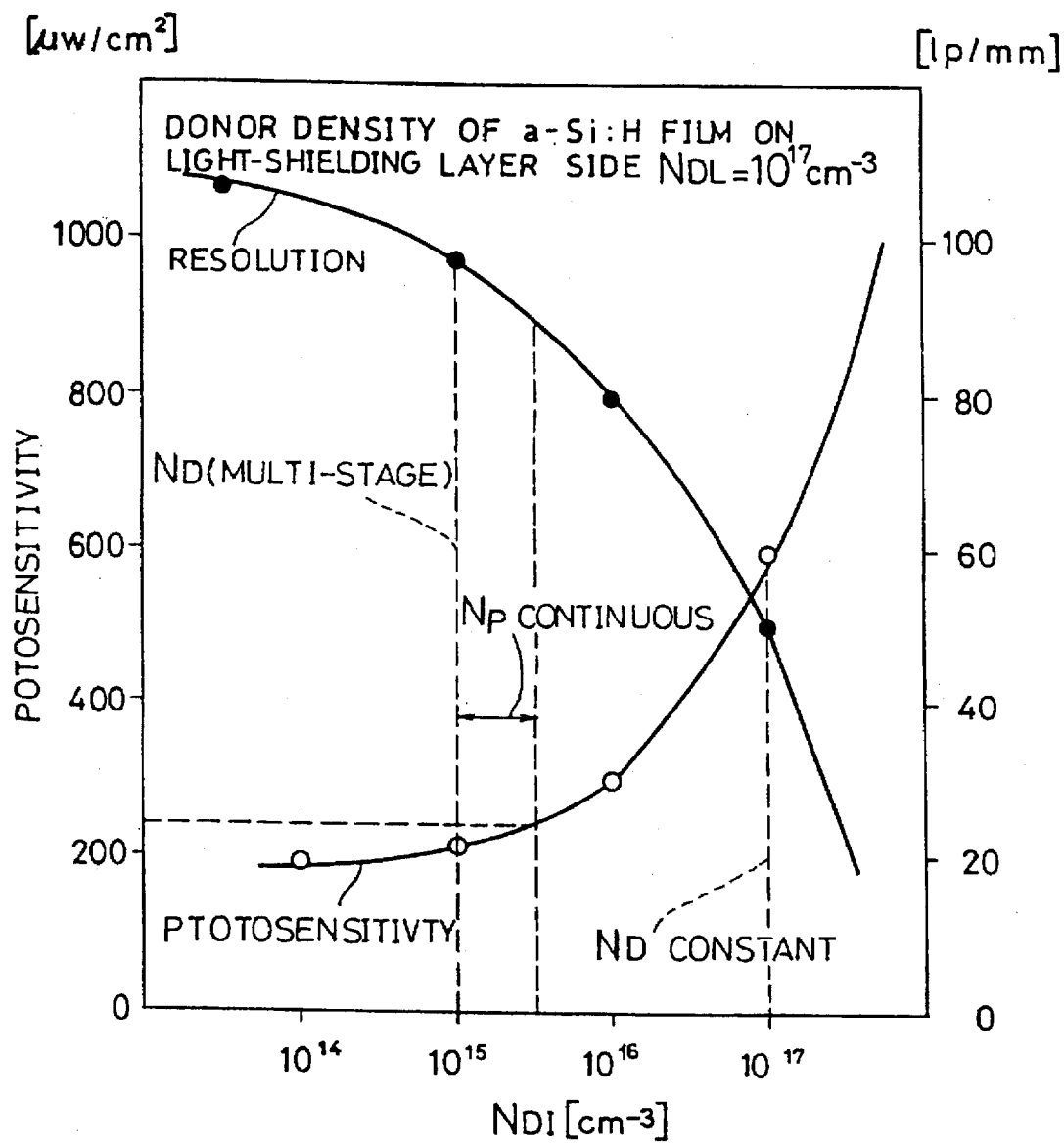
FIG. 19 is a graph which shows the relationship between the donor density on the writing-light side and the light intensity of required writing light (the intensity of writing light that allows reading light to have an approximately maximum value) of the photoconductive layers that are provided in the light-writing-type liquid crystal elements of FIGS. 17(a) through 17(c).

FIG. 19 shows the relationship between the writing light intensity and resolution in the three cases: that is, in the case where the donor density ($N_{DI}$) on the transparent electrode 31 side of the a-Si:H film is made smaller than the donor density ($N_{DL}$) on the light-shielding layer 18 side, that is, ($N_{DI}<N_{DL}$); in the case where the donor density is continuously changed or is changed step by step; and in the case where the donor density is constant ($N_D$).

FIG. 19 yields the results shown in Table 3.

TABLE 3

| | Light Intensity (µw/cm$^2$) | Resolution (1 p/mm) |
|---|---|---|
| $N_D$ Constant | 600 | 50 |
| $N_{DI} - N_{DL}$ (Multi-Step) | 220 | 90 |
| $N_{DI} < N_{DL}$ (Continuous) | 200–250 | 85–95 |

Table 3 indicates that the cases where the donor density satisfies $N_{DI}<N_{DL}$ provide higher photosensitivity (that is, lower light intensity required for writing light) than the case where the donor density is constant, and these cases make it possible to write image information well even when the writing light is weak, and also to provide better resolutions.

Moreover, when the donor density on the transparent electrode 31 side in the a-Si:H film is approximately $10^{16}$ cm$^{-3}$, the width of the maximum depletion layer formed by the junction with the insulating layer is approximately 10000 Å. Therefore, supposing that the donor density on the transparent electrode 31 side in the photoconductive layer is approximately $10^{16}$ cm$^{-3}$, it is preferable to have an arrangement wherein the donor density in the a-Si:H film is not increased in a region corresponding to a film thickness of 1 µm from the junction with the carrier-blocking layer 15 on the transparent electrode 31 side, since, when the donor density is increased, the width of depletion layer is narrowed to the corresponding degree.

Furthermore, when the donor density on the light-shielding layer 18 side in the a-Si:H film is approximately $10^{18}$ cm$^{-3}$, the width of the maximum depletion layer formed by the junction with the insulating layer is approximately 1000 Å. Therefore, supposing that the donor density on the light-shielding layer 18 side in the photoconductive layer is approximately $10^{18}$ cm$^{-3}$, it is preferable to have an arrangement wherein the donor density in the a-Si:H film is not decreased in a region corresponding to a film thickness of 1000 Å from the junction with the carrier-blocking layer 17 on the light-shielding layer 18 side.

In the present embodiment, the donor density in the photoconductive layer is changed so that a higher voltage is applied onto the transparent electrode 31 side of the photoconductive layer than onto the light-shielding layer 18. In the following embodiment 3, in order to apply a higher voltage onto the transparent electrode 31 side of the photoconductive layer than onto the light-shielding layer 18, the following structures are used as the photoconductive layer: a structure wherein a semiconductor of i-type and a semiconductor of wide energy-gap type (hereinafter, referred to as wide-gap semiconductor) having a greater energy gap than the semiconductor of i-type are jointed to each other; a structure wherein a semiconductor of i-type and a semiconductor that has the same energy gap as the semiconductor of i-type but has a different conduction type are joined to each other; and a structure wherein a semiconductor of i-type and a semiconductor having a chirp element structure whose energy gap reduces continuously toward the light-shielding layer 18 are joined to each other. An explanation will be given of each of the cases.

[EMBODIMENT 3]

Referring to FIGS. 20(a) through 27(c) and FIG. 70, the following description will discuss still another embodiment of the present invention.

With respect to the photoconductive layer that is used in the light-writing-type liquid crystal element of the present embodiment, a wide-gap semiconductor, a semiconductor that has the same energy gap but has a different conduction type and a semiconductor having a chirp element structure whose energy gap reduces continuously toward the light-shielding layer 18 are used, and each of them is joined to an i-type semiconductor 26 whose donor density ($N_D$) is set to be uniform. An explanation will be given of the energy band of each of the cases.

Figure 20A:
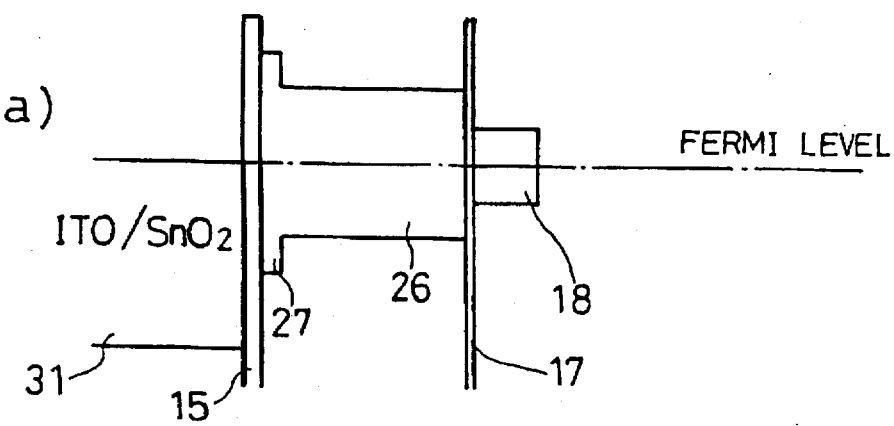
FIG. 20(a) is a band diagram of a light-writing-type liquid crystal element having an element structure of I/wide-i/i/I type, which has a photoconductive layer wherein a semiconductor of i-type is joined to a wide-gap semiconductor of i-type.

First, the following description will discuss the photoconductive layer wherein an i-type wide-gap semiconductor is joined to an i-type semiconductor. As illustrated in FIG. 20(a), the wide-gap semiconductor 27 is joined to the carrier-blocking layer 15 on the transparent electrode 31 side so as to provide an energy structure for preventing carrier injection from the transparent electrode 31. By using this wide-gap semiconductor 27, an interface level, which occurs in the joint portion between the carrier-blocking layer 15 and the photoconductive layer, does not give adverse effects on the effective area of carrier generation that is formed in the i-type semiconductor 26. Therefore, since carriers generated inside the i-type semiconductor 26 are not trapped by defects on the interface, a larger photocurrent is allowed to flow.

Here, the following description will discuss a manufacturing method of the photoconductive layer wherein the i-type semiconductor 26 is joined to the above-mentioned i-type wide-gap semiconductor 27.

The i-type wide-gap semiconductor 27 is made of a-Si$_x$C$_{1-x}$:H (which has a composition x=0.6 in the i-layer), and its film thickness is set to 100 Å. Here, the composition and film thickness of the i-type wide-gap semiconductor 27 are not intended to be limited to the above-mentioned conditions, and other materials may be used as long as they are within a range for allowing a larger photocurrent to flow. Typical film-forming conditions for the P-CVD method are given as follows: $SiH_4=50$ sccm, $CH_4=20$ sccm and $H_2=200$ sccm were introduced into a reaction furnace, and decomposed using glow discharge so as to accumulate a film. The accumulated i-type a-$Si_xC_{1-x}$:H film had a donor density of $10^{16}$ cm$^{-3}$.

In the above-mentioned i-type wide-gap semiconductor 27, it is necessary to make the donor density as small as possible when the width of a maximum depletion layer formed by the junction between the carrier-blocking layer 15 and the photoconductive layer is taken into consideration, that is, in order to widen the width of a depletion layer. In this case, the i-type wide-gap semiconductor 27 is formed so as to have a donor density within the range of $10^{15}$ cm$^{-3}$ to $10^{17}$ cm$^{-3}$, which is virtually the same range as the a-Si:H film that forms the i-type semiconductor 26 of the photoconductive layer. Moreover, the film thickness of the i-type wide-gap semiconductor 27 needs to be thinner than the width of the maximum depletion layer or the width of the depletion layer that is formed by the junction with the carrier-blocking layer 15, in order to form a depletion layer in the area of carrier generation.

Furthermore, in the above-mentioned photoconductive layer, the i-type semiconductor 26, whose donor density is uniform, is used. Therefore, as shown in FIG. 20(a), the energy levels are in equilibrium in the i-type semiconductor 26 portion. For this reason, the mobility speed of the carriers generated in the i-type semiconductor 26 is kept uniform, and the flow of photocurrent is thus limited.

Here, it is proposed that, instead of the i-type semiconductor 26, an i-type semiconductor, which is formed so that the donor density ($N_D$) in the a-Si:H film increases from the transparent electrode 31 side toward the light-shielding layer 18 side, is used. In order to differentiate the donor density ($N_D$) in the a-Si:H film between the transparent electrode 31 side and the light-shielding layer 18 side, two methods are proposed as described in the aforementioned Embodiment 2: the method in which the donor density ($N_D$) is increased continuously and the method in which it is increased step by step.

Figure 20B:
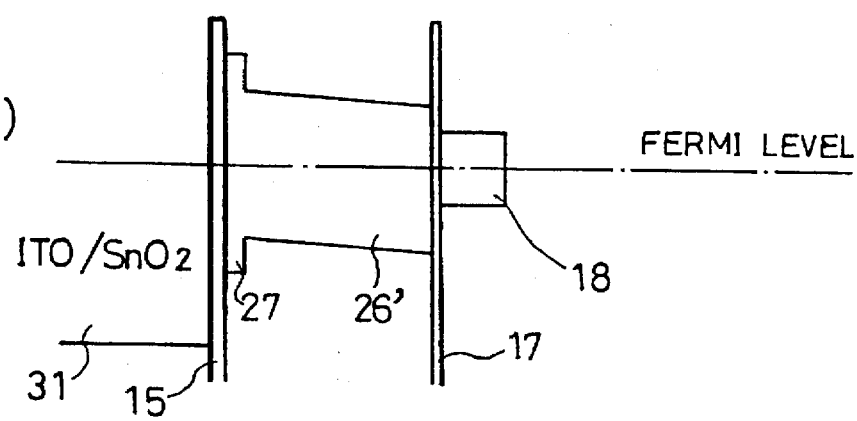
FIG. 20(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 20(a).
Figure 20C:
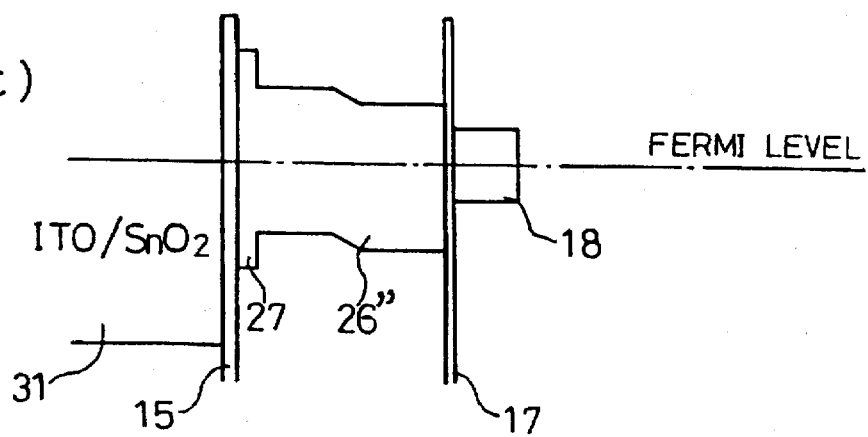
FIG. 20(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 20(a).

In the case where the donor density is continuously increased from the transparent electrode 31 side toward the light-shielding layer 18 side, the energy level in the i-type semiconductor 26' portion continuously reduces toward the light-shielding layer 18, as shown in FIG. 20(b). Further, in the case where the donor density is increased from the transparent electrode 31 side toward the light-shielding layer 18 side step by step, the energy level in the i-type semiconductor 26" portion reduces toward the light-shielding layer 18 step by step, as shown in FIG. 20(c).

With this arrangement wherein the donor density is made greater on the light-shielding layer 18 side than on the transparent electrode 31 side, the mobility speed of carriers that are generated in the i-type semiconductors 26' and 26" become greater on the light-shielding layer 18 side, thereby allowing a larger photocurrent to flow.

Figure 21A:
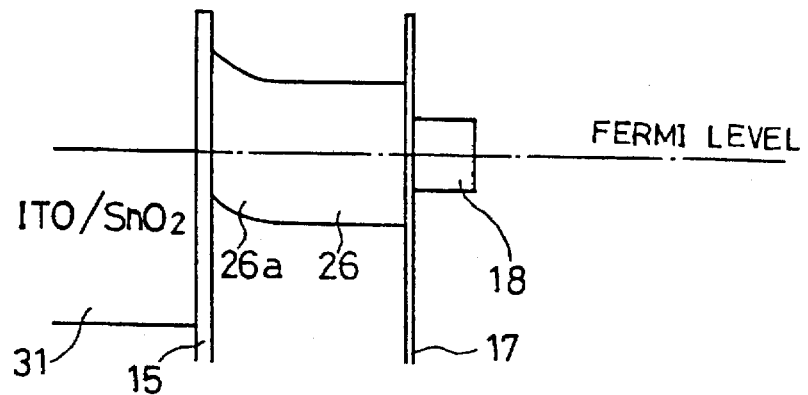
FIG. 21(a) is a band diagram of a light-writing-type liquid crystal element having an element structure of I/p/i/I type, which has a photoconductive layer wherein a semiconductor of p-type and a semiconductor of i-type, which have the same energy gap, are joined to each other.

Next, the following description will discuss the photoconductive layer wherein a p-type semiconductor and an i-type semiconductor, which have the same energy gap, are joined to each other. As illustrated in FIG. 21(a), a depletion layer is formed in the vicinity of the joint portion by joining the i-type semiconductor 26 and the p-type semiconductor 26a. Thus, more current is applied onto the transparent electrode 31 side of the photoconductive layer, thereby allowing a larger photocurrent to flow.

Figure 21B:
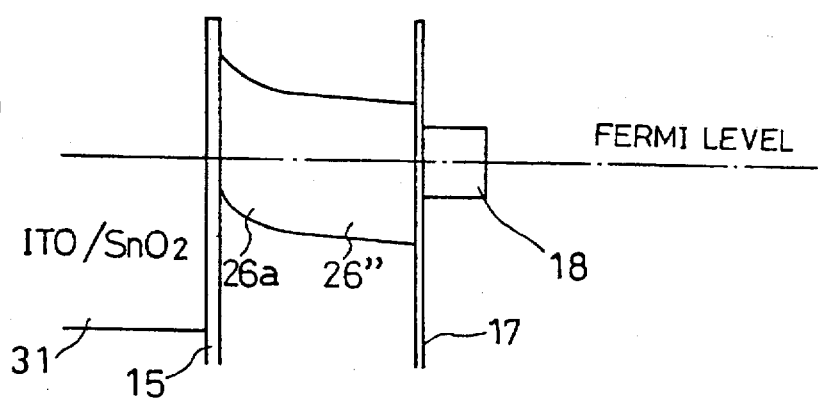
FIG. 21(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 21(a).
Figure 21C:
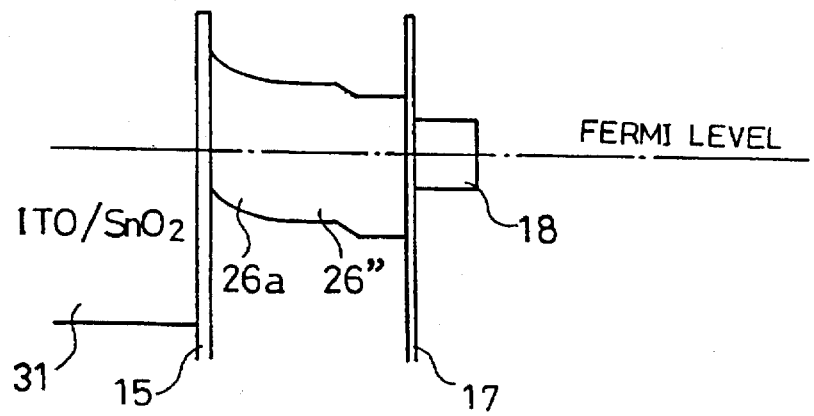
FIG. 21(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 21(a).

In order to allow a larger photocurrent to flow, the donor density of the i-type semiconductor 26 is changed. In the case where the donor density is continuously increased from the transparent electrode 31 side toward the light-shielding layer 18 side, the energy level in the i-type semiconductor 26' portion continuously reduces toward the light-shielding layer 18, as shown in FIG. 21(b). Further, in the case where the donor density is increased from the transparent electrode 31 side toward the light-shielding layer 18 side step by step, the energy level in the i-type semiconductor 26" portion reduces toward the light-shielding layer 18 step by step, as shown in FIG. 21(c).

With this arrangement wherein the donor density is made greater on the light-shielding layer 18 side than on the transparent electrode 31 side, the mobility speed of carriers that are generated in the i-type semiconductors 26' and 26" become greater on the light-shielding layer 18 side, thereby allowing a larger photocurrent to flow.

Figure 22A:
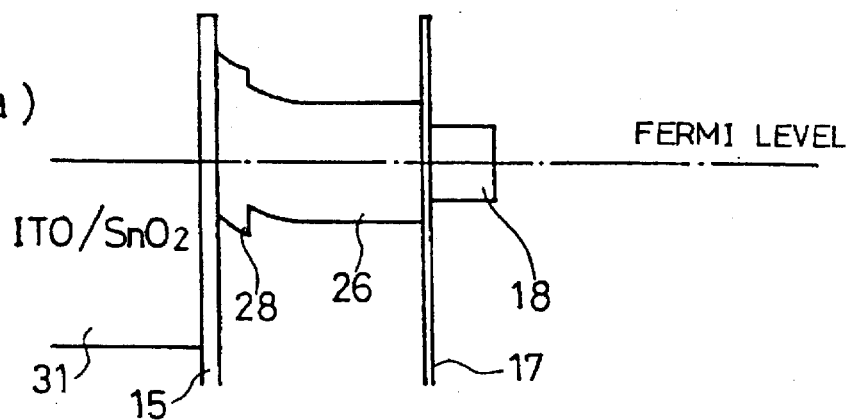
FIG. 22(a) is a band diagram of a light-writing-type liquid crystal element having an element structure of I/wide-p/i/I type, which has a photoconductive layer wherein a semiconductor of p-type and a semiconductor of i-type are joined to each other.

Moreover, the following description will discuss the photoconductive layer wherein an p-type wide-gap semiconductor is joined to an i-type semiconductor. As illustrated in FIG. 22(a), the wide-gap semiconductor 28 is joined to the carrier-blocking layer 15 on the transparent electrode 31 side so as to provide an energy structure for preventing carrier injection from the transparent electrode 31. By using this wide-gap semiconductor 28, since carriers generated inside the i-type semiconductor 26 are not trapped by defects on the interface, a larger photocurrent is allowed to flow, in the same manner as the wide-gap semiconductor 27 shown in FIG. 22(a).

Figure 22B:
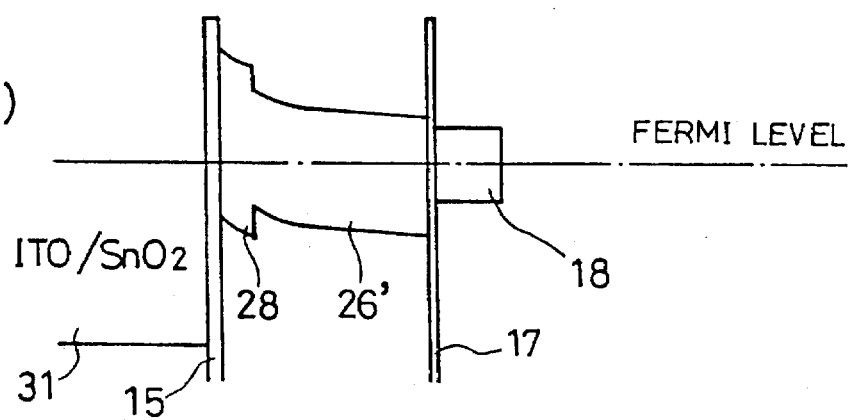
FIG. 22(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 22(a).
Figure 22C:
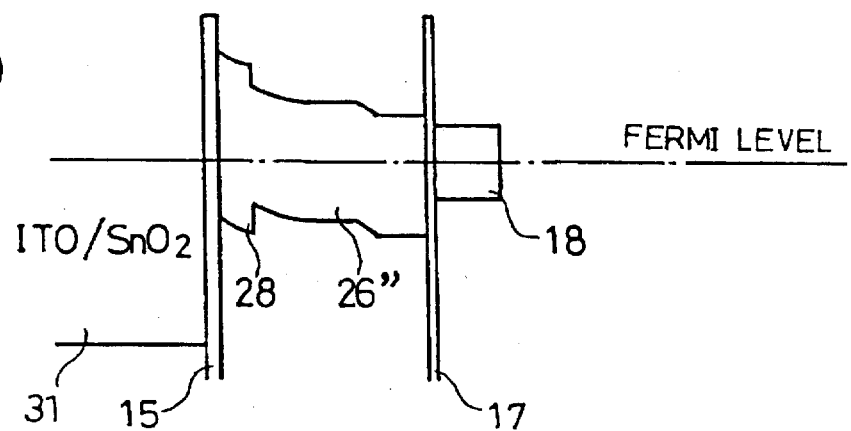
FIG. 22(c) is a band diagram of an element structure which uses a photoconductive layer in which the donor density As increased step by step toward the light-shielding layer side from the transparent electrode side (while the acceptor density decreases), instead of the photoconductive layer of the light-writing-type liquid crystal element of FIG. 22(a).

In order to allow a larger photocurrent to flow, the donor density of the i-type semiconductor 26 is changed. In the case where the donor density is continuously increased from the transparent electrode 31 side toward the light-shielding layer 18 side, the energy level in the i-type semiconductor 26' portion continuously reduces toward the light-shielding layer 18, as shown in FIG. 22(b). Further, in the case where the donor density is increased from the transparent electrode 31 side toward the light-shielding layer 18 side step by step, the energy level in the i-type semiconductor 26" portion reduces toward the light-shielding layer 18 step by step, as shown in FIG. 22(c).

Here, the following description will discuss a manufacturing method of the photoconductive layer wherein the i-type semiconductor 26 is joined to the above-mentioned p-type wide-gap semiconductor 28.

The p-type wide-gap semiconductor is made of a-$Si_xC_{1-x}$:H (which has a composition x=0.6 in the i-layer), and its film thickness is set to 100 Å. Here, the composition and film thickness of the p-type wide-gap semiconductor are not intended to be limited to the above-mentioned conditions, and other materials may be used as long as they are within a range for allowing a larger photocurrent to flow. The p-type a-$Si_xC_{1-x}$:H film, which functions as the p-type wide-gap semiconductor 28, had an acceptor density of $10^{17}$ cm$^{-3}$. On this film, an i-type a-Si:H film is formed in the same manner as Embodiment 2 so as to form a photoconductive layer.

With respect to the film thickness of the p-type wide-gap semiconductor 28, it is necessary to make the width of a depletion layer that is formed in the p-type wide-gap semiconductor 28 as small as possible, compared with the width of a maximum depletion layer that is formed by the junction between the carrier-blocking layer 15 and the i-type semiconductor 26, in order to form a thin depletion layer in the i-type semiconductor 26. Here, the acceptor density in the p-type wide-gap semiconductor 28 is preferably set within the range of $10^{16}$ cm$^{-3}$ to $10^{20}$ cm$^{-3}$, and more preferably set in the order of $10^{16}$ cm$^{-3}$.

Figure 23:
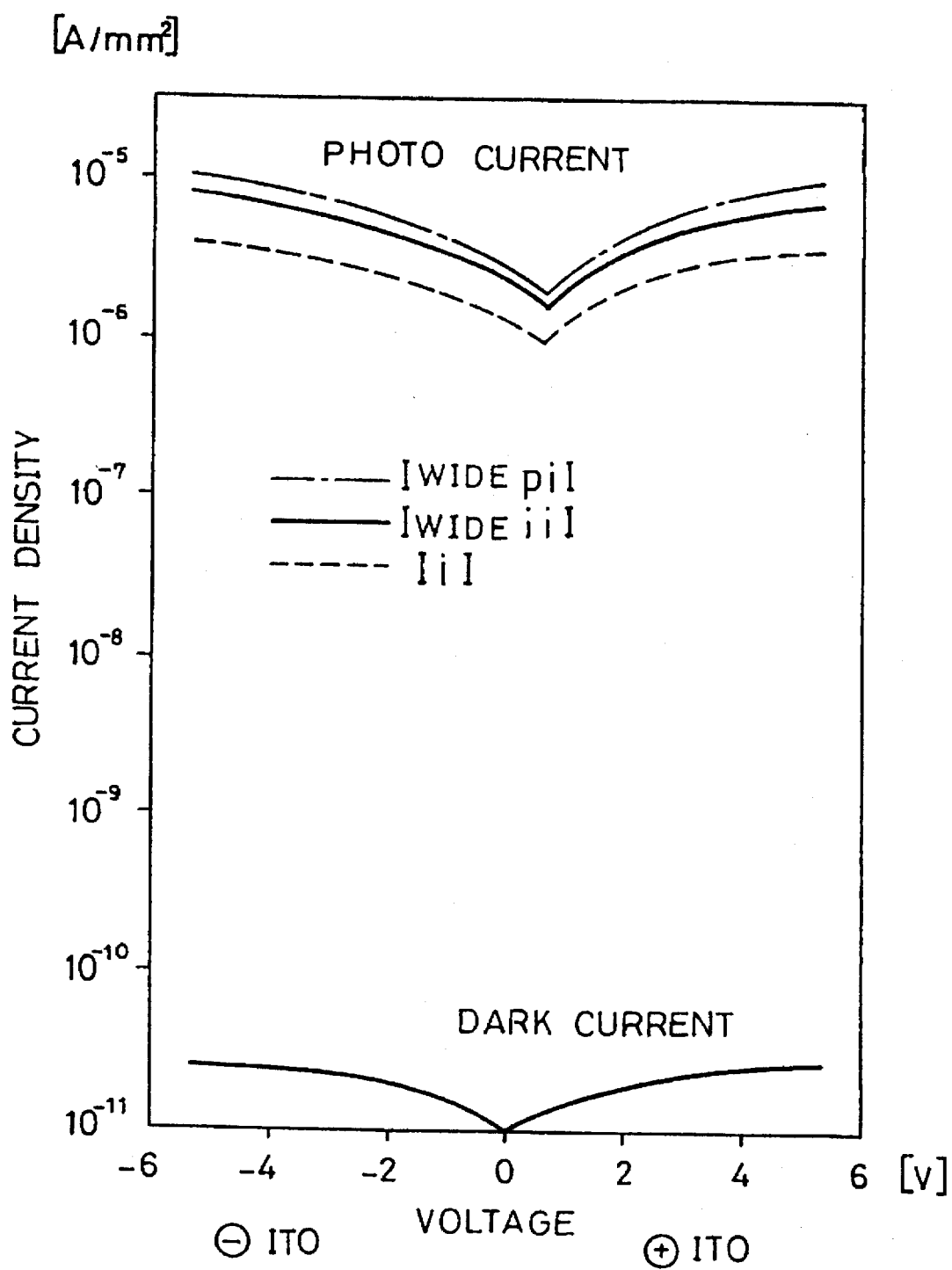
FIG. 23 is a graph that shows the relationship between the applied voltage and the current density of the light-writing-type liquid crystal elements having element structures of I/wide-p/i/I type, I/wide-i/i/I type and I/i/I type.

As shown in FIG. 23, the photoconductive layer, which is formed as described above, has a greater current density in photocurrent, compared with the case where only the i-type semiconductor is used as the photoconductive layer and the case where the i-type wide-gap semiconductor and the i-type semiconductor are joined to each other. This is because, since a depletion layer is formed by the junction between the p-type wide-gap semiconductor 28 and the i-type semiconductor 26, a higher voltage is applied onto the transparent electrode 31 side of the photoconductive layer, and because generated carriers are not trapped by the interface level.

Moreover, the above-mentioned p-type wide-gap semiconductor may be used in place of the carrier-blocking layer 15. The detailed description of this arrangement will be given in embodiments later.

Figure 24A:
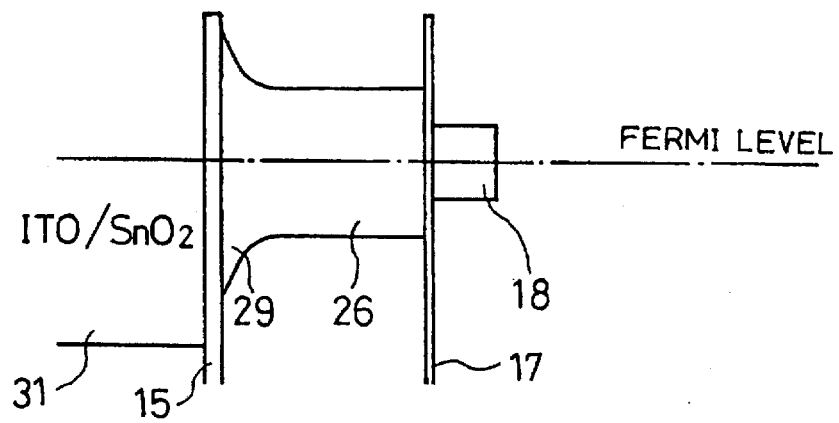
FIG. 24(a) is a band diagram of a light-writing-type liquid crystal element having an element structure of I/Chirp-i/i/I type, which uses a photoconductive layer wherein a semiconductor of i-type is joined to a semiconductor having a chirp structure of i-type (Chirp semiconductor of i-type).

Next, the following description will discuss a photoconductive layer wherein an i-type semiconductor is joined to an i-type semiconductor having a chirp structure (hereinafter, referred to as i-type chirp semiconductor). As illustrated in FIG. 24(a), the i-type chirp semiconductor 29 is joined to the i-type semiconductor 26 on its one side, and also joined to the carrier-blocking layer 15 on the transparent electrode 31 side on its other side, so as to provide an energy structure for preventing carrier injection from the transparent electrode 31.

In general, the use of a chirp semiconductor in the photoconductive layer allows carriers, which are created by writing light, to be generated from the photoconductive layer, and the carriers are not re-coupled on the junction interface with the insulating layer. Moreover, the carriers thus generated, which obtain energy from biased bands, can easily move toward the transparent electrode 31 side; this also reduces the possibility of re-coupling of carriers.

Meanwhile, since writing light, which is incident on the transparent electrode 31 side, is reflected by films having different refractive indexes, that is, the transparent electrode 31 and the photoconductive layer, the amount of writing light incident on the photoconductive layer is reduced. However, in the chirp semiconductor, since its refractive index of light continuously changes to the same refractive index as the photoconductive layer, the reflection of writing light can be reduced. In other words, in the chirp semiconductor, since its composition ratio changes successively, the interface reflection is reduced. Thus, writing light is directed to the photoconductive layer efficiently by minimizing its loss.

As described above, by using the chirp semiconductor in the photoconductive layer, it is possible to slightly reduce the impedance during photo time, compared with the case wherein the wide-gap semiconductor is used. In this case, the light intensity of writing light was 200 µW/cm². Here, FIG. 70 shows the relationship between the light intensity of writing light and the reflectivity of read-out light. FIG. 70 shows that the chirp semiconductor provides high reflectivity even upon receipt of weak writing light in the light intensity, compared with conventional symmetric-type and pin-type semiconductors. Thus, even weak writing light can be effectively utilized by adopting the chirp semiconductor.

The following description will discuss a manufacturing method of the photoconductive layer wherein the i-type semiconductor 26 is joined to the above-mentioned i-type chirp semiconductor 29.

Here, the i-type chirp semiconductor 29 is made of a-Si$_x$C$_{1-x}$:H (which has a composition x=0.6~1 in the i-layer), and its film thickness is set to 1000 Å. Here, the composition and film thickness of the i-type chirp semiconductor 29 are not intended to be limited to the above-mentioned conditions, and other materials may be used as long as they are within a range for allowing a larger photocurrent to flow. Typical film-forming conditions for the P-CVD method are given as follows: SiH$_4$=50 sccm was introduced into a reaction furnace immediately after the start of a film-forming process, and the amount of SiH$_4$ gas supply was increased with the increase in the film thickness until the amount of supply finally reached 100 sccm. The amount of CH$_4$ gas supply was 20 sccm immediately after the start of a film-forming process, and was set to zero at the end of the process. Further, the amount of H$_2$ gas supply was 200 sccm immediately after the start of a film-forming process, and was also set to zero at the end of the process. These gases were decomposed in the reaction furnace using glow discharge so as to accumulate a film, under the conditions of: base pressure (P$_B$)=0.92 Torr, RF power=50W, substrate temperature (T$_{sub}$)=300° C. The i-type a-Si$_x$C$_{1-x}$:H film (composition x=0.6~1), which was accumulated under the above-mentioned conditions and which functions an i-type chirp semiconductor, had a donor density of $10^{16}$ cm$^{-3}$. On this film, the i-type a-Si:H film is formed in the same manner as Embodiment 2 so as to provide photoconductive layer.

The above-mentioned i-type chirp semiconductor needs to be thinner than the width of a maximum depletion layer formed by the junction between the carrier-blocking layer 15 and the photoconductive layer. Further, the donor density in the i-type chirp semiconductor 29 needs to be set in the range of $10^{15}$ cm$^{-3}$ to $10^{17}$ cm$^{-3}$, which is virtually the same range as the i-type a-Si:H film.

Here, it is proposed that, instead of the i-type semiconductor 26, i-type semiconductors 26' and 26", each of which is formed so that the donor density (N$_D$) in the a-Si:H film increases from the transparent electrode 31 side toward the light-shielding layer 18 side, is used. In order to differentiate the donor density (N$_D$) in the a-Si:H film between the transparent electrode 31 side and the light-shielding layer 18 side, two methods are proposed as described in the aforementioned Embodiment 2: the method in which the donor density (N$_D$) is increased continuously and the method in which it is increased step by step.

Figure 24B:
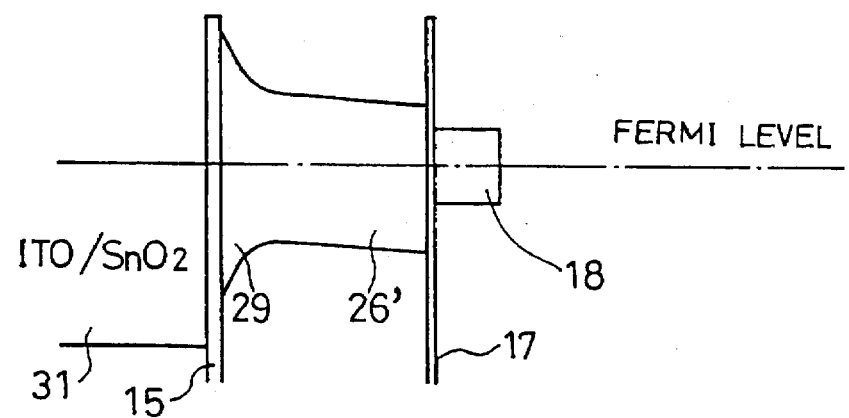
FIG. 24(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 24(a).
Figure 24C:
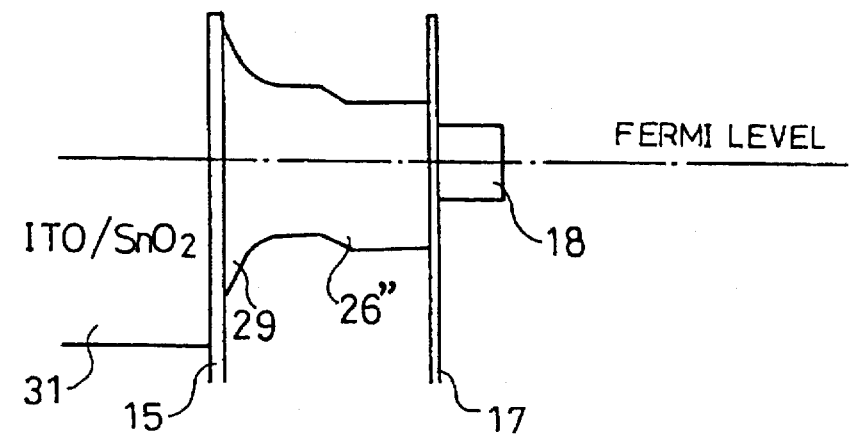
FIG. 24(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 24(a).

In the case where the donor density is continuously increased from the transparent electrode 31 side toward the light-shielding layer 18 side, the energy level in the i-type semiconductor 26' portion continuously reduces toward the light-shielding layer 18, as shown in FIG. 24(b). Further, in the case where the donor density is increased from the transparent electrode 31 side toward the light-shielding layer 18 side step by step, the energy level in the i-type semiconductor 26' portion reduces toward the light-shielding layer 18 step by step, as shown in FIG. 24(c).

Moreover, instead of using the i-type chirp semiconductors, p-type chirp semiconductors, to which an acceptor such as B or other materials is slightly added, may be used. In this case, the amount of addition of B may be continuously reduced from the interface with the transparent electrode 31 toward the interface with the i-type semiconductor 26.

Figure 25A:
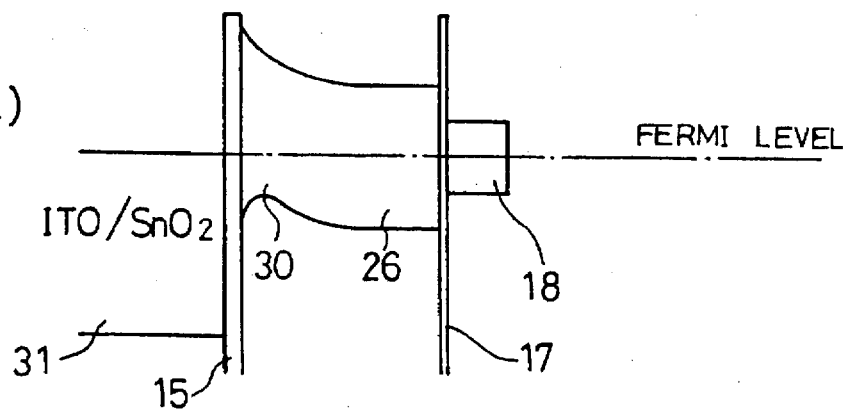
FIG. 25(a) is a band diagram of a light-writing-type liquid crystal element having an element structure of I/Chirp-p/i/I type, which uses a photoconductive layer wherein a semiconductor of i-type is joined to a semiconductor having a chirp structure of p-type (Chirp semiconductor of p-type).

Next, the following description will discuss photoconductive layer wherein an i-type semiconductor is joined to a p-type semiconductor having a chirp structure (hereinafter, referred to as p-type chirp semiconductor). As illustrated in FIG. 25(a), the p-type chirp semiconductor 30 is joined to the i-type semiconductor 26 on its one side, and also joined to the carrier-blocking layer 15 on the transparent electrode 31 side on its other side, so as to provide an energy structure for preventing carrier injection from the transparent electrode 31.

The following description will discuss a manufacturing method of the photoconductive layer wherein the i-type semiconductor 26 is joined to the above-mentioned p-type chirp semiconductor 30.

Here, the p-type chirp semiconductor 30 is made of p-type a-$Si_xC_{1-x}$:H (which has a composition x=0.6~1 in the i-layer), and its film thickness is set to 300 Å. Here, the composition and film thickness of the p-type chirp semiconductor 30 are not intended to be limited to the above-mentioned conditions, and other materials may be used as long as they are within a range for allowing a lot of photocurrent to flow. Typical film-forming conditions for the P-CVD method are given as follows: $SiH_4$=50 sccm was introduced into a reaction furnace immediately after the start of a film-forming process, and the amount of $SiH_4$ gas supply was increased with the increase in the film thickness until the amount of supply finally reached 100 sccm. The amount of $CH_4$ gas supply was 20 sccm immediately after the start of a film-forming process, and was set to zero at the end of the process. Further, the amount of $H_2$ gas supply was 200 sccm immediately after the start of a film-forming process, and was also set to zero at the end of the process. The amount of $PH_3$ gas, used for adding an acceptor, was set to 50 sccm all through the process. These gases were decomposed in the reaction furnace using glow discharge so as to accumulate a film, under the conditions of: base pressure ($P_B$)=0.92 Torr, RF power=50W, substrate temperature ($T_{sub}$)=300° C. The i-type a-$Si_xC_{1-x}$:H film (composition x=0.6~1), which was accumulated under the above-mentioned conditions and which functions as a p-type chirp semiconductor, had an acceptor density of $10^{17}$ $cm^{-3}$. On this film, the i-type a-Si:H film is formed in the same manner as Embodiment 2 so as to provide a photoconductive layer.

The above-mentioned p-type chirp semiconductor 30 needs to be thinner than the width of a maximum depletion layer formed by the junction between the carrier-blocking layer 15 and the i-type semiconductor 26. Further, the acceptor density in the p-type chirp semiconductor 30 is preferably set in the range of $10^{16}$ $cm^{-3}$ to $10^{20}$ $cm^{-3}$ and more preferably set in the order of $10^{18}$ $cm^{-3}$.

Here, it is proposed that, instead of the i-type semiconductor 26, i-type semiconductors, each of which is formed so that the donor density ($N_D$) in the a-Si:H film increases from the transparent electrode 31 side toward the light-shielding layer 18 side, is used. In order to differentiate the donor density ($N_D$) in the a-Si:H film between the transparent electrode 31 side and the light-shielding layer 18 side, two methods are proposed as described in the aforementioned Embodiment 2: the method in which the donor density ($N_D$) is increased continuously and the method in which it is increased step by step.

Figure 25B:
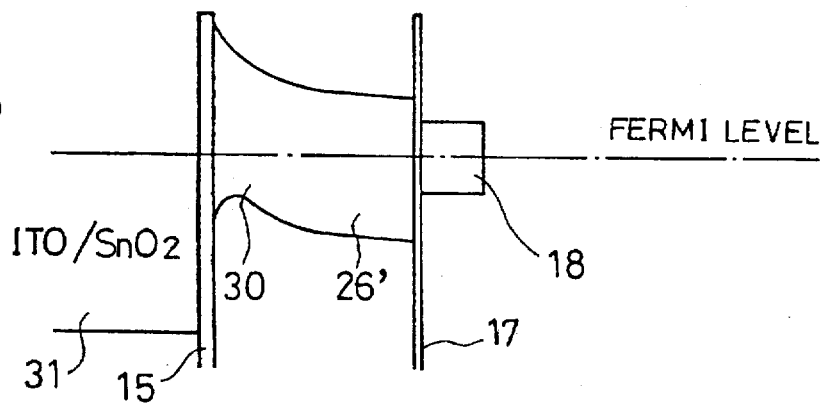
FIG. 25(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 25(a).
Figure 25C:
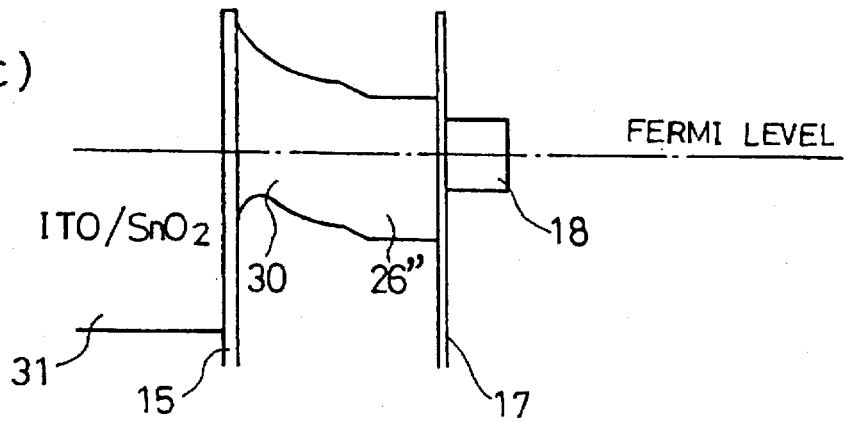
FIG. 25(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 25(a).

In the case where the donor density is continuously increased from the transparent electrode 31 side toward the light-shielding layer 18 side, the energy level in the i-type semiconductor 26' portion continuously reduces toward the light-shielding layer 18, as shown in FIG. 25(b). Further, in the case where the donor density is increased from the transparent electrode 31 side toward the light-shielding layer 18 side step by step, the energy level in the i-type semiconductor 26" portion reduces toward the light-shielding layer 18 step by step, as shown in FIG. 25(c).

In the above-mentioned chirp semiconductor, the energy gap continuously reduces toward the light-shielding layer 18. However, for example, chirp semiconductors, whose energy gap reduces toward the light-shielding layer 18 step by step, may be adopted. The following description will discuss the chirp semiconductor whose energy gap reduces step by step (hereinafter, referred to as multi-step chirp semiconductor).

First, the following description will discuss a photoconductive layer wherein an i-type multi-step chirp semiconductor is joined to an i-type semiconductor.

Figure 26A:
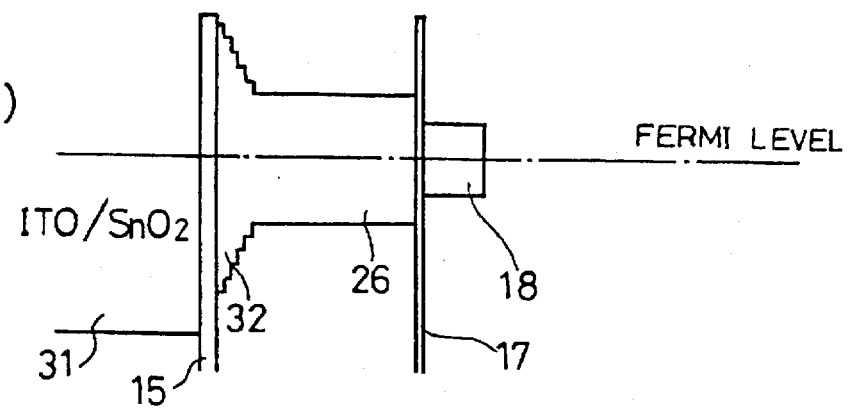
FIG. 26(a) is a band diagram of a light-writing-type liquid crystal element having an element structure of I/multi-step Chirp-i/i/I type, which uses a photoconductive layer wherein a semiconductor of i-type is joined to a multi-step Chirp semiconductor of i-type (Chirp semiconductor whose energy gap decreases step by step).

As illustrated in FIG. 26(a), the i-type multi-step chirp semiconductor 32 is joined to the i-type semiconductor 26 on its one side, and also joined to the carrier-blocking layer 15 on the transparent electrode 31 side on its other sided so as to provide an energy structure for preventing carrier injection from the transparent electrode 31.

The following description will discuss a manufacturing method of the photoconductive layer wherein the i-type semiconductor 26 is joined to the above-mentioned i-type multi-step chirp semiconductor 32.

Here, the i-type multi-step chirp semiconductor 32 is made of i-type a-$Si_xC_{1-x}$:H film (which have compositions x=0.6, 0.8, and 1 in the i-layer), and its film thickness is set to 1000 Å. Here, the composition and film thickness of the i-type multi-step chirp semiconductor 32 are not intended to be limited to the above-mentioned conditions, and other materials may be used as long as they are within a range for allowing a larger photocurrent to flow. Typical film-forming conditions for the P-CVD method are given as follows: The amount of $SiH_4$ gas supply was set to 50 sccm immediately after the start of a film-forming process, set to 75 sccm in the next step, and set to 100 sccm in the last step. The amount of $CH_4$ gas supply also had multi-steps. In other words, the amount of $CH_4$ gas supply was set to 20 sccm immediately after the start of a film-forming process, set to 10 sccm in the next step, and set to zero in the last step. Further, the amount of $H_2$ gas supply also had multi-steps. In other words, the amount of $H_2$ gas supply was set to 200 sccm immediately after the start of a film-forming process, set to 100 sccm in the next step, and set to zero in the last step. These gases were decomposed in the reaction furnace using glow discharge so as to accumulate a film, under the conditions of: $P_B$=0.92 Torr, RF power=550W, and $T_{sub}$=300° C. The i-type multi-step a-$Si_xC_{1-x}$:H film (compositions x=0.6, 0.8 and 1), which was accumulated under the above-mentioned conditions and which functions as an i-type multi-step chirp semiconductor, had a donor density of $10^{16}$ $cm^{-3}$. On this film, the i-type a-Si:H film was formed in the same manner as Embodiment 2 so as to provide a photoconductive layer.

The above-mentioned i-type multi-step chirp semiconductor 32 needs to be thinner than the width of a maximum depletion layer formed by the junction between the carrier-blocking layer 15 and the i-type semiconductor 26. Further, the donor density in the i-type multi-step chirp semiconductor 32 is preferably set in the range of $10^{14}$ $cm^{-3}$ to $10^{16}$ $cm^{-3}$.

Here, it is proposed that, instead of the i-type semiconductor 26, i-type semiconductors 28, each of which is formed so that the donor density ($N_D$) in the a-Si:H film increases from the transparent electrode 31 side toward the light-shielding layer 18 side, is used. In order to differentiate the donor density ($N_D$) in the a-Si:H film between the transparent electrode 31 side and the light-shielding layer 18 side, two methods are proposed as described in the aforementioned Embodiment 2: the method in which the donor density ($N_D$) is increased continuously and the method in which it is increased step by step.

Figure 26B:
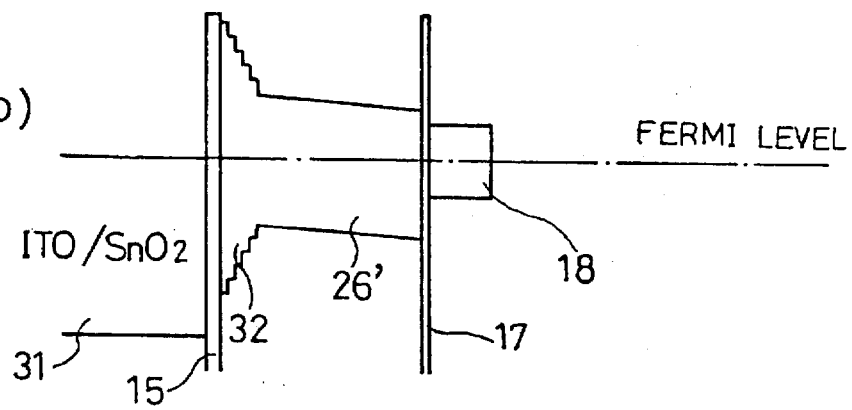
FIG. 26(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 26(a).
Figure 26C:
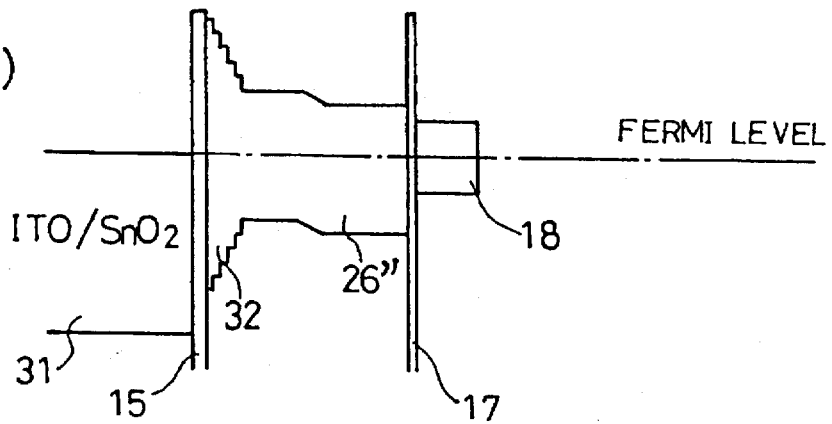
FIG. 26(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 26(a).

In the case where the donor density is continuously increased from the transparent electrode 31 side toward the light-shielding layer 18 side, the energy level in the i-type semiconductor 26' portion continuously reduces toward the light-shielding layer 18, as shown in FIG. 26(b). Further, in the case where the donor density is increased from the transparent electrode 31 side toward the light-shielding layer 18 side step by step, the energy level in the i-type semiconductor 26" portion reduces toward the light-shielding layer 18 step by step, as shown in FIG. 26(c).

Next, the following description will discuss a photoconductive layer wherein a p-type multi-step chirp semiconductor is joined to an i-type semiconductor.

Figure 27A:
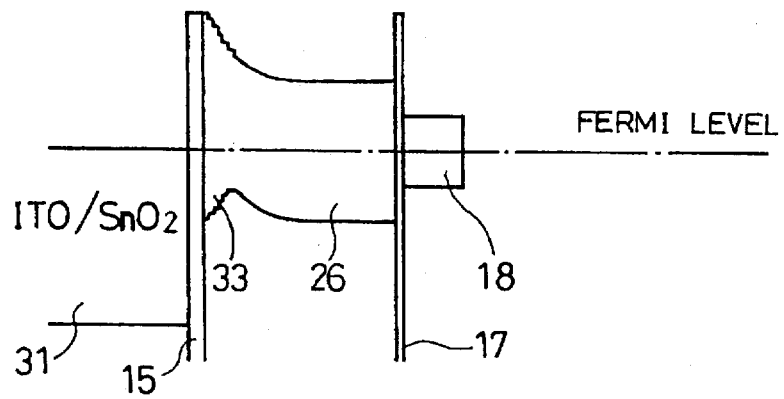
FIG. 27(a) is a band diagram of a light-writing-type liquid crystal element having an element structure of I/multi-step Chirp-p/i/I type, which uses a photoconductive layer wherein a multi-step Chirp semiconductor of p-type is joined to a semiconductor of i-type.

As illustrated in FIG. 27(a), the p-type multi-step chirp semiconductor 33 is joined to the i-type semiconductor 26 on its one side, and also joined to the carrier-blocking layer 15 on the transparent electrode 31 side on its other side, so as to provide an energy structure for preventing carrier injection from the transparent electrode 31.

The following description will discuss a manufacturing method of the photoconductive layer wherein the i-type semiconductor 26 is joined to the above-mentioned p-type multi-step chirp semiconductor 33.

Here, the p-type multi-step chirp semiconductor 33 is made of p-type a-$Si_xC_{1-x}$:H (which have compositions x=0.6, 0.8, and 1 in the i-layer), and its film thickness is set to 300 Å. Here, the composition and film thickness of the p-type multi-step chirp semiconductor 33 are not intended to be limited to the above-mentioned conditions, and other materials may be used as long as they are within a range for allowing a larger photocurrent to flow. Typical film-forming conditions for the P-CVD method are given as follows: The amount of $SiH_4$ gas supply was set to 50 sccm immediately after the start of a film-forming process, set to 75 sccm in the next step, and set to 100 sccm in the last step. The amount of $CH_4$ gas supply also had multi-steps. In other words, the amount of $CH_4$ gas supply was set to 20 sccm immediately after the start of a film-forming process, set to 10 sccm in the next step, and set to zero in the last step. Further, the amount of $H_2$ gas supply also had multi-steps. In other words, the amount of $H_2$ gas supply was set to 200 sccm immediately after the start of a film-forming process, set to 100 sccm in the next step, and set to zero in the last step. The amount of $B_2H_6$ gas, used for adding an acceptor, was set to 50 sccm all through the process. These gases were decomposed in the reaction furnace using glow discharge so as to accumulate a film, under the conditions of: $P_g$=0.92 Torr, RF power=50W, and $T_{sub}$=280° C. The i-type multi-step a-$Si_xC_{1-x}$:H film (compositions x=0.6, 0.8 and 1), which was accumulated under the above-mentioned conditions and which functions as a p-type multi-step chirp semiconductor, had an acceptor density of $10^{17}$ cm$^{-3}$. On this film, the i-type a-Si:H film was formed in the same manner as Embodiment 2 so as to provide a photoconductive layer.

The above-mentioned p-type multi-step chirp semiconductor 33 needs to be thinner than the width of a maximum depletion layer formed by the junction between the carrier-blocking layer 15 and the i-type semiconductor 26. Further, the acceptor density in the p-type multi-step chirp semiconductor 33 is preferably set in the range of $10^{16}$ cm$^{-3}$ to $10^{20}$ cm$^{-3}$, and more preferably set in the order of $10^{18}$ cm$^{-3}$.

Here, it is proposed that, instead of the i-type semiconductor 26, i-type semiconductors, each of which is formed so that the donor density ($N_D$) in the a-Si:H film increases from the transparent electrode 31 side toward the light-shielding layer 18 side, are used. In order to differentiate the donor density ($N_D$) in the a-Si:H film between the transparent electrode 31 side and the light-shielding layer 18 side, two methods are proposed as described in the aforementioned Embodiment 2: the method in which the donor density ($N_D$) is increased continuously and the method in which it is increased step by step.

Figure 27B:
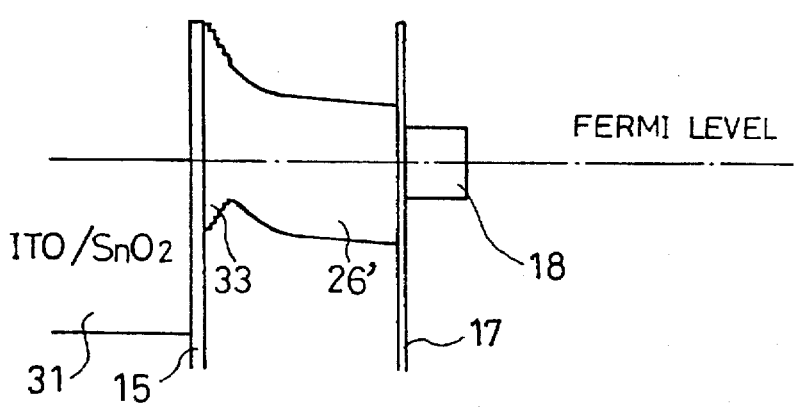
FIG. 27(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 27(a).
Figure 27C:
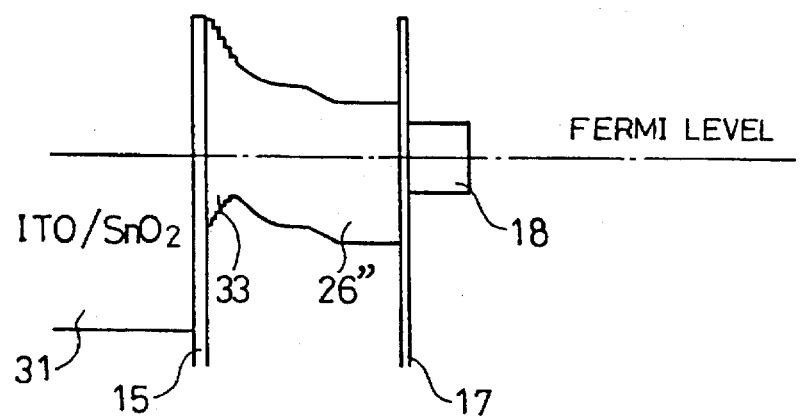
FIG. 27(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 27(a).

In the case where the donor density is continuously increased from the transparent electrode 31 side toward the light-shielding layer 18 side, the energy level in the i-type semiconductor 26' portion continuously reduces toward the light-shielding layer 18, as shown in FIG. 27(b). Further, in the case where the donor density is increased from the transparent electrode 31 side toward the light-shielding layer 18 side step by step, the energy level in the i-type semiconductor 26" portion reduces toward the light-shielding layer 18 step by step, as shown in FIG. 27(c).

In general, since multi-step chirp semiconductors are formed while manufacturing parameters, such as refractive index, are being set to optimal values step by step, it is possible to manufacture films with high-quality and high-accuracy, compared with chirp semiconductors whose energy level continuously reduces. Moreover, multi-step chirp semiconductors are applicable to cases where the amount of change in energy level is great in comparison with film thickness; however, continuous chirp semiconductors sometimes fail to deal with such cases. The following Table 4 shows comparisons in performances between the multi-step chirp semiconductor and the continuous chirp semiconductor.

TABLE 4

|  | Continuous Chirp Semiconductor | Multi-Step Chirp Semiconductor |
| --- | --- | --- |
| Changes in Material Values | Continuous and Smooth | Step by Step |
| Amount of Energy Change as a Whole | Small | Large |
| Difficulty in Production | Difficult: All parameters have to be changed continuously. | Easy: Film design is easier than that of continuous chirp semiconductors. |
| Film Quality | Δ | ○ |

Table 4 indicates that the multi-step chirp semiconductor can deal with the amount of change in energy level that can not be dealt with by the continuous chirp semiconductor.

In general, in a photoconductive layer wherein semiconductors of not less than two types are joined together, the mobility of charge decreases at the joint interfaces and the response speed of the photoconductive layer consequently slows down. In contrast, in the present embodiment, the compositions of semiconductors are successively changed in the vicinity of the joint interfaces of the semiconductors while consideration is given to their refractive indexes. In other words, the compositions are changed so as to provide the same refraction as the semiconductor (i-type semiconductor) to which another semiconductor is joined. Therefore, it is possible to prevent reduction in the response speed of the photoconductive layer, and also to reduce loss of light that is incident on the photoconductive layer, by minimizing the reflection of light at portions that have been subjected to changes in composition.

As described above, in all Embodiments 1, 2 and 3, insulating films (carrier-blocking layer 15 and carrier-blocking layer 17) are formed respectively between the photoconductive layer and the transparent electrode 31 as well as between the photoconductive layer and the light-shielding layer 18. By installing the insulating films on both sides of the photoconductive layer, it becomes possible to prevent carrier injection, and also to minimize interface reflection of writing light in the photoconductive layer.

Meanwhile, instead of installing the carrier-blocking layer 15 or the carrier-blocking layer 17, a p-type semiconductor, which has the same energy gap as the i-type semiconductor, or a wide-gap p-type semiconductor may be adopted for use in carrier blocking, which results in the same effect as described above. When consideration is given to the manufacture of photoconductive layers, it is more preferable to use a p-type semiconductor as the carrier-blocking layer than to use an insulating film. In other words, EB vapor deposition, which is carried out when an insulating film is formed as the carrier-blocking layer, makes the manufacturing process of photoconductive layers complicate. In contrast, when a p-type semiconductor is used as the carrier-blocking layer, the manufacture of photoconductive layers can be carried out by using the same process as the i-type semiconductor.

In the following Embodiments 4, 5 and 6, explanations will be given of cases where p-type semiconductors are used as the carrier-blocking layer.

[EMBODIMENT 4]

The following description will be given by reference to FIGS. 28(a) through 35(c). Here, in the present embodiment, with respect to the respective element structures shown in Embodiments 1, 2 and 3, explanations are given of a light-writing-type liquid crystal element wherein a p-type semiconductor, which has the same energy gap as the i-type semiconductor that forms a photoconductive layer, is used as the carrier-blocking layer 17 on the light-shielding layer 18 side, as well as of a light-writing-type liquid crystal element wherein a p-type semiconductor, which has an energy gap that is greater than the i-type semiconductor that forms a photoconductive layer, is used as the carrier-blocking layer 17 on the light-shielding layer 18 side.

Figure 28A:
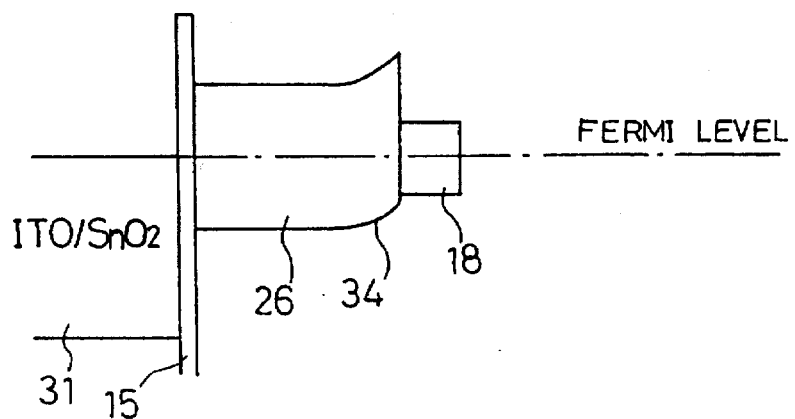
FIG. 28(a) is a band diagram of a light-writing-type liquid crystal element having an element structure of I/i/p type, which uses a photoconductive layer wherein a semiconductor of i-type and a semiconductor of p-type are joined to each other.

First, the following description will discuss the light-writing-type liquid crystal element using the p-type semiconductor which has the same energy gap as the i-type semiconductor that forms a photoconductive layer. As illustrated in FIG. 28(a), in a photoconductive layer provided in the light-writing-type liquid crystal element, the i-type semiconductor 26 is joined to the transparent electrode 31 on its one side through the carrier-blocking layer 15, and also joined to the light-shielding layer 18 on its other side through a p-type semiconductor 34. Thus, carrier injection from the transparent electrode 31 is blocked by the carrier-blocking layer 15, and carrier injection (tom the light-shielding layer 18 is blocked by a depletion layer that is formed by the i-type semiconductor 26 and the p-type semiconductor 34.

Here, the p-type semiconductor 34, formed on the light-shielding layer 18 side, is made of a-Si:H, and an explanation will be given of the film-forming method. The film thickness is set to 150 Å. Here, it is supposed that, after the i-type semiconductor 26 has been formed on the carrier-blocking layer 15, the p-type semiconductor 34 is formed thereon. In this case, the i-type semiconductor is formed by the same method as that of Embodiment 1. Here, the composition and film thickness of the p-type semiconductor 34 are not intended to be limited to the above-mentioned conditions, and other materials may be used as long as they are within a range for allowing a larger photocurrent to flow. Typical film-forming conditions for the P-CVD method are given as follows: $SiH_4$=50 sccm, $H^2$=200 sccm, and $B_2H_6$=50 sccm ($H_2$ diluted to 100 ppm), used for adding an acceptor, were supplied. These gases were introduced into the reaction furnace so as to accumulate a film, under the conditions of: $P_B$=0.92 Torr, RF power=50W, and $T_{sub}$=280° C. The p-type a-Si:H film, which was accumulated under the above-mentioned conditions and which functions as the p-type semiconductor 34, had an acceptor density of $10^{17}$ $cm^{-3}$.

Here, it is proposed that, instead of the i-type semiconductor 26, i-type semiconductors, each of which is formed so that the donor density ($N_D$) in the a-Si:H film increases from the transparent electrode 31 side toward the light-shielding layer 18 side, are used. In order to differentiate the donor density ($N_D$) in the a-Si:H film between the transparent electrode 31 side and the light-shielding layer 18 side, two methods are proposed as described in the aforementioned Embodiment 2: the method in which the donor density ($N_D$) is increased continuously and the method in which it is increased step by step.

Figure 28B:
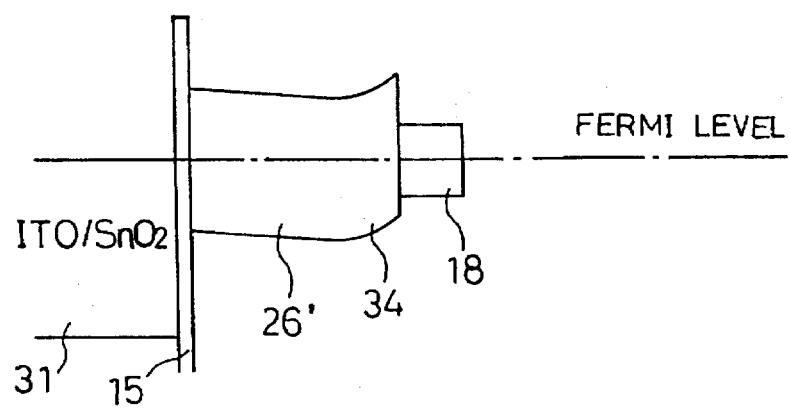
FIG. 28(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 28(a).

In the case where the donor density is continuously increased from the transparent electrode 31 side toward the light-shielding layer 18 side, the energy level in the i-type semiconductor 26' portion continuously reduces toward the light-shielding layer 18, as shown in FIG. 28(b). Further, in the case where the donor density is increased from the transparent electrode 31 side toward the light-shielding layer 18 side step by step, the energy level in the i-type semiconductor 26" portion reduces toward the light-shielding layer 18 step by step, as shown in FIG. 28(c).

Figure 28C:
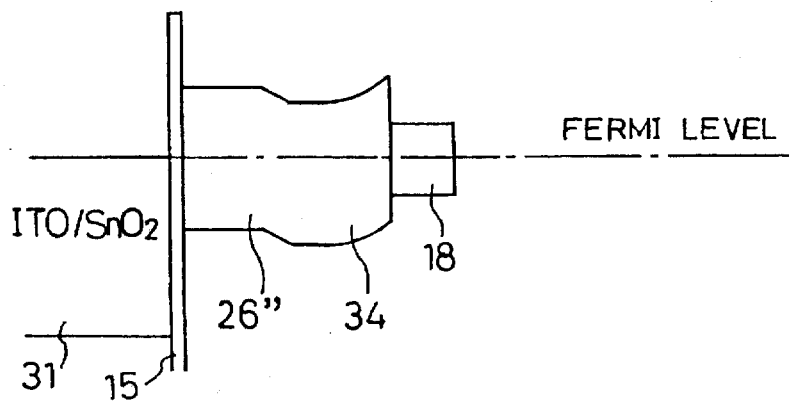
FIG. 28(c) is a band diagram of an element structure which uses a photoconductive layer in which the donor density is increased step by step forward the light-shielding layer side from the transparent electrode side (while the acceptor density decreases), instead of the photoconductive laser of the light-writing-type liquid crystal element of FIG. 28(a).
Figure 29A:
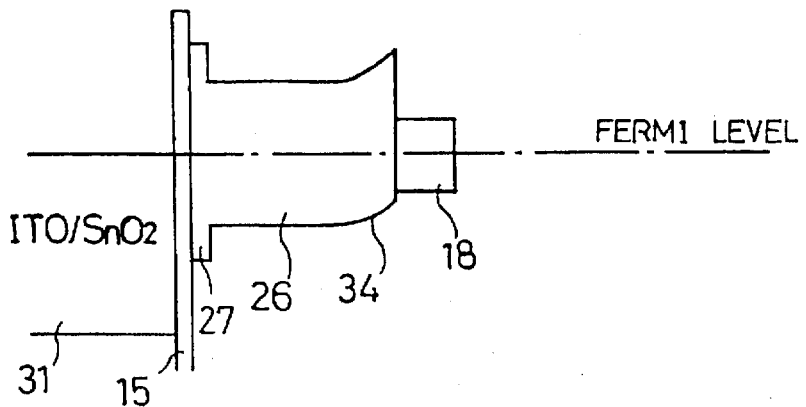
FIG. 29(a) is a band diagram of a light-writing-type liquid crystal element having an element structure of I/wide-i/i/p type.
Figure 29B:
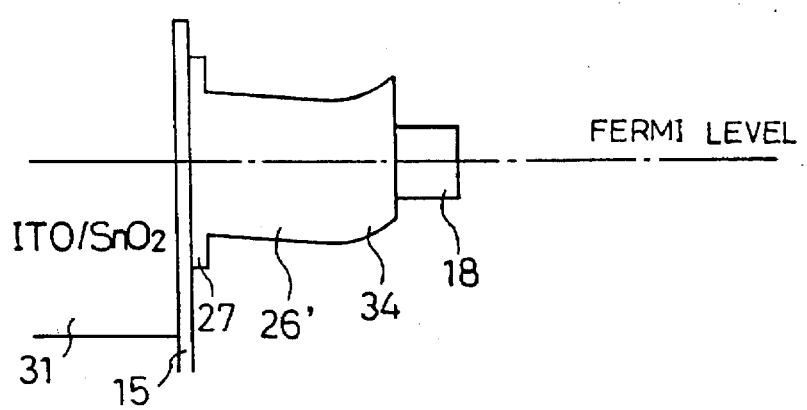
FIG. 29(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 29(a).
Figure 29C:
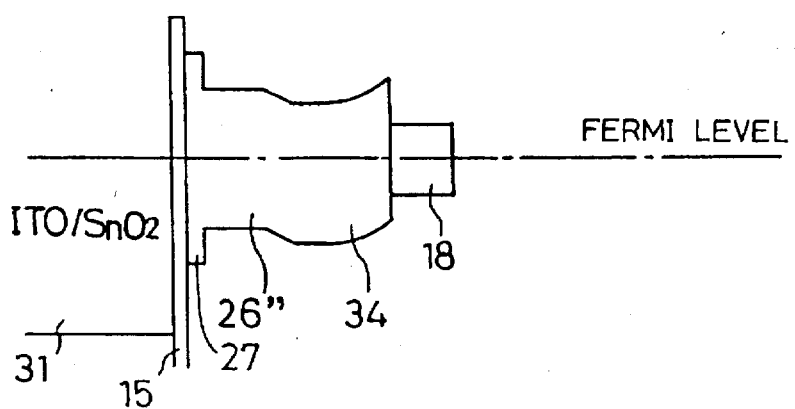
FIG. 29(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 29(a).
Figure 30A:
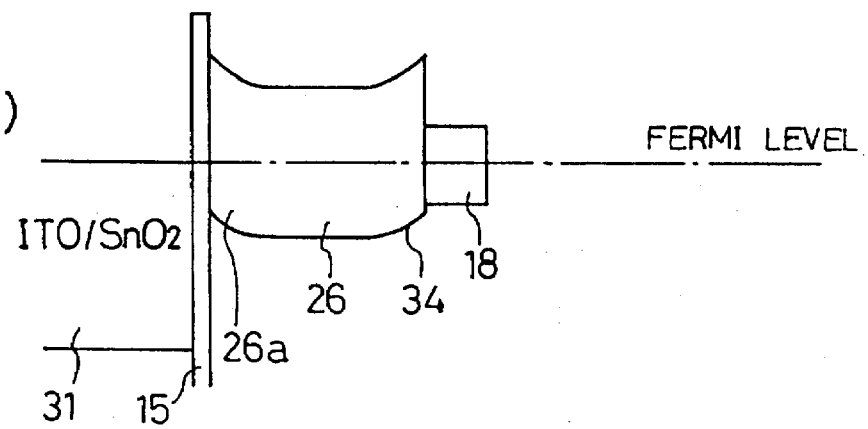
FIG. 30(a) is a band diagram of a light-writing-type liquid crystal element having an element structure of I/p/i/p type.
Figure 30B:
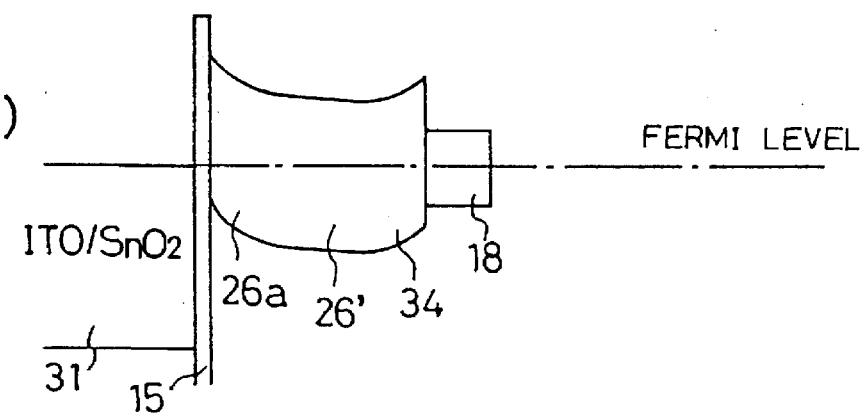
FIG. 30(b) is a hand diagram of an element structure which uses a photoconductive layer in which the donor density is continuously increased toward the light-shielding layer side from the transparent electrode side (while the acceptor density decreases), instead of the photoconductive layer of the light-writing-type llquid crystal element of FIG. 30(a).
Figure 30C:
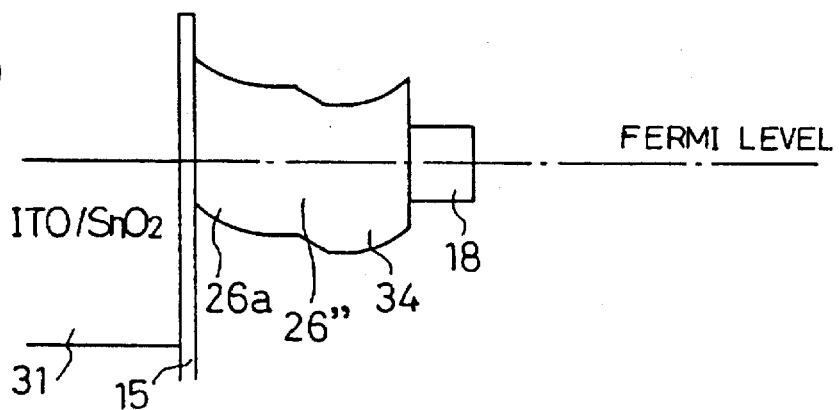
FIG. 30(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 30(a).
Figure 31A:
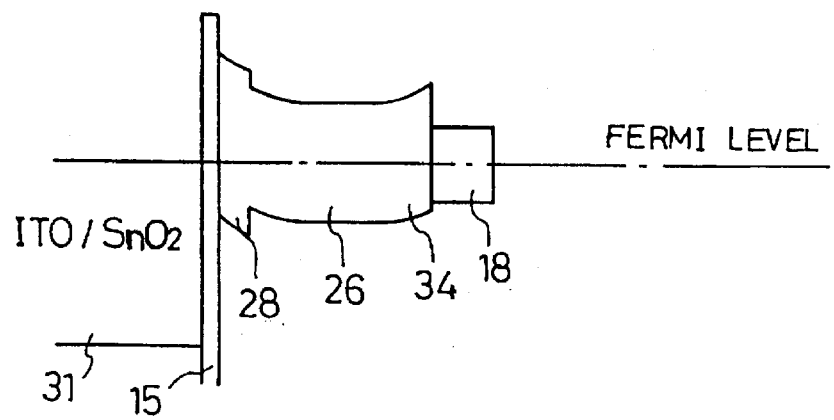
FIG. 31(a) is a band diagram of a light-writing-type liquid crystal element having an element structure of I/wide-p/i/p type.
Figure 31B:
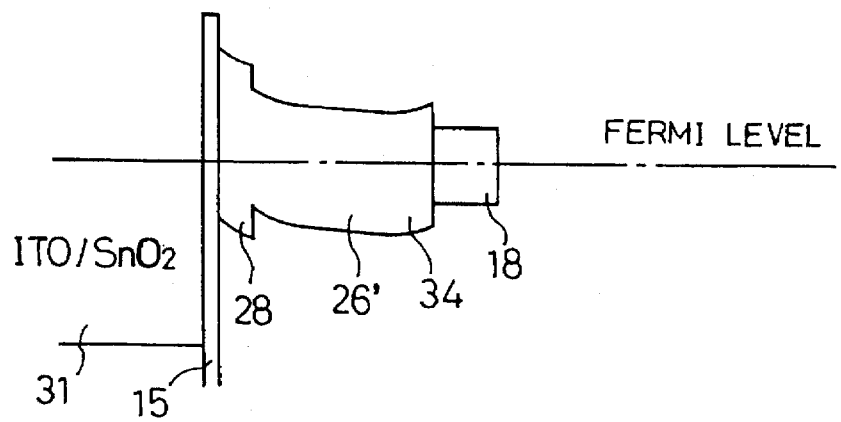
FIG. 31(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 31(a).
Figure 31C:
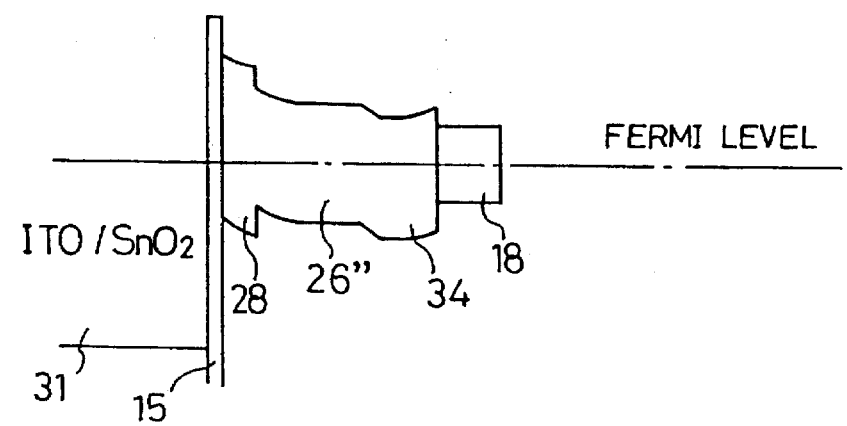
FIG. 31(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 31(a).
Figure 32A:
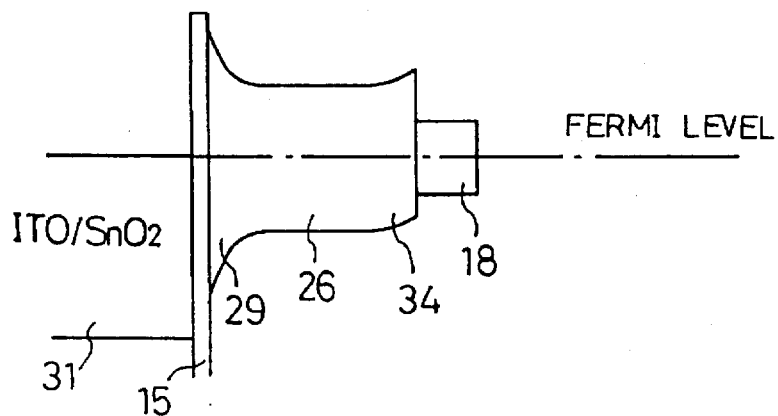
FIG. 32(a) is a band diagram of a light-writing-type liquid crystal element having an element structure of I/Chip-i/i/p type.
Figure 32B:
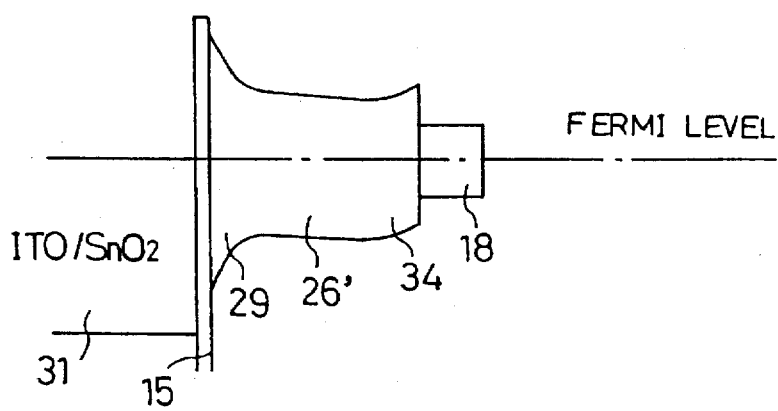
FIG. 32(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 32(a).
Figure 32C:
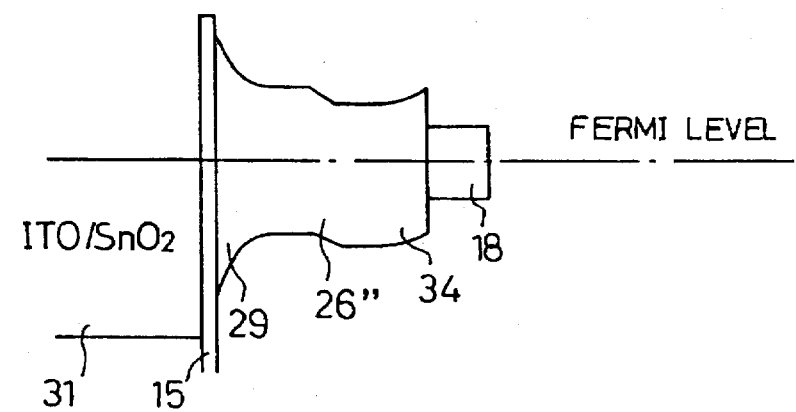
FIG. 32(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 32(a).
Figure 33A:
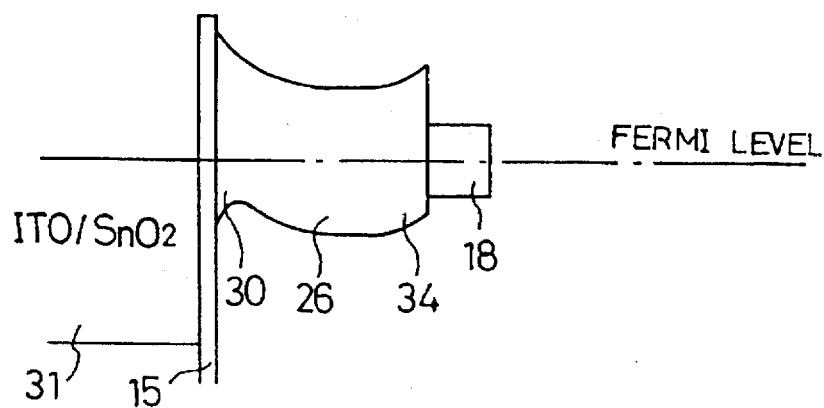
FIG. 33(a) is a band diagram of a light-writing-type liquid crystal element having an element structure of I/Chirp-p/i/p type.
Figure 33B:
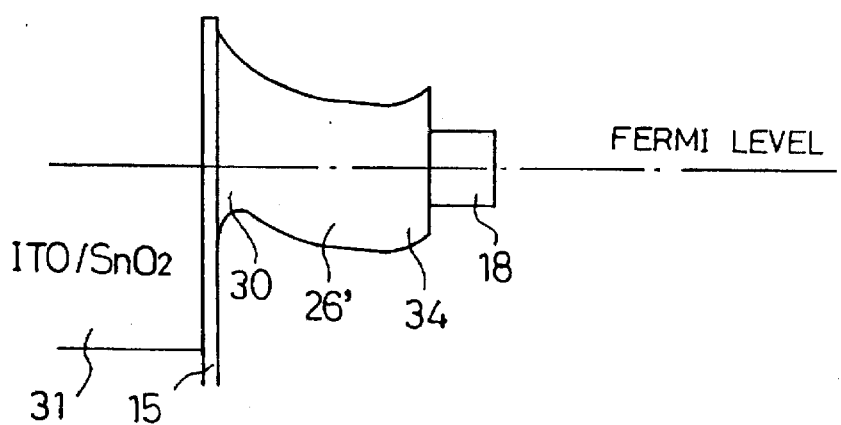
FIG. 33(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 33(a).
Figure 33C:
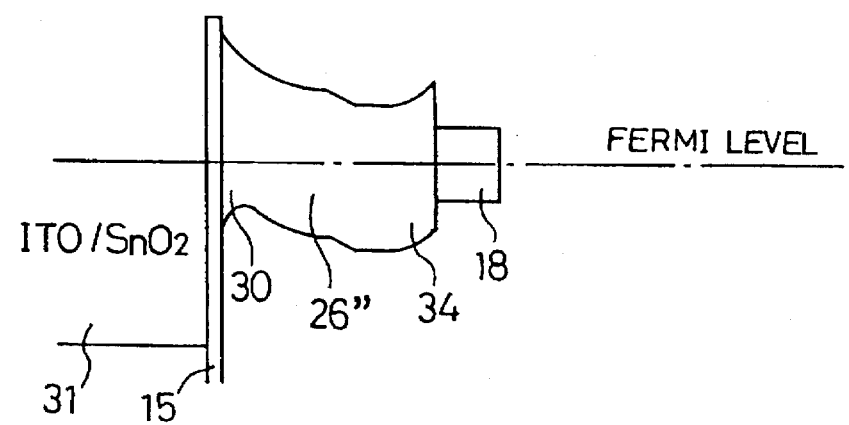
FIG. 33(c) is a band diagram of an element structure which uses a photoconductive layer in which the donor density is increased step by step toward the light-shielding layer side from the transparent electrode side (while acceptor density decreases), instead of the photoconductive layer of the light-writing-type liquid crystal element of FIG. 33(a).
Figure 34A:
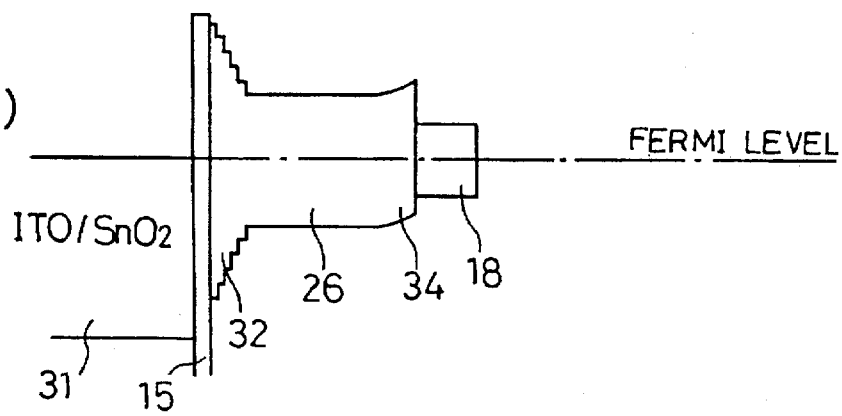
FIG. 34(a) is a band diagram of a light-writing-type liquid crystal element having an element structure I/multi-step-i/i/p type.
Figure 34B:
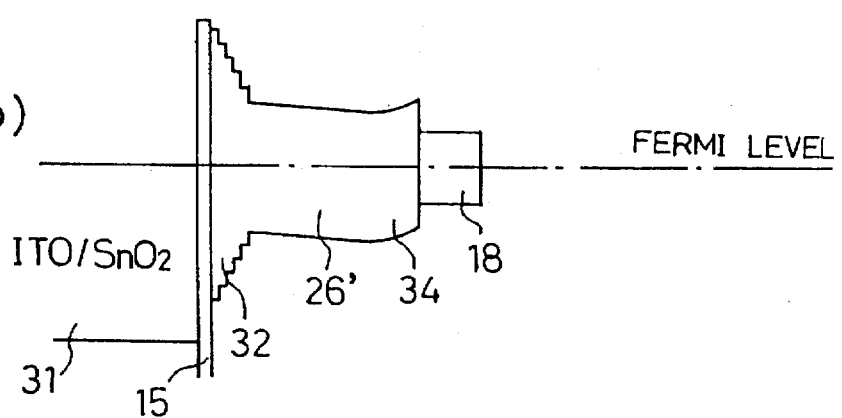
FIG. 34(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 34(a).
Figure 34C:
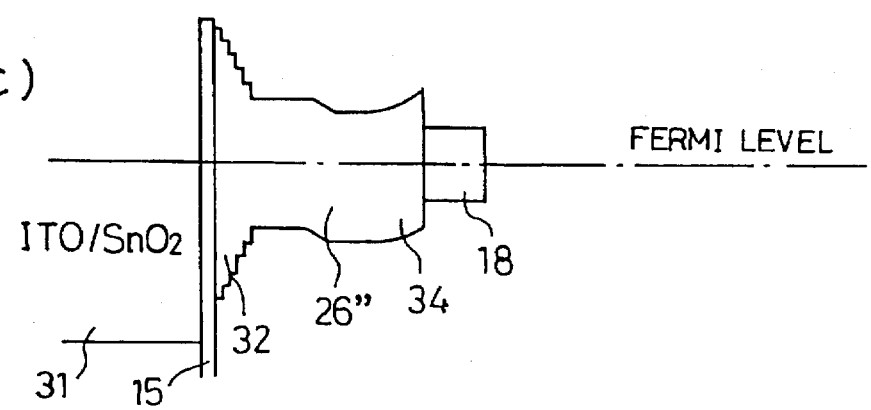
FIG. 34(c) is a band diagram of an element structure which uses a photoconductive layer in which the donor density is Increased step by drop toward the light-shielding layer side from the transparent electrode side (while the acceptor density decreases), instead of the photoconductive layer of the light-writing-type liquid crystal element FIG. 34(a).
Figure 35A:
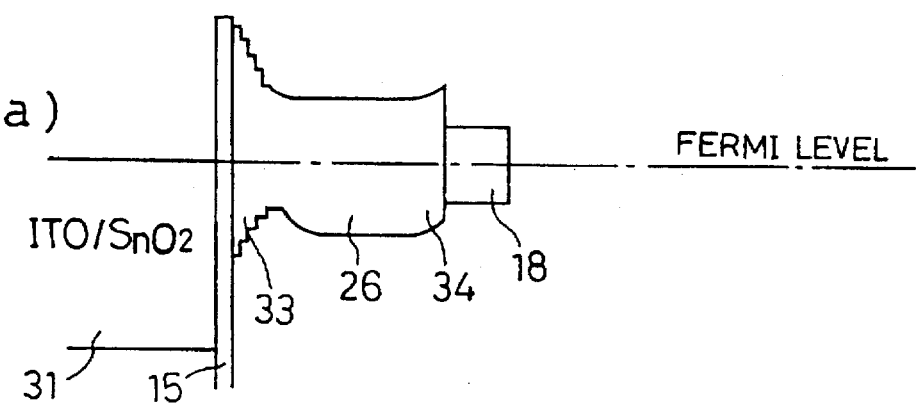
FIG. 35(a) is a band diagram of a light-writing-type liquid crystal element having an element structure of I/multi-step-p/i/p type.
Figure 35B:
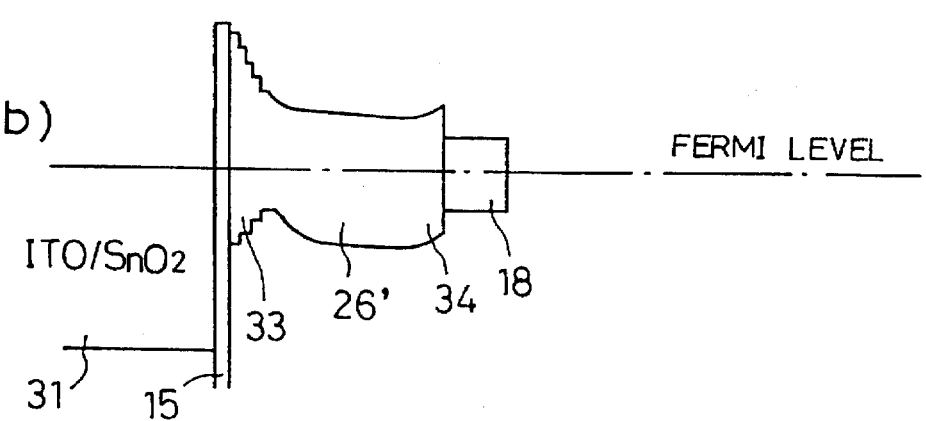
FIG. 35(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 35(a).
Figure 35C:
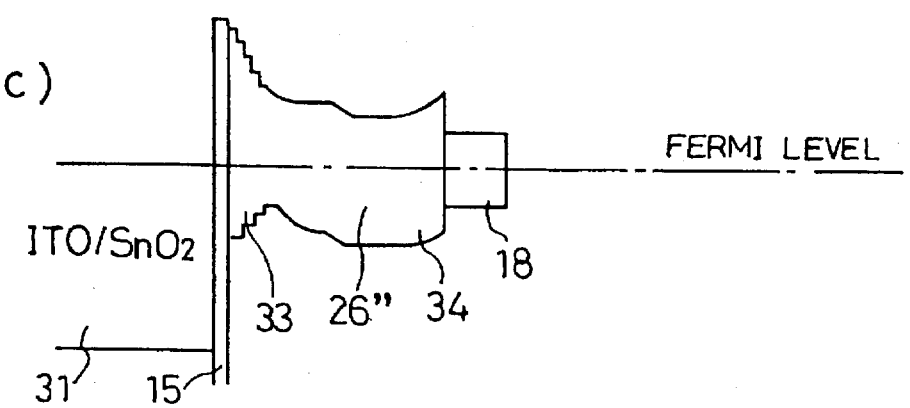
FIG. 35(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 35(a).

Moreover, with respect to the light-writing-type liquid crystal element using, as a carrier-blocking layer on the light-shielding layer 18 side, the p-type semiconductor which has the same energy gap as the i-type semiconductor that forms a photoconductive layer, in addition to the element shown in FIGS. 28(a) through 28(c), the following light-writing-type liquid crystal elements, which have element structures shown in FIGS. 29(a) through 35(c), may be adopted. Here, these element structures correspond to those described in the aforementioned embodiment 3 by reference to FIGS. 20(a) through 22(c) as well as FIGS. 24(a) through 27(c), and in each structure, the p-type semiconductor 34 is used in place of the carrier-blocking layer 17.

Next, an explanation will be given of a film-forming method of an insulator/i/wide p-type element structure (not shown). In this structure, the p-type semiconductor, which has an energy gap that is greater than the i-type semiconductor that forms a photoconductive layer, is used as the carrier-blocking layer on the light-shielding layer 18 side in the element structures shown in FIGS. 28(a) through 28(c). In this case, it is supposed that the p-type wide-gap semiconductor 28 that was used in Embodiment 3 is used as the above-mentioned p-type wide-gap semiconductor.

This semiconductor is made of a-$Si_xC_{1-x}$:H (composition x=0.8), the film thickness is set to 120 Å. Here, the composition and film thickness of the semiconductor are not intended to be limited to the above-mentioned conditions, and other materials may be used as long as they are within a range for allowing a larger photocurrent to flow. Typical film-forming conditions for the P-CVD method are given as follows: $SiH_4$=75 sccm, $CH_4$=10 sccm, $H_2$=100 sccm, and $B_2H_6$=50 sccm ($H_2$ diluted to 100 ppm), used for adding an acceptor, were supplied. These gases were introduced into the reaction furnace so as to accumulate a film, under the conditions of $P_B$=0.92 Torr, RF power=50W, and $T_{sub}$=280° C. The p-type a-$Si_xC_{1-x}$:H film (composition X=0.8), which was accumulated under the above-mentioned conditions and which functions as the p-type semiconductor 34, had an acceptor density of $10^{17}$ $cm^{-3}$.

With the above-mentioned arrangement wherein the p-type semiconductor is provided instead of forming an insulating film as the carrier-blocking layer on the light-shielding layer 18 side of the photoconductive layer, it is possible to obtain the same effects as those in the case where an insulating film is formed as the carrier-blocking layer on the light-shielding layer 18 side of the photoconductive layer.

Further, with respect to a case where the wide-gap p-type semiconductor is used, its explanation will be given later in Embodiment 6. In this case, the thin-film effect of the photoconductive layer (150 Å→120 Å) is obtained, and extra voltage loss can be eliminated.

Moreover, in the elements wherein an insulating material is used as the carrier-blocking layer on the transparent electrode 31 side and the p-type semiconductor is used as the carrier-blocking layer on the light-shielding layer 18 side, as shown in FIGS. 28(a) through 35(c), the following effect is obtained: there is a big difference in refractive index between the transparent electrode 31 and the photoconductive layer. It is difficult to obtain this effect by using a chirp semiconductor due to the limitation in its composition ratio. Here, an insulating layer, which has a refractive index that is located at mid-point between those of the transparent electrode 31 and the photoconductive layer, is interpolated as an intermediate layer; this makes it possible to reduce interface reflection of writing light. Moreover, this layer makes the photoconductive layer thicker so that residual distortion due to heat and residual stress are alleviated; therefore, the contact strength of the films can be improved.

In addition, since the p-type semiconductor is formed by the same method as the i-type semiconductor, it is also possible to simplify the manufacturing process.

[EMBODIMENT 5]

Referring to FIGS. 36(a) through 39(c), the following description will discuss still another embodiment of the present invention.

Here, in the present embodiment, with respect to the respective element structures shown in Embodiments 1, 2 and 3, explanations are given of a light-writing-type liquid crystal element wherein a p-type semiconductor is used in place of the carrier-blocking layer 15 that consists of an insulating material and that is provided on the transparent electrode 31 side.

In the element structures shown in FIGS. 36(a) through 39(c), the p-type semiconductor, which functions as the carrier-blocking layer and which is shown in FIGS. 21(a) through 21(c), FIGS. 22(a) through 22(c), FIGS. 25(a) through 25(c) and FIGS. 27(a) through 27(c), is provided. In other words, the p-type semiconductor has the same energy gap as the i-type semiconductor that forms a photoconductive layer, or has an energy gap that is greater than the i-type semiconductor. Here, the manufacturing methods for these elements are the same as those described in the respective embodiments. Further, any film thickness and any acceptor density may be adopted as long as they are located within the ranges described in the respective Embodiments.

As described above, with the arrangement wherein the p-type semiconductor is used in place of the carrier-blocking layer that is made of an insulating film and that is provided on the transparent electrode 31 side, a depletion layer is formed by the junction between the p-type semiconductor and the i-type semiconductor, on the transparent electrode 31 side of the photoconductive layer. This depletion layer makes an area on the transparent electrode 31 side of the photoconductive layer more highly resistive than an area on the light-shielding layer 18 side. Therefore, the area is subjected to higher voltage than the area on the light-shielding layer 18 side of the photoconductive layer. Further, on the light-shielding layer 18 side, carrier injection during dark time can be blocked by the carrier-blocking layer 17 made of the insulating film. Moreover, distortion components, which exist in the photoconductive layer, can be alleviated by the carrier-blocking layer 17 on the light-shielding layer 18 side. Therefore, in the photoconductive layer, photocurrent increases while dark current decreases, thereby making it possible to improve the photosensitivity as well as the contact strength of the films.

[EMBODIMENT 6]

Figure 44A:
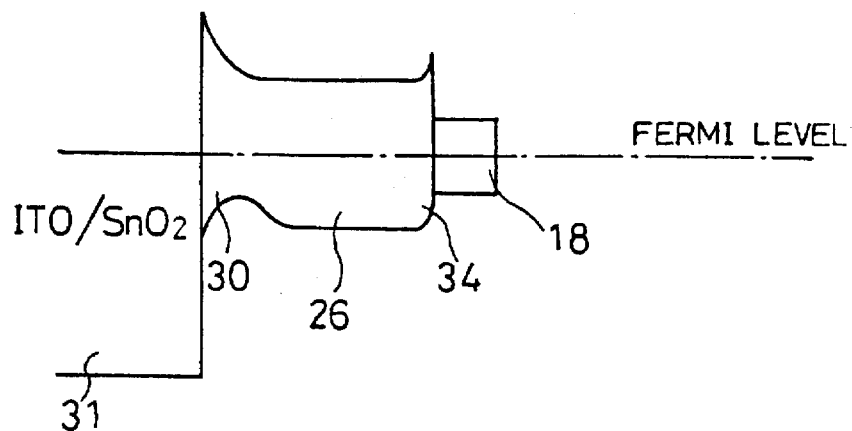
FIG. 44(a) is a band diagram of a light-writing-type liquid crystal element having an element structure of Chirp-p/i/p type.
Figure 44B:
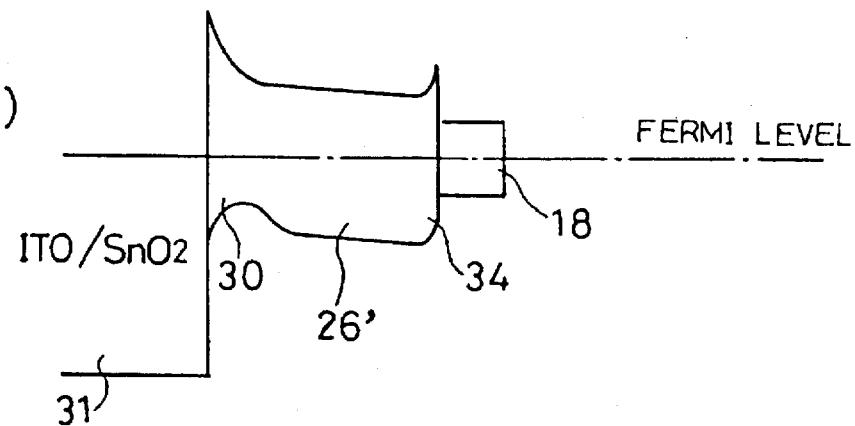
FIG. 44(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 44(a).
Figure 44C:
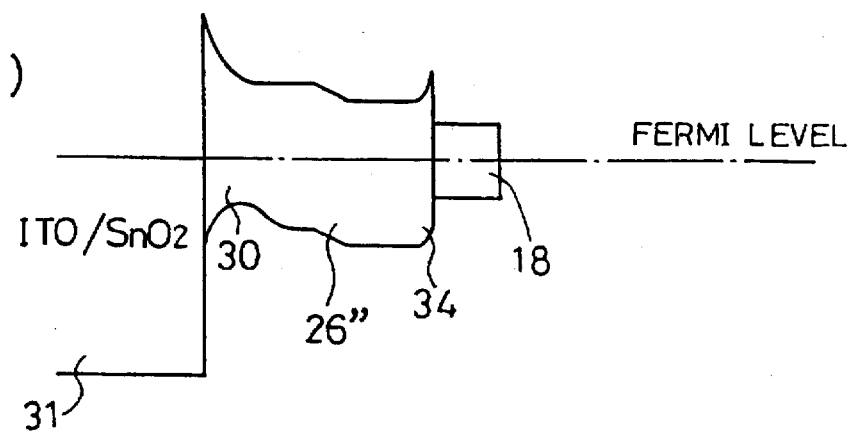
FIG. 44(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 44(a).
Figure 45A:
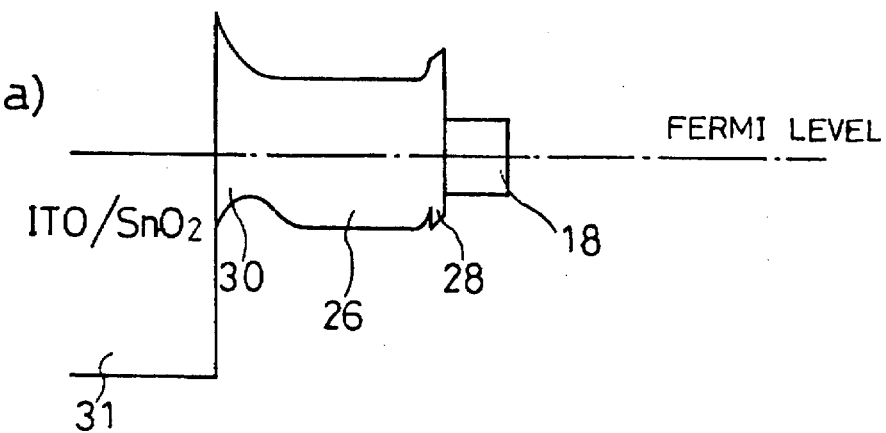
FIG. 45(a) is a band diagram of a light-writing-type liquid crystal element having an element structure of Chirp-p/i/Chirp-p type.
Figure 45B:
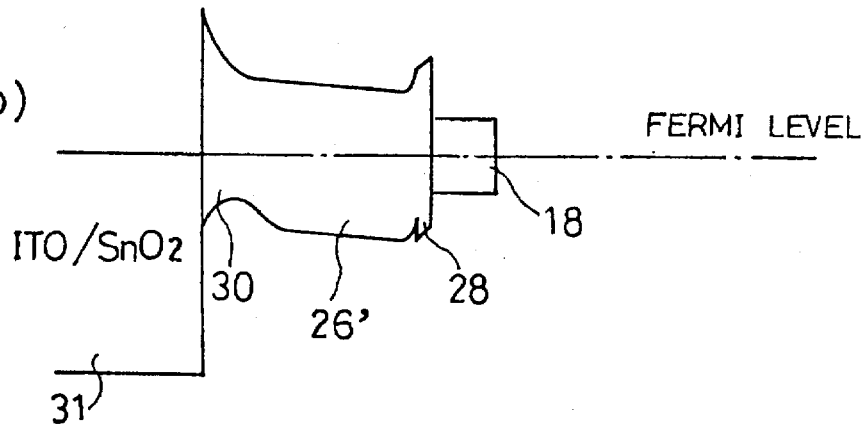
FIG. 45(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 45(a).
Figure 45C:
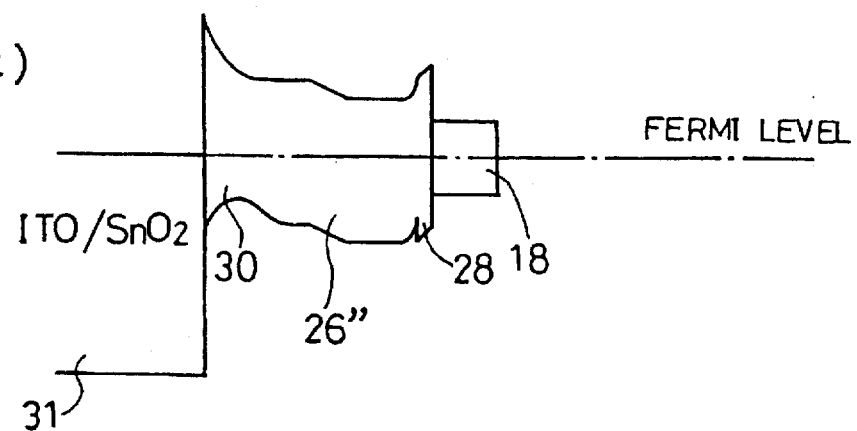
FIG. 45(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 45(a).
Figure 46:
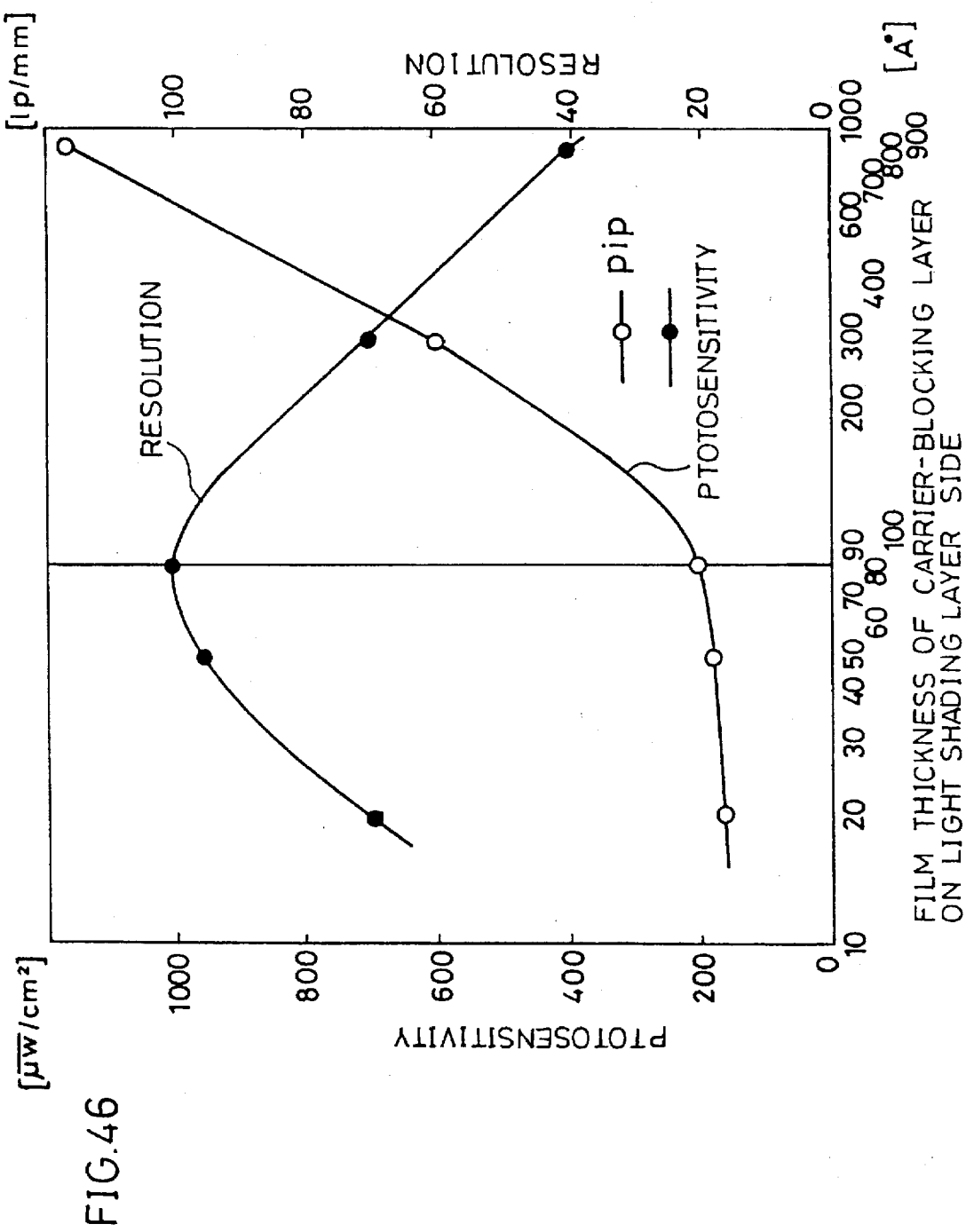
FIG. 46 is a graph that shows the relationships among the film thickness of a carrier-blocking layer on the light-shielding-layer side, the photosensitivity (the light-intensity of writing light required) and the resolution in the photoconductive layer that is provided in the light-writing-type liquid crystal element of FIG. 40(a).

Referring to FIGS. 40(a) through 45(c) as well as FIG. 46 and FIG. 69, the following description will discuss still another embodiment of the present invention.

Figure 36A:
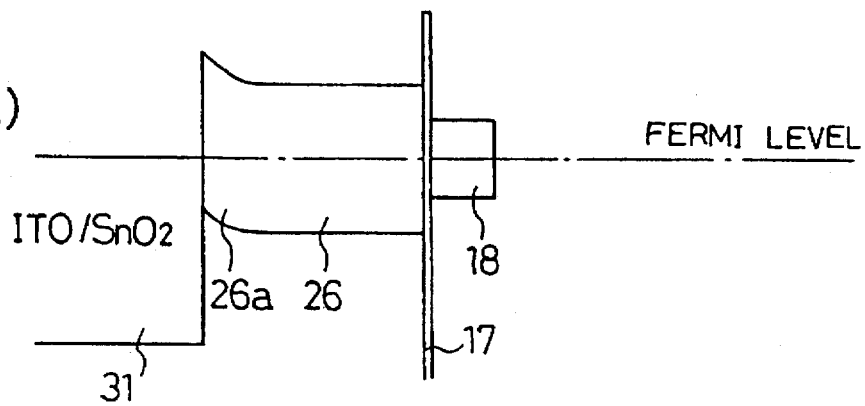
FIG. 36(a) is a band diagram of a light-writing-type liquid crystal element having an element structure of p/i/I type.
Figure 36B:
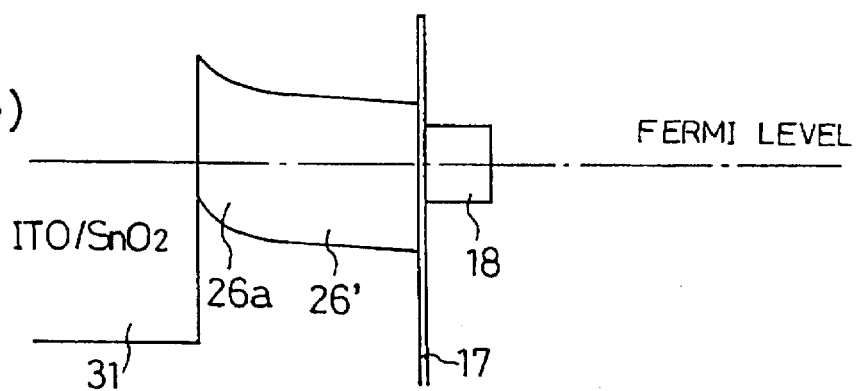
FIG. 36(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 36 (a).
Figure 36C:
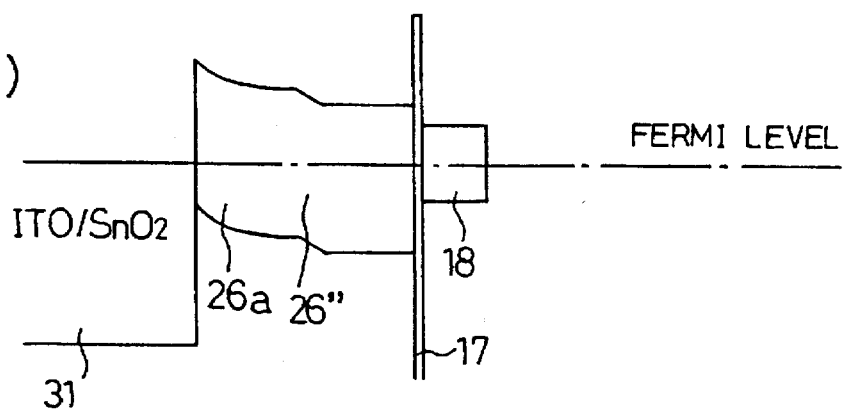
FIG. 36(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 36(a).
Figure 37A:
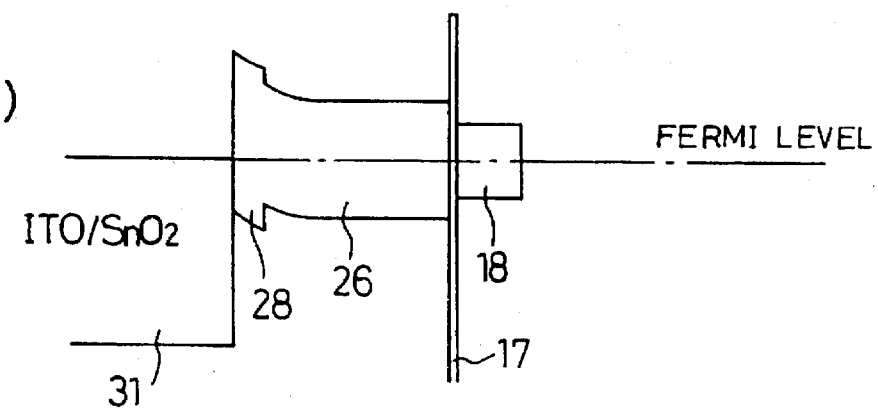
FIG. 37(a) is a band diagram of a light-writing-type liquid crystal element having an element structure of wide-p/i/I type.
Figure 37B:
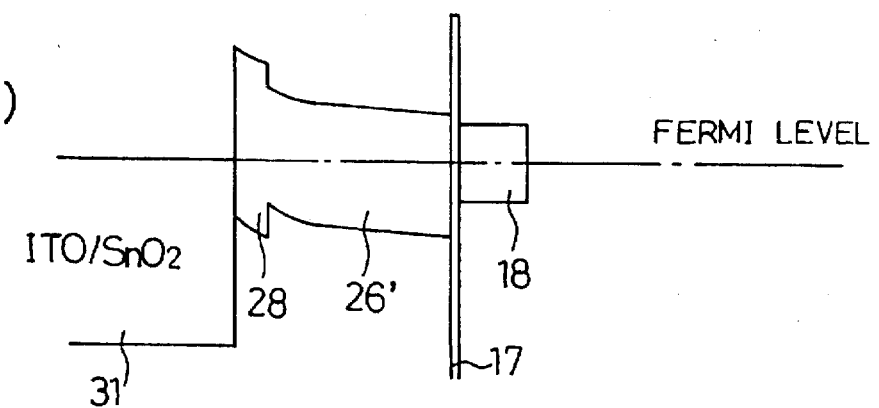
FIG. 37(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 37(a).
Figure 37C:
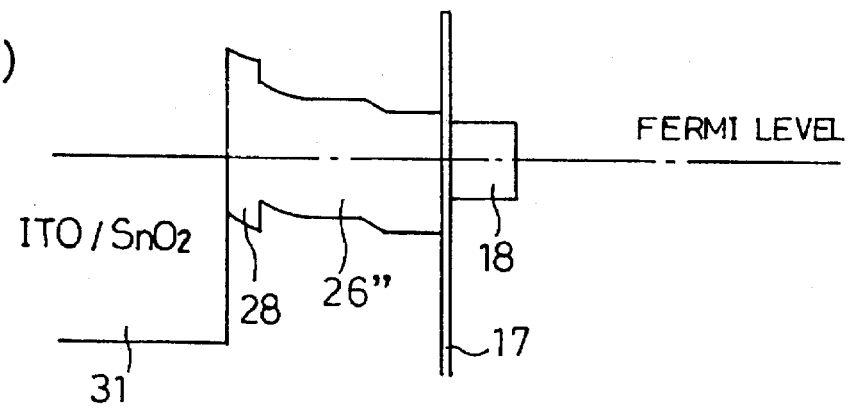
FIG. 37(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 37(a).
Figure 38A:
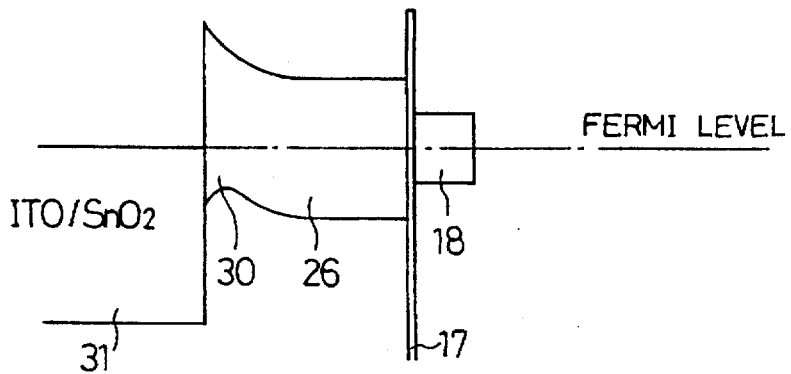
FIG. 38(a) is a band diagram of a light-writing-type liquid crystal element having an element structure of Chirp-p/i/I type.
Figure 38B:
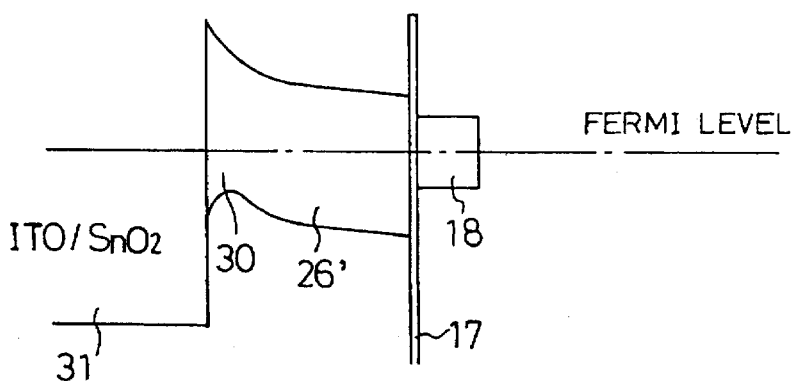
FIG. 38(b) is a band diagram of an element structure which uses a photoconductive layer in which the donor density is continuously increased toward the light-shielding layer side from the transparent electrode side (while acceptor density decreases), instead of the photoconductive layer of the light-writing-type liquid crystal element of FIG. 38(a).
Figure 38C:
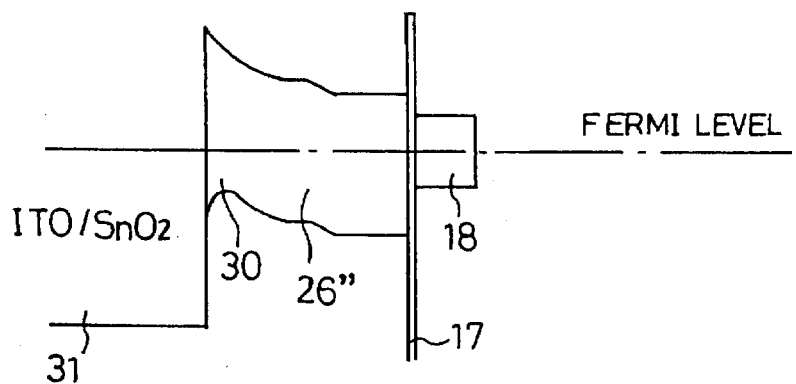
FIG. 38(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 38(a).
Figure 39A:
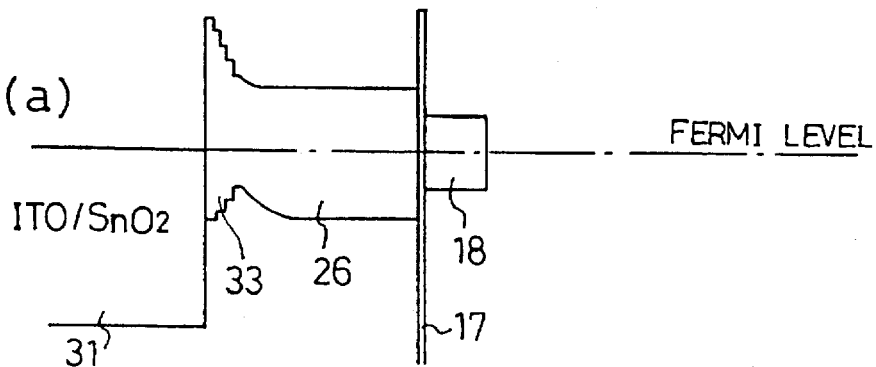
FIG. 39(a) is a band diagram of a light-writing-type liquid crystal element having an element structure of multi-step-Chirp-p/i/I type.
Figure 39B:
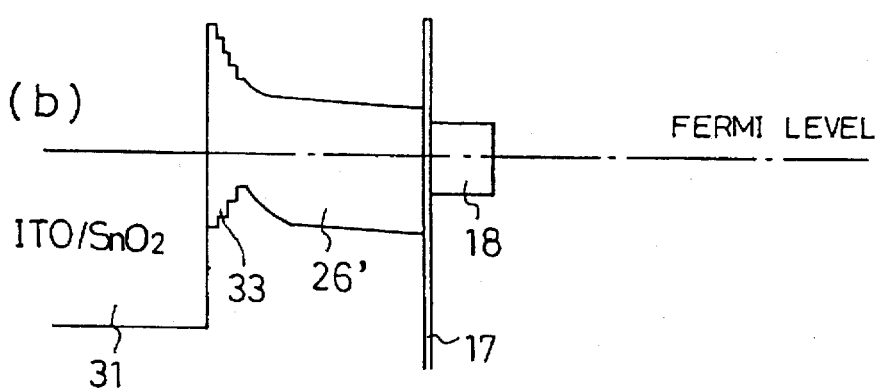
FIG. 39(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 39(a).
Figure 39C:
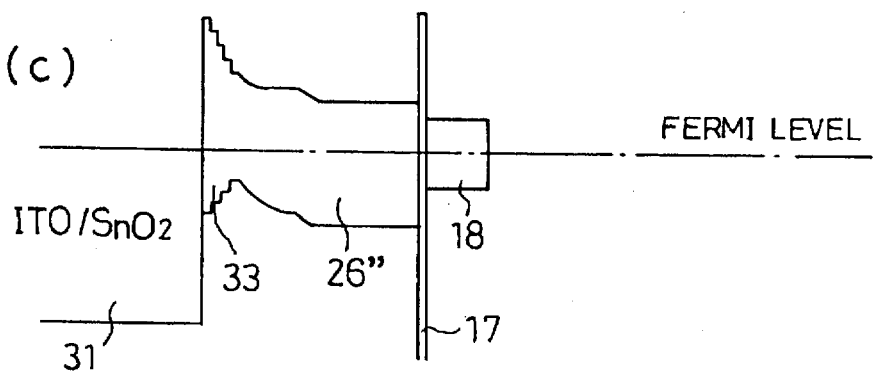
FIG. 39(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 39(a).

As illustrated in FIG. 40(a), in the element structure of the light-writing-type liquid crystal element of the present embodiment, the p-type semiconductor 34 is used in place of the carrier-blocking layer 17 on the light-shielding layer 18 side of the element structure shown in the above-mentioned Embodiment 5 (FIG. 36(a)). Here, the manufacturing method of the light-writing-type liquid crystal element having the above-mentioned element structure is the same as those described in the respective Embodiments, and manufacturing conditions, such as reaction conditions, are not particularly limited, as long as they are set within the ranges described in the respective Embodiments.

The p-type semiconductor 34 has the same energy gap as the i-type semiconductor 26. Further, a p-type semiconductor that has an energy gap greater than that of the i-type semiconductor 26 may be used as the carrier-blocking layer on the light-shielding layer 18 side.

In the case when the p-type semiconductor 34 that has the same energy gap as the i-type semiconductor 26 is used as the carrier-blocking layer on the light-shielding layer 18 side, the film thickness is set to 85 Å when, in the photoconductive layer, the donor density of the i-type semiconductor 26 shows $10^{18}$ cm$^{-3}$ and the acceptor density the p-type semiconductor 34 shows $10^{19}$ cm$^{-3}$.

Further, in the case when the p-type semiconductor (a-Si$_x$C$_{1-x}$:H, composition X=0.8) is used as the carrier-blocking layer on the light-shielding layer 18 side, the film thickness is set to 65 Å when, in the photoconductive layer, the donor density of the i-type semiconductor 26 shows $10^{18}$ cm$^{-3}$ and the acceptor density of the p-type semiconductor 34 shows $10^{19}$ cm$^{-3}$.

The above-mentioned film thicknesses are determined by theoretical values which make it possible for the p-type semiconductors to have energy structures capable of blocking carrier injection from the light-shielding layer 18 during dark time. Here, these theoretical values are derived from the theoretical equations shown in Embodiment 1.

However, when the p-type semiconductor is used as the carrier-blocking layer, the film thickness depends on the donor density and acceptor density of semiconductors that constitute the photoconductive layer. In other words, as the donor density increases, the film thickness of the p-type semiconductor has to be increased, while as the acceptor density increases, the film thickness of the p-type semiconductor can be reduced.

In particular, in the case when the p-type semiconductor that has the same energy gap as the semiconductor constituting the photoconductive layer is used as the carrier-blocking layer, the film-forming process can be carried out by merely increasing dopant gas in the P-CVD method; therefore, it becomes possible to simplify the manufacturing method, compared with the case using the wide-gap semiconductor. Moreover, compared with the case using an insulating film as the carrier-blocking layer on the light-shielding layer 18 side, the p-type semiconductor makes it possible to form the carrier-blocking layer continuously from the film formation of the i-type semiconductor, thereby shortening the manufacturing time.

FIG. 46 shows the relationships among the film thickness of the carrier-blocking layer on the light-shielding layer 18 side, the photosensitivity and the resolution. Here, in order to give a general example wherein the p-type semiconductor is used as the carrier-blocking layer, the relationships among the film thickness of the carrier-blocking layer on the light-shielding layer 18 side, the photosensitivity (the light intensity of writing light required) and the resolution are shown, in the case when the film thickness of the p-type semiconductor is set to 300 Å as the carrier-blocking layer on the transparent electrode 31 side in the element structure shown in FIG. 40(a).

FIG. 46 indicates that the photosensitivity abruptly drops when the carrier-blocking layer on the light-shielding layer 18 side becomes greater than 85 Å. This coincides with the aforementioned theoretical value that is derived from the designing method of the photoconductive layer, and if the film thickness that is greater than the theoretical value is used, an extra depletion layer is formed on the light-shielding layer 18 side and a voltage loss is caused by the depletion layer.

it is also indicated that the resolution marks a maximum when the carrier-blocking layer on the light-shielding layer 18 side is set to 85 Å. This also coincides with the results that are directed from the designing method, and the film thickness, when set to not more than the theoretical value, tends to cause carrier injection from the light-shielding layer 18 side, resulting in diffusion of carriers in lateral directions. Moreover, the film thickness, when set to not less than the theoretical value, fails to apply sufficient voltage to the photoconductive layer in which carriers are generated by writing light the light-shielding layer 18 side, because of a voltage loss caused by an extra depletion layer that is formed on the light-shielding layer 18 side.

The above description is summarized as follows: It is possible to prevent inflow of carriers from the light-shielding layer 18 and also to allow the incident area of writing light to receive a higher voltage than the liquid crystal layer side by designing the film thickness of the carrier-blocking layer on the light-shielding 18 side as described above. In other words, the optimal theoretical value prevents diffusion in lateral directions due to inflow of carriers. Further, the voltage loss caused by a depletion layer generated on the light-shielding layer 18 side can be suppressed to a minimum, voltage is efficiently applied to a depletion layer generated in the incident area of writing light, and photocurrent can be increased.

Here, although the above explanation was given of the case where the donor density of the i-type semiconductor 26 is uniform as shown in FIG. 40(a), the donor density may be set so that it becomes greater on the light-shielding layer 18 side than on the transparent electrode 31 side in order to allow photocurrent to flow more effectively.

In order to differentiate the donor density in the a-Si:H film, which functions as the i-type semiconductor 26, between the transparent electrode 31 side and the light-shielding layer 18 side, two methods are proposed as described in the aforementioned Embodiment 2: the method in which the donor density is increased continuously and the method in which it is increased step by step.

Figure 40B:
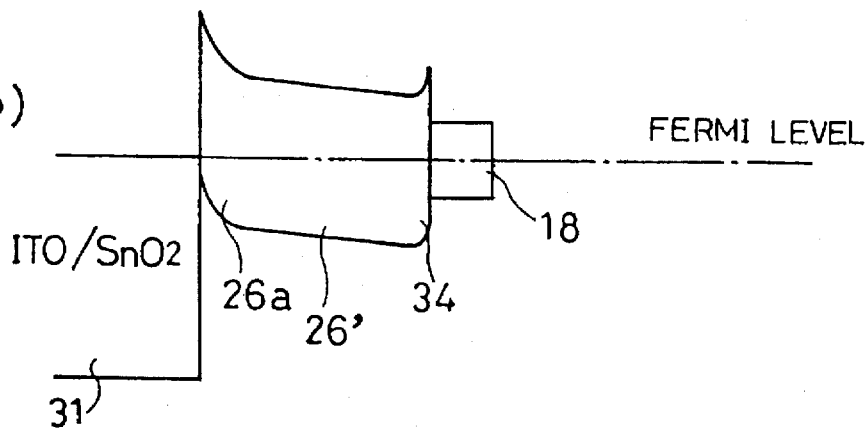
FIG. 40(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 40(a).
Figure 40C:
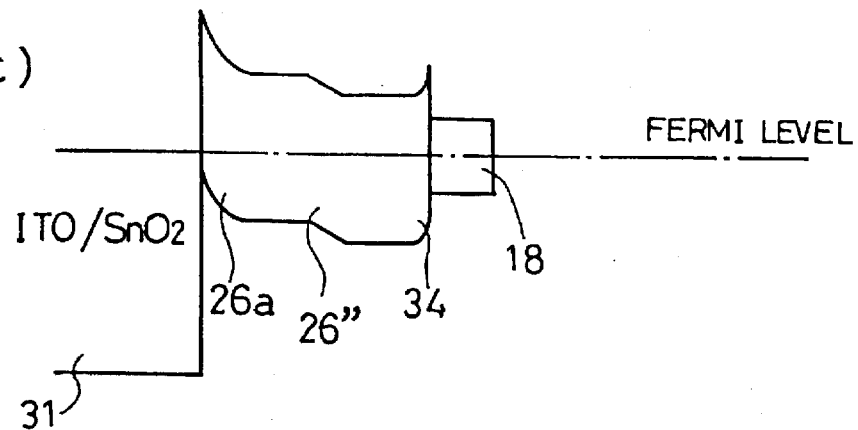
FIG. 40(c) is a band diagram of an element structure which uses a photoconductive layer in which the donor density is increased step by step toward the light-shielding layer side from the transparent electrode side (while acceptor density decreases), instead of the photoconductive layer of the light-writing-type liquid crystal element FIG. 40(a).

In the case where the donor density is continuously increased from the transparent electrode 31 side toward the light-shielding layer 18 side, the energy-band diagram shows that the donor density in the i-type semiconductor 26' portion continuously reduces toward the light-shielding layer 18, as shown in FIG. 40(b). Further, in the case where the donor density is increased from the transparent electrode 31 side toward the light-shielding layer 18 side step by step, the energy-band diagram shows that the donor density in the i-type semiconductor 26" portion reduces toward the light-shielding layer 18 step by step, as shown in FIG. 40(c).

Moreover, in the present embodiment, an element structure, which has a p-type semiconductor 26a, an i-type semiconductor 26 and a p-type semiconductor 28 that are stacked from the transparent electrode 31 side, is used as the photoconductive layer, as shown in FIG. 40, that is, the pip-type element structure is used. However, other element structures, such as shown in FIGS. 41(a) through 45(c), may be adopted.

Figure 41A:
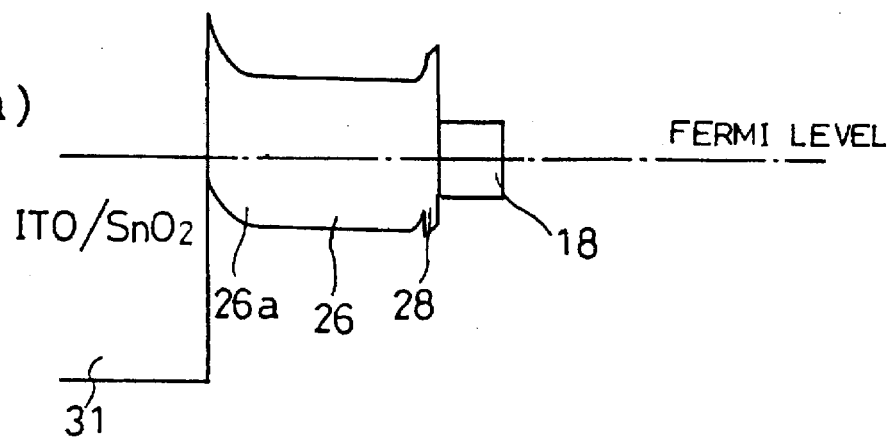
FIG. 41(a) is a band diagram of a light-writing-type liquid crystal element having an element structure of p/i/wide-p type.
Figure 41B:
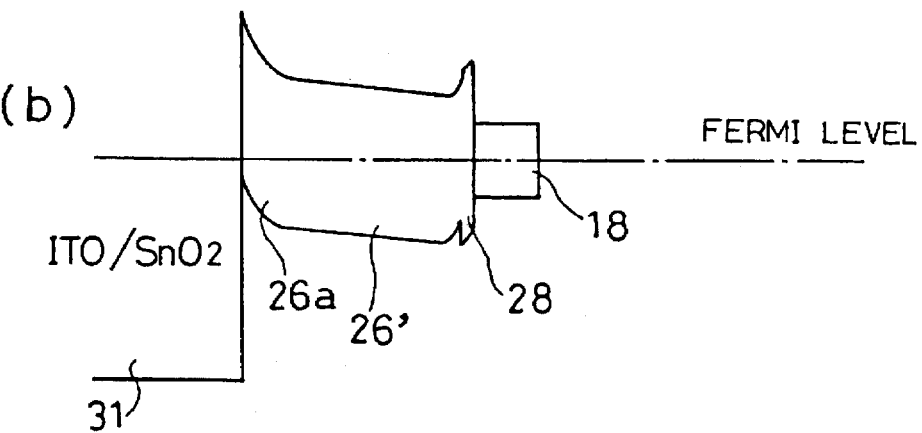
FIG. 41(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 41(a).
Figure 41C:
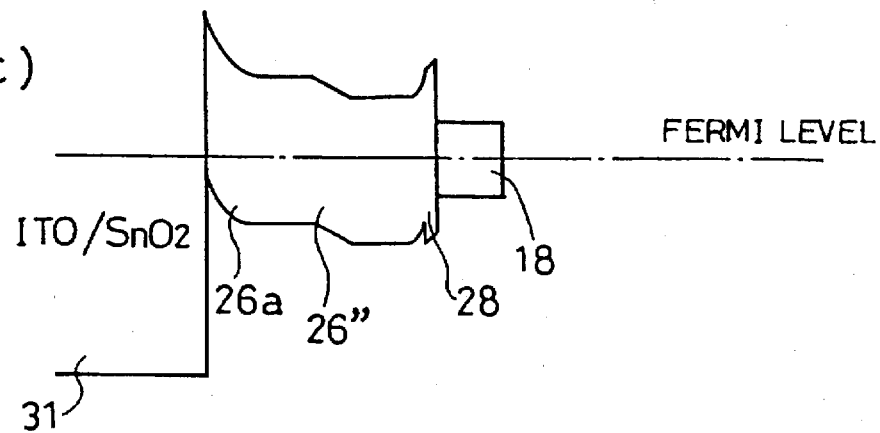
FIG. 41(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 41(a).
Figure 42B:
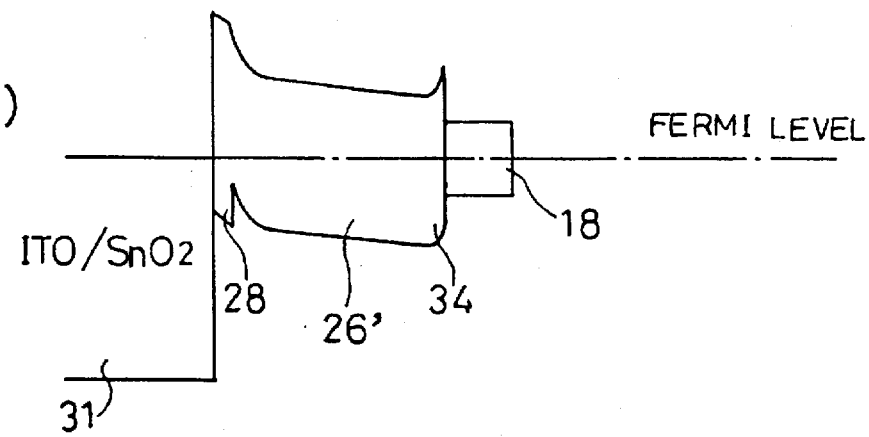
FIG. 42(b) is a band diagram of an element structure which uses a photoconductive layer an which the donor density is continuously increased toward the light-shielding layer side from the transparent electrode side (while the acceptor density decreases), instead of the photoconductive layer of the light-writing-type liquid crystal element of FIG. 42(a).
Figure 42C:
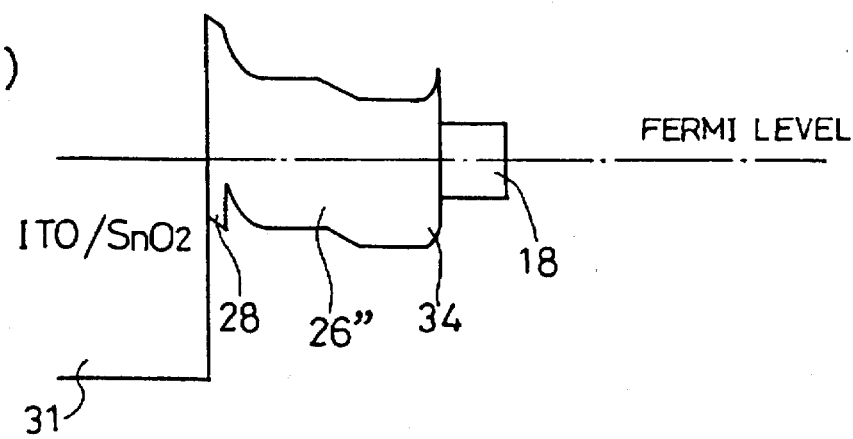
FIG. 42(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 42(a).
Figure 43A:
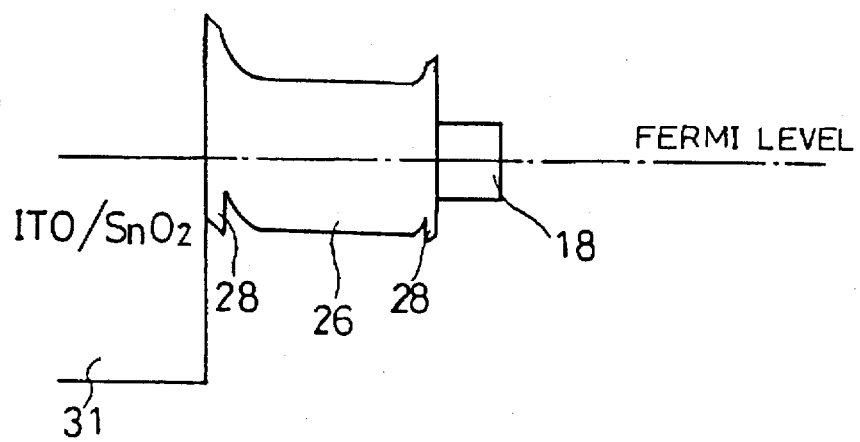
FIG. 43(a) is a band diagram of a light-writing-type liquid crystal element having an element structure of wide-p/i/wide-p type.
Figure 43B:
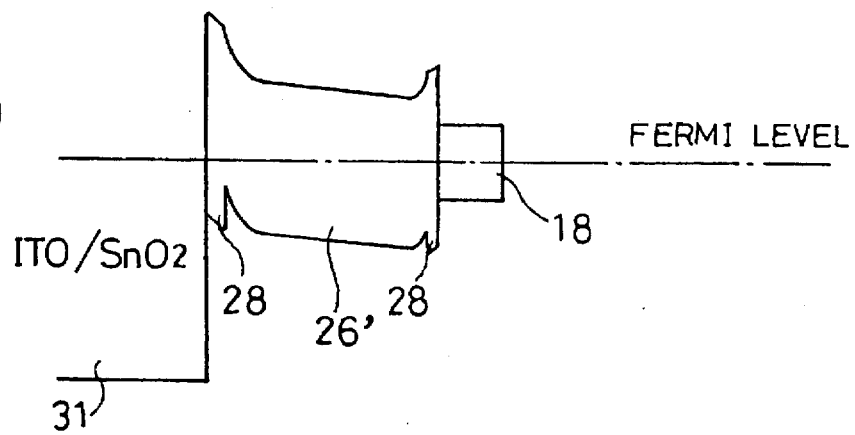
FIG. 43(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 43(a).
Figure 43C:
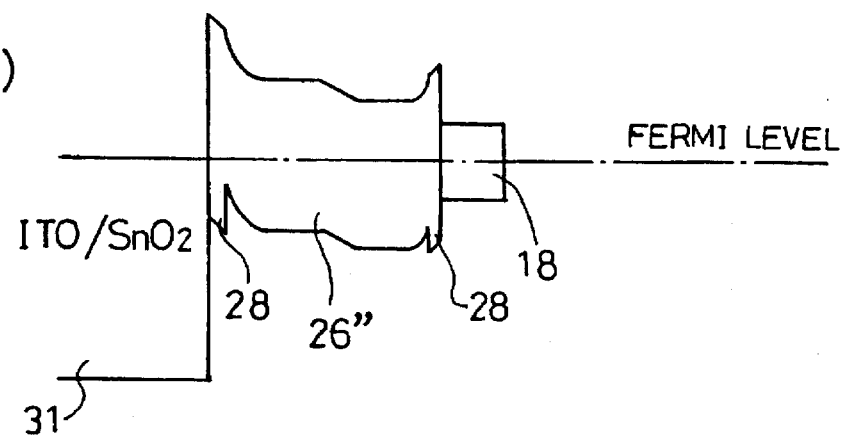
FIG. 43(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 43(a).

More specifically, FIGS. 41(a) through 41(c) show a p/i/wide-p type element structure wherein the p-type semiconductor 26a, the i-type semiconductor 26 and the p-type wide-gap semiconductor 28 are stacked, and FIGS. 42(a) through 42(c) show a wide-p/i/p type element structure wherein the p-type wide-gap semiconductor 28, the i-type semiconductor 26 and the p-type semiconductor 26a are stacked. Further, FIGS. 43(a) through 43(c) show a wide-p/i/wide-p type element structure wherein the p-type wide-gap semiconductor 28, the i-type semiconductor 26 and the p-type wide-gap semiconductor 28 are stacked; and FIGS. 44(a) through 44(c) show a chirp-p/i/p type element structure wherein the p-type chirp semiconductor 30, the i-type semiconductor 26 and the p-type semiconductor 26a are stacked. Moreover, FIGS. 45(a) through 45(c) show a chirp-p/i/wide-p type element structure wherein the p-type chirp semiconductor 30, the i-type semiconductor 26 and the p-type wide-gap semiconductor 28 are stacked.

Here, FIGS. 41(a), 42(a), ... 45(a) show a state where the donor density of the i-type semiconductor 26 is uniform; FIGS. 41(b), 42(b), ... 45(b) show a state where the donor density of the i-type semiconductor 26 is continuously increased from the transparent electrode 31 side toward the light-shielding layer 18 side; and FIGS. 41(c), 42(c), ... 45(c) show a state the donor density of the i-type semiconductor 26 is increased from the transparent electrode 31 side toward the light-shielding layer 18 side step by step.

FIG. 69 shows the relationship between the film thickness of the carrier-blocking layer on the light-shielding layer 18 side and the photosensitivity in the case when a p-type wide-gap semiconductor and a p-type semiconductor are respectively used as the carrier-blocking layer on the light-shielding layer 18 side.

FIG. 69 indicates that the use of the p-type wide-gap semiconductor as the carrier-blocking layer on the light-shielding layer 18 side makes the film thickness of the carrier-blocking layer thinner than the use of the p-type semiconductor as the carrier-blocking layer on the light-shielding layer 18 side (from 85 Å to 65 Å). Since this arrangement makes it possible to further narrow the depletion layer formed by the carrier-blocking layer on the light-shielding 18 side, the voltage loss can be reduced, and the photosensitivity and the resolution can be improved.

In particular, in the case of the pip-type element structures shown in FIGS. 40(a)–40(c) through 45(a)–45(c), a film-forming process can be carried out by merely changing the gas system, using a single manufacturing apparatus; therefore, major effects can be obtained by simplifying the manufacturing method.

Additionally, although not shown in Figures, other element structures, which use, for example, the p-type multi-step chirp semiconductor, the p-type wide-gap continuous-chirp semiconductor or the p-type wide-gap multi-step chirp semiconductor, may be adopted, and these structures also provide the same effects as the above-mentioned element structures of FIGS. 40(a) through 45(c).

In the above-mentioned Embodiments 1 through 6, explanations were given of the element structures wherein carrier-blocking layers are installed on both sides of the i-type semiconductor in the case when either an insulating film or a p-type semiconductor is used as the carrier-blocking layer. In the following Embodiments 7 through 10, explanations will be given of light-writing-type liquid crystal elements having an element structure wherein the carrier-blocking layer on the light-shielding layer side is installed inside the photoconductive layer.

[EMBODIMENT 7]

Referring to FIGS. 47(a) through 52(c), the following description will discuss still another embodiment of the present invention.

Figure 47A:
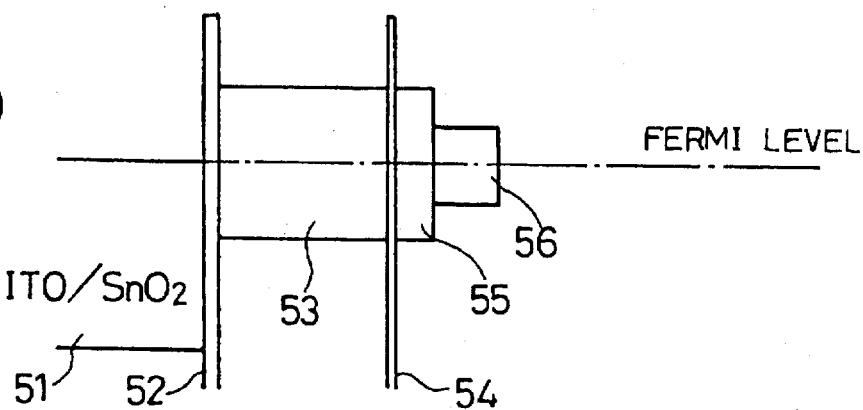
FIG. 47(a) is a band diagram of a light-writing-type liquid crystal element having an element structure of I/i/intermediate-I/i type, wherein a carrier-blocking layer on the light-shielding side is formed at mid-point in a photoconductive layer.

As illustrated in FIG. 47(a), in the element structure of the light-writing-type liquid crystal element of the present embodiment, the carrier-blocking layer 17, which is provided on the light-shielding layer 18 side in the element structure shown in FIG. 1 of Embodiment 1, is formed at mid-point in the photoconductive layer 16.

The following description will discuss a manufacturing method of the light-writing-type liquid crystal element having the above-mentioned element structure.

First, on a glass substrate that serves as the insulating transparent substrate, an $In_2(Sn)O_3$ film with a thickness of 1000 Å and a $SnO_2$:Sb film with a thickness of 300 Å are successively stacked by using the sputtering method so as to form a transparent electrode 51. On this is deposited a carrier-blocking layer 52 with a thickness of 850 Å that is made of $TiO_2$ by using the electron beam (EB) vapor deposition method under conditions: base pressure $(P_B)$ $=1 \times 10^{-6}$ Torr, vapor deposition rate (R)=5 Å/s, and substrate temperature $(T_S)$=300° C.

Next, an a-Si:H film 53, which is an amorphous silicon hydride layer, is accumulated as follows by using the plasma CVD method (chemical vapor phase growth method) with a thickness of 6.0 μm. More specifically, the a-Si:H film 53 is formed as follows: $SiH_4$ gas is directed into a reaction furnace, and decomposed using glow discharge so as to accumulate an a-Si:H layer of 6.0 μm.

Next, on this a-Si:H film 53, a carrier-blocking layer 54 made of $TiO_2$ was vapor-deposited by using the EB deposition method with a thickness of 350 Å under the same conditions as the vapor deposition of the carrier-blocking layer 52.

Then, on this carrier-blocking layer 54, an a-Si:H film 55, which is an amorphous silicon hydride layer, is accumulated by using the plasma CVD method (chemical vapor phase growth method) with a thickness of 4.0 μm in the same manner as the a-Si:H film 53.

Further, on this a-Si:H film 55, a light-shielding layer (a-SiGe:H film) 56 was accumulated by using the plasma CVD method with a thickness of 5000 Å. The film-forming method of the light-shielding layer 56 is the same as that of Embodiment 1.

As described above, the present embodiment has the element structure wherein the carrier-blocking layer 54 on the light-shielding layer 56 side is formed inside the a-Si:H film that constitutes the photoconductive layer, and has an energy structure capable of preventing carrier injection from the light-shielding layer 56 during dark time, in the same manner as the above-mentioned respective Embodiments.

Therefore, the carrier-blocking layer 54 needs to be installed at a position which does not overlap a depletion layer that is formed on the transparent electrode 51 side in the a-Si:H film and which allows the amount of carriers generated by writing light that is incident from the transparent electrode 51 side to become sufficiently small.

Moreover, the donor density of the a-Si:H film corresponding to the area at which the carrier-blocking layer 54 is formed is preferably set to be greater than the donor density of the depletion layer formed on the transparent electrode 51 side. Since this arrangement reduces the voltage loss, the photosensitivity is improved and photocurrent is allowed to flow well.

Here, although the above explanation was given of the case where the donor density of each of the i-type semiconductor 53 and the i-type semiconductor 55 is uniform as shown in FIG. 47(a), the donor density of each of the i-type semiconductor 53 and the i-type semiconductor 55 may be set so that it becomes greater on the light-shielding layer 56 side than on the transparent electrode 51 side in order to allow photocurrent to flow more effectively.

In order to differentiate the donor density in the a-Si:H film, which functions as each of the i-type semiconductor 53 and the i-type semiconductor 55, between the transparent electrode 51 side and the light-shielding layer 56 side, two methods are proposed as described in the aforementioned Embodiment 2: the method in which the donor density is increased continuously and the method in which it is increased step by step.

Figure 47B:
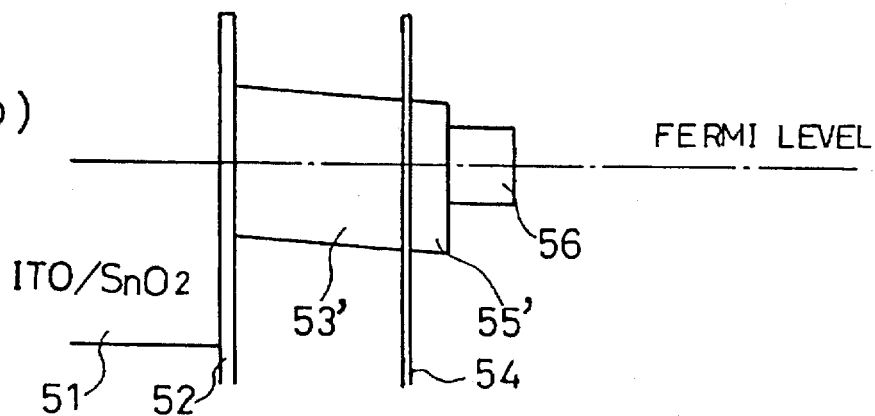
FIG. 47(b) is a hand diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 47(a).
Figure 47C:
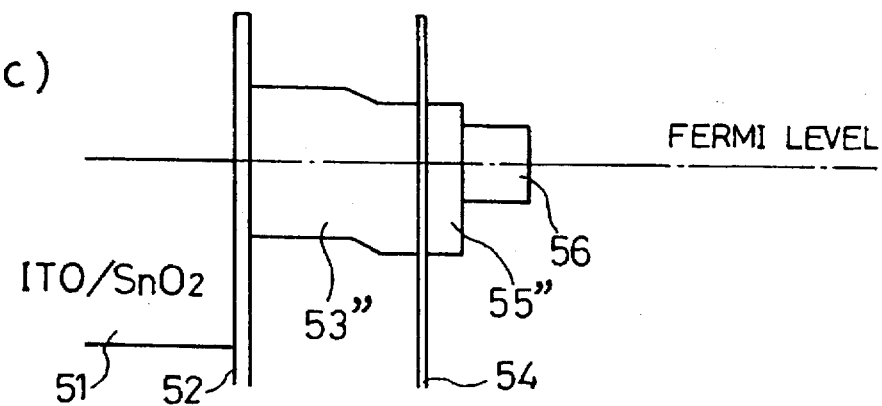
FIG. 47(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 47(a).

In the case where the donor density is continuously increased from the transparent electrode 51 side toward the light-shielding layer 56 side, the energy level shows that the donor density in each of the i-type semiconductor 53' and 55' portions continuously reduces toward the light-shielding layer 56, as shown in FIG. 47(b). Further, in the case where the donor density is increased from the transparent electrode 51 side toward the light-shielding layer 56 side step by step, the energy level shows that the donor density in each of the i-type semiconductor 53" and 55" portions reduces toward the light-shielding layer 56 step by step, as shown in FIG. 47(c).

Moreover, in the present embodiment, an element structure, which has an insulating film, a carrier-blocking layer (I)54, the i-type semiconductor 53, the carrier-blocking layer (I)52, and the i-type semiconductor 55 that are stacked from the transparent electrode 51 side, is used as the photoconductive layer, as shown in FIG. 47, that is, the I/i/intermediate I/i type element structure is used. However, other element structures, such as shown in FIGS. 48(a) through 52(c), may be adopted.

Figure 48A:
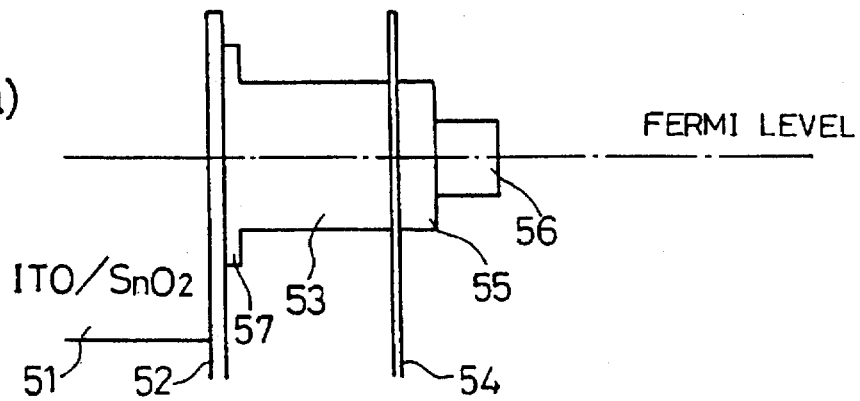
FIG. 48(a) is a band diagram of a light-writing-type liquid crystal element having an element structure of I/wide-i/i/intermediate-I/i type.
Figure 48B:
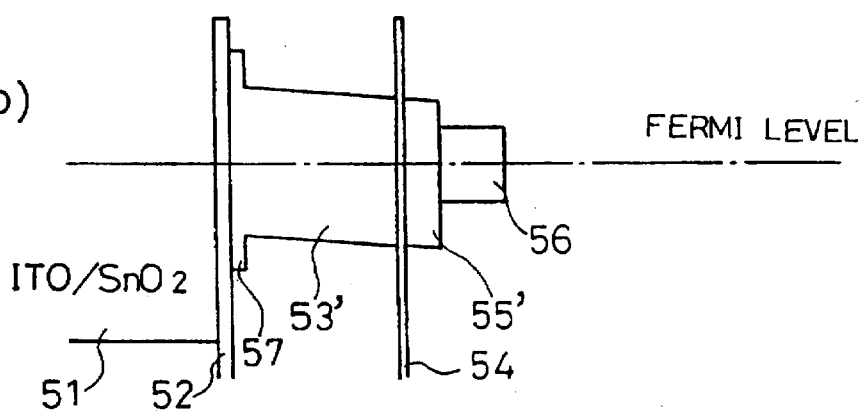
FIG. 48(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 48(a).
Figure 48C:
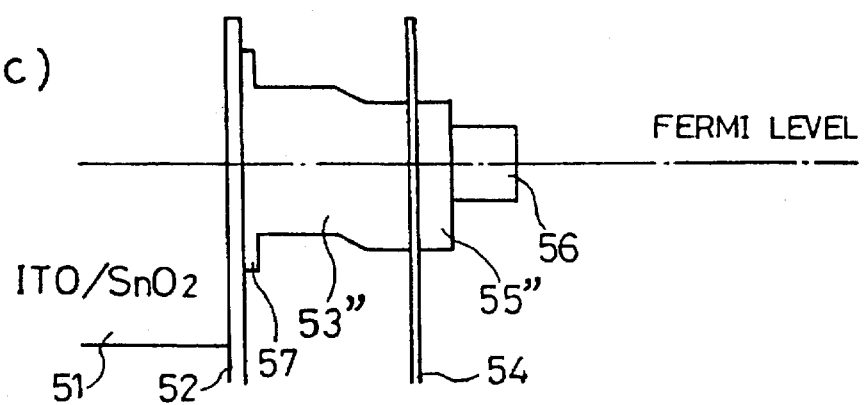
FIG. 48(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 48(a).
Figure 49A:
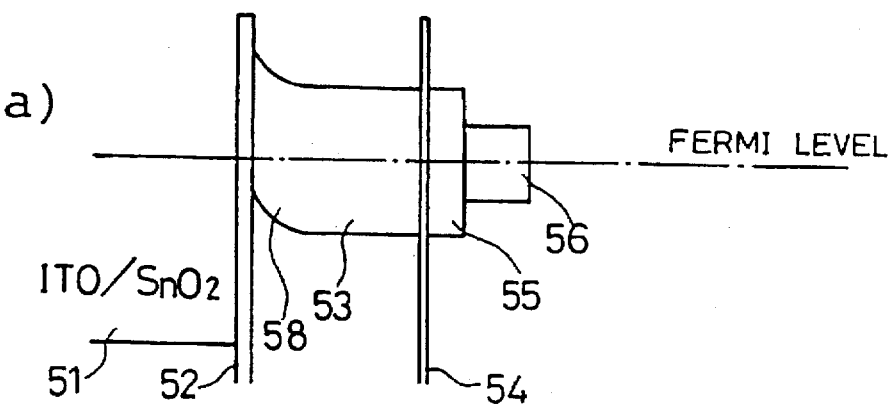
FIG. 49(a) is a band diagram of a light-writing-type liquid crystal element having an element structure of I/p/i/intermediate-I/i type.
Figure 49B:
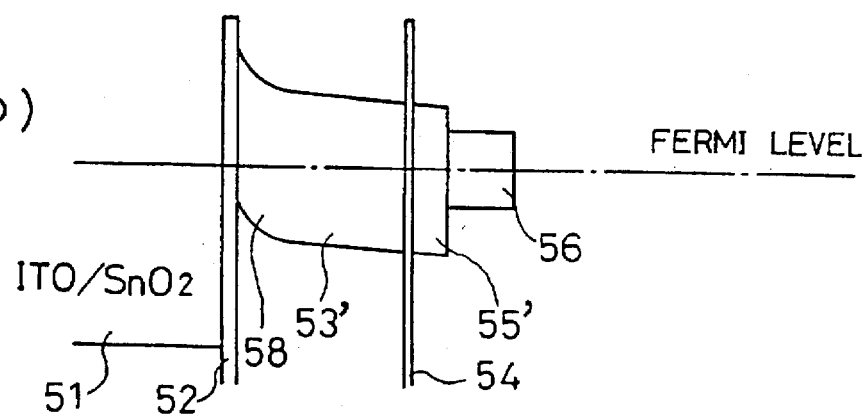
FIG. 49(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 49(a).
Figure 49C:
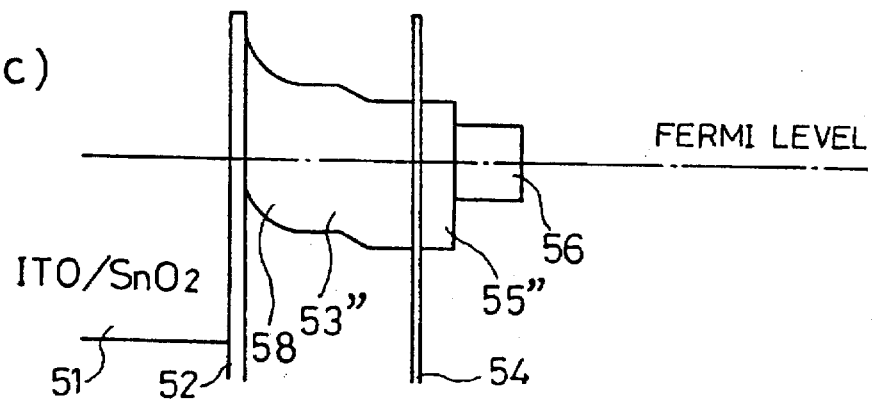
FIG. 49(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 49(a).
Figure 50A:
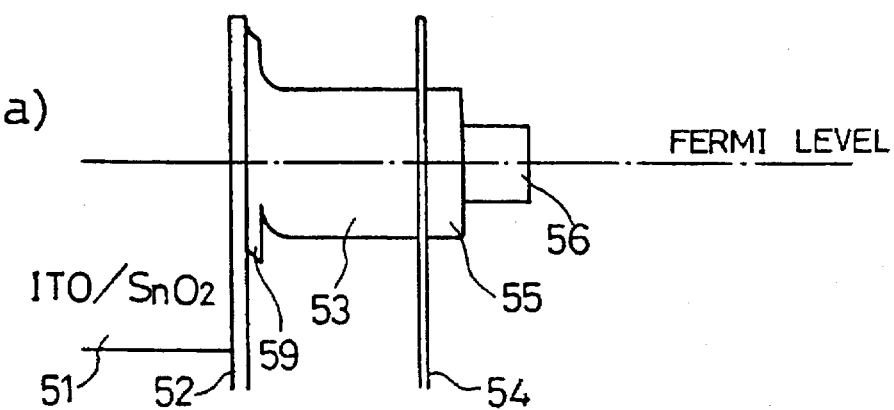
FIG. 50(a) is a band diagram of a light-writing-type liquid crystal element having an element structure of I/wide-p/i/intermediate-I/i type.
Figure 50B:
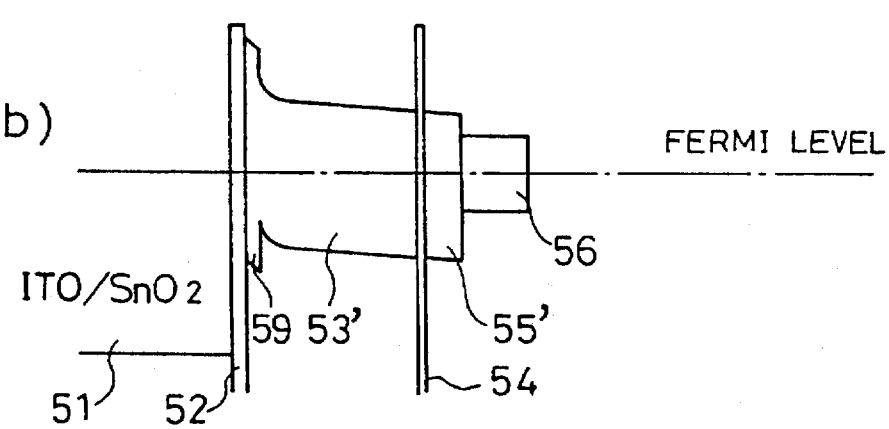
FIG. 50(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 50(a).
Figure 50C:
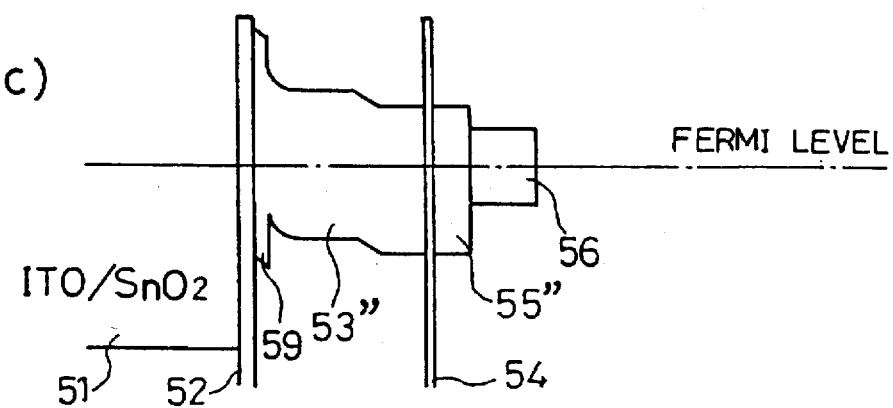
FIG. 50(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 50(a).
Figure 51A:
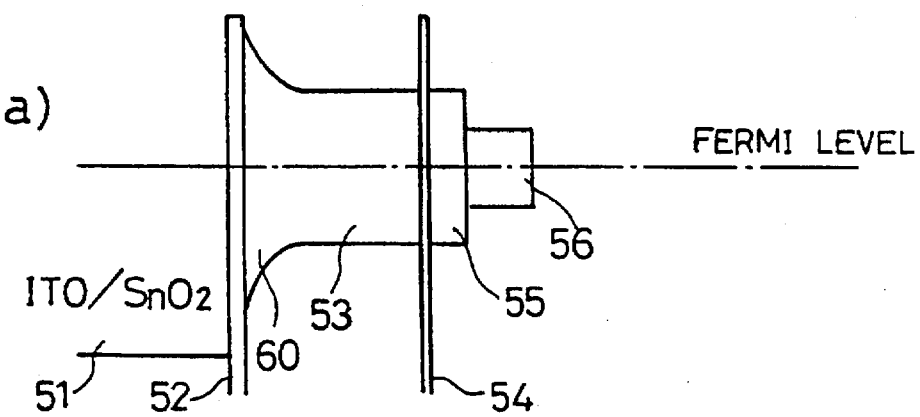
FIG. 51(a) is a band diagram of a light-writing-type liquid crystal element having an element structure of I/Chirp-i/i/intermediate-I/i type.
Figure 51B:
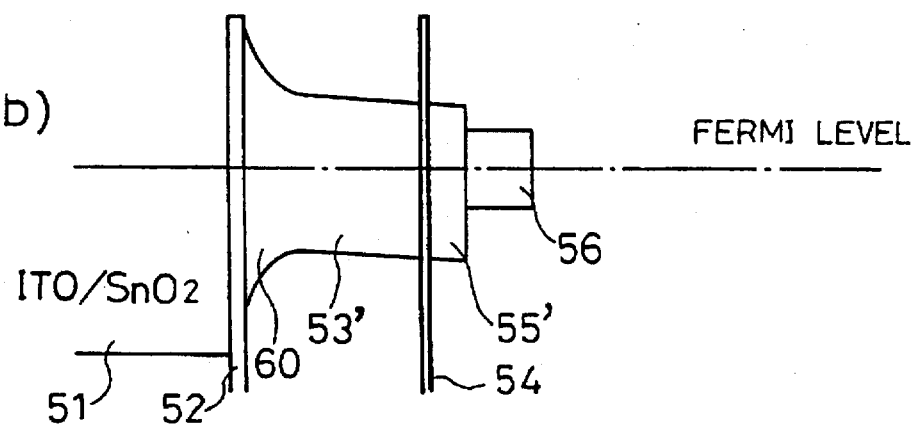
FIG. 51(b) is a band diagram of an element structure which uses a photoconductive layer in which the donor density is continuously increased toward tho light-shielding layer side from the transparent electrode side (while the acceptor density decreases), instead of the photoconductive layer of the light-writing-type liquid crystal element of FIG. 51(a).
Figure 51C:
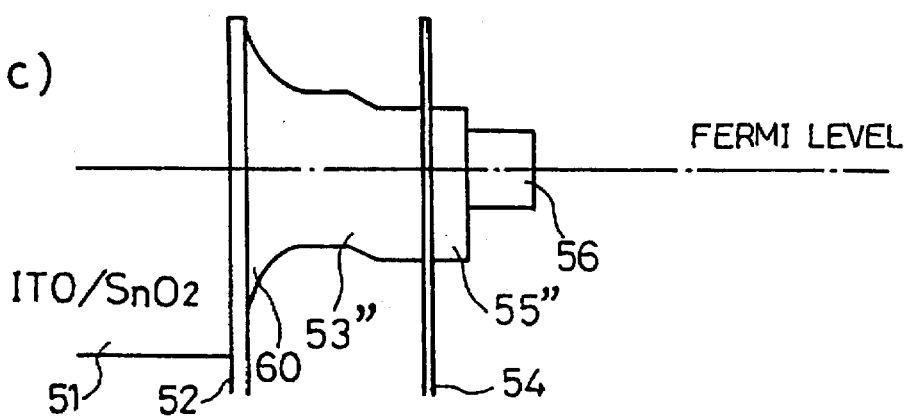
FIG. 51(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 51(a).
Figure 52A:
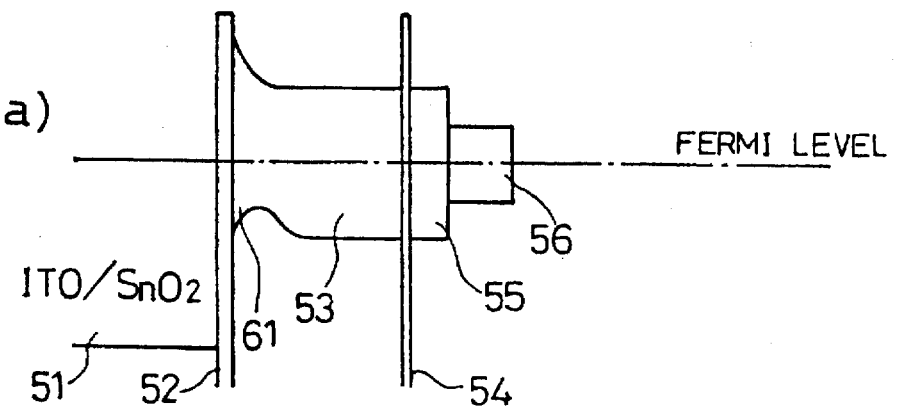
FIG. 52(a) is a band diagram of a light-writing-type liquid crystal element having an element structure of I/Chirp-p/i/intermediate-I/i type.
Figure 52B:
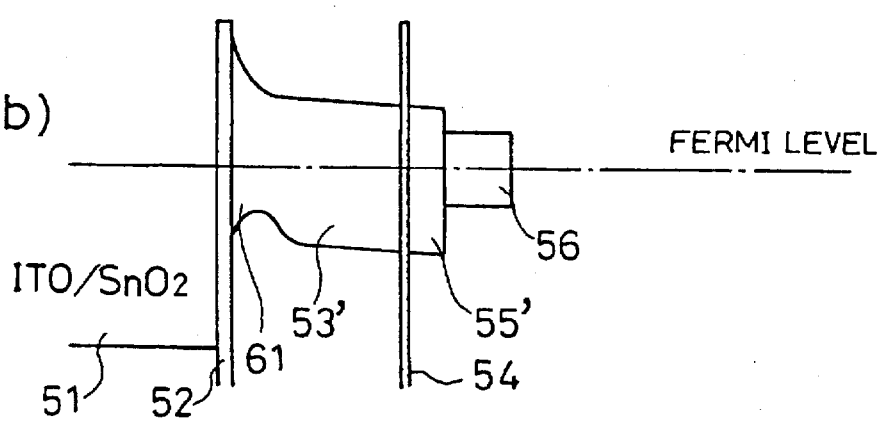
FIG. 52(b) is a band diagram of an element structure which uses a photoconductive layer in which the donor density is continuously increased toward the light-shielding layer side from the transparent electrode side (while the acceptor density decreases), instead of the photoconductive layer of the light-writing-type liquid crystal element of FIG. 52(a).
Figure 52C:
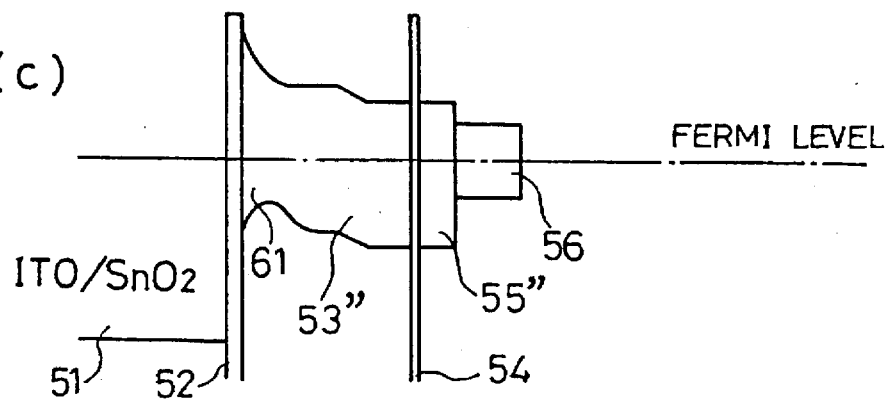
FIG. 52(c) is a band diagram of an element structure which uses a photoconductive layer in which the donor density is increased step by step toward the light-shielding layer side from the transparent electrode side (while the acceptor density decreases), instead of the photoconductive layer of the light-writing-type liquid crystal element of FIG. 52(a).

More specifically, FIGS. 48(a) through 48(c) show an I/wide-i/i/intermediate I/i type element structure wherein the carrier-blocking layer (I)52, an i-type wide gap semiconductor 57, the i-type semiconductor 53, the carrier-blocking layer (I)54 and the i-type semiconductor 55 are successively stacked; and FIGS. 49(a) through 49(c) show an I/p/i/intermediate I/i type element structure wherein the carrier-blocking layer (I)52, a p-type semiconductor 58, the i-type semiconductor 53, the carrier-blocking layer (I)54 and the i-type semiconductor 55 are successively stacked. Further, FIGS. 50(a) through 50(c) show an I/wide-p/i/intermediate I/i type element structure wherein the carrier-blocking layer (I)52, a p-type wide-gap semiconductor 59, the i-type semiconductor 53, the carrier-blocking layer (I)54 and the i-type semiconductor 55 are successively stacked; and FIGS. 51(a) through 51(c) show an I/chirp-i/i/I/i type element structure wherein the carrier-blocking layer (I)52, an i-type chirp semiconductor 60, the i-type semiconductor 53, the carrier-blocking layer (I)54 and the i-type semiconductor 55 are successively stacked. Moreover, FIGS. 52(a) through 52(c) show an I/chirp-p/i/I/i type element structure wherein the carrier-blocking layer (I)52, a p-type chirp semiconductor 61, the i-type semiconductor 53, the carrier-blocking layer (I)54 and the i-type semiconductor 55 are successively stacked.

Here, FIGS. 48(a), 49(a), . . . 52(a) show an energy state where the donor density of each of the i-type semiconductor 53 and the I-type semiconductor 55 is uniform; FIGS. 48(b), 49(b), . . . 52(b) show an energy state where the donor density of each of the i-type semiconductor 53 and the i-type semiconductor 55 is continuously increased from the transparent electrode 51 side toward the light-shielding layer 56 side; and FIGS. 48(c), 49(c), . . . 52(c) show an energy state where the donor density of each of the i-type semiconductor 53 and the i-type semiconductor 55 is increased from the transparent electrode 51 side toward the light-shielding layer 56 side step by step.

Furthermore, a multi-step chirp semiconductor, which reduces the energy level step by step, may be used instead of the chirp semiconductor that is joined to the carrier-blocking layer (I)52.

[EMBODIMENT 8]

Referring to FIGS. 53(a) through 58(c), the following description will discuss still another embodiment of the present invention. Here, for convenience of explanation, those members that have the same functions and that are described in the above-mentioned Embodiment 8 are indicated by the same reference numerals end the description thereof is omitted.

Figure 53A:
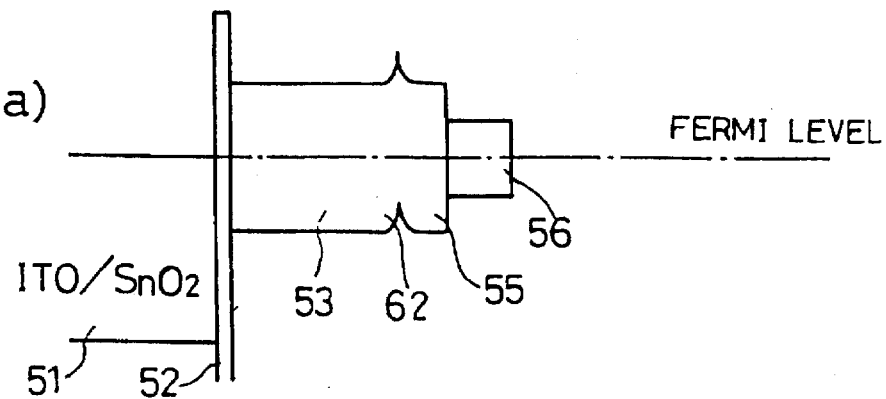

As illustrated in FIG. 53(a), in the element structure of the light-writing-type liquid crystal element of the present embodiment, a p-type semiconductor 62, which has the same energy gap as the photoconductive layer, is formed at mid-point in the photoconductive layer in place of the carrier-blocking layer 54 on the light-shielding layer 56 side in the element structure shown in Embodiment 7. Thus, since a depletion layer is formed on the light-shielding layer 56 side of the photoconductive layer, the above-mentioned element structure has an energy structure capable of blocking carrier injection from the light-shielding layer 56 side.

The film thickness of the p-type semiconductor 62 is set to 170 Å when, in the photoconductive layer, the peripheral donor density shows $10^{18}$ cm$^{-3}$ and the acceptor density of the p-type semiconductor 62 shows $10^{19}$ cm$^{-3}$. The above-mentioned film thickness is determined by theoretical values which make it possible for the p-type semiconductor 62 to have an energy structure capable of blocking carrier injection from the light-shielding layer 56 during dark time. Here, this theoretical value is derived from the theoretical equations shown in Embodiment 1.

As described above, the film thickness of the p-type semiconductor 62 installed inside the photoconductive layer depends on the donor density and acceptor density of semiconductors that constitute the photoconductive layer. In other words, as the donor density increases, the film thickness of the p-type semiconductor has to be increased, while as the acceptor density increases, the film thickness of the p-type semiconductor can be reduced.

The following description will discuss a manufacturing method of the light-writing-type liquid crystal element having the above-mentioned element structure.

First, on a glass substrate that serves as the insulating transparent substrate, an In$_2$(Sn)O$_3$ film with a thickness of 1000 Å and a SnO$_2$:Sb film with a thickness of 300 Å are successively stacked by using the sputtering method so as to form a transparent electrode 51. On this is deposited a carrier-blocking layer 52 with a thickness of 850 Å that is made of TiO$_2$ by using the EB vapor deposition method under conditions: base pressure $(P_B)=1\times10^{-6}$ Torr, vapor deposition rate (R)=5 Å/s, and substrate temperature $(T_S)=$ 300° C.

Next, an a-Si:H film 53, which is an amorphous silicon hydride layer, is accumulated as follows by using the plasma CVD method (chemical vapor phase growth method) with a thickness of 6.0 μm. More specifically, the a-Si:H film 53 is formed as follows: SiH$_4$ gas is directed into a reaction furnace, and decomposed using glow discharge so as to accumulate an a-Si:H layer of 6.0 μm.

Next, on this a-Si:H film 53, an a-Si:H semiconductor, which serves as the p-type semiconductor 62, is formed by supplying SiH$_4$, H$_2$ and B$_2$H$_6$ for use in adding an acceptor, under the typical P-CVD film-forming conditions. These gases are introduced into an reaction furnace so as to deposit the film. The p-type a-Si:H film that was deposited under these conditions as the p-type semiconductor 62 had an acceptor density of $10^{17}$ cm$^{-3}$. Here, the composition and film thickness of the p-type semiconductor are not intended to be limited to the above-mentioned conditions, and other materials may be used as long as they are within a range for allowing a larger photocurrent to flow.

Then, on this p-type semiconductor 62, an a-Si:H film 55, which is an amorphous silicon hydride layer, is accumulated by using type plasma CVD method (chemical vapor phase growth method) with a thickness of 4.0 μm in the same manner as the a-Si:H film 53.

Further, on this a-Si:H film 55, a light-shielding layer (a-SiGe:H film) 56 was accumulated by using the plasma CVD method with a thickness of 5000 Å. The film-forming method of the light-shielding layer 56 is the same as that of Embodiment 1.

As described above, the present embodiment has the element structure wherein the carrier-blocking layer (the p-type semiconductor 62) on the light-shielding layer 56 side is formed inside the a-Si:H film that constitutes the photoconductive layer, and has an energy structure capable of preventing carrier injection from the light-shielding layer 56 during dark time, in the same manner as the above-mentioned respective Embodiments.

Therefore, the carrier-blocking layer (the p-type semiconductor 62) needs to be installed at a position which does not overlap a depletion layer that is formed on the transparent electrode 51 side in the a-Si:H film and which allows the amount of carriers generated by writing light that is incident from the transparent electrode 51 side to become sufficiently small.

Moreover, the donor density of the a-Si:H film corresponding to the area at which the carrier-blocking layer (the p-type semiconductor 62) is formed is preferably set to be greater than the donor density of the depletion layer formed on the transparent electrode 51 side. Since this arrangement reduces the voltage loss, the photosensitivity is improved and photocurrent is allowed to flow well.

Here, although the above explanation was given of the case where the donor density of each of the i-type semiconductor 53 and the i-type semiconductor 55 is uniform as shown in FIG. 53(a), the donor density of each of the i-type semiconductor 53 and the i-type semiconductor 55 may be set so that it becomes greater on the light-shielding layer 56 side than on the transparent electrode 51 side in order to allow photocurrent to flow more effectively.

In order to differentiate the donor density in the a-Si:H film, which functions as each of the i-type semiconductor 53 and the i-type semiconductor 55, between the transparent electrode 51 side and the light-shielding layer 56 side, two methods are, for example, proposed as described in the aforementioned Embodiment 2: the method in which the donor density is increased continuously and the method in which it is increased step by step.

Figure 53B:
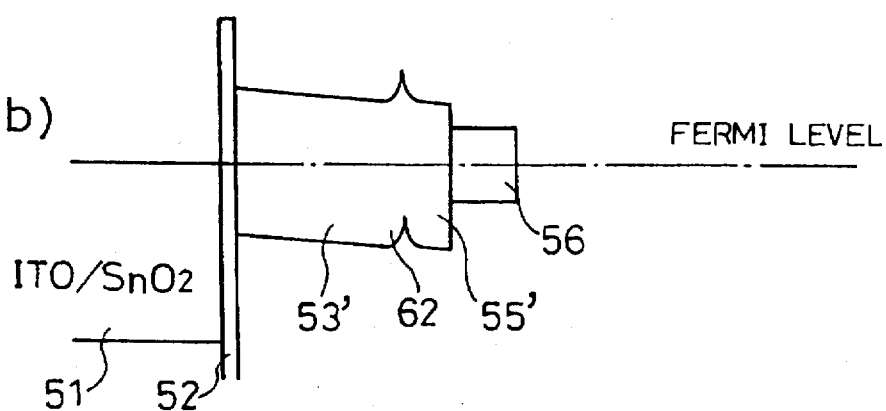

In the case where the donor density is continuously increased from the transparent electrode 51 side toward the light-shielding layer 56 side, the energy level shows that the donor density in each of the i-type semiconductor 53' and 55' portions continuously reduces toward the light-shielding layer 56, as shown in FIG. 53(b). Further, in the case where the donor density is increased from the transparent electrode 51 side toward the light-shielding layer 56 side step by step, the energy level shows that the donor density in each of the i-type semiconductor 53" and 55" portions reduces toward the light-shielding layer 56 step by step, as shown in FIG. 53(c).

Figure 53C:
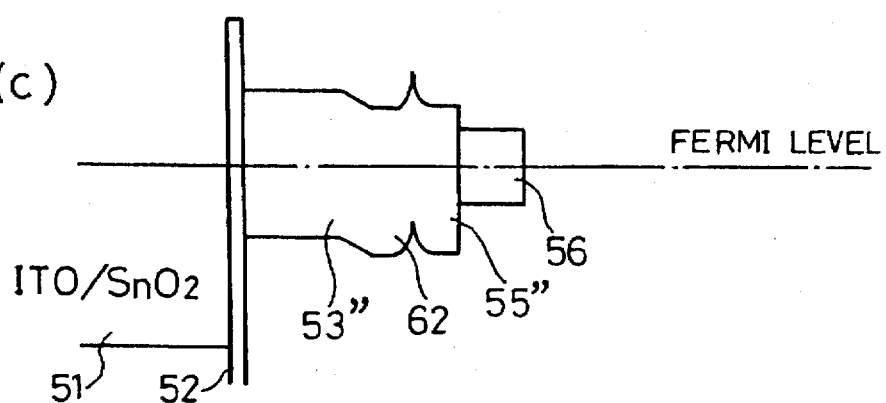

Moreover, in the present embodiment, an element structure, which has an insulating film, a carrier-blocking layer (I)52, the i-type semiconductor 53, the p-type semiconductor 62, and the i-type semiconductor 55 that are stacked from the transparent electrode 51 side, is used as the photoconductive layer, as shown in FIGS. 53(a) through 53(c), that is, the I/i/intermediate p/i type element structure is used. However, other element structures, such as shown in FIGS. 54(a) through 58(c), may be adopted.

Figure 54A:
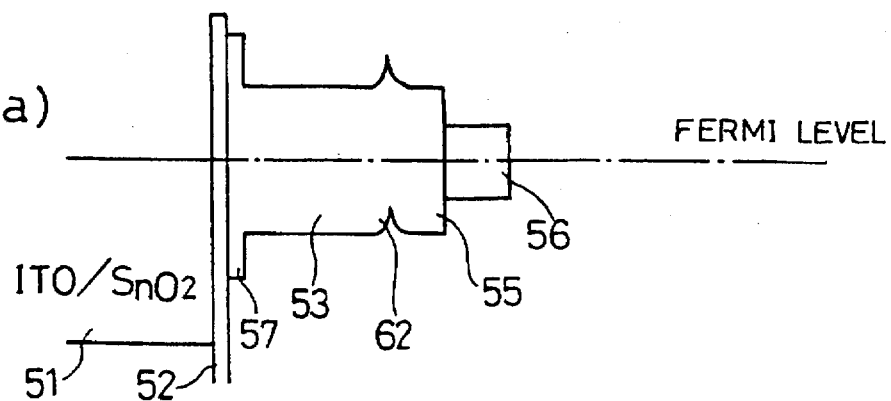
Figure 54B:
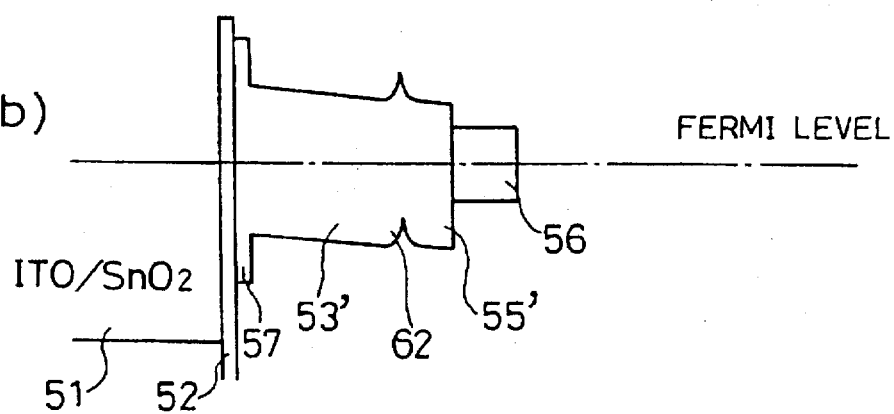
Figure 54C:
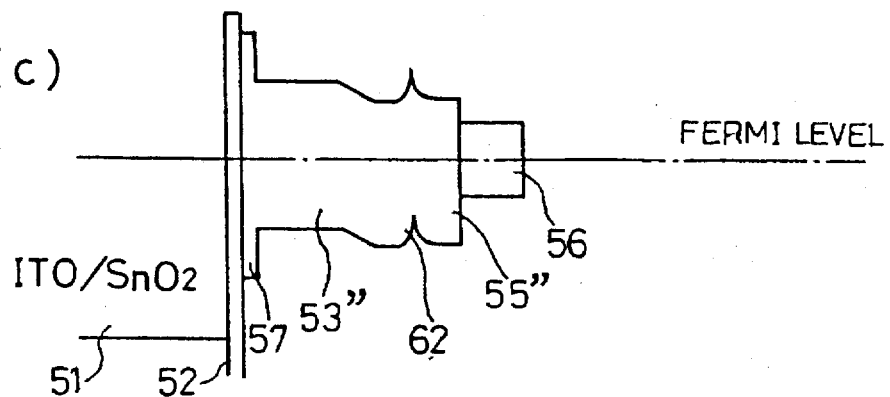
Figure 55A:
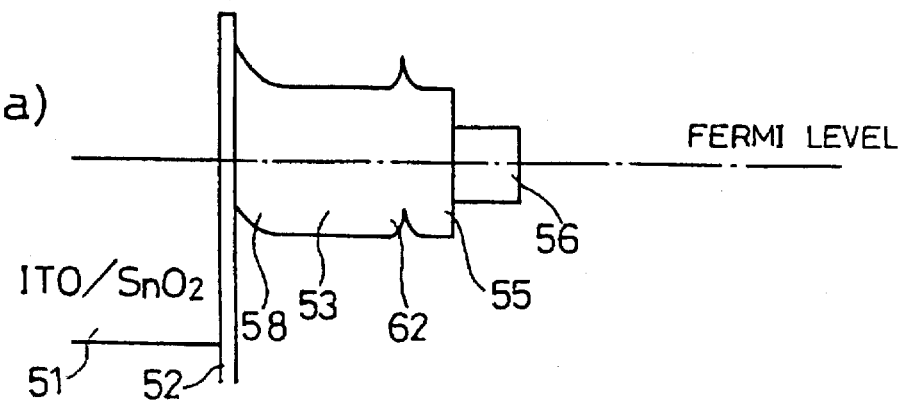
Figure 55B:
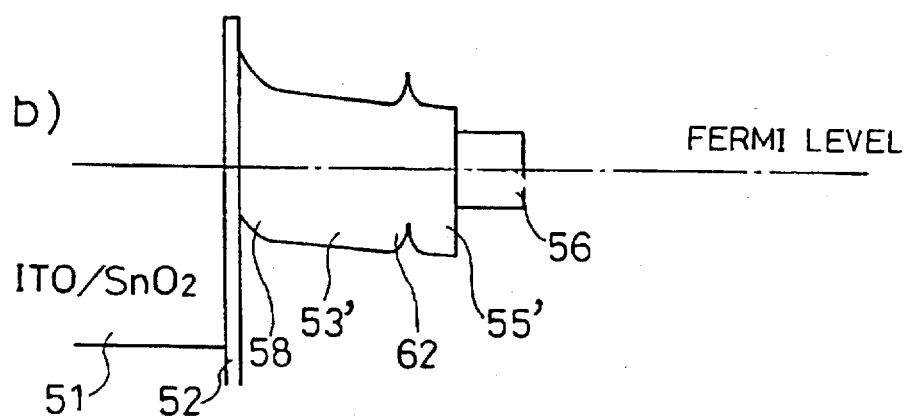
Figure 55C:
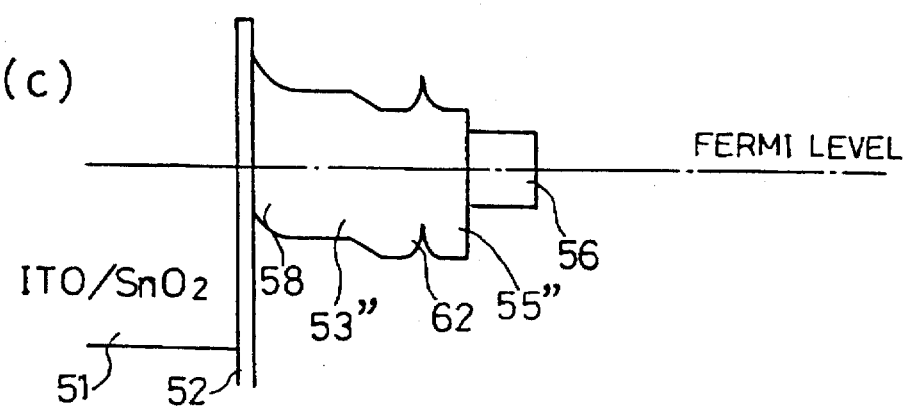
Figure 56A:
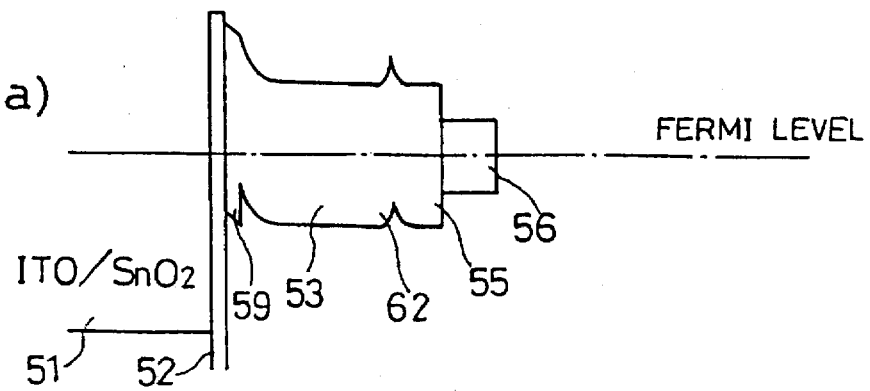
Figure 56B:
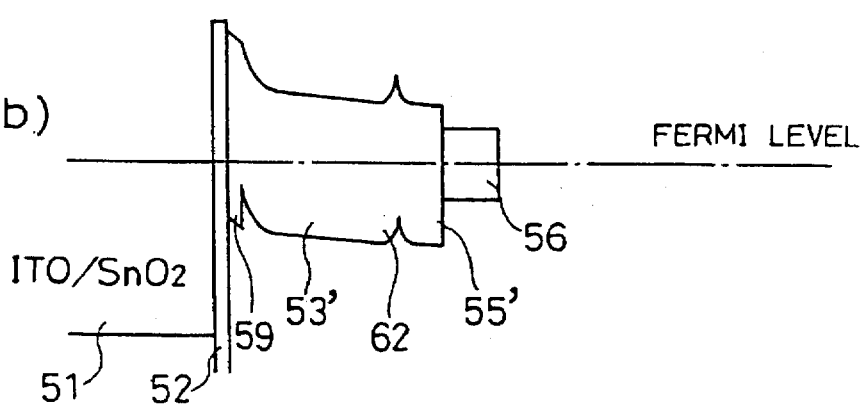
Figure 56C:
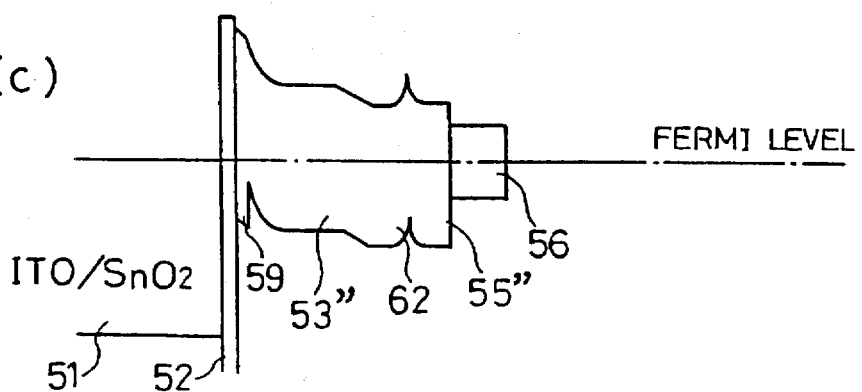

More specifically, FIGS. 54(a) through 54(c) show an I/wide-i/i/intermediate p/i type element structure wherein the carrier-blocking layer (I)52, an i-type wide-gap semiconductor 57, the i-type semiconductor 53, the p-type semiconductor 62 and the i-type semiconductor 55 are successively stacked; and FIGS. 55(a) through 55(c) show an I/p/i/intermediate p/i type element structure wherein the carrier-blocking layer (I)52, a p-type semiconductor 58, the i-type semiconductor 53, the p-type semiconductor 62 and the i-type semiconductor 55 are successively stacked. Further, FIGS. 56(a) through 56(c) show an I/wide-p/i/intermediate p/i type element structure wherein the carrier-blocking layer (I)52, a p-type wide-gap semiconductor 59, the i-type semiconductor 53, the p-type semiconductor 62 and the i-type semiconductor 55 are successively stacked; and FIGS. 57(a) through 57(c) show an I/chirp-i/i/intermediate p/i type element structure wherein the carrier-blocking layer (I)52, an i-type chirp semiconductor 60, the i-type semiconductor 53, the p-type semiconductor 62 and the i-type semiconductor 55 are successively stacked. Moreover, FIGS. 58(a) through 58(c) show an I/chirp-p/i/intermediate p/i type element structure wherein the carrier-blocking layer (I)52, a p-type chirp semiconductor 61, the i-type semiconductor 53, the p-type semiconductor 62 and the i-type semiconductor 55 are successively stacked.

Here, FIGS. 54(a), 55(a), . . . 58(a) show an energy state where the donor density of each of the i-type semiconductor 53 and the i-type semiconductor 55 is uniform; FIGS. 54(b), 55(b), . . . 58(b) show an energy state where the donor density of each of the i-type semiconductor 53 and the i-type semiconductor 55 is continuously increased from the transparent electrode 51 side toward the light-shielding layer 56 side; and FIGS. 54(c), 55(c), . . . 58(c) show an energy state where the donor density of each of the i-type semiconductor 53 and the i-type semiconductor 55 is increased from the transparent electrode 51 side toward the light-shielding layer 56 side step by step.

Furthermore, a multi-step chirp semiconductor, which reduces the energy level step by step, may be used instead of the chirp semiconductor that is joined to the carrier-blocking layer (I)52.

[EMBODIMENT 9]

Referring to FIGS. 59(a) through 64(c), the following description will discuss still another embodiment of the present invention. Here, for convenience of explanation, those members that have the same functions and that are described in the above-mentioned Embodiment 8 are indicated by the same reference numerals and the description thereof is omitted.

As illustrated in FIGS. 59(a) through 64(c), in the element structure of the light-writing-type liquid crystal element of the present embodiment, a p-type wide-gap semiconductor 63, which has an energy gap greater than that of the i-type semiconductor 53, is used in place of the p-type semiconductor 62 in the element structures shown in FIGS. 53(a) through 58(c) of Embodiment 8. Thus, since a depletion layer is formed on the light-shielding layer 56 side of the photoconductive layer, the above-mentioned element structures have an energy structure capable of blocking carrier injection from the light-shielding layer 56 side.

The p-type wide-gap semiconductor 63 is made of a-$Si_xC_{1-x}$:H (composition X=0.8), and the film thickness thereof is set to 130 Å when the peripheral donor density of the photoconductive layer shows $10^{18}$ cm$^{-3}$ and the acceptor density of the p-type wide-gap semiconductor 63 shows $10^{19}$ cm$^{-3}$. The above-mentioned film thickness is determined by theoretical values which make it possible for the p-type wide-gap semiconductor 63 to have an energy structure capable of blocking carrier injection from the light-shielding layer 56 during dark time. Here, this theoretical value is derived from the theoretical equations shown in Embodiment 1.

As described above, the film thickness of the p-type semiconductor 62 installed inside the photoconductive layer depends on the donor density and acceptor density of semiconductors that constitute the photoconductive layer. In other words, as the donor density increases, the film thickness of the p-type semiconductor has to be increased, while as the acceptor density increases, the film thickness of the p-type semiconductor can be reduced.

The following description will discuss a manufacturing method of the light-writing-type liquid crystal element having the above-mentioned element structure.

First, on a glass substrate that serves as the insulating transparent substrate, an $In_2(Sn)O_3$ film with a thickness of 1000 Å and a $SnO_2$:Sb film with a thickness of 300 Å are successively stacked by using the sputtering method so as to form a transparent electrode 51. On this is deposited a carrier-blocking layer 52 with a thickness of 850 Å that is made of $TiO_2$ by using the EB vapor deposition method under conditions: base pressure $(P_B)$=1×10$^{-6}$ Torr, vapor deposition rate (R)=5 Å/s, and substrate temperature $(T_S)$= 300° C.

Next, an a-Si:H film 53, which is an amorphous silicon hydride layer, is accumulated as follows by using the plasma CVD method (chemical vapor phase growth method) with a thickness of 6.0 μm. More specifically, the a-Si:H film 53 is formed as follows: $SiH_4$ gas is directed into a reaction furnace, and decomposed using glow discharge so as to accumulate an a-Si:H layer of 6.0 μm.

Next, on this a-Si:H film 53, an a-$Si_xC_{1-x}$:H (composition X=0.8) semiconductor, which serves as the p-type wide-gap semiconductor 63, is formed by supplying $SiH_4$, $CH_4$, $H_2$, and $B_2H_6$ for use in adding an acceptor, under the typical P-CVD film-forming conditions. These gases are introduced into an reaction furnace, and decomposed using glow discharge so as to accumulate a layer of 350 Å. The p-type a-$Si_xC_{1-x}$:H (composition X×0.8) film that was deposited under these conditions as the p-type wide-gap semiconductor 63 had an acceptor density of $10^{16}$ cm$^{-3}$. Here, the composition and film thickness of the p-type semiconductor are not intended to be limited to the above-mentioned conditions, and other materials may be used as long as they are within a range for allowing a larger photocurrent to flow.

Then, on this p-type wide-gap semiconductor 63, an a-Si:H film 55, which is an amorphous silicon hydride layer, was accumulated by using the plasma CVD method (chemical vapor phase growth method) with a thickness of 4.0 μm in the same manner as the a-Si:H film 53.

Further, on this a-Si:H film 55, a light-shielding layer (a-SiGe:H film) 56 was accumulated by using the plasma CVD method with a thickness of 5000 Å. The film-forming method of the light-shielding layer 56 is the same as that of Embodiment 1.

As described above, the present embodiment has the element structure wherein the p-type wide-gap semiconductor 63 was formed as the carrier-blocking layer on the light-shielding layer 56 side, inside the a-Si:H film that constitutes the photoconductive layer, and has an energy structure capable of preventing carrier injection from the light-shielding layer 56 during dark time, in the same manner as the above-mentioned respective Embodiments.

Here, although the above explanation was given of the case where the donor density of each of the i-type semiconductor 53 and the i-type semiconductor 55 is uniform as shown in FIG. 59(a), the donor density of each of the i-type semiconductor 53 and the i-type semiconductor 55 may be set so that it becomes greater on the light-shielding layer 56 side than on the transparent electrode 51 side in order to allow photocurrent to flow more effectively.

In order to differentiate the donor density in the a-Si:H film, which functions as each of the i-type semiconductor 53 and the i-type semiconductor 55, between the transparent electrode 51 side and the light-shielding layer 56 side, two methods are, for example, proposed as described in the aforementioned Embodiment 2; the method in which the donor density is increased continuously and the method in which it is increased step by step.

In the case where the donor density is continuously increased from the transparent electrode 51 side toward the light-shielding layer 56 side, the energy level shows that the donor density in each of the i-type semiconductor 53' and 55' portions continuously reduces toward the light-shielding layer 56, as shown in FIG. 59(b). Further, in the case where the donor density is increased from the transparent electrode 51 side toward the light-shielding layer 56 side step by step, the energy level shows that the donor density in each of the i-type semiconductor 53" and 55" portions reduces toward the light-shielding layer 56 step by step, as shown in FIG. 59(c).

Moreover, in the present embodiment, an element structure, which has a carrier-blocking layer (I)52 having an insulating film, the i-type semiconductor 53, the p-type wide-gap semiconductor 63, and the i-type semiconductor 55 that are stacked from the transparent electrode 51 side, is used as the photoconductive layer, as shown in FIGS. 59(a) through 59(c), that is, the I/i/(intermediate) wide-p/i type element structure is used. However other element structures, such as shown in FIGS. 60(a) through 64(c), may be adopted.

More specifically, FIGS. 60(a) through 60(c) show an I/wide-i/(intermediate) wide-p/i type element structure wherein the carrier-blocking layer (I)52, an i-type wide-gap semiconductor 57, the i-type semiconductor 53, the p-type wide-gap semiconductor 63 and the i-type semiconductor 55 are successively stacked; and FIGS. 61(a) through 61(c) show an I/p/i/(intermediate) wide-p/i type element structure wherein the carrier-blocking layer (I)52, a p-type semiconductor 58, the i-type semiconductor 53, the p-type wide-gap semiconductor 63 and the i-type semiconductor 55 are successively stacked. Further, FIGS. 62(a) through 62(c) show an I/wide-p/i/(intermediate) wide-p/i type element structure wherein the carrier-blocking layer (I)52, a p-type wide-gap semiconductor 59, the i-type semiconductor 53, the p-type wide-gap semiconductor 63 and the i-type semiconductor 55 are successively stacked; and FIGS. 63(a) through 63(c) show an I/chirp-i/i/(intermediate) wide-p/i type element structure wherein the carrier-blocking layer (I)52, an i-type chirp semiconductor 60, the i-type semiconductor 53, the p-type wide-gap semiconductor 63 and the i-type semiconductor 55 are successively stacked. Moreover, FIGS. 64(a) through 64(c) show an I/Chirp-p/i/(intermediate) wide-p/i type element structure wherein the carrier-blocking layer (I)52, a p-type chirp semiconductor 61, the i-type semiconductor 53, the p-type wide-gap semiconductor 63 and the i-type semiconductor 55 are successively stacked.

Here, FIGS. 60(a), 61(a), . . . 64(a) show an energy state where the donor density of each of the i-type semiconductor 53 and the i-type semiconductor 55 is uniform; FIGS. 60(b), 61(b), . . . 64(b) show an energy state where the donor density of each of the i-type semiconductor 53 and the i-type semiconductor 55 is continuously increased from the transparent electrode 51 side toward the light-shielding layer 56 side; and FIGS. 60(c), 61(c), . . . 64(c) show an energy state where the donor density of each of the i-type semiconductor 53 and the i-type semiconductor 55 is increased from the transparent electrode 51 side toward the light-shielding layer 56 side step by step.

Furthermore, a multi-step chirp semiconductor, which reduces the energy level step by step, may be used instead of the chirp semiconductor that is joined to the carrier-blocking layer (I)52.

[EMBODIMENT 10]

Referring to FIGS. 65(a) through 68(c), the following description will discuss still another embodiment of the present invention. Here, for convenience of explanation, those menders that have the same functions and that are described in the above-mentioned Embodiment 8 are indicated by the same reference numerals and the description thereof is omitted.

As illustrated in FIGS. 65(a) through 68(c), in the element structure of the light-writing-type liquid crystal element of the present embodiment, the carrier-blocking layer(I) 52, which is an insulating film and which is stalled on the transparent electrode 51 side in the element structures of the above-mentioned Embodiments 8 and 9, is replaced with the p-type semiconductor 58 or the p-type wide-gap semiconductor 59 that functions as a carrier-blocking layer.

In the element structure of the light-writing-type liquid crystal element shown in FIGS. 65(a) through 66(c), the carrier-blocking layer (I)52 that is installed on the transparent electrode 51 side and that are shown in FIGS. 55(a) through 56(c) of the aforementioned Embodiment 8, is removed, and the p-type semiconductor 62 is used as the carrier-blocking layer on the light-shielding layer 56 side. Here, the p-type semiconductor 62 has the same energy gap as the i-type semiconductor 53 that constitutes the photoconductive layer. Additionally, the manufacturing methods of these elements are the same as those described in the respective embodiments, and the film thickness and the acceptor density are also freely set as long as they are within ranges that are described in the respective embodiments.

In the element structure of the light-writing-type liquid crystal element shown in FIGS. 67(a) through 68(c), the carrier-blocking layer(I) 52 that is installed on the transparent electrode 51 side and that are shown in FIGS. 61(a) through 62(c) of the aforementioned Embodiment 9, is removed, and the p-type wide-gap semiconductor 63 is used as the carrier-blocking layer on the light-shielding layer 56 side. Here, the p-type wide-gap semiconductor 63 has an energy gap that is greater than the i-type semiconductor 53 that constitutes the photoconductive layer.

As described above, with the arrangement wherein the p-type semiconductor or the p-type wide-gap semiconductor is provided on the transparent electrode 51 side in place of the carrier-blocking layer made of an insulating film, a depletion layer is formed on the transparent electrode 51 side of the photoconductive layer by a junction between the p-type semiconductor and the i-type semiconductor. Since the depletion layer forms a highly-resistive area on the transparent electrode 51 side of the photoconductive layer, a higher voltage is applied thereto than to areas on the light-shielding layer 56 side of the photoconductive layer. On the light-shielding layer 56 side, since the p-type semiconductor 62 or the p-type wide-gap semiconductor 63 is provided as the carrier-blocking layer, in place of the carrier-blocking layer made of an insulating film, it is possible to block carrier injection during dark time. This results in more photocurrent and less dark current in the photoconductive layer, thereby making it possible to improve the photosensitivity.

Here, FIGS. 65(a), 66(a), ... 68(a) show an energy state where the donor density of each of the i-type semiconductor 53 and the i-type semiconductor 55 is uniform; FIGS. 65(b), 66(b), ... 68(b) show an energy state where the donor density of each of the i-type semiconductor 53 and the i-type semiconductor 55 is continuously increased from the transparent electrode 51 side toward the light-shielding layer 56 side; and FIGS. 65(c), 66(c), ... 68(c) show an energy state where the donor density of each of the i-type semiconductor 53 and the i-type semiconductor 55 is increased from the transparent electrode 51 side toward the light-shielding layer 56 side step by step.

Furthermore, although not shown in Figures, other element structures may also be adopted: an element structure of the so-called p/i/intermediate I/i type consisting of a p-type semiconductor/an i-type semiconductor/a carrier-blocking layer (I)/an i-type semiconductor; an element structure of the wide-p/i/intermediate I/i type consisting of a p-type wide-gap semiconductor/an i-type semiconductor/a carrier-blocking layer (I)/an i-type semiconductor 55; an element structure of the chirp-p/i/intermediate I/i type consisting of a p-type chirp semiconductor/an i-type semiconductor/a carrier-blocking layer (I)/an i-type semiconductor; an element structure of the multi-step-p/i/intermediate I/i type consisting of a p-type multi-step semiconductor/an i-type semiconductor/a carrier-blocking layer (I)/an i-type semiconductor; an element structure of the chirp-p/i/intermediate p/i type consisting of a p-type chirp semiconductor/an I-type semiconductor/a p-type semiconductor/an i-type semiconductor; an element structure of the chirp-p/i/wide (intermediate) p/i type consisting of a p-type chirp semiconductor/an i-type semiconductor/a p-type wide-gap semiconductor/an i-type semiconductor; and an element structure of the multi-step p/i/wide (intermediate) p/i type consisting of a p-type multi-step chirp semiconductor/an i-type semiconductor/a p-type wide-gap semiconductor/an i-type semiconductor. The manufacturing methods of these elements are the same as those described in the respective embodiments.

As described above, in the element structures which have no carrier-blocking layer 15 made of an insulating film on the transparent electrode 51 side, the depletion layer is formed by a junction between the semiconductors so as to function as a carrier-blocking layer; therefore, it is possible to eliminate (or reduce) processes for forming insulating films from manufacturing processes of light-writing-type liquid crystal elements. Consequently, the manufacturing processes are simplified and the manufacturing time is shortened.

[EMBODIMENT 11]

Referring to FIGS. 73 and 74, the following description will discuss still another embodiment of the present invention.

In the present embodiment, a carrier-blocking layer, which is formed on the writing-light-incident side of a photoconductive layer used in the light-writing-type liquid crystal element, has a superlattice structure, FIG. 73 shows an energy-band diagram ranging from a transparent electrode 31 to a light-shielding layer 18 in the light-writing-type liquid crystal element.

Additionally, although not shown in the drawing, structures (see FIGS. 17(b), 17(c) and other drawings) wherein the carrier density is increased continuously or step by step from the transparent electrode 31 side toward the light-shielding layer 18 side may also be adopted in the present embodiment.

The following description will discuss one structural example of a carrier-blocking layer 76 having a superlattice structure that is formed on the transparent electrode 31 side. The superlattice structure is made of cyclicly stacked layers consisting of ultra-thin films of a-SiC:H and a-Si:H. The compositions and film thicknesses of the cyclic stacked layers were set as follows: The composition of a-SiC:H having a wide energy gap was set to a-$Si_{0.5}C_{0.5}$:H with a film thickness of 200 Å. The film thickness of a-Si:H was set to 100 Å. These ultra-thin films were repeatedly stacked 100 cycles so that the film thickness of the superlattice structure was set to approximately 3 µm.

Then a-Si:H of 7 µm, which functions as a photoconductive layer 26, was deposited on the carrier-blocking layer 76 of the superlattice structure, and the a-SiC:H having a wide energy gap, which functions as a carrier-blocking layer 77 on the light-shielding layer 18 side, was deposited with a film thickness of 150 Å. Further, a-SiGe:H was deposited on the carrier-blocking layer 77 as the light-shielding layer 18.

FIG. 74 shows measurements of the light-absorption coefficient with respect to a photoconductive layer having this superlattice structure (hereinafter, referred to as superlattice photoconductive layer) and a conventional photoconductive layer. This figure indicates that the superlattice photoconductive layer has greater light-absorption coefficients within the writing-light region (wavelength: 6000~7000 Å).

The following description will discuss a manufacturing method of the above-mentioned light-writing-type liquid crystal element.

First, on a glass substrate (an insulating transparent substrate), an ITO film was deposited with a thickness of 1000 Å by the sputtering method, and on this film was deposited a $SnO_2$ film with a thickness of 300 Å; thus, a transparent electrode 31 was formed. On this was further deposited the carrier-blocking layer 76 with a thickness of approximately 3 µm, which has the superlattice structure consisting of the cyclicly stacked layers of a-SiC:H and a-Si:H that are repeatedly stacked 100 cycles starting with an a-SiC:H film. Next, on this was deposited a-Si:H of 7 µm as the photoconductive layer 26. Successively, on this was deposited a-SiC:H of 150 Å as the carrier-blocking layer 77, and on this was further deposited a-SiGe:H of 1 μm as the light-shielding layer 18. Then, on this was deposited a multi-layer dielectric reflection film, and on this was further deposited a liquid crystal alignment film so as to provide an alignment treatment.

Moreover, an ITO film of 1000 Å, which serves as a transparent electrode, was deposited on another glass substrate, and on this was further deposited a liquid crystal alignment film so as to provide an alignment treatment.

Next, a pair of the laminated substrates, obtained through the above-mentioned processes, were disposed so that the liquid crystal alignment films of the respective substrates were aligned face to face with each other, and spacers and seal members are interpolated between the substrates so as to maintain an injection space for liquid crystal layer. Then twisted nematic liquid crystal was injected between the substrates and sealed.

The driving operation of the light-writing-type liquid crystal element using the above-mentioned superlattice photoconductive layer was carried out by applying ac voltage between the transparent electrodes that were formed on the respective substrates.

When the light-writing-type liquid crystal element using the superlattice photoconductive layer was estimated under the same driving conditions as a conventional light-writing-type liquid crystal element, the photosensitivity was remarkably improved from 400 $\mu W/cm^2$ (conventional value) to 200 $\mu w/cm^2$. Further, the present light-writing-type liquid crystal element achieved a high contrast of 200. Moreover, since the superlattice structure provides a superior carrier-blocking function, it is possible to achieve light-writing-type liquid crystal elements with high reliability and long service life.

Additionally, the material for forming the superlattice structure is not intended to be limited to a-SiC:H: any material may be used and provide the same effects as described above, as long as it has a wide-gap property that makes the light-absorption coefficient greater than that of the photoconductive layer when formed into a superlattice structure.

Moreover, in the present embodiment, a semiconductor having a wide energy gap was used as the carrier-blocking layer 77 on the light-shielding layer 18 side (liquid crystal layer side). However, the present invention is not intended to be limited to this structure, other carrier-blocking layers using the structures described in the aforementioned embodiments may be installed on the liquid crystal layer side.

As described above, in the light-writing-type liquid crystal element of the present embodiment, the carrier-blocking layer 76, formed on the writing-light incident side of the photoconductive layer 26, has a superlattice structure; this makes it possible to increase the light-absorption coefficient compared with conventional photoconductive layers and also to increase photoconductive carriers. Consequently, the impedance during photo time becomes smaller than that of conventional photoconductive layers, and the impedance ratio during photo and dark times becomes greater than that of conventional photoconductive layers. Furthermore, since a material (a-SiC:H), which has a wider gap than the photoconductive layer 26 of a-Si:H or other materials, is used, higher insulation is provided compared with a-Si:H or other materials. Consequently, upon application of a voltage to the photoconductive layer, a higher voltage is applied to the region on the writing-light incident side than that applied to the region on the liquid crystal layer side. These effects allow the light-writing-type liquid crystal element to have high sensitivity, high contrast, and high resolution.

In general, the superlattice structure means a structure wherein one-dimensional cyclic potential (which has a cycle of several tens of the lattice constant a (=several Å)) is artificially introduced into a semiconductor, that is, a structure wherein semiconductors having different energy gaps are cyclicly stacked. The superlattice structures that are to be adopted in the present invention of course include the above-mentioned generally-used structure, as well as including a superlattice structure wherein the film thicknesses of stacked semiconductors having different energy gaps are set to be relatively thinner and thicker depending on specific locations and a superlattice structure wherein the energy gaps of the semiconductors that have greater energy gaps are set to become gradually smaller from the transparent electrode 31 toward the light-shielding layer 18.

[EMBODIMENT 12]

Referring to FIGS. 75 through 77, the following description will discuss still another embodiment of the present invention.

In the present embodiment, a carrier-blocking layer, which is used in the light-writing-type liquid crystal element, has a stacked structure of p-type semiconductors and n-type semiconductors. FIGS. 75 and 76 show energy-band diagrams each of which ranges from a transparent electrode 31 to a light-shielding layer 18 in the light-writing-type liquid crystal element. FIG. 75 shows an energy-band diagram during a film-forming process, and when a thermal equilibrium state has been reached, the energy-band diagram changes to the one shown in FIG. 76.

Additionally, although not shown in the drawing, structures (see FIGS. 17(b), 17(c) and other drawings) wherein the carrier density is increased continuously or step by step from the transparent electrode 31 side toward the light-shielding layer 18 side may also be adopted in the present embodiment.

Referring to the above-mentioned energy-band diagrams, an explanation will be given as follows: An n-type semiconductor 78a (n-type a-Si:H film) with a film thickness of 100 Å is deposited on the transparent electrode 31, in order to suppress holes from flowing out from the photoconductive layer 26 toward the transparent electrode 31. Further, a p-type semiconductor 78b (p-type a-Si:H film) with a film thickness of 100 Å is deposited on the n-type semiconductor 78a, in order to suppress electrons from flowing out from the photoconductive layer 26 toward the transparent electrode 31. Thus, a carrier-blocking layer 78, which is formed on the writing-light incident side, has a stacked structure of the n-type semiconductor 78a and the p-type semiconductor 78b.

Then a-Si:H of 10 μm, which functions as a photoconductive layer 26, is deposited on the carrier-blocking layer 78. Since the photoconductive layer 26 tends to have n-type conduction in a slight degree when made by using an ordinary P-CVD film-forming process, it is preferably provided as an intrinsic semiconductor by using a p-type doping gas such as diborane. In this case, with respect to the doping process, it is preferable to apply a density that is smaller than the acceptor density that was used in the outflow suppressing film for electrons (the above-mentioned p-type semiconductor 78b).

Further, a p-type semiconductor 79b (p-type a-Si:H film) with a film thickness of 100 Å is deposited on the photoconductive layer 26 in order to suppress electrons from flowing out toward the light-shielding layer 18. Moreover, an n-type semiconductor 79a (n-type a-Si:H film) with a film thickness of 100 Å is deposited on the p-type semiconductor 79b, in order to suppress holes from flowing out toward the light-shielding layer 18. Thus, a carrier-blocking layer 79 on the light-shielding layer 18 side has a stacked structure of the above-mentioned n-type semiconductor 79a and p-type semiconductor 79b.

Then an a-SiGe:H film of 1 µm is deposited on the carrier-blocking layer 79 as the light-shielding layer 18.

The feature of the photoconductive layer having the above-mentioned carrier-outflow suppressing effects is that homogeneous materials (such as a-Si:H) are used as the carrier-blocking layers 78 and 79, and that the flowing out of carriers is suppressed by controlling their conduction types appropriately. This arrangement makes it possible to reduce the costs and also to reduce the managing items of film-forming conditions.

Moreover, the use of the photoconductive layer having the above-mentioned energy-band structure provides an extremely high resistance during dark time, since the mobility of carriers toward the transparent electrode 31 and the light-shielding layer 18 hardly occurs. In other words, the carrier-blocking layers 78 and 79 having the stacked-layer structure of p-type semiconductors and n-type semiconductors have a function by which both the electron and hole mobilities are suppressed, and no carriers are allowed to flow out of the photoconductive layer 26 except for re-coupled carriers. This provides greater impedance ratios during photo and dark times, compared with conventional photoconductive layers.

When the light-writing-type liquid crystal element having this carrier-outflow suppressing structure was estimated under the same driving conditions as a conventional light-writing-type liquid crystal element, the photosensitivity was remarkably improved from 400 µW/cm$^2$ (conventional value) to 200 µW/cm$^2$. Further, the present light-writing-type liquid crystal element achieved a high contrast of 200. Moreover, since the carrier-blocking layers 78 and 79 provide a superior carrier-blocking function, it is possible to achieve light-writing-type liquid crystal elements with high reliability.

Additionally, in the above-mentioned arrangement, the n-type semiconductors 78a and 79a are installed on the transparent electrode 31 side or on the light-shielding layer 18 side, and the p-type semiconductors 78b and 79b are installed on the photoconductive layer 26 side. However, the present invention is not intended to be limited to this arrangement, the use of another arrangement wherein the n and p-type semiconductors are reversely installed may also provide the same effects.

Moreover, in the above-mentioned arrangement, the film thicknesses of the carrier-blocking layer 78 on the transparent electrode 31 side and the carrier-blocking layer 79 on the light-shielding layer 18 side are set to virtually the same; however, the present invention is not intended to be limited to this arrangement. It is more preferable to make the film thickness of the carrier-blocking layer 78 thicker than that of the carrier-blocking layer 79 so as to provide an asymmetric energy structure as shown in FIG. 77 (an energy-band diagram during a film-forming process).

In other words, as shown in FIG. 75, even in the case of using virtually the same film thickness of the carrier-blocking layers 78 and 79 (the energy structure of the photoconductive layer is not symmetric), it is possible to increase impedance ratios during photo and dark times, compared with conventional photoconductive layers. However, the use of the as electric energy structure, such as shown in FIG. 77, allows a higher voltage to be applied to the region on the writing-light incident side of the photoconductive layer than that to be applied to the light-shielding layer 18 side; therefore, it becomes possible to use writing light more effectively, and consequently to improve performances of the light-writing-type liquid crystal element.

Furthermore, in an asymmetric energy structure wherein a higher voltage is applied to the region on the writing-light incident side of the photoconductive layer than that applied to the light-shielding layer 18 side, a carrier-blocking layer having a stacked-layer structure of n-type semiconductors and p-type semiconductors may be installed either on the writing-light incident side or on the liquid crystal layer side. In particular, it is preferable to adopt the stacked-layer structure of n-type semiconductors and p-type semiconductors in the carrier-blocking layer on the writing-light incident side.

Additionally, in the above explanation, each of the stacked n-type and p-type semiconductors was set to have a film thickness of 100 Å; however, the present invention is not intended to be limited to this thickness. The film thicknesses may be preferably set in the range of 50 Å to 2000 Å, more preferably, in the range of 100 Å to 1000 Å. In the case when these film thicknesses are extremely thin (less than 50 Å), leakage tends to occur because of imperfect thin-film formation, causing a problem of malfunction for use as a carrier-blocking layer. In contrast, in the case of too thick films (more than 2000 Å), since the doping layer has a low resistance, charges tend to expand in the surface direction, thereby causing adverse effects on resolution.

Moreover, with respect to n-type semiconductors of pn stacked-layer structure, even a-Si:H films which are not doped with impurities normally exhibit n-type conduction; therefore, the films of this type may be adopted. Alternatively, a-Si:H films which have been doped by an impurity of V group, such as phosphorus (P), may be adopted. Furthermore, with respect to p-type semiconductors of pn stacked-layer structure, a-Si:H films which have been doped by an impurity of III group, such as boron (B), may be adopted.

In the above-mentioned element structures of Embodiments 1 through 12, carrier injection into the photoconductive layer and carrier outflow from the photoconductive layer are respectively blocked or suppressed.

As described earlier, in order to completely block carrier injection and outflow, it is proposed to place insulating films on both ends of the photoconductive layer. In other words, in this case, it is possible to completely block carrier injection and outflow if tunnel currents that flow through the insulating films are eliminated.

Moreover, in the case when a carrier-blocking layer that controls conduction types of both ends of the photoconductive layer is used, it is possible to virtually block (suppress in a strict sense of the word) carrier injection and outflow since drift currents of carriers are eliminated (although it is not possible to completely eliminate re-coupling currents, these currents are extremely small compared with drift currents).

Further, each of the structures also allows voltage to be applied onto the transparent electrode side of the photoconductive layer in a focused manner. In other words, in each of the light-writing-type liquid crystal elements of the respective embodiments, in a light-writing-type liquid crystal element wherein a photoconductive layer and a liquid crystal layer are formed between a pair of transparent electrode substrates that are placed face to face with each other, carrier-blocking layers are respectively provided on the writing-light incident-side as well as on the liquid crystal layer side of the photoconductive layer. These carrier-blocking layers prevent or suppress carrier injection and outflow into and from the photoconductive layer, and allow a higher voltage to be applied onto a region on the writing-light incident side of the photoconductive layer than onto a region on the liquid crystal layer side when a voltage is applied to the photoconductive layer.

Therefore, the impedance ratio of during dark time and photo time becomes greater than those of other conventional elements, and by applying the photoconductive layer to light-writing-type liquid crystal elements, it becomes possible to achieve remarkable improvements in performances, as shown in Table 2, compared with conventional light-writing-type liquid crystal elements: That is, the photosensitivity is improved, the contrast and resolution are enhanced, the temperature dependence becomes smaller, and the service life is lengthened. Thus, these element structures make it possible to achieve practical use of liquid crystal projection apparatuses that use light-writing-type liquid crystal elements and that feature super large size, ultra-high luminance and ultra-high definition.

Moreover, as described earlier, in the light-writing-type liquid crystal elements, a depletion layer or a maximum depletion layer, which is formed by the carrier-blocking layers, satisfies the following inequality: $W_{fi} > W_{Bfi}$, where $W_{fi}$ represents the width of a depletion layer or a maximum depletion layer that is formed in the area on the writing-light-incident side and $W_{Bfi}$ represents the width of a depletion layer or a maximum depletion layer that is formed in the area on the liquid-crystal-layer side.

With this arrangement, a higher voltage is applied onto the writing-light incident-side of the photoconductive layer upon application of a voltage, thereby reducing the impedance during photo time. Therefore, since the ratio (Z dark/Z photo) between the impedance during dark time (Z dark) and the impedance during photo time (Z photo) becomes greater, it is possible to improve the photosensitivity of the photoconductive layer, compared with the conventional cases in which the impedance during dark time is increased, and consequently to improve the resolution.

Moreover, as described earlier, the light-writing-type liquid crystal elements have an arrangement wherein at least the carrier-blocking layer that is formed at the area on the writing-light incident-side of the photoconductive layer is constituted of an insulating layer.

This arrangement makes it possible to reduce the interface reflection of writing light, and the writing light is thus directed to the photoconductive layer effectively. This arrangement also makes it possible to improve the adhering strength between the photoconductive layer and the carrier-blocking layer.

Furthermore, as described earlier, the light-writing-type liquid crystal elements have an arrangement wherein at least the carrier-blocking layer that is formed at the area on the liquid crystal layer side of the photoconductive layer is constituted of an wide-gap i-type or p-type semiconductor whose energy level is greater than the photoconductive layer, or a p-type semiconductor whose energy level is the same as that of the photoconductive layer.

With this arrangement, even if no insulating layer is provided, carrier injection from the transparent electrode can be blocked. Further, since the carrier-blocking layer can be continuously formed by using the forming apparatus of the photoconductive layer, it is possible to simplify the manufacturing processes. In particular, when wide-gap semiconductor materials (i-type or p-type) are used, thinner films are available compared with the use of p-type semiconductors having the same energy gap. Therefore, it is possible to eliminate extra voltage loss, and consequently to allow photocurrent to flow well.

Further, as described earlier, the light-writing-type liquid crystal elements have an arrangement wherein the wide-gap i-type or p-type semiconductor or the p-type semiconductor that is formed on the transparent electrode side on the writing-light incident-side of the photoconductive layer has a chirp structure whose energy level decreases toward the liquid crystal layer side.

This arrangement makes it possible to suppress electrons generated in the photoconductive layer from re-coupling to holes, and to allow photocurrent to flow well. Therefore, since the photosensitivity of the photoconductive layer is improved, the photosensitivity and contrast of the light-writing-type liquid crystal element can be improved.

Moreover, as described earlier, the light-writing-type liquid crystal elements have an arrangement wherein an inequality, $N_{DI} < N_{DLC}$, is satisfied when the donor density of the area on the writing-light incident-side of the photoconductive layer is represented by $N_{DI}$ and the donor density of the area on the liquid crystal side is represented by $N_{DLC}$.

With this arrangement, the area on the writing-light incident-side of the photoconductive layer becomes more highly resistive than the area on the liquid crystal layer side, and is subjected to a higher applied voltage.

Therefore, the photoconductive layer is subjected to more photocurrent flows, and the photosensitivity of the photoconductive layer is thus improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A light-writing-type liquid crystal element comprising of:

a pair of first and second transparent electrode substrates that are placed face to face with each other;

a liquid crystal layer that is formed between the first and second transparent electrode substrates;

a photoconductive layer that is formed inside the first transparent electrode substrate;

a first carrier-blocking layer for preventing or suppressing carrier injection and outflow into and from the photoconductive layer, the first carrier-blocking layer being formed on the writing-light incident-side of the photoconductive layer;

a second carrier-blocking layer for preventing or suppressing carrier injection and outflow into and from the photoconductive layer, the second carrier blocking layer being formed on the liquid-crystal-layer side of the photoconductive layer, wherein the first and second carrier blocking layers are arranged so that the energy-band structure of the photoconductive layer is kept asymmetric so that when a voltage is applied onto the photoconductive layer, an area on the writing-light incident-side of the photoconductive layer is applied a higher voltage than that of the corresponding area on the liquid-crystal-layer side.

2. The light-writing-type liquid crystal element defined in claim 1, wherein the first and second carrier-blocking layers are formed on boundaries of the photoconductive layer.

3. The light-writing-type liquid crystal element as defined in claim 1, wherein the first carrier-blocking layer is formed on a boundary of the photoconductive layer and the second carrier-blocking layer is formed inside the photoconductive layer.

4. The light-writing-type liquid crystal element as defined in claim 1, wherein a depletion layer or a maximum depletion layer, which is formed by the first and second carrier-blocking layers, satisfies an inequality: $W_{fi} > W_{Bfi}$, where $W_{fi}$ represents the width of a depletion layer or a maximum depletion layer that is formed in the area on the writing-light incident side and $W_{Bfi}$ represents the width a depletion layer or a maximum depletion layer that is formed in the area on the liquid-crystal-layer side.

5. The light-writing-type liquid crystal element as defined in claim 1, wherein a depletion layer or a maximum depletion layer, which is formed by the first and second carrier-blocking layers, satisfies an inequality: $C_{fi} < C_{Bfi}$, where $C_{fi}$ represents an electrostatic capacity of a depletion layer or a maximum depletion layer that is formed in the area on the writing-light incident side and $C_{Bfi}$ represents an electrostatic capacity of a depletion layer or a maximum depletion layer that is formed in the area on the liquid-crystal-layer side.

6. The light-writing-type liquid crystal element as defined in claim 1, wherein the photoconductive layer has a donor density that is virtually constant.

7. The light-writing-type liquid crystal element as defined in claim 1, wherein the depth profile on donor density of the photoconductive layer varies so that, when the donor density of the area on the writing-light incident-side of the photoconductive layer is represented by $N_{Df}$ and the donor density of the area on the liquid-crystal-layer side is represented by $N_{DLC}$, an inequality, $N_{Df} < N_{DLC}$, is satisfied.

8. The light-writing-type liquid crystal element as defined in claim 7, wherein the donor density of the photoconductive layer continuously increases from the writing-light incident side toward the liquid crystal layer side.

9. The light-writing-type liquid crystal element as defined in claim 7, wherein the donor density of the photoconductive layer increases from the writing-light incident side toward the liquid crystal layer side in a multi-step level with one step or more.

10. The light-writing-type liquid crystal element as defined in claim 1, wherein the first carrier-blocking layer is made of an insulating material.

11. The light-writing-type liquid crystal element as defined in claim 1, wherein the second carrier-blocking layer is made of an insulating material.

12. The light-writing-type liquid crystal element as defined in claim 1, wherein in the case when the first and second carrier-blocking layers are made of the same insulating material, the first carrier-blocking layer has a film thickness that is thicker than that of the second carrier-blocking layer.

13. The light-writing-type liquid crystal element as defined in claim 1, wherein in the case when the first and second carrier-blocking layers are made of insulating materials that are different from each other, the first carrier-blocking layer has a dielectric constant that is smaller than that of the second carrier-blocking layer.

14. The light-writing-type liquid crystal element as defined in claim 1, wherein the first carrier-blocking layer includes a wide-gap semiconductor whose energy gap is wider than that of the photoconductive layer, the wide-gap semiconductor having a hetero-junction with the photoconductive layer.

15. The light-writing-type liquid crystal element as defined in claim 14, wherein the wide-gap semiconductor is an i-type semiconductor or a p-type semiconductor.

16. The light-writing-type liquid crystal element as defined in claim 14, wherein the first carrier-blocking layer is made by stacking the insulating material and the wide-gap semiconductor in this order, from the writing-light incident side, the thickness of wide-gap semiconductor being thinner than a width of the maximum depletion layer or a width of the depletion layer that is formed by the junction between the insulating material and the photoconductive layer.

17. The light-writing-type liquid crystal element as defined in claim 14, wherein the wide-gap semiconductor is made of $a\text{-}Si_xC_{1-x}\text{:}H$.

18. The light-writing-type liquid crystal element as defined in claim 1, wherein the first carrier-blocking layer includes a p-type semiconductor which has the same energy gap as the photoconductive layer.

19. The light-writing-type liquid crystal element as defined in claim 1, wherein the first carrier-blocking layer includes a semiconductor of a chirp-structure whose energy gap decreases from the writing-light incident side toward the liquid crystal layer side.

20. The light-writing-type liquid crystal element as defined in claim 19, wherein the semiconductor of the chirp-structure is an i-type semiconductor or a p-type semiconductor.

21. The light-writing-type liquid crystal element as defined in claim 19, wherein the energy gap of the semiconductor of the chirp-structure varies continuously.

22. The light-writing-type liquid crystal element as defined in claim 19, wherein the energy gap of the semiconductor of the chirp-structure varies in a multi-step level.

23. The light-writing-type liquid crystal element as defined in claim 1, wherein the second carrier-blocking layer includes a p-type semiconductor which has the same energy gap as the photoconductive layer.

24. The light-writing-type liquid crystal element as defined in claim 1, wherein the second carrier-blocking layer includes a wide-gap semiconductor whose energy gap is wider than that of the photoconductive layer, the wide-gap semiconductor having a hereto-junction with the photoconductive layer.

25. The light-writing-type liquid crystal element as defined in claim 24, wherein the wide-gap semiconductor is a p-type semiconductor.

26. The light-writing-type liquid crystal element as defined in claim 1, wherein the photoconductive layer is a-Si:H film of i-type.

27. The light-writing-type liquid crystal element as defined in claim 1, wherein the photoconductive layer is a-Si:F:H film of i-type.

28. The light-writing-type liquid crystal element as defined in claim 1, further comprising:
   a light-shielding layer for blocking writing light; and
   a mirror-layer for reflecting read-out light, the light-shielding layer and the mirror layer being formed in this order on the photoconductive layer.

29. The light-writing-type liquid crystal element as defined in claim 1, wherein the first carrier-blocking layer has a superlattice structure.

30. The light-writing-type liquid crystal element as defined in claim 1, wherein at least the first carrier-blocking layer has a stacked-layer structure of p-type semiconductor, and n-type semiconductors.

31. A light-writing-type liquid crystal element comprising of:
   a pair of first and second transparent electrode substrates that are placed face to face with each other;
   a liquid crystal layer that is formed between the first and second transparent electrode substrates;

a photoconductive layer that is formed inside the first transparent electrode substrate;

carrier-blocking layers for preventing or suppressing carrier injection and outflow into and from the photoconductive layer, the carrier-blocking layers being respectively formed on the writing-light incident-side of the photoconductive layer and on the liquid crystal layer side, wherein each carrier-blocking layer has a stacked-layer structure of p-type semiconductors and n-type semiconductors.

32. A light-writing-type liquid crystal element comprising:

a pair of first and second transparent electrode substrates that are placed face to face with each other;

a liquid crystal layer that is formed between the first and second transparent electrode substrates;

a photoconductive layer having no rectifying properties, the photoconductive layer being formed inside the first transparent electrode substrate;

a first carrier-blocking layer for preventing or suppressing carrier injection and outflow into and from the photoconductive layer, the first carrier-blocking layer being formed on the writing-light incident-side of the photoconductive layer;

a second carrier-blocking layer for preventing or suppressing carrier injection and outflow into and from the photoconductive layer, the second carrier-blocking layer being formed on the liquid-crystal-layer side of the photoconductive layer, wherein the first and second carrier-blocking layers are arranged so that the energy-band structure of the photoconductive layer is kept asymmetric so that when a voltage is applied onto the photoconductive layer, an area on the writing-light incident-side of the photoconductive layer is applied a higher voltage than that of the corresponding area on the liquid-crystal-layer side.

33. The light-writing-type liquid crystal element as defined in claim 32, wherein the photoconductive layer has a donor density that is virtually constant.

34. The light-writing-type liquid crystal element as defined in claim 32, wherein the depth profile on donor density of the photoconductive layer varies so that, when the donor density of the area on the writing-light incident-side of the photoconductive layer is represent by $N_{DI}$ and the donor density of the area on the liquid-crystal-layer side is represented by $N_{DLC}$, an inequality $N_{DI} < N_{DLC}$, is satisfied.

35. The light-writing-type liquid crystal element as defined in claim 34, wherein the donor density of the photoconductive layer increases from the writing-light incident side toward the liquid crystal layer side in a multi-step level with one stop or more.

36. The light-writing-type liquid crystal element as defined in claim 32, wherein the first carrier-blocking layer is made of an insulating material.

37. The light-writing-type liquid crystal element as defined in claim 32, wherein the second carrier-blocking layer is made of an insulating material.

38. The light-writing-type liquid crystal element as defined in claim 32, wherein the photoconductive layer is a-Si:H film of I-type.

39. The light-writing-type liquid crystal element as defined in claim 32, wherein the photoconductive layer is a-Si:F:H film or I-type.

* * * * *